United States Patent
Beaumont et al.

(10) Patent No.: US 12,138,626 B2
(45) Date of Patent: Nov. 12, 2024

(54) IN SITU-GENERATED MICROFLUIDIC ISOLATION STRUCTURES, KITS AND METHODS OF USE THEREOF

(71) Applicant: BRUKER CELLULAR ANALYSIS, INC., Emeryville, CA (US)

(72) Inventors: Kristin G. Beaumont, New York, NY (US); Nan-Linda Ding, Vancouver (CA); Volker L. S. Kurz, Oakland, CA (US); Troy A. Lionberger, Berkeley, CA (US); Randall D. Lowe, Jr., Emeryville, CA (US); Daniele Malleo, San Jose, CA (US); Andrew W. McFarland, Berkeley, CA (US); J. Tanner Nevill, El Cerrito, CA (US); Xiaohua Wang, Albany, CA (US)

(73) Assignee: BRUKER CELLULAR ANALYSIS, INC., Emeryville, CA (US)

( * ) Notice: Subject to any disclaimer, the term of this patent is extended or adjusted under 35 U.S.C. 154(b) by 0 days.

(21) Appl. No.: 18/164,124

(22) Filed: Feb. 3, 2023

(65) Prior Publication Data
US 2023/0182136 A1 Jun. 15, 2023

Related U.S. Application Data

(62) Division of application No. 15/359,115, filed on Nov. 22, 2016, now Pat. No. 11,666,913.

(60) Provisional application No. 62/423,627, filed on Nov. 17, 2016, provisional application No. 62/258,957, filed on Nov. 23, 2015.

(51) Int. Cl.
*B01L 3/00* (2006.01)
*B01J 19/00* (2006.01)
*G01N 27/447* (2006.01)

(52) U.S. Cl.
CPC ..... *B01L 3/502753* (2013.01); *B01J 19/0093* (2013.01); *B01L 3/5023* (2013.01); *B01L 3/502707* (2013.01); *B01L 3/502738* (2013.01); *B01L 3/502761* (2013.01); *G01N 27/44791* (2013.01); *B01L 2200/0668* (2013.01); *B01L 2300/0816* (2013.01); *B01L 2300/0864* (2013.01); *B01L 2300/16* (2013.01); *B01L 2400/0424* (2013.01); *B01L 2400/0677* (2013.01); *B01L 2400/08* (2013.01)

(58) Field of Classification Search
CPC ............. B01L 3/502753; B01L 3/5023; B01L 3/502707; B01L 3/502738; B01L 3/502761; B01L 2200/0668; B01L 2300/0816; B01L 2300/0864; B01L 2300/16; B01L 2400/0424; B01L 2400/0677; B01L 2400/08; B01J 19/0093; G01N 27/44791
See application file for complete search history.

(56) References Cited

U.S. PATENT DOCUMENTS

| | | |
|---|---|---|
| 6,294,063 B1 | 9/2001 | Becker et al. |
| 6,387,707 B1 | 5/2002 | Seul et al. |
| 6,408,878 B2 | 6/2002 | Unger et al. |
| 6,488,872 B1 | 12/2002 | Beebe et al. |
| 6,942,776 B2 | 9/2005 | Medoro |
| 7,090,759 B1 | 8/2006 | Seul |
| 7,442,339 B2 | 10/2008 | Sundararajan et al. |
| 7,790,631 B2 | 9/2010 | Sharma et al. |
| 8,581,167 B2 | 11/2013 | Lean et al. |
| 8,685,344 B2 | 4/2014 | Sudarsan et al. |
| 9,144,806 B2 | 9/2015 | Chen et al. |
| 9,261,496 B2 | 2/2016 | Kamm et al. |
| 10,690,628 B2 | 6/2020 | Chapman et al. |
| 2003/0008364 A1 | 1/2003 | Wang et al. |
| 2003/0047456 A1 | 3/2003 | Medoro |
| 2003/0138819 A1 | 7/2003 | Gong et al. |
| 2003/0175947 A1 | 9/2003 | Liu et al. |
| 2003/0224528 A1 | 12/2003 | Chiou et al. |
| 2004/0072278 A1 | 4/2004 | Chou et al. |
| 2004/0115838 A1 | 6/2004 | Quake et al. |
| 2004/0191789 A1 | 9/2004 | Manaresi et al. |
| 2004/0197905 A1 | 10/2004 | Hafeman |
| 2005/0112548 A1 | 5/2005 | Segawa et al. |
| 2005/0129581 A1 | 6/2005 | McBride et al. |
| 2005/0175702 A1 | 8/2005 | Muller-Schulte |
| 2005/0175981 A1 | 8/2005 | Voldman et al. |
| 2005/0208465 A1 | 9/2005 | Arai et al. |
| 2005/0274456 A1 | 12/2005 | Roitman et al. |
| 2005/0274612 A1 | 12/2005 | Segawa et al. |

(Continued)

FOREIGN PATENT DOCUMENTS

| | | |
|---|---|---|
| CN | 101248709 | 8/2008 |
| CN | 101275114 | 10/2008 |

(Continued)

OTHER PUBLICATIONS

Beebe et al., "Functional Hydrogel Structures for Autonomous Flow Control inside Microfluidic Channels" Nature 404:588-90 (2000).
Betre et al., "Characterization of a Genetically Engineered Polypeptide for Cartilaginous Tissue Repair" Biomacromolecules 3:910-16 (2002).
Chen et al., Microfluidic approaches for cancer cell detection, characterization, and separation, Lab on a Chip 12:1753 (2012).
Chiou et al., "Massively parallel manipulation of single cells and microparticles using optical images," Nature, vol. 436 (Jul. 21, 2005), pp. 370-372.
Chiou, Pei-Yu, Massively Parallel Optical Manipulation of Cells, Micro- and Nano-Particles on Optoelectronic devices, Dissertation, University of California at Berkeley, 2005 (147 pages).

(Continued)

*Primary Examiner* — Samuel P Siefke
(74) *Attorney, Agent, or Firm* — Norton Rose Fulbright US LLP

(57) ABSTRACT

In situ-generated microfluidic isolation structures incorporating a solidified polymer network, methods of preparation and use, compositions and kits therefor are described. The ability to introduce in real time, a variety of isolating structures including pens and barriers offers improved methods of micro-object manipulation in microfluidic devices. The in situ-generated isolation structures may be permanently or temporarily installed.

20 Claims, 24 Drawing Sheets

(56) References Cited

U.S. PATENT DOCUMENTS

| | | |
|---|---|---|
| 2006/0091015 A1 | 5/2006 | Lau |
| 2006/0154361 A1 | 7/2006 | Wikswo et al. |
| 2006/0240545 A1 | 10/2006 | Tomida et al. |
| 2006/0240548 A1 | 10/2006 | Deutsch et al. |
| 2006/0263612 A1 | 11/2006 | Chen et al. |
| 2007/0095669 A1 | 5/2007 | Lau et al. |
| 2007/0183934 A1 | 8/2007 | Diercks et al. |
| 2007/0242105 A1 | 10/2007 | Srinivasan et al. |
| 2007/0264481 A1 | 11/2007 | DeSimone et al. |
| 2007/0292941 A1 | 12/2007 | Handique et al. |
| 2008/0014575 A1 | 1/2008 | Nelson |
| 2008/0153134 A1 | 6/2008 | Wiyatno et al. |
| 2008/0193536 A1 | 8/2008 | Khademhosseini et al. |
| 2008/0223721 A1 | 9/2008 | Cohen et al. |
| 2008/0302732 A1 | 12/2008 | Soh et al. |
| 2009/0023608 A1 | 1/2009 | Hung et al. |
| 2009/0170186 A1 | 7/2009 | Wu et al. |
| 2010/0003666 A1 | 1/2010 | Lee et al. |
| 2010/0009335 A1 | 1/2010 | Joseph et al. |
| 2010/0052196 A1 | 3/2010 | Yasuda et al. |
| 2010/0068706 A1 | 3/2010 | Pourahmadi et al. |
| 2010/0101960 A1 | 4/2010 | Ohta et al. |
| 2010/0151561 A1 | 6/2010 | Richter et al. |
| 2010/0263599 A1 | 10/2010 | Yanik et al. |
| 2010/0273681 A1 | 10/2010 | Cerrina et al. |
| 2010/0285490 A1 | 11/2010 | Dees et al. |
| 2011/0003325 A1 | 1/2011 | Durack |
| 2011/0053151 A1 | 3/2011 | Hansen et al. |
| 2011/0108422 A1 | 5/2011 | Heller et al. |
| 2011/0117634 A1 | 5/2011 | Halamish et al. |
| 2011/0143964 A1 | 6/2011 | Zhou et al. |
| 2011/0186165 A1 | 8/2011 | Borenstein et al. |
| 2011/0195527 A1 | 8/2011 | O'Neill et al. |
| 2011/0262906 A1 | 10/2011 | Dimov et al. |
| 2012/0009671 A1 | 1/2012 | Hansen et al. |
| 2012/0015347 A1 | 1/2012 | Singhal et al. |
| 2012/0024708 A1 | 2/2012 | Chiou et al. |
| 2012/0118740 A1 | 5/2012 | Garcia et al. |
| 2012/0156675 A1 | 6/2012 | Lueerssen et al. |
| 2012/0208266 A1 | 8/2012 | Bookbinder et al. |
| 2012/0325665 A1 | 12/2012 | Chiou et al. |
| 2013/0059322 A1 | 3/2013 | Hung et al. |
| 2013/0115606 A1 | 5/2013 | Hansen et al. |
| 2013/0118905 A1 | 5/2013 | Morimoto et al. |
| 2013/0130232 A1 | 5/2013 | Weibel et al. |
| 2013/0146459 A1 | 6/2013 | Bazant et al. |
| 2013/0171628 A1 | 7/2013 | Di Carlo et al. |
| 2013/0190212 A1 | 7/2013 | Handique et al. |
| 2013/0204076 A1 | 8/2013 | Han et al. |
| 2013/0213488 A1 | 8/2013 | Weitz et al. |
| 2013/0261021 A1 | 10/2013 | Bocchi et al. |
| 2013/0277218 A1 | 10/2013 | Mudrik et al. |
| 2013/0288065 A1 | 10/2013 | Chen et al. |
| 2014/0057311 A1 | 2/2014 | Kamm et al. |
| 2014/0116881 A1 | 5/2014 | Chapman et al. |
| 2014/0124370 A1 | 5/2014 | Short et al. |
| 2014/0154703 A1 | 6/2014 | Skelley et al. |
| 2014/0154791 A1 | 6/2014 | North et al. |
| 2014/0299472 A1 | 10/2014 | Chang et al. |
| 2015/0018226 A1 | 1/2015 | Hansen et al. |
| 2015/0148264 A1 | 5/2015 | Esfandyarpour et al. |
| 2015/0151298 A1 | 6/2015 | Hobbs et al. |
| 2015/0151307 A1 | 6/2015 | Breinlinger et al. |
| 2015/0165436 A1 | 6/2015 | Chapman et al. |
| 2015/0167043 A1 | 6/2015 | Goluch et al. |
| 2015/0306598 A1 | 10/2015 | Khandros et al. |
| 2015/0306599 A1 | 10/2015 | Khandros et al. |
| 2015/0352547 A1 | 12/2015 | Breinlinger et al. |
| 2016/0184821 A1 | 6/2016 | Hobbs et al. |
| 2016/0199837 A1 | 7/2016 | Breinlinger et al. |
| 2016/0222224 A1 | 8/2016 | Haag et al. |
| 2016/0252495 A1 | 9/2016 | Ricicova et al. |
| 2016/0257918 A1 | 9/2016 | Chapman et al. |
| 2016/0312165 A1 | 10/2016 | Lowe, Jr. et al. |
| 2016/0370266 A1 | 12/2016 | White et al. |
| 2017/0021366 A1 | 1/2017 | Chapman et al. |
| 2018/0298318 A1 | 10/2018 | Kurz et al. |
| 2019/0240665 A1 | 8/2019 | Lionberger et al. |
| 2019/0275516 A1 | 9/2019 | Lowe, Jr. et al. |

FOREIGN PATENT DOCUMENTS

| | | |
|---|---|---|
| CN | 103477222 | 12/2013 |
| CN | 104838273 | 8/2015 |
| EP | 0421380 | 12/1995 |
| EP | 1065378 | 1/2001 |
| EP | 2397224 | 12/2011 |
| EP | 2647434 | 5/2017 |
| JP | 2006-512092 | 4/2006 |
| JP | 2007108087 | 4/2007 |
| JP | 4228114 | 2/2009 |
| JP | 2011000079 | 1/2011 |
| JP | 2011101626 | 5/2011 |
| KR | 20100008222 | 1/2010 |
| WO | WO 2000/046595 | 8/2000 |
| WO | WO 2002/081183 | 10/2002 |
| WO | WO 2002/088702 | 11/2002 |
| WO | WO 2004/061085 | 7/2004 |
| WO | WO 2005/007796 | 1/2005 |
| WO | WO 2005/095963 | 10/2005 |
| WO | WO 2005/100541 | 10/2005 |
| WO | WO 2006/117541 | 11/2006 |
| WO | WO 2007/061448 | 5/2007 |
| WO | WO 2007/074756 | 7/2007 |
| WO | WO 2007/092713 | 8/2007 |
| WO | WO 2008/119066 | 10/2008 |
| WO | WO 2008/131048 | 10/2008 |
| WO | WO 2009/061392 | 5/2009 |
| WO | WO 2010/115167 | 10/2010 |
| WO | WO 2010/147078 | 12/2010 |
| WO | WO 2012/037030 | 3/2012 |
| WO | WO 2012/072823 | 6/2012 |
| WO | WO 2013/019491 | 2/2013 |
| WO | WO 2013/130714 | 9/2013 |
| WO | WO 2014/070873 | 5/2014 |
| WO | WO 2015/061462 | 4/2015 |
| WO | WO 2015/061497 | 4/2015 |
| WO | WO 2015/061506 | 4/2015 |
| WO | WO 2015/095623 | 6/2015 |
| WO | WO 2015/164846 | 10/2015 |
| WO | WO 2015/164847 | 10/2015 |
| WO | WO 2015/188171 | 12/2015 |
| WO | WO 2016/090295 | 6/2016 |
| WO | WO 2017/100347 | 6/2017 |
| WO | WO 2022/150659 | 7/2022 |

OTHER PUBLICATIONS

Chow et al., "Peptide-based polymers in biomedicine and biotechnology" Materials Science and Engineering 62:125-155 (2008).

Chung et al., Imaging Single-Cell Signaling Dynamics with a Deterministic High-Density Single-Cell Trap Array, Anal. Chem. 83(18):7044-7052 (2011).

Core BLI Chip Reference—BL000162US as published 20150165436A1.

DiCarlo et al., "Dynamic Single Cell Analysis for Quantitative Biology," Analytical Chemistry (Dec. 1, 2006), pp. 7918-7925.

Fairbanks et al., "Photoinitiated Polymerization of PEG-diacrylate with lithium phenyl-2,4,6-trimethylbenzoylphosphinate: polymerization rate and cytocompatability" Biomaterials 30(35):6702-6707 (2009).

Folk et al., Hydrogel Microvalves with Short Response Time, 226 American Chemical Society National Meeting, New York (2003).

Fuchs et al., "Electronic sorting and recovery of single live cells from microlitre sized samples" Lab on a Chip 6:121-26 (2006).

Gascoyne, Peter et al., "Dielectrophoretic Separation of Cancer Cells from Blood", IEEE Trans Ind Appl. 1997, vol. 33(3), pp. 67-678, Dec. 2009.

Hsu, Hy et al., "Sorting of Differentiated Neurons Using Phototransistor-Based Optoelectronic Tweezers for Cell Replacement Therapy of Neurodegenerative Diseases", Transducers 2009, Denver, CO USA Jun. 2009, download dated Nov. 23, 2009 from IEEE Xplore, 4 pages.

(56) References Cited

OTHER PUBLICATIONS

Hulkower, Keren I. and Renee L. Herber. "Cell Migration and Invasion Assays as Tools for Drug Discovery"; Pharmaceutics (2011) 3, 107-124; doi:10.3390/pharmaceutics3010107.

Hung et al., Continuous Perfusion Microfluidic Cell Culture Array for High-Throughput Cell-Based Assays, Biotech and Bioengineering 89(1): 1-8 (2004). Dec. 3, 2004.

Iliescu et al., Continuous Field-Flow Separation of Particle Populations in a Dielectrophoretic Chip with Three Dimensional Electrodes, Applied Physics Letters 90:234104 (2007).

Jamshidi, Arash and Wu, Ming C.; Optoelectronic Manipulation, Assembly, and Patterning of Nanoparticles; Dissertation (University of California, Berkeley); Technical Report No. UCB/EECS-2009-165 (Dec. 10, 2009).

Jongpaiboonkit et al., "An adaptable hydrogel array format for 3-dimensional cell culture and analysis", Biomaterials 29:3346-3356 (2008).

Kim et al., "A practical guide to microfluidic perfusion culture of adherent mammalian cells" Lab on a Chip 11(7): 681-694.

Kleparnik, K. et al., "Recent advances in the development of single cell analysis—A review", Analytica chemical acta, 2013, 800, 12-21.

Lee et al., "Development of Macroporous PEG Hydrogel Arrays within Microfluidic Channels" Biomacromolecules 13:11(12): 3316-3324 (2010).

Lee et al., Microfluidic Chemostat and Turbidostat with Flow Rate, Oxygen and Temperature Control for Dynamic Continuous Culture, Lab on a Chip 11:1730-39 (2011).

Lee, Gi-Hun et al. "Separation and sorting of cells in microsystems using physical principles", Journal of Micromechanics & Microengineering, Institute of Physics Publishing, Bristol, GB, vol. 26, No. 1, Dec. 16, 2015 (Dec. 16, 2015), p. 13003.

Meng et al., A Review of Stimuli-responsive shape memory polymer composites, Polymer 54:2199-2221 (2013).

Nevill et al., Integrated microfluidic cell culture and lysis on a chip, Lab on a Chip 7:1689-95 (2007).

Papageorgiou, D.P. et al. "Superior performance of multilayered fluoropolymer films in low voltage electrowetting" Journal of Colloid Interface Science, Oct. 25, 2011, vol. 368, No. 1, pp. 592-598.

Sajeesh, P. et al., "Particle separation and sorting in microfluidic devices: a review" Microfluid Nanofluid (2014) vol. 17, pp. 1-52.

Sochol, et al. (2013). Single-layer "domino" diodes via optofluidic lithography for ultra-low Reynolds number applications. Proceedings of the IEEE International Conference on Micro Electro Mechanical Systems (MEMS). 2. 153-156. 10.1109/MEMSYS.2013.6474200.

Somaweera H. et al., Generation of a Chemical Gradient Across an Array of 256 Cell Cultures in a Single Chip. Analyst, Oct. 7, 2013, vol. 138, No. 19, pp. 5566-5571.

Sun, Jinchen and Tan, Huaping; "Alginate-Based Biomaterials for Regenerative Medicine Applications"; Materials (2013) 6, 1285-1309.

Valley et al., Optoelectronic Tweezers as a Tool for Parallel Single-Cell Manipulation and Stimulation, IEEE Transactions on Biomedical Circuits and Systems, vol. 3, No. 6 (Dec. 2009), pp. 424-431.

Vats et al., "Dynamic Manipulation of Hydrogels to Control Cell Behavior: A Review" Tissue Engineering: Part B 19(6):445-469 (2013).

Xu, Guoling et al,. Recent Trends in Dielectrophoresis, Informacije MIDEM, 2010, vol. 40, Issue No. 4, pp. 253-262.

Yi et al., "Microfluidics technology for manipulation and analysis of biological cells," Analytica Chimica Acta 560 (2006), pp. 1-23.

Z Report_European Patent Office, International Report on Patentability by the the International Searching Authority for related PCT/US2016/063387, mailed Jun. 7, 2018, 13 pages.

Z Report_European Patent Office, International Search Report by the the International Searching Authority for related PCT/US2016/063387, mailed Mar. 31, 2017, 7 pages.

Z Report_European Patent Office, Written Opinion by the the International Searching Authority for related PCT/US2016/063387, mailed May 29, 2018, 12 pages.

Z Report_International Preliminary Report on Patentability issued Jun. 21, 2018 in International Application No. PCT/US2016/065426 (12 pages).

Z Report_International Search Report and Written Opinion issued in International Application No. PCT/US2016/065426 mailed Feb. 16, 2017 (14 pages).

Z Report_International Search Report and Written Opinion issued in International Application No. PCT/US2016/065452 mailed Feb. 16, 2017.

Z Report_Singapore Office Action issued Aug. 7, 2019 in Singapore Patent Application No. 11201804275T (8 pages).

Zhang et al., "Azide Functional Monolayers Grafted to a Germanium Surface: Model Substrates for ATR-IR Studies of Interfacial Click Reactions," Langmuir, Vo. 28, No. 1, Nov. 14, 2011, abstract (2 pages).

Zhang, Z. et al. "'Click' chemistry-based surface modification of poly(dimethylsiloxane) for protein separation in a microfluidic chaip" Electrophoresis, Sep. 20, 2010, vol. 31, No. 18, pp. 3129-3136.

Zustiak, Silviya P. and Leach, Jennie B.; Hydrolytically degradable poly(ethylene glycol) hydrogelscaffolds with tunable degradation and mechanical properties; Biomacromolecules. May 10, 2010; 11(5): 1348-1357.

Official Action issued Feb. 27, 2024 in related Korean Patent Application No. 10-2018-7017925 (with English Translation), 19 pgs.

Official Action issued Mar. 12, 2024 in related Japanese Patent Application No. 2023-014512 (with English Translation), 8 pgs.

Official Action issued May 9, 2024 in related Chinese Patent Application No. 2022108957754 (with English translation), 6 pgs.

Search Report issued May 7, 2024 in related Chinese Patent Application No. 2022108957754 (with English translation), 3 pgs.

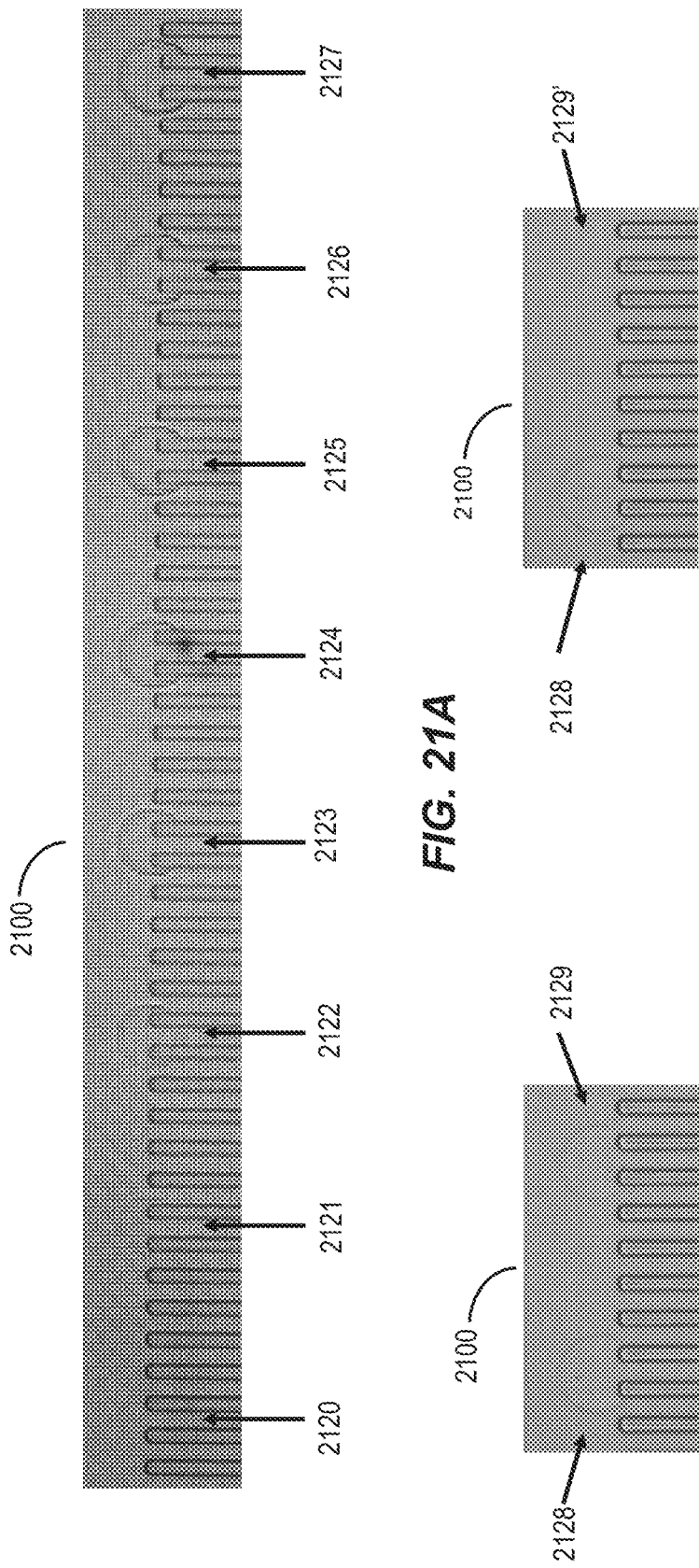

IN SITU-GENERATED MICROFLUIDIC ISOLATION STRUCTURES, KITS AND METHODS OF USE THEREOF

This application is a divisional of U.S. patent application Ser. No. 15/359,115, filed Nov. 22, 2016, which claims the benefit of priority to U.S. Provisional Application No. 62/258,957 filed on Nov. 23, 2015, and of U.S. Provisional Application No. 62/423,627 filed on Nov. 17, 2016, the entire content of each of which are incorporated by reference in their entirety.

BACKGROUND OF THE INVENTION

In biosciences and related fields, it can be useful to have the ability to re-configure the flow region of a microfluidic device in real time. Some embodiments of the present invention include apparatuses and processes for in situ-generation of microfluidic isolation structures.

SUMMARY OF THE INVENTION

In one aspect, a microfluidic device is provided which includes an enclosure having: a substrate; a flow region located within the enclosure; and at least one in situ-generated isolation structure disposed on the substrate, where the at least one in situ-generated isolation structure includes a solidified polymer network. In some embodiments, the solidified polymer network does not include a silicone polymer. In some embodiments, the solidified polymer network does not include silicon. The solidified polymer network may include a photoinitiated polymer. All or at least part of the at least one in situ-generated isolation structure may consist of the solidified polymer network.

In another aspect, a microfluidic device is provided which includes an enclosure having: a substrate; a microfluidic channel; at least one sequestration pen; and an in situ-generated barrier. The sequestration pen may include an isolation region and a connection region, the connection region having a proximal opening to the microfluidic channel and a distal opening to the isolation region. The in situ-generated barrier may be disposed to provide at least a partial blockade of the microfluidic channel and/or the sequestration pen. In various embodiments, the in situ-generated barrier may include a solidified polymer network. The solidified polymer network may include a photoinitiated polymer.

In yet another aspect, a microfluidic device is provided which includes an enclosure having: a substrate; a flow region including a microfluidic channel configured to contain a fluidic medium; a first plurality of sequestration pens disposed adjacent to each other such that each sequestration pen of the first plurality opens off a first side of the microfluidic channel; and a second plurality of sequestration pens disposed adjacent to each other such that each sequestration pen of the second plurality opens off a second opposing side of the microfluidic channel. The first side of the microfluidic channel may be configured to receive a first fluidic medium, and the second side of the microfluidic channel may be configured to receive a second fluidic medium. In various embodiments, the enclosure may further comprise a barrier. The barrier may be configured to divide the microfluidic channel into a first sub-channel and a second sub-channel, wherein the first sub-channel is configured to provide a first sub-flow of fluidic medium past the first plurality of sequestration pens, and wherein the second sub-channel is configured to provide a second sub-flow of fluidic medium past the second plurality of sequestration pens. The barrier may comprise, consist of, or consist essentially of an in situ-generated barrier. Thus, in certain embodiments, the barrier may comprise a portion that is not an in situ-generated barrier. In various embodiments, the barrier may be punctuated by at least one gap. The gap may be aligned between a proximal opening of a first pen of the first plurality of pens and a proximal opening of a corresponding first pen of the second plurality of pens. In various embodiments, the in situ-generated barrier may prevent cells from moving from the first sub-channel to the second sub-channel, and vice versa.

In another aspect, a method of isolating a micro-object in a microfluidic device is provided, including the steps of: introducing a first fluidic medium including a plurality of micro-objects into an enclosure of the microfluidic device, the enclosure including a substrate and a flow region; introducing a solution including a flowable polymer into the enclosure; activating solidification of the flowable polymer at at least one selected area of the flow region, thereby forming an in situ-generated isolation structure; and isolating at least one of the plurality of micro-objects with the in situ-generated isolation structure. In some embodiments, the step of initiating solidification of the flowable polymer may include optically illuminating the at least one selected area of the flow region. In some embodiments, the solidification of the flowable polymer may include the polymerization of polymers of the flowable polymer into a polymer network. The step of introducing a flowable polymer may further include introducing a photoactivatable polymerization initiator.

In another aspect, a method of isolating a micro-object in a microfluidic device is provided, including the steps of: providing a microfluidic device including an enclosure having a substrate, a flow region including a microfluidic channel, and a plurality of sequestration pens; introducing a first fluidic medium including a plurality of micro-objects into the microfluidic channel of the microfluidic device; disposing ones of the plurality of micro-objects in at least a portion of the plurality of sequestration pens, thereby forming a plurality of populated sequestration pens each containing at least one micro-object; introducing a second fluidic medium into the microfluidic channel, wherein the second fluidic medium comprises a flowable polymer; selecting at least one of the plurality of populated sequestration pens; initiating polymerization of the flowable polymer at at least a first selected point within or adjacent to at least one selected sequestration pen, where the polymerized polymer of the flowable polymer generates at least a partial in situ-generated barrier that prevents the at least one micro-object from exiting the at least one selected sequestration pen. Each of the plurality of sequestration pens may include an isolation region and a connection region, the connection region having a proximal opening to the microfluidic channel and a distal opening to the isolation region. In certain embodiments, initiating polymerization of the flowable polymer at a selected point within or adjacent to a sequestration pen comprises: initiating polymerization within the connection region or isolation region of the sequestration pen; and/or initiating polymerization at or adjacent to an edge of the proximal opening of the connection region.

In another aspect, a method of concentrating micro-objects in a microfluidic device may be provided, including the steps of: providing a microfluidic device including an enclosure having a substrate and a flow region configured to contain a fluidic medium; introducing an in situ-generated isolation structure in a first sector of the flow region, where the in situ-generated isolation structure is configured to permit the fluidic medium to flow through the in situ-generated isolation structure while preventing at least one micro-object in the fluidic medium from passing into, out of, and/or through the in situ-generated isolation structure; introducing a first plurality of micro-objects in a first volume of the fluidic medium into the first sector of the flow region; and concentrating at least a first subset of the first plurality of micro-objects in the first sector of the flow region. In various embodiments, the first volume of the fluidic medium may be larger than a volume of the first sector of the flow region.

In another aspect, a method of assaying a cell of a clonal population in a microfluidic device is provided, the method including the steps of: introducing a first fluidic medium comprising a plurality of cells into an enclosure of the microfluidic device, the enclosure comprising a substrate, a flow region comprising a microfluidic channel configured to contain a fluidic medium, a first plurality of sequestration pens disposed adjacent to each other such that each sequestration pen of the first plurality opens off a first side of the microfluidic channel, and a second plurality of sequestration pens disposed adjacent to each other such that each sequestration pen of the second plurality opens off a second opposing side of the microfluidic channel; flowing the first fluidic medium and the plurality of cells into the microfluidic channel of the microfluidic device; introducing a clonal population of cells in each of the sequestration pens of the first plurality of sequestration pens; for each clonal population of cells in the first plurality of sequestration pens, moving at least one cell to a respective sequestration pen of the second plurality of sequestration pens; introducing a flowable polymer into the microfluidic channel; activating solidification of the flowable polymer along a length of the microfluidic channel, thereby forming an in situ-generated barrier dividing the microfluidic channel into a first sub-channel configured to provide a first sub-flow of fluidic medium past the first plurality of sequestration pens and a second sub-channel configured to provide a second sub-flow of fluidic medium past the second plurality of sequestration pens, wherein the in situ-generated barrier prevents cells from moving from the first sub-channel to the second sub-channel, and vice versa; flowing a second fluidic medium into the second sub-channel, wherein the second fluidic medium comprises reagents for assaying the cells in the second plurality of sequestration pens; and assaying the cell(s) in each sequestration pen of the second plurality. The step of introducing the clonal population may include introducing a single cell into each of the first plurality of sequestration pens, and may further include expanding the single cell to a clonal population of cells.

In another aspect, a kit for isolating a micro-object within a microfluidic device is provided, the kit including a microfluidic device comprising an enclosure having: a substrate and a flow region located within the enclosure; and a flowable polymer solution, where the polymer may be capable of polymerization and/or thermally-induced gelling. In some embodiments, flowable polymer may be configured to be polymerized by photoinitiation. In some embodiments, the kit may further include a photoactivatable polymerization initiator. In some embodiments, the microfluidic device may further include at least one sequestration pen. In various embodiments, the at least one sequestration pen may include an isolation region and a connection region, the connection region having a proximal opening to the flow region and a distal opening to the isolation region.

In another aspect, a kit for assaying cells of a clonal population is provided, the kit including: a microfluidic device comprising an enclosure having a substrate, a flow region including a channel located within the enclosure, a first plurality of sequestration pens disposed adjacent to each other such that each sequestration pen of the first plurality opens off a first side of the microfluidic channel, and a second plurality of sequestration pens disposed adjacent to each other such that each sequestration pen of the second plurality opens off a second opposing side of the microfluidic channel; and a flowable polymer solution, wherein the polymer is capable of polymerization and/or thermally-induced gelling. In some embodiments, the microfluidic device may further include a barrier separating the first side of the microfluidic channel from the second side of the microfluidic channel. In some embodiments, the barrier is punctuated by at least one gap aligned between a proximal opening to the microfluidic channel of a first pen of the first plurality of pens and a proximal opening to the microfluidic channel of a first pen of the second plurality of pens.

BRIEF DESCRIPTION OF THE DRAWINGS

FIGS. 21A-C are photographic representations of in situ-generated isolation structures of a microfluidic (or nanofluidic) device, according to an embodiment of the invention.

DETAILED DESCRIPTION OF THE INVENTION

Figure 1A:
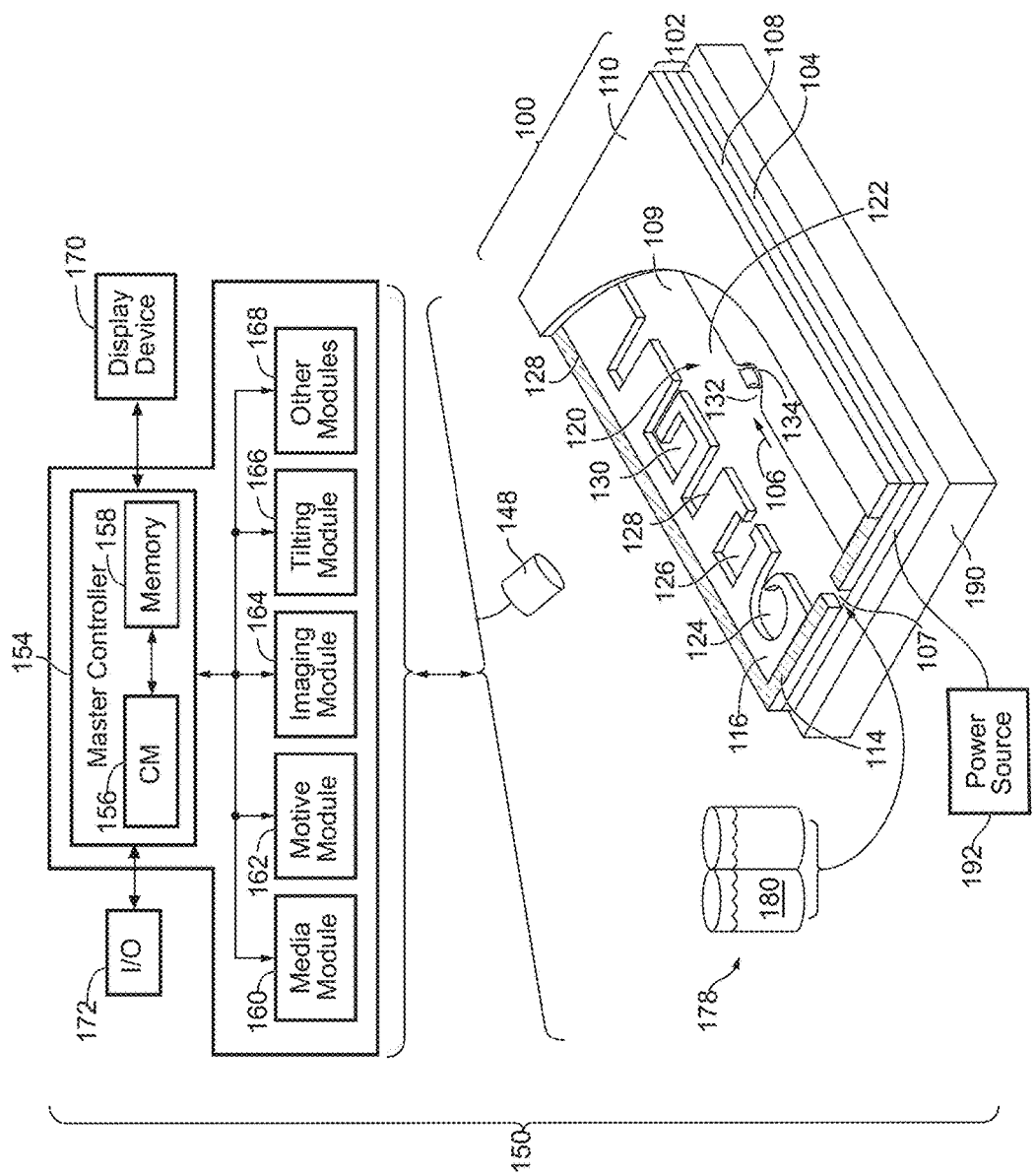
FIG. 1A illustrates an example of a system for use with a microfluidic device and associated control equipment according to some embodiments of the invention.

This specification describes exemplary embodiments and applications of the invention. The invention, however, is not limited to these exemplary embodiments and applications or to the manner in which the exemplary embodiments and applications operate or are described herein. Moreover, the Figures may show simplified or partial views, and the dimensions of elements in the Figures may be exaggerated or otherwise not in proportion for clarity. In addition, as the terms "on," "attached to," or "coupled to" are used herein, one element (e.g., a material, a layer, a substrate, etc.) can be "on," "attached to," or "coupled to" another element regardless of whether the one element is directly on, attached, or coupled to the other element or there are one or more intervening elements between the one element and the other element. Also, directions (e.g., above, below, top, bottom, side, up, down, under, over, upper, lower, horizontal, vertical, "x," "y," "z," etc.), if provided, are relative and provided solely by way of example and for ease of illustration and discussion and not by way of limitation. In addition, where reference is made to a list of elements (e.g., elements a, b, c), such reference is intended to include any one of the listed elements by itself, any combination of less than all of the listed elements, and/or a combination of all of the listed elements.

Section divisions in the specification are for ease of review only and do not limit any combination of elements discussed.

As used herein, "substantially" means sufficient to work for the intended purpose. The term "substantially" thus allows for minor, insignificant variations from an absolute or perfect state, dimension, measurement, result, or the like such as would be expected by a person of ordinary skill in the field but that do not appreciably affect overall performance. When used with respect to numerical values or parameters or characteristics that can be expressed as numerical values, "substantially" means within ten percent.

As used herein, the term "ones" means more than one. As used herein, the term "plurality" can be 2, 3, 4, 5, 6, 7, 8, 9, 10, or more.

As used herein: μm means micrometer, $\mu m^3$ means cubic micrometer, pL means picoliter, nL means nanoliter, and μL (or uL) means microliter.

As used herein, the term "transparent" refers to a material which allows visible light to pass through without substantially altering the light as is passes through.

As used herein, the term "disposed" encompasses within its meaning "located."

As used herein, a "nanofluidic device" or "nanofluidic apparatus" is a type of microfluidic device having a microfluidic circuit that contains at least one circuit element, including but not limited to region(s), flow path(s), channel (s), chamber(s), and/or pen(s), configured to hold a volume of fluid of less than about 1 μL, e.g., less than about 750, 500, 250, 200, 150, 100, 75, 50, 25, 20, 15, 10, 9, 8, 7, 6, 5, 4, 3, 2, 1 nL or less. A nanofluidic device may comprise a plurality of circuit elements (e.g., at least 2, 3, 4, 5, 6, 7, 8, 9, 10, 15, 20, 25, 50, 75, 100, 150, 200, 250, 300, 400, 500, 600, 700, 800, 900, 1000, 1500, 2000, 2500, 3000, 3500, 4000, 4500, 5000, 6000, 7000, 8000, 9000, 10,000, or more). In certain embodiments, one or more (e.g., all) of the at least one circuit elements is configured to hold a volume of fluid of about 100 pL to nL, 100 pL to 2 nL, 100 pL to 5 nL, 250 pL to 2 nL, 250 pL to 5 nL, 250 pL to 10 nL, 500 pL to 5 nL, 500 pL to 10 nL, 500 pL to 15 nL, 750 pL to 10 nL, 750 pL to 15 nL, 750 pL to 20 nL, 1 to 10 nL, 1 to 15 nL, 1 to 20 nL, 1 to 25 nL, or 1 to 50 nL. In other embodiments, one or more (e.g., all) of the at least one circuit elements is configured to hold a volume of fluid of about 20 nL to 200 nL, 100 to 200 nL, 100 to 300 nL, 100 to 400 nL, 100 to 500 nL, 200 to 300 nL, 200 to 400 nL, 200 to 500 nL, 200 to 600 nL, 200 to 700 nL, 250 to 400 nL, 250 to 500 nL, 250 to 600 nL, or 250 to 750 nL.

As used herein, a "flow path" refers to one or more fluidically connected circuit elements (e.g. channel(s), region(s), chamber(s) and the like) that define, and are subject to, the trajectory of a flow of medium. A flow path is thus an example of a swept region of a microfluidic device. Other circuit elements (e.g., unswept regions) may be fluidically connected with the circuit elements that comprise the flow path without being subject to the flow of medium in the flow path.

A "microfluidic channel" or "flow channel" as used herein refers to flow region of a microfluidic device having a length that is significantly longer than both the horizontal and vertical dimensions. For example, the flow channel can be at least 5 times the length of either the horizontal or vertical dimension, e.g., at least 10 times the length, at least 25 times the length, at least 100 times the length, at least 200 times the length, at least 500 times the length, at least 1,000 times the length, at least 5,000 times the length, or longer. In some embodiments, the length of a flow channel is in the range of from about 100,000 microns to about 500,000 microns, including any range therebetween. In some embodiments, the horizontal dimension is in the range of from about 100 microns to about 1000 microns (e.g., about 150 to about 500 microns) and the vertical dimension is in the range of from about 25 microns to about 200 microns, e.g., from about 40 to about 150 microns. It is noted that a flow channel may have a variety of different spatial configurations in a microfluidic device, and thus is not restricted to a perfectly linear element. For example, a flow channel may be, or include one or more sections having, the following configurations: curve, bend, spiral, incline, decline, fork (e.g., multiple different flow paths), and any combination thereof. In addition, a flow channel may have different cross-sectional areas along its path, widening and constricting to provide a desired fluid flow therein.

As used herein, the term "obstruction" refers generally to a bump or similar type of structure that is sufficiently large so as to partially (but not completely) impede movement of target micro-objects between two different regions or circuit elements in a microfluidic device. The two different regions/circuit elements can be, for example, the connection region and the isolation region of a microfluidic sequestration pen.

As used herein, the term "constriction" refers generally to a narrowing of a width of a circuit element (or an interface between two circuit elements) in a microfluidic device. The constriction can be located, for example, at the interface between the isolation region and the connection region of a microfluidic sequestration pen of the instant invention.

As used herein in reference to a fluidic medium, "diffuse" and "diffusion" refer to thermodynamic movement of a component of the fluidic medium down a concentration gradient.

The phrase "flow of a medium" means bulk movement of a fluidic medium primarily due to any mechanism other than diffusion. For example, flow of a medium can involve movement of the fluidic medium from one point to another point due to a pressure differential between the points. Such flow can include a continuous, pulsed, periodic, random, intermittent, or reciprocating flow of the liquid, or any combination thereof. When one fluidic medium flows into another fluidic medium, turbulence and mixing of the media can result.

The phrase "substantially no flow" refers to a rate of flow of a fluidic medium that, averaged over time, is less than the rate of diffusion of components of a material (e.g., an analyte of interest) into or within the fluidic medium. The rate of diffusion of components of such a material can depend on, for example, temperature, the size of the components, and the strength of interactions between the components and the fluidic medium.

As used herein in reference to different regions within a microfluidic device, the phrase "fluidically connected" means that, when the different regions are substantially filled with fluid, such as fluidic media, the fluid in each of the regions is connected so as to form a single body of fluid. This does not mean that the fluids (or fluidic media) in the different regions are necessarily identical in composition. Rather, the fluids in different fluidically connected regions of a microfluidic device can have different compositions (e.g., different concentrations of solutes, such as proteins, carbohydrates, ions, or other molecules) which are in flux as solutes move down their respective concentration gradients and/or fluids flow through the device.

A microfluidic (or nanofluidic) device can comprise "swept" regions and "unswept" regions. As used herein, a "swept" region is comprised of one or more fluidically interconnected circuit elements of a microfluidic circuit, each of which experiences a flow of medium when fluid is flowing through the microfluidic circuit. The circuit elements of a swept region can include, for example, regions, channels, and all or parts of chambers. As used herein, an "unswept" region is comprised of one or more fluidically interconnected circuit element of a microfluidic circuit, each of which experiences substantially no flux of fluid when fluid is flowing through the microfluidic circuit. An unswept region can be fluidically connected to a swept region, provided the fluidic connections are structured to enable diffusion but substantially no flow of media between the swept region and the unswept region. The microfluidic device can thus be structured to substantially isolate an unswept region from a flow of medium in a swept region, while enabling substantially only diffusive fluidic communication between the swept region and the unswept region. For example, a flow channel of a micro-fluidic device is an example of a swept region while an isolation region (described in further detail below) of a microfluidic device is an example of an unswept region.

The capability of biological micro-objects (e.g., biological cells) to produce specific biological materials (e.g., proteins, such as antibodies) can be assayed in such a microfluidic device. In a specific embodiment of an assay, sample material comprising biological micro-objects (e.g., cells) to be assayed for production of an analyte of interest can be loaded into a swept region of the microfluidic device. Ones of the biological micro-objects (e.g., mammalian cells, such as human cells) can be selected for particular characteristics and disposed in unswept regions. The remaining sample material can then be flowed out of the swept region and an assay material flowed into the swept region. Because the selected biological micro-objects are in unswept regions, the selected biological micro-objects are not substantially affected by the flowing out of the remaining sample material or the flowing in of the assay material. The selected biological micro-objects can be allowed to produce the analyte of interest, which can diffuse from the unswept regions into the swept region, where the analyte of interest can react with the assay material to produce localized detectable reactions, each of which can be correlated to a particular unswept region. Any unswept region associated with a detected reaction can be analyzed to determine which, if any, of the biological micro-objects in the unswept region are sufficient producers of the analyte of interest.

As used herein, the term "micro-object" refers generally to any microscopic object that may be isolated and/or manipulated in accordance with the present invention. Non-limiting examples of micro-objects include: inanimate micro-objects such as microparticles; microbeads (e.g., polystyrene beads, Luminex™ beads, or the like); magnetic beads; microrods; microwires; quantum dots, and the like; biological micro-objects such as cells; biological organelles; vesicles, or complexes; synthetic vesicles; liposomes (e.g., synthetic or derived from membrane preparations); lipid nanorafts, and the like; or a combination of inanimate micro-objects and biological micro-objects (e.g., microbeads attached to cells, liposome-coated micro-beads, liposome-coated magnetic beads, or the like). Beads may include moieties/molecules covalently or non-covalently attached, such as fluorescent labels, proteins, carbohydrates, antigens, small molecule signaling moieties, or other chemical/biological species capable of use in an assay. Lipid nanorafts have been described, for example, in Ritchie et al. (2009) "Reconstitution of Membrane Proteins in Phospholipid Bilayer Nanodiscs," Methods Enzymol., 464:211-231.

As used herein, the term "cell" is used interchangeably with the term "biological cell." Non-limiting examples of biological cells include eukaryotic cells, plant cells, animal cells, such as mammalian cells, reptilian cells, avian cells, fish cells, or the like, prokaryotic cells, bacterial cells, fungal cells, protozoan cells, or the like, cells dissociated from a tissue, such as muscle, cartilage, fat, skin, liver, lung, neural tissue, and the like, immunological cells, such as T cells, B cells, natural killer cells, macrophages, and the like, embryos (e.g., zygotes), oocytes, ova, sperm cells, hybridomas, cultured cells, cells from a cell line, cancer cells, infected cells, transfected and/or transformed cells, reporter cells, and the like. A mammalian cell can be, for example, from a human, a mouse, a rat, a horse, a goat, a sheep, a cow, a primate, or the like.

A colony of biological cells is "clonal" if all of the living cells in the colony that are capable of reproducing are daughter cells derived from a single parent cell. In certain embodiments, all the daughter cells in a clonal colony are derived from the single parent cell by no more than 10 divisions. In other embodiments, all the daughter cells in a clonal colony are derived from the single parent cell by no more than 14 divisions. In other embodiments, all the daughter cells in a clonal colony are derived from the single parent cell by no more than 17 divisions. In other embodiments, all the daughter cells in a clonal colony are derived from the single parent cell by no more than 20 divisions. The term "clonal cells" refers to cells of the same clonal colony.

As used herein, a "colony" of biological cells refers to 2 or more cells (e.g. about 2 to about 20, about 4 to about 40, about 6 to about 60, about 8 to about 80, about 10 to about 100, about 20 about 200, about 40 about 400, about 60 about 600, about 80 about 800, about 100 about 1000, or greater than 1000 cells).

As used herein, the term "maintaining (a) cell(s)" refers to providing an environment comprising both fluidic and gaseous components and, optionally a surface, that provides the conditions necessary to keep the cells viable and/or expanding.

As used herein, the term "expanding" when referring to cells, refers to increasing in cell number.

As used herein, the term "processing" when referring to processing cells, may include culturing or continuing to culture the cells, assaying the cells using one or more assays, and/or preparing the cells for a procedure such as, but not limited to, lysis, fusion, transfection, gene editing of any kind (e.g., targeted gene editing) and/or genotyping.

As used herein, "isolating a micro-object" means confining a micro-object to a defined area within the microfluidic device. The micro-object may still be capable of motion within the defined area (e.g., within an in situ-generated isolation structure).

As used herein, "antibody" refers to an immunoglobulin (Ig) and includes both polyclonal and monoclonal antibodies; primatized (e.g., humanized); murine; mouse-human; mouse-primate; and chimeric; and may be an intact molecule, a fragment thereof (such as scFv, Fv, Fd, Fab, Fab' and F(ab)'2 fragments), or multimers or aggregates of intact molecules and/or fragments; and may occur in nature or be produced, e.g., by immunization, synthesis or genetic engineering. An "antibody fragment," as used herein, refers to fragments, derived from or related to an antibody, which bind antigen and which in some embodiments may be derivatized to exhibit structural features that facilitate clearance and uptake, e.g., by the incorporation of galactose residues. This includes, e.g., F(ab), F(ab)'2, scFv, light chain variable region (VL), heavy chain variable region (VH), and combinations thereof.

A "component" of a fluidic medium is any chemical or biochemical molecule present in the medium, including solvent molecules, ions, small molecules, antibiotics, nucleotides and nucleosides, nucleic acids, amino acids, peptides, proteins, sugars, carbohydrates, lipids, fatty acids, cholesterol, metabolites, or the like.

As used herein, "capture moiety" is a chemical or biological species, functionality, or motif that provides a recognition site for a micro-object. A selected class of micro-objects may recognize the capture moiety and may bind or have an affinity for the capture moiety. Non-limiting examples include antigens, antibodies, and cell surface binding motifs.

As used herein, "flowable polymer" is a polymer monomer or macromer that is soluble or dispersible within a fluidic medium. The flowable polymer may be input into a microfluidic flow region and flow with other components of a fluidic medium therein.

As used herein, "photoinitiated polymer" refers to a polymer (or a monomeric molecule that can be used to generate the polymer) that upon exposure to light, is capable of crosslinking covalently, forming specific covalent bonds, changing regiochemistry around a rigidified chemical motif, or forming ion pairs which cause a change in physical state, and thereby forming a polymer network. In some instances, a photoinitiated polymer may include a polymer segment bound to one or more chemical moieties capable of crosslinking covalently, forming specific covalent bonds, changing regiochemistry around a rigidified chemical motif, or forming ion pairs which cause a change in physical state. In some instances, a photoinitiated polymer may require a photoactivatable radical initiator to initiate formation of the polymer network (e.g., via polymerization of the polymer).

Microfluidic devices and systems for operating and observing such devices. FIG. 1A illustrates an example of a microfluidic device 100 and a system 150 which can be used for generation of embryos in vitro, including selecting and evaluating ova and/or oocytes and/or sperm. A perspective view of the microfluidic device 100 is shown having a partial cut-away of its cover 110 to provide a partial view into the microfluidic device 100. The microfluidic device 100 generally comprises a microfluidic circuit 120 comprising a flow path 106 through which a fluidic medium 180 can flow, optionally carrying one or more micro-objects (not shown) into and/or through the microfluidic circuit 120. Although a single microfluidic circuit 120 is illustrated in FIG. 1A, suitable microfluidic devices can include a plurality (e.g., 2 or 3) of such microfluidic circuits. Regardless, the microfluidic device 100 can be configured to be a nanofluidic device. As illustrated in FIG. 1A, the microfluidic circuit 120 may include a plurality of microfluidic sequestration pens 124, 126, 128, and 130, where each sequestration pens may have one or more openings in fluidic communication with flow path 106. In some embodiments of the device of FIG. 1A, the sequestration pens may have only a single opening in fluidic communication with the flow path 106. As discussed further below, the microfluidic sequestration pens comprise various features and structures that have been optimized for retaining micro-objects in the microfluidic device, such as microfluidic device 100, even when a medium 180 is flowing through the flow path 106. Before turning to the foregoing, however, a brief description of microfluidic device 100 and system 150 is provided.

As generally illustrated in FIG. 1A, the microfluidic circuit 120 is defined by an enclosure 102. Although the enclosure 102 can be physically structured in different configurations, in the example shown in FIG. 1A the enclosure 102 is depicted as comprising a support structure 104 (e.g., a base), a microfluidic circuit structure 108, and a cover 110. The support structure 104, microfluidic circuit structure 108, and cover 110 can be attached to each other.

For example, the microfluidic circuit structure 108 can be disposed on an inner surface 109 of the support structure 104, and the cover 110 can be disposed over the microfluidic circuit structure 108. Together with the support structure 104 and cover 110, the microfluidic circuit structure 108 can define the elements of the microfluidic circuit 120.

The support structure 104 can be at the bottom and the cover 110 at the top of the microfluidic circuit 120 as illustrated in FIG. 1A. Alternatively, the support structure 104 and the cover 110 can be configured in other orientations. For example, the support structure 104 can be at the top and the cover 110 at the bottom of the microfluidic circuit 120. Regardless, there can be one or more ports 107 each comprising a passage into or out of the enclosure 102. Examples of a passage include a valve, a gate, a pass-through hole, or the like. As illustrated, port 107 is a pass-through hole created by a gap in the microfluidic circuit structure 108. However, the port 107 can be situated in other components of the enclosure 102, such as the cover 110. Only one port 107 is illustrated in FIG. 1A but the microfluidic circuit 120 can have two or more ports 107. For example, there can be a first port 107 that functions as an inlet for fluid entering the microfluidic circuit 120, and there can be a second port 107 that functions as an outlet for fluid exiting the microfluidic circuit 120. Whether a port 107 function as an inlet or an outlet can depend upon the direction that fluid flows through flow path 106.

The support structure 104 can comprise one or more electrodes (not shown) and a substrate or a plurality of interconnected substrates. For example, the support structure 104 can comprise one or more semiconductor substrates, each of which is electrically connected to an electrode (e.g., all or a subset of the semiconductor substrates can be electrically connected to a single electrode). The support structure 104 can further comprise a printed circuit board assembly ("PCBA"). For example, the semiconductor substrate(s) can be mounted on a PCBA.

The microfluidic circuit structure 108 can define circuit elements of the microfluidic circuit 120. Such circuit elements can comprise spaces or regions that can be fluidly interconnected when microfluidic circuit 120 is filled with fluid, such as flow regions (which may include or be one or more flow channels), chambers, pens, traps, and the like. In the microfluidic circuit 120 illustrated in FIG. 1A, the microfluidic circuit structure 108 comprises a frame 114 and a microfluidic circuit material 116. The frame 114 can partially or completely enclose the microfluidic circuit material 116. The frame 114 can be, for example, a relatively rigid structure substantially surrounding the microfluidic circuit material 116. For example, the frame 114 can comprise a metal material.

The microfluidic circuit material 116 can be patterned with cavities or the like to define circuit elements and interconnections of the microfluidic circuit 120. The microfluidic circuit material 116 can comprise a flexible material, such as a flexible polymer (e.g. rubber, plastic, elastomer, silicone, polydimethylsiloxane ("PDMS"), or the like), which can be gas permeable. Other examples of materials that can compose microfluidic circuit material 116 include molded glass, an etchable material such as silicone (e.g. photo-patternable silicone or "PPS"), photo-resist (e.g., SU8), or the like. In some embodiments, such materials—and thus the microfluidic circuit material 116—can be rigid and/or substantially impermeable to gas. Regardless, microfluidic circuit material 116 can be disposed on the support structure 104 and inside the frame 114.

The cover 110 can be an integral part of the frame 114 and/or the microfluidic circuit material 116. Alternatively, the cover 110 can be a structurally distinct element, as illustrated in FIG. 1A. The cover 110 can comprise the same or different materials than the frame 114 and/or the microfluidic circuit material 116. Similarly, the support structure 104 can be a separate structure from the frame 114 or microfluidic circuit material 116 as illustrated, or an integral part of the frame 114 or microfluidic circuit material 116. Likewise, the frame 114 and microfluidic circuit material 116 can be separate structures as shown in FIG. 1A or integral portions of the same structure.

In some embodiments, the cover 110 can comprise a rigid material. The rigid material may be glass or a material with similar properties. In some embodiments, the cover 110 can comprise a deformable material. The deformable material can be a polymer, such as PDMS. In some embodiments, the cover 110 can comprise both rigid and deformable materials. For example, one or more portions of cover 110 (e.g., one or more portions positioned over sequestration pens 124, 126, 128, 130) can comprise a deformable material that interfaces with rigid materials of the cover 110. In some embodiments, the cover 110 can further include one or more electrodes. The one or more electrodes can comprise a conductive oxide, such as indium-tin-oxide (ITO), which may be coated on glass or a similarly insulating material. Alternatively, the one or more electrodes can be flexible electrodes, such as single-walled nanotubes, multi-walled nanotubes, nanowires, clusters of electrically conductive nanoparticles, or combinations thereof, embedded in a deformable material, such as a polymer (e.g., PDMS). Flexible electrodes that can be used in microfluidic devices have been described, for example, in U.S. 2012/0325665 (Chiou et al.), the contents of which are incorporated herein by reference. In some embodiments, the cover 110 can be modified (e.g., by conditioning all or part of a surface that faces inward toward the microfluidic circuit 120) to support cell adhesion, viability and/or growth. The modification may include a coating of a synthetic or natural polymer. In some embodiments, the cover 110 and/or the support structure 104 can be transparent to light. The cover 110 may also include at least one material that is gas permeable (e.g., PDMS or PPS).

FIG. 1A also shows a system 150 for operating and controlling microfluidic devices, such as microfluidic device 100. System 150 includes an electrical power source 192, an imaging device 194 (incorporated within imaging module 164, where device 194 is not illustrated in FIG. 1A, per se), and a tilting device 190 (part of tilting module 166, where device 190 is not illustrated in FIG. 1).

The electrical power source 192 can provide electric power to the microfluidic device 100 and/or tilting device 190, providing biasing voltages or currents as needed. The electrical power source 192 can, for example, comprise one or more alternating current (AC) and/or direct current (DC) voltage or current sources. The imaging device 194 (part of imaging module 164, discussed below) can comprise a device, such as a digital camera, for capturing images inside microfluidic circuit 120. In some instances, the imaging device 194 further comprises a detector having a fast frame rate and/or high sensitivity (e.g. for low light applications). The imaging device 194 can also include a mechanism for directing stimulating radiation and/or light beams into the microfluidic circuit 120 and collecting radiation and/or light beams reflected or emitted from the microfluidic circuit 120 (or micro-objects contained therein). The emitted light beams may be in the visible spectrum and may, e.g., include fluorescent emissions. The reflected light beams may include reflected emissions originating from an LED or a wide spectrum lamp, such as a mercury lamp (e.g. a high pressure mercury lamp) or a Xenon arc lamp. As discussed with respect to FIG. 3B, the imaging device 194 may further include a microscope (or an optical train), which may or may not include an eyepiece.

System 150 further comprises a tilting device 190 (part of tilting module 166, discussed below) configured to rotate a microfluidic device 100 about one or more axes of rotation. In some embodiments, the tilting device 190 is configured to support and/or hold the enclosure 102 comprising the microfluidic circuit 120 about at least one axis such that the microfluidic device 100 (and thus the microfluidic circuit 120) can be held in a level orientation (i.e. at 0° relative to x- and y-axes), a vertical orientation (i.e. at 90° relative to the x-axis and/or the y-axis), or any orientation therebetween. The orientation of the microfluidic device 100 (and the microfluidic circuit 120) relative to an axis is referred to herein as the "tilt" of the microfluidic device 100 (and the microfluidic circuit 120). For example, the tilting device 190 can tilt the microfluidic device 100 at 0.1°, 0.2°, 0.3°, 0.4°, 0.5°, 0.6°, 0.7°, 0.8°, 0.9°, 1°, 2°, 3°, 4°, 5°, 10°, 15°, 20°, 25°, 30°, 35°, 40°, 45°, 50°, 55°, 60°, 65°, 70°, 75°, 80°, 90° relative to the x-axis or any degree therebetween. The level orientation (and thus the x- and y-axes) is defined as normal to a vertical axis defined by the force of gravity. The tilting device can also tilt the microfluidic device 100 (and the microfluidic circuit 120) to any degree greater than 90° relative to the x-axis and/or y-axis, or tilt the microfluidic device 100 (and the microfluidic circuit 120) 180° relative to the x-axis or the y-axis in order to fully invert the microfluidic device 100 (and the microfluidic circuit 120). Similarly, in some embodiments, the tilting device 190 tilts the microfluidic device 100 (and the microfluidic circuit 120) about an axis of rotation defined by flow path 106 or some other portion of microfluidic circuit 120.

In some instances, the microfluidic device 100 is tilted into a vertical orientation such that the flow path 106 is positioned above or below one or more sequestration pens. The term "above" as used herein denotes that the flow path 106 is positioned higher than the one or more sequestration pens on a vertical axis defined by the force of gravity (i.e. an object in a sequestration pen above a flow path 106 would have a higher gravitational potential energy than an object in the flow path). The term "below" as used herein denotes that the flow path 106 is positioned lower than the one or more sequestration pens on a vertical axis defined by the force of gravity (i.e. an object in a sequestration pen below a flow path 106 would have a lower gravitational potential energy than an object in the flow path).

In some instances, the tilting device 190 tilts the microfluidic device 100 about an axis that is parallel to the flow path 106. Moreover, the microfluidic device 100 can be tilted to an angle of less than 90° such that the flow path 106 is located above or below one or more sequestration pens without being located directly above or below the sequestration pens. In other instances, the tilting device 190 tilts the microfluidic device 100 about an axis perpendicular to the flow path 106. In still other instances, the tilting device 190 tilts the microfluidic device 100 about an axis that is neither parallel nor perpendicular to the flow path 106.

System 150 can further include a media source 178. The media source 178 (e.g., a container, reservoir, or the like) can comprise multiple sections or containers, each for holding a different fluidic medium 180. Thus, the media source 178 can be a device that is outside of and separate from the microfluidic device 100, as illustrated in FIG. 1A. Alternatively, the media source 178 can be located in whole or in part inside the enclosure 102 of the microfluidic device 100. For example, the media source 178 can comprise reservoirs that are part of the microfluidic device 100.

FIG. 1A also illustrates simplified block diagram depictions of examples of control and monitoring equipment 152 that constitute part of system 150 and can be utilized in conjunction with a microfluidic device 100. As shown, examples of such control and monitoring equipment 152 include a master controller 154 comprising a media module 160 for controlling the media source 178, a motive module 162 for controlling movement and/or selection of micro-objects (not shown) and/or medium (e.g., droplets of medium) in the microfluidic circuit 120, an imaging module 164 for controlling an imaging device 194 (e.g., a camera, microscope, light source or any combination thereof) for capturing images (e.g., digital images), and a tilting module 166 for controlling a tilting device 190. The control equipment 152 can also include other modules 168 for controlling, monitoring, or performing other functions with respect to the microfluidic device 100. As shown, the equipment 152 can further include a display device 170 and an input/output device 172.

The master controller 154 can comprise a control module 156 and a digital memory 158. The control module 156 can comprise, for example, a digital processor configured to operate in accordance with machine executable instructions (e.g., software, firmware, source code, or the like) stored as non-transitory data or signals in the memory 158. Alternatively, or in addition, the control module 156 can comprise hardwired digital circuitry and/or analog circuitry. The media module 160, motive module 162, imaging module 164, tilting module 166, and/or other modules 168 can be similarly configured. Thus, functions, processes acts, actions, or steps of a process discussed herein as being performed with respect to the microfluidic device 100 or any other microfluidic apparatus can be performed by any one or more of the master controller 154, media module 160, motive module 162, imaging module 164, tilting module 166, and/or other modules 168 configured as discussed above. Similarly, the master controller 154, media module 160, motive module 162, imaging module 164, tilting module 166, and/or other modules 168 may be communicatively coupled to transmit and receive data used in any function, process, act, action or step discussed herein.

The media module 160 controls the media source 178. For example, the media module 160 can control the media source 178 to input a selected fluidic medium 180 into the enclosure 102 (e.g., through an inlet port 107). The media module 160 can also control removal of media from the enclosure 102 (e.g., through an outlet port (not shown)). One or more media can thus be selectively input into and removed from the microfluidic circuit 120. The media module 160 can also control the flow of fluidic medium 180 in the flow path 106 inside the microfluidic circuit 120. For example, in some embodiments media module 160 stops the flow of media 180 in the flow path 106 and through the enclosure 102 prior to the tilting module 166 causing the tilting device 190 to tilt the microfluidic device 100 to a desired angle of incline.

The motive module 162 can be configured to control selection, trapping, and movement of micro-objects (not shown) in the microfluidic circuit 120. As discussed below with respect to FIGS. 1B and 1C, the enclosure 102 can comprise a dielectrophoresis (DEP), optoelectronic tweezers (OET) and/or opto-electrowetting (OEW) configuration (not shown in FIG. 1A), and the motive module 162 can control the activation of electrodes and/or transistors (e.g., phototransistors) to select and move micro-objects (not shown) and/or droplets of medium (not shown) in the flow path 106 and/or sequestration pens 124, 126, 128, 130.

The imaging module 164 can control the imaging device 194. For example, the imaging module 164 can receive and process image data from the imaging device 194. Image data from the imaging device 194 can comprise any type of information captured by the imaging device 194 (e.g., the presence or absence of micro-objects, droplets of medium, accumulation of label, such as fluorescent label, etc.). Using the information captured by the imaging device 194, the imaging module 164 can further calculate the position of objects (e.g., micro-objects, droplets of medium) and/or the rate of motion of such objects within the microfluidic device 100.

The tilting module 166 can control the tilting motions of tilting device 190. Alternatively, or in addition, the tilting module 166 can control the tilting rate and timing to optimize transfer of micro-objects to the one or more sequestration pens via gravitational forces. The tilting module 166 is communicatively coupled with the imaging module 164 to receive data describing the motion of micro-objects and/or droplets of medium in the microfluidic circuit 120. Using this data, the tilting module 166 may adjust the tilt of the microfluidic circuit 120 in order to adjust the rate at which micro-objects and/or droplets of medium move in the microfluidic circuit 120. The tilting module 166 may also use this data to iteratively adjust the position of a micro-object and/or droplet of medium in the microfluidic circuit 120.

In the example shown in FIG. 1A, the microfluidic circuit 120 is illustrated as comprising a microfluidic channel 122 and sequestration pens 124, 126, 128, 130. Each pen comprises an opening to channel 122, but otherwise is enclosed such that the pens can substantially isolate micro-objects inside the pen from fluidic medium 180 and/or micro-objects in the flow path 106 of channel 122 or in other pens. The walls of the sequestration pen extend from the inner surface 109 of the base to the inside surface of the cover 110 to provide enclosure. The opening of the pen to the microfluidic channel 122 is oriented at an angle to the flow 106 of fluidic medium 180 such that flow 106 is not directed into the pens. The flow may be tangential or orthogonal to the plane of the opening of the pen. In some instances, pens 124, 126, 128, 130 are configured to physically corral one or more micro-objects within the microfluidic circuit 120. Sequestration pens in accordance with the present invention can comprise various shapes, surfaces and features that are optimized for use with DEP, OET, OEW, fluid flow, and/or gravitational forces, as will be discussed and shown in detail below.

The microfluidic circuit 120 may comprise any number of microfluidic sequestration pens. Although five sequestration pens are shown, microfluidic circuit 120 may have fewer or more sequestration pens. As shown, microfluidic sequestration pens 124, 126, 128, and 130 of microfluidic circuit 120 each comprise differing features and shapes which may provide one or more benefits useful in producing an embryo, such as isolating one ovum from an adjacent ovum. Testing, stimulating and fertilizing may all be performed on an individual basis and, in some embodiments, may be performed on an individual time scale. In some embodiments, the microfluidic circuit 120 comprises a plurality of identical microfluidic sequestration pens.

In some embodiments, the microfluidic circuit 120 comprises a plurality of microfluidic sequestration pens, wherein two or more of the sequestration pens comprise differing structures and/or features which provide differing benefits in producing embryos. One non-limiting example may include maintaining ova in one type of pen while maintaining sperm in a different type of pen. In another embodiment, at least one of the sequestration pens is configured to have electrical contacts suitable for providing electrical activation for an ovum. In yet another embodiment, differing types of cells (such as, for example, uterine cells, endometrial cells, PEG (intercalary) cells derived from the uterine tube (e.g., oviduct or Fallopian tube), cumulus cells, or a combination thereof) may be disposed in sequestration pens adjacent to a sequestration pen containing an ovum, such that secretions from the surrounding sequestration pens may diffuse out of each respective pen and into the pen containing an ovum, which is not possible with macroscale in-vitro culturing and fertilization. Microfluidic devices useful for producing an embryo may include any of the sequestration pens 124, 126, 128, and 130 or variations thereof, and/or may include pens configured like those shown in FIGS. 2B, 2C, 2D, 2E and 2F, as discussed below.

In the embodiment illustrated in FIG. 1A, a single channel 122 and flow path 106 is shown. However, other embodiments may contain multiple channels 122, each configured to comprise a flow path 106. The microfluidic circuit 120 further comprises an inlet valve or port 107 in fluid communication with the flow path 106 and fluidic medium 180, whereby fluidic medium 180 can access channel 122 via the inlet port 107. In some instances, the flow path 106 comprises a single path. In some instances, the single path is arranged in a zigzag pattern whereby the flow path 106 travels across the microfluidic device 100 two or more times in alternating directions.

In some instances, microfluidic circuit 120 comprises a plurality of parallel channels 122 and flow paths 106, wherein the fluidic medium 180 within each flow path 106 flows in the same direction. In some instances, the fluidic medium within each flow path 106 flows in at least one of a forward or reverse direction. In some instances, a plurality of sequestration pens is configured (e.g., relative to a channel 122) such that the sequestration pens can be loaded with target micro-objects in parallel.

In some embodiments, microfluidic circuit 120 further comprises one or more micro-object traps 132. The traps 132 are generally formed in a wall forming the boundary of a channel 122, and may be positioned opposite an opening of one or more of the microfluidic sequestration pens 124, 126, 128, 130. In some embodiments, the traps 132 are configured to receive or capture a single micro-object from the flow path 106. In some embodiments, the traps 132 are configured to receive or capture a plurality of micro-objects from the flow path 106. In some instances, the traps 132 comprise a volume approximately equal to the volume of a single target micro-object.

The traps 132 may further comprise an opening which is configured to assist the flow of targeted micro-objects into the traps 132. In some instances, the traps 132 comprise an opening having a height and width that is approximately equal to the dimensions of a single target micro-object, whereby larger micro-objects are prevented from entering into the micro-object trap. The traps 132 may further comprise other features configured to assist in retention of targeted micro-objects within the trap 132. In some instances, the trap 132 is aligned with and situated on the opposite side of a channel 122 relative to the opening of a microfluidic sequestration pen, such that upon tilting the microfluidic device 100 about an axis parallel to the channel 122, the trapped micro-object exits the trap 132 at a trajectory that causes the micro-object to fall into the opening of the sequestration pen. In some instances, the trap 132 comprises a side passage 134 that is smaller than the target micro-object in order to facilitate flow through the trap 132 and thereby increase the likelihood of capturing a micro-object in the trap 132.

In some embodiments, dielectrophoretic (DEP) forces are applied across the fluidic medium 180 (e.g., in the flow path and/or in the sequestration pens) via one or more electrodes (not shown) to manipulate, transport, separate and sort micro-objects located therein. For example, in some embodiments, DEP forces are applied to one or more portions of microfluidic circuit 120 in order to transfer a single micro-object from the flow path 106 into a desired microfluidic sequestration pen. In some embodiments, DEP forces are used to prevent a micro-object within a sequestration pen (e.g., sequestration pen 124, 126, 128, or 130) from being displaced therefrom. Further, in some embodiments, DEP forces are used to selectively remove a micro-object from a sequestration pen that was previously collected in accordance with the teachings of the instant invention. In some embodiments, the DEP forces comprise optoelectronic tweezer (OET) forces.

In other embodiments, optoelectrowetting (OEW) forces are applied to one or more positions in the support structure 104 (and/or the cover 110) of the microfluidic device 100 (e.g., positions helping to define the flow path and/or the sequestration pens) via one or more electrodes (not shown) to manipulate, transport, separate and sort droplets located in the microfluidic circuit 120. For example, in some embodiments, OEW forces are applied to one or more positions in the support structure 104 (and/or the cover 110) in order to transfer a single droplet from the flow path 106 into a desired microfluidic sequestration pen. In some embodiments, OEW forces are used to prevent a droplet within a sequestration pen (e.g., sequestration pen 124, 126, 128, or 130) from being displaced therefrom. Further, in some embodiments, OEW forces are used to selectively remove a droplet from a sequestration pen that was previously collected in accordance with the teachings of the instant invention.

In some embodiments, DEP and/or OEW forces are combined with other forces, such as flow and/or gravitational force, so as to manipulate, transport, separate and sort micro-objects and/or droplets within the microfluidic circuit 120. For example, the enclosure 102 can be tilted (e.g., by tilting device 190) to position the flow path 106 and micro-objects located therein above the microfluidic sequestration pens, and the force of gravity can transport the micro-objects and/or droplets into the pens. In some embodiments, the DEP and/or OEW forces can be applied prior to the other forces. In other embodiments, the DEP and/or OEW forces can be applied after the other forces. In still other instances, the DEP and/or OEW forces can be applied at the same time as the other forces or in an alternating manner with the other forces.

Figure 1B:
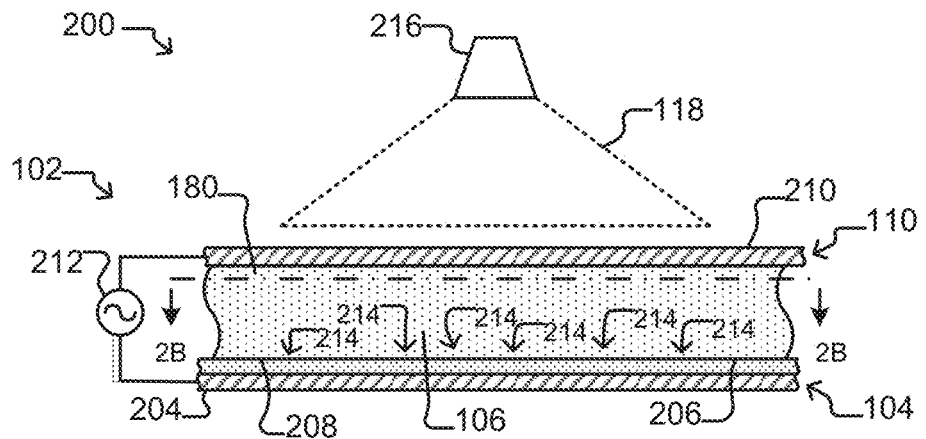
FIGS. 1B and 1C illustrate a microfluidic device according to some embodiments of the invention.

FIGS. 1B, 1C, and 2A-2H illustrates various embodiments of microfluidic devices that can be used in the practice of the present invention. FIG. 1B depicts an embodiment in which the microfluidic device 200 is configured as an optically-actuated electrokinetic device. A variety of optically-actuated electrokinetic devices are known in the art, including devices having an optoelectronic tweezer (OET) configuration and devices having an opto-electrowetting (OEW) configuration. Examples of suitable OET configurations are illustrated in the following U.S. patent documents, each of which is incorporated herein by reference in its entirety: U.S. Pat. No. RE 44,711 (Wu et al.) (originally issued as U.S. Pat. No. 7,612,355); and U.S. Pat. No. 7,956,339 (Ohta et al.). Examples of OEW configurations are illustrated in U.S. Pat. No. 6,958,132 (Chiou et al.) and U.S. Patent Application Publication No. 2012/0024708 (Chiou et al.), both of which are incorporated by reference herein in their entirety. Yet another example of an optically-actuated electrokinetic device includes a combined OET/OEW configuration, examples of which are shown in U.S. Patent Publication Nos. 20150306598 (Khandros et al.) and 20150306599 (Khandros et al.) and their corresponding PCT Publications WO2015/164846 and WO2015/164847, all of which are incorporated herein by reference in their entirety.

Examples of microfluidic devices having pens in which oocytes, ova, or embryos can be placed, cultured, and/or monitored have been described, for example, in US 2014/0116881 (application Ser. No. 14/060,117, filed Oct. 22, 2013), US 2015/0151298 (application Ser. No. 14/520,568, filed Oct. 22, 2014), and US 2015/0165436 (application Ser. No. 14/521,447, filed Oct. 22, 2014), each of which is incorporated herein by reference in its entirety. U.S. application Ser. Nos. 14/520,568 and 14/521,447 also describe exemplary methods of analyzing secretions of cells cultured in a microfluidic device. Each of the foregoing applications further describes microfluidic devices configured to produce dielectrophoretic (DEP) forces, such as optoelectronic tweezers (OET) or configured to provide opto-electro wetting (OEW). For example, the optoelectronic tweezers device illustrated in FIG. 2 of US 2014/0116881 is an example of a device that can be utilized in embodiments of the present invention to select and move an individual biological micro-object or a group of biological micro-objects.

Microfluidic device motive configurations. As described above, the control and monitoring equipment of the system can comprise a motive module for selecting and moving objects, such as micro-objects or droplets, in the microfluidic circuit of a microfluidic device. The microfluidic device can have a variety of motive configurations, depending upon the type of object being moved and other considerations. For example, a dielectrophoresis (DEP) configuration can be utilized to select and move micro-objects in the microfluidic circuit. Thus, the support structure 104 and/or cover 110 of the microfluidic device 100 can comprise a DEP configuration for selectively inducing DEP forces on micro-objects in a fluidic medium 180 in the microfluidic circuit 120 and thereby select, capture, and/or move individual micro-objects or groups of micro-objects. Alternatively, the support structure 104 and/or cover 110 of the microfluidic device 100 can comprise an electrowetting (EW) configuration for selectively inducing EW forces on droplets in a fluidic medium 180 in the microfluidic circuit 120 and thereby select, capture, and/or move individual droplets or groups of droplets.

Figure 1C:
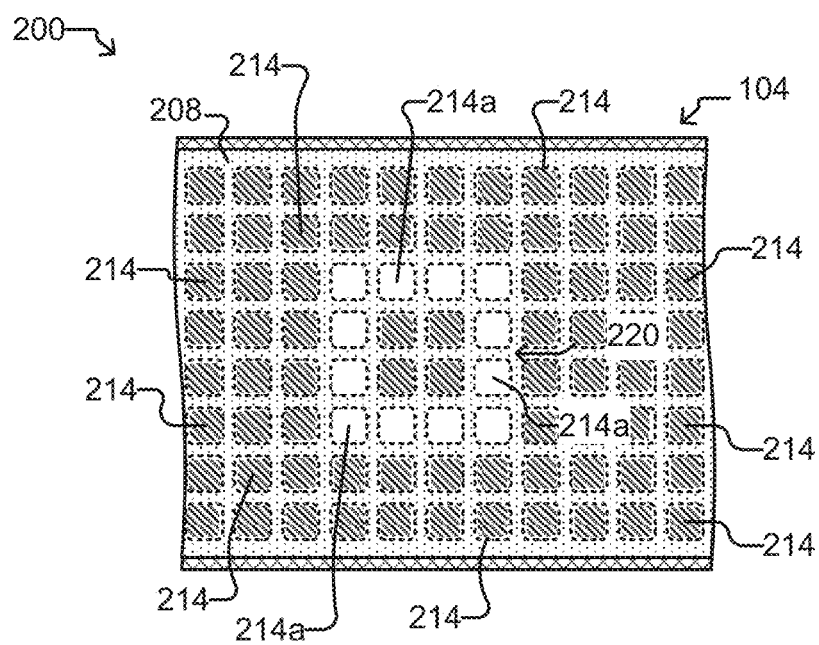

One example of a microfluidic device 200 comprising a DEP configuration is illustrated in FIGS. 1B and 1C. While for purposes of simplicity FIGS. 1B and 1C show a side cross-sectional view and a top cross-sectional view, respectively, of a portion of an enclosure 102 of the microfluidic device 200 having an open region/chamber 202, it should be understood that the region/chamber 202 may be part of a fluidic circuit element having a more detailed structure, such as a growth chamber, a sequestration pen, a flow region, or a flow channel. Furthermore, the microfluidic device 200 may include other fluidic circuit elements. For example, the microfluidic device 200 can include a plurality of growth chambers or sequestration pens and/or one or more flow regions or flow channels, such as those described herein with respect to microfluidic device 100. A DEP configuration may be incorporated into any such fluidic circuit elements of the microfluidic device 200, or select portions thereof. It should be further appreciated that any of the above or below described microfluidic device components and system components may be incorporated in and/or used in combination with the microfluidic device 200. For example, system 150 including control and monitoring equipment 152, described above, may be used with microfluidic device 200, including one or more of the media module 160, motive module 162, imaging module 164, tilting module 166, and other modules 168.

As seen in FIG. 1B, the microfluidic device 200 includes a support structure 104 having a bottom electrode 204 and an electrode activation substrate 206 overlying the bottom electrode 204, and a cover 110 having a top electrode 210, with the top electrode 210 spaced apart from the bottom electrode 204. The top electrode 210 and the electrode activation substrate 206 define opposing surfaces of the region/chamber 202. A medium 180 contained in the region/chamber 202 thus provides a resistive connection between the top electrode 210 and the electrode activation substrate 206. A power source 212 configured to be connected to the bottom electrode 204 and the top electrode 210 and create a biasing voltage between the electrodes, as required for the generation of DEP forces in the region/chamber 202, is also shown. The power source 212 can be, for example, an alternating current (AC) power source.

In certain embodiments, the microfluidic device 200 illustrated in FIGS. 1B and 1C can have an optically-actuated DEP configuration. Accordingly, changing patterns of light 218 from the light source 216, which may be controlled by the motive module 162, can selectively activate and deactivate changing patterns of DEP electrodes at regions 214 of the inner surface 208 of the electrode activation substrate 206. (Hereinafter the regions 214 of a microfluidic device having a DEP configuration are referred to as "DEP electrode regions.") As illustrated in FIG. 1C, a light pattern 218 directed onto the inner surface 208 of the electrode activation substrate 206 can illuminate select DEP electrode regions 214a (shown in white) in a pattern, such as a square. The non-illuminated DEP electrode regions 214 (cross-hatched) are hereinafter referred to as "dark" DEP electrode regions 214. The relative electrical impedance through the DEP electrode activation substrate 206 (i.e., from the bottom electrode 204 up to the inner surface 208 of the electrode activation substrate 206 which interfaces with the medium 180 in the flow region 106) is greater than the relative electrical impedance through the medium 180 in the region/chamber 202 (i.e., from the inner surface 208 of the electrode activation substrate 206 to the top electrode 210 of the cover 110) at each dark DEP electrode region 214. An illuminated DEP electrode region 214a, however, exhibits a reduced relative impedance through the electrode activation substrate 206 that is less than the relative impedance through the medium 180 in the region/chamber 202 at each illuminated DEP electrode region 214a.

With the power source 212 activated, the foregoing DEP configuration creates an electric field gradient in the fluidic medium 180 between illuminated DEP electrode regions 214a and adjacent dark DEP electrode regions 214, which in turn creates local DEP forces that attract or repel nearby micro-objects (not shown) in the fluidic medium 180. DEP electrodes that attract or repel micro-objects in the fluidic medium 180 can thus be selectively activated and deactivated at many different such DEP electrode regions 214 at the inner surface 208 of the region/chamber 202 by changing light patterns 218 projected from a light source 216 into the microfluidic device 200. Whether the DEP forces attract or repel nearby micro-objects can depend on such parameters as the frequency of the power source 212 and the dielectric properties of the medium 180 and/or micro-objects (not shown).

The square pattern 220 of illuminated DEP electrode regions 214a illustrated in FIG. 1C is an example only. Any pattern of the DEP electrode regions 214 can be illuminated (and thereby activated) by the pattern of light 218 projected into the device 200, and the pattern of illuminated/activated DEP electrode regions 214 can be repeatedly changed by changing or moving the light pattern 218.

In some embodiments, the electrode activation substrate 206 can comprise or consist of a photoconductive material. In such embodiments, the inner surface 208 of the electrode activation substrate 206 can be featureless. For example, the electrode activation substrate 206 can comprise or consist of a layer of hydrogenated amorphous silicon (a-Si:H). The a-Si:H can comprise, for example, about 8% to 40% hydrogen (calculated as 100*the number of hydrogen atoms/the total number of hydrogen and silicon atoms). The layer of a-Si:H can have a thickness of about 500 nm to about 2.0 µm. In such embodiments, the DEP electrode regions 214 can be created anywhere and in any pattern on the inner surface 208 of the electrode activation substrate 206, in accordance with the light pattern 218. The number and pattern of the DEP electrode regions 214 thus need not be fixed, but can correspond to the light pattern 218. Examples of microfluidic devices having a DEP configuration comprising a photoconductive layer such as discussed above have been described, for example, in U.S. Pat. No. RE 44,711 (Wu et al.) (originally issued as U.S. Pat. No. 7,612,355), the entire contents of which are incorporated herein by reference.

In other embodiments, the electrode activation substrate 206 can comprise a substrate comprising a plurality of doped layers, electrically insulating layers (or regions), and electrically conductive layers that form semiconductor integrated circuits, such as is known in semiconductor fields. For example, the electrode activation substrate 206 can comprise a plurality of phototransistors, including, for example, lateral bipolar phototransistors, each phototransistor corresponding to a DEP electrode region 214. Alternatively, the electrode activation substrate 206 can comprise electrodes (e.g., conductive metal electrodes) controlled by phototransistor switches, with each such electrode corresponding to a DEP electrode region 214. The electrode activation substrate 206 can include a pattern of such phototransistors or phototransistor-controlled electrodes. The pattern, for example, can be an array of substantially square phototransistors or phototransistor-controlled electrodes arranged in rows and columns, such as shown in FIG. 2B. Alternatively, the pattern can be an array of substantially hexagonal phototransistors or phototransistor-controlled electrodes that form a hexagonal lattice. Regardless of the pattern, electric circuit elements can form electrical connections between the DEP electrode regions 214 at the inner surface 208 of the electrode activation substrate 206 and the bottom electrode 210, and those electrical connections (i.e., phototransistors or electrodes) can be selectively activated and deactivated by the light pattern 218. When not activated, each electrical connection can have high impedance such that the relative impedance through the electrode activation substrate 206 (i.e., from the bottom electrode 204 to the inner surface 208 of the electrode activation substrate 206 which interfaces with the medium 180 in the region/chamber 202) is greater than the relative impedance through the medium 180 (i.e., from the inner surface 208 of the electrode activation substrate 206 to the top electrode 210 of the cover 110) at the corresponding DEP electrode region 214. When activated by light in the light pattern 218, however, the relative impedance through the electrode activation substrate 206 is less than the relative impedance through the medium 180 at each illuminated DEP electrode region 214, thereby activating the DEP electrode at the corresponding DEP electrode region 214 as discussed above. DEP electrodes that attract or repel micro-objects (not shown) in the medium 180 can thus be selectively activated and deactivated at many different DEP electrode regions 214 at the inner surface 208 of the electrode activation substrate 206 in the region/chamber 202 in a manner determined by the light pattern 218.

Examples of microfluidic devices having electrode activation substrates that comprise phototransistors have been described, for example, in U.S. Pat. No. 7,956,339 (Ohta et al.) (see, e.g., device 300 illustrated in FIGS. 21 and 22, and descriptions thereof), the entire contents of which are incorporated herein by reference. Examples of microfluidic devices having electrode activation substrates that comprise electrodes controlled by phototransistor switches have been described, for example, in U.S. Patent Publication No. 2014/0124370 (Short et al.) (see, e.g., devices 200, 400, 500, 600, and 900 illustrated throughout the drawings, and descriptions thereof), the entire contents of which are incorporated herein by reference.

In some embodiments of a DEP configured microfluidic device, the top electrode 210 is part of a first wall (or cover 110) of the enclosure 102, and the electrode activation substrate 206 and bottom electrode 204 are part of a second wall (or support structure 104) of the enclosure 102. The region/chamber 202 can be between the first wall and the second wall. In other embodiments, the electrode 210 is part of the second wall (or support structure 104) and one or both of the electrode activation substrate 206 and/or the electrode 210 are part of the first wall (or cover 110). Moreover, the light source 216 can alternatively be used to illuminate the enclosure 102 from below.

With the microfluidic device 200 of FIGS. 1B-1C having a DEP configuration, the motive module 162 can select a micro-object (not shown) in the medium 180 in the region/chamber 202 by projecting a light pattern 218 into the device 200 to activate a first set of one or more DEP electrodes at DEP electrode regions 214a of the inner surface 208 of the electrode activation substrate 206 in a pattern (e.g., square pattern 220) that surrounds and captures the micro-object. The motive module 162 can then move the captured micro-object by moving the light pattern 218 relative to the device 200 to activate a second set of one or more DEP electrodes at DEP electrode regions 214. Alternatively, the device 200 can be moved relative to the light pattern 218.

In other embodiments, the microfluidic device 200 can have a DEP configuration that does not rely upon light activation of DEP electrodes at the inner surface 208 of the electrode activation substrate 206. For example, the electrode activation substrate 206 can comprise selectively addressable and energizable electrodes positioned opposite to a surface including at least one electrode (e.g., cover 110). Switches (e.g., transistor switches in a semiconductor substrate) may be selectively opened and closed to activate or inactivate DEP electrodes at DEP electrode regions 214, thereby creating a net DEP force on a micro-object (not shown) in region/chamber 202 in the vicinity of the activated DEP electrodes. Depending on such characteristics as the frequency of the power source 212 and the dielectric properties of the medium (not shown) and/or micro-objects in the region/chamber 202, the DEP force can attract or repel a nearby micro-object. By selectively activating and deactivating a set of DEP electrodes (e.g., at a set of DEP electrodes regions 214 that forms a square pattern 220), one or more micro-objects in region/chamber 202 can be trapped and moved within the region/chamber 202. The motive module 162 in FIG. 1A can control such switches and thus activate and deactivate individual ones of the DEP electrodes to select, trap, and move particular micro-objects (not shown) around the region/chamber 202. Microfluidic devices having a DEP configuration that includes selectively addressable and energizable electrodes are known in the art and have been described, for example, in U.S. Pat. No. 6,294,063 (Becker et al.) and U.S. Pat. No. 6,942,776 (Medoro), the entire contents of which are incorporated herein by reference.

As yet another example, the microfluidic device 200 can have an electrowetting (EW) configuration, which can be in place of the DEP configuration or can be located in a portion of the microfluidic device 200 that is separate from the portion which has the DEP configuration. The EW configuration can be an opto-electrowetting configuration or an electrowetting on dielectric (EWOD) configuration, both of which are known in the art. In some EW configurations, the support structure 104 has an electrode activation substrate 206 sandwiched between a dielectric layer (not shown) and the bottom electrode 204. The dielectric layer can comprise a hydrophobic material and/or can be coated with a hydrophobic material, as described below. For microfluidic devices 200 that have an EW configuration, the inner surface 208 of the support structure 104 is the inner surface of the dielectric layer or its hydrophobic coating.

The dielectric layer (not shown) can comprise one or more oxide layers, and can have a thickness of about 50 nm to about 250 nm (e.g., about 125 nm to about 175 nm). In certain embodiments, the dielectric layer may comprise a layer of oxide, such as a metal oxide (e.g., aluminum oxide or hafnium oxide). In certain embodiments, the dielectric layer can comprise a dielectric material other than a metal oxide, such as silicon oxide or a nitride. Regardless of the exact composition and thickness, the dielectric layer can have an impedance of about 10 kOhms to about 50 kOhms.

In some embodiments, the surface of the dielectric layer that faces inward toward region/chamber 202 is coated with a hydrophobic material. The hydrophobic material can comprise, for example, fluorinated carbon molecules. Examples of fluorinated carbon molecules include perfluoro-polymers such as polytetrafluoroethylene (e.g., TEFLON®) or poly (2,3-difluoromethylenyl-perfluorotetrahydrofuran) (e.g., CYTOP™). Molecules that make up the hydrophobic material can be covalently bonded to the surface of the dielectric layer. For example, molecules of the hydrophobic material can be covalently bound to the surface of the dielectric layer by means of a linker such as a siloxane group, a phosphonic acid group, or a thiol group. Thus, in some embodiments, the hydrophobic material can comprise alkyl-terminated siloxane, alkyl-termination phosphonic acid, or alkyl-terminated thiol. The alkyl group can be long-chain hydrocarbons (e.g., having a chain of at least 10 carbons, or at least 16, 18, 20, 22, or more carbons). Alternatively, fluorinated (or perfluorinated) carbon chains can be used in place of the alkyl groups. Thus, for example, the hydrophobic material can comprise fluoroalkyl-terminated siloxane, fluoroalkyl-terminated phosphonic acid, or fluoroalkyl-terminated thiol. In some embodiments, the hydrophobic coating has a thickness of about 10 nm to about 50 nm. In other embodiments, the hydrophobic coating has a thickness of less than 10 nm (e.g., less than 5 nm, or about 1.5 to 3.0 nm).

In some embodiments, the cover 110 of a microfluidic device 200 having an electrowetting configuration is coated with a hydrophobic material (not shown) as well. The hydrophobic material can be the same hydrophobic material used to coat the dielectric layer of the support structure 104, and the hydrophobic coating can have a thickness that is substantially the same as the thickness of the hydrophobic coating on the dielectric layer of the support structure 104. Moreover, the cover 110 can comprise an electrode activation substrate 206 sandwiched between a dielectric layer and the top electrode 210, in the manner of the support structure 104. The electrode activation substrate 206 and the dielectric layer of the cover 110 can have the same composition and/or dimensions as the electrode activation substrate 206 and the dielectric layer of the support structure 104. Thus, the microfluidic device 200 can have two electrowetting surfaces.

In some embodiments, the electrode activation substrate 206 can comprise a photoconductive material, such as described above. Accordingly, in certain embodiments, the electrode activation substrate 206 can comprise or consist of a layer of hydrogenated amorphous silicon (a-Si:H). The a-Si:H can comprise, for example, about 8% to 40% hydrogen (calculated as 100*the number of hydrogen atoms/the total number of hydrogen and silicon atoms). The layer of a-Si:H can have a thickness of about 500 nm to about 2.0 μm. Alternatively, the electrode activation substrate 206 can comprise electrodes (e.g., conductive metal electrodes) controlled by phototransistor switches, as described above. Microfluidic devices having an opto-electrowetting configuration are known in the art and/or can be constructed with electrode activation substrates known in the art. For example, U.S. Pat. No. 6,958,132 (Chiou et al.), the entire contents of which are incorporated herein by reference, discloses opto-electrowetting configurations having a photoconductive material such as a-Si:H, while U.S. Patent Publication No. 2014/0124370 (Short et al.), referenced above, discloses electrode activation substrates having electrodes controlled by phototransistor switches.

The microfluidic device 200 thus can have an opto-electrowetting configuration, and light patterns 218 can be used to activate photoconductive EW regions or photoresponsive EW electrodes in the electrode activation substrate 206. Such activated EW regions or EW electrodes of the electrode activation substrate 206 can generate an electrowetting force at the inner surface 208 of the support structure 104 (i.e., the inner surface of the overlaying dielectric layer or its hydrophobic coating). By changing the light patterns 218 (or moving microfluidic device 200 relative to the light source 216) incident on the electrode activation substrate 206, droplets (e.g., containing an aqueous medium, solution, or solvent) contacting the inner surface 208 of the support structure 104 can be moved through an immiscible fluid (e.g., an oil medium) present in the region/chamber 202.

In other embodiments, microfluidic devices 200 can have an EWOD configuration, and the electrode activation substrate 206 can comprise selectively addressable and energizable electrodes that do not rely upon light for activation. The electrode activation substrate 206 thus can include a pattern of such electrowetting (EW) electrodes. The pattern, for example, can be an array of substantially square EW electrodes arranged in rows and columns, such as shown in FIG. 2B. Alternatively, the pattern can be an array of substantially hexagonal EW electrodes that form a hexagonal lattice. Regardless of the pattern, the EW electrodes can be selectively activated (or deactivated) by electrical switches (e.g., transistor switches in a semiconductor substrate). By selectively activating and deactivating EW electrodes in the electrode activation substrate 206, droplets (not shown) contacting the inner surface 208 of the overlaying dielectric layer or its hydrophobic coating can be moved within the region/chamber 202. The motive module 162 in FIG. 1A can control such switches and thus activate and deactivate individual EW electrodes to select and move particular droplets around region/chamber 202. Microfluidic devices having a EWOD configuration with selectively addressable and energizable electrodes are known in the art and have been described, for example, in U.S. Pat. No. 8,685,344 (Sundarsan et al.), the entire contents of which are incorporated herein by reference.

Regardless of the configuration of the microfluidic device 200, a power source 212 can be used to provide a potential (e.g., an AC voltage potential) that powers the electrical circuits of the microfluidic device 200. The power source 212 can be the same as, or a component of, the power source 192 referenced in FIG. 1. Power source 212 can be configured to provide an AC voltage and/or current to the top electrode 210 and the bottom electrode 204. For an AC voltage, the power source 212 can provide a frequency range and an average or peak power (e.g., voltage or current) range sufficient to generate net DEP forces (or electrowetting forces) strong enough to trap and move individual micro-objects (not shown) in the region/chamber 202, as discussed above, and/or to change the wetting properties of the inner surface 208 of the support structure 104 (i.e., the dielectric layer and/or the hydrophobic coating on the dielectric layer) in the region/chamber 202, as also discussed above. Such frequency ranges and average or peak power ranges are known in the art. See, e.g., U.S. Pat. No. 6,958,132 (Chiou et al.), U.S. Pat. No. RE44,711 (Wu et al.) (originally issued as U.S. Pat. No. 7,612,355), and US Patent Application Publication Nos. US2014/0124370 (Short et al.), US2015/0306598 (Khandros et al.), and US2015/0306599 (Khandros et al.).

Sequestration pens. Non-limiting examples of generic sequestration pens 224, 226, and 228 are shown within the microfluidic device 230 depicted in FIGS. 2A-2C. Each sequestration pen 224, 226, and 228 can comprise an isolation structure 232 defining an isolation region 240 and a connection region 236 fluidically connecting the isolation region 240 to a channel 122. The connection region 236 can comprise a proximal opening 234 to the channel 122 and a distal opening 238 to the isolation region 240. The connection region 236 can be configured so that the maximum penetration depth of a flow of a fluidic medium (not shown) flowing from the channel 122 into the sequestration pen 224, 226, 228 does not extend into the isolation region 240. Thus, due to the connection region 236, a micro-object (not shown) or other material (not shown) disposed in an isolation region 240 of a sequestration pen 224, 226, 228 can thus be isolated from, and not substantially affected by, a flow of medium 180 in the channel 122.

Figure 2A:
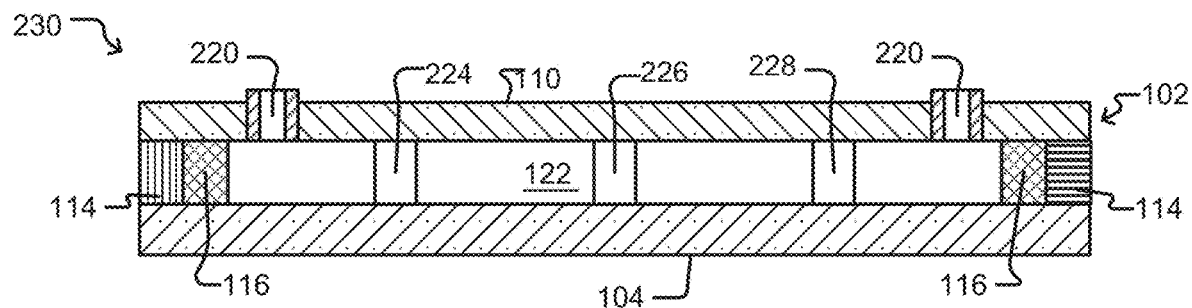
FIGS. 2A and 2B illustrate isolation pens according to some embodiments of the invention.
Figure 2B:
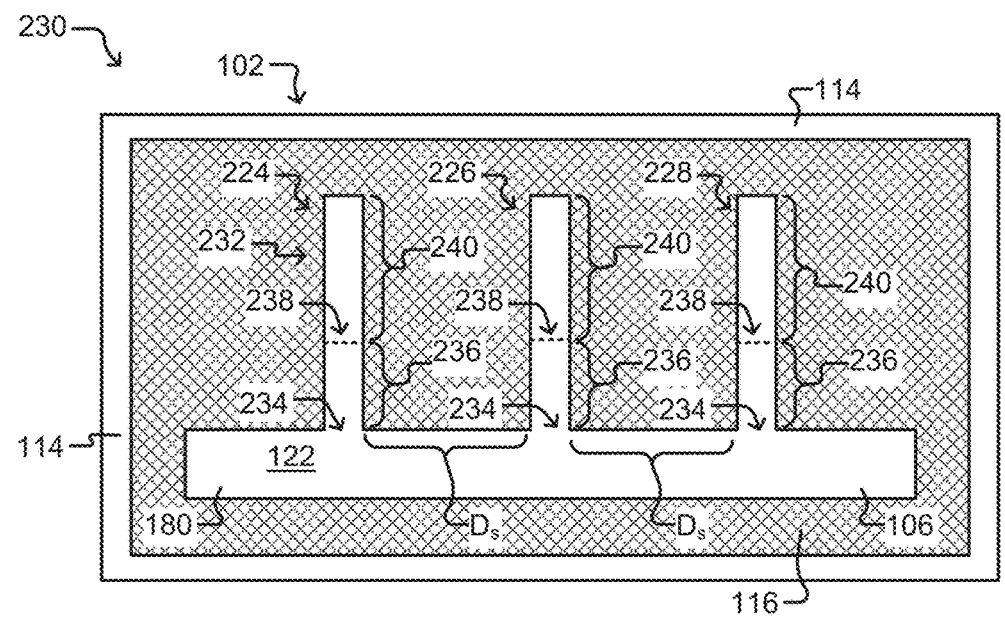
Figure 2C:
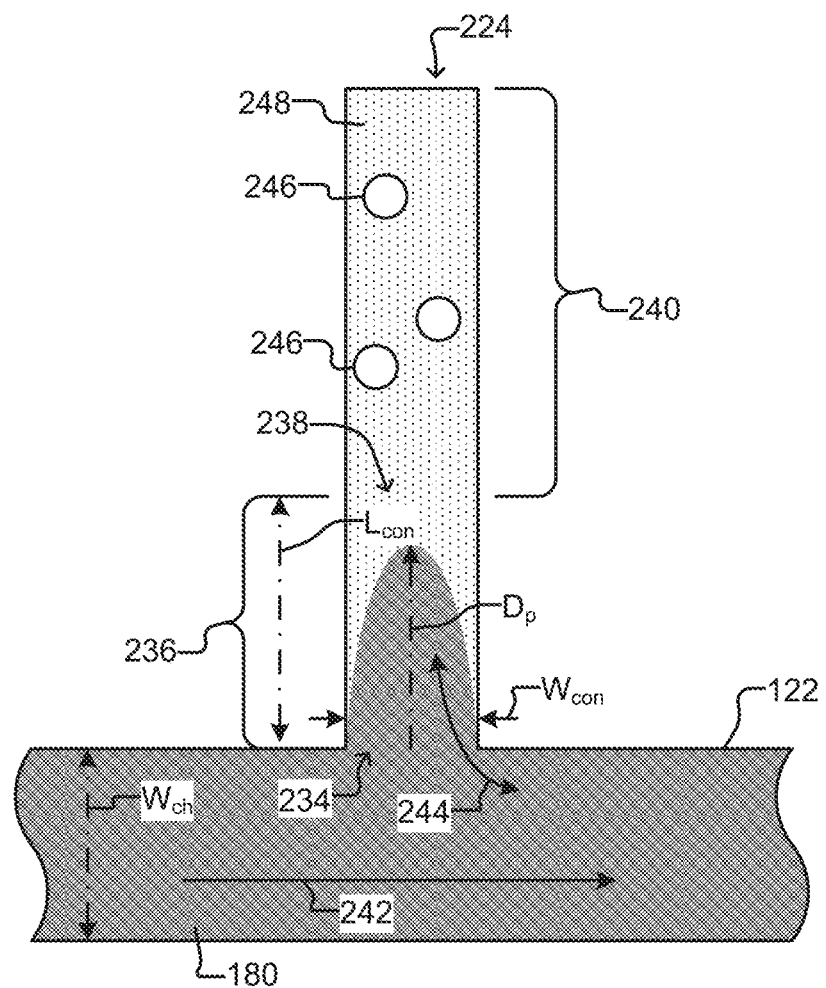
FIG. 2C illustrates a detailed sequestration pen according to some embodiments of the invention.

The sequestration pens 224, 226, and 228 of FIGS. 2A-2C each have a single opening which opens directly to the channel 122. The opening of the sequestration pen opens laterally from the channel 122. The electrode activation substrate 206 underlays both the channel 122 and the sequestration pens 224, 226, and 228. The upper surface of the electrode activation substrate 206 within the enclosure of a sequestration pen, forming the floor of the sequestration pen, is disposed at the same level or substantially the same level of the upper surface the of electrode activation substrate 206 within the channel 122 (or flow region if a channel is not present), forming the floor of the flow channel (or flow region, respectively) of the microfluidic device. The electrode activation substrate 206 may be featureless or may have an irregular or patterned surface that varies from its highest elevation to its lowest depression by less than about 3 microns, 2.5 microns, 2 microns, 1.5 microns, 1 micron, 0.9 microns, 0.5 microns, 0.4 microns, 0.2 microns, 0.1 microns or less. The variation of elevation in the upper surface of the substrate across both the channel 122 (or flow region) and sequestration pens may be less than about 3%, 2%, 1%. 0.9%, 0.8%, 0.5%, 0.3% or 0.1% of the height of the walls of the sequestration pen or walls of the microfluidic device. While described in detail for the microfluidic device 200, this also applies to any of the microfluidic devices 100, 230, 250, 280, 290, 320, 400, 450, 500, 700 described herein.

The channel 122 can thus be an example of a swept region, and the isolation regions 240 of the sequestration pens 224, 226, 228 can be examples of unswept regions. As noted, the channel 122 and sequestration pens 224, 226, 228 can be configured to contain one or more fluidic media 180. In the example shown in FIGS. 2A-2B, the ports 222 are connected to the channel 122 and allow a fluidic medium 180 to be introduced into or removed from the microfluidic device 230. Prior to introduction of the fluidic medium 180, the microfluidic device may be primed with a gas such as carbon dioxide gas. Once the microfluidic device 230 contains the fluidic medium 180, the flow 242 of fluidic medium 180 in the channel 122 can be selectively generated and stopped. For example, as shown, the ports 222 can be disposed at different locations (e.g., opposite ends) of the channel 122, and a flow 242 of medium can be created from one port 222 functioning as an inlet to another port 222 functioning as an outlet.

FIG. 2C illustrates a detailed view of an example of a sequestration pen 224 according to the present invention. Examples of micro-objects 246 are also shown.

As is known, a flow 242 of fluidic medium 180 in a microfluidic channel 122 past a proximal opening 234 of sequestration pen 224 can cause a secondary flow 244 of the medium 180 into and/or out of the sequestration pen 224. To isolate micro-objects 246 in the isolation region 240 of a sequestration pen 224 from the secondary flow 244, the length $L_{con}$ of the connection region 236 of the sequestration pen 224 (i.e., from the proximal opening 234 to the distal opening 238) should be greater than the penetration depth $D_p$ of the secondary flow 244 into the connection region 236. The penetration depth $D_p$ of the secondary flow 244 depends upon the velocity of the fluidic medium 180 flowing in the channel 122 and various parameters relating to the configuration of the channel 122 and the proximal opening 234 of the connection region 236 to the channel 122. For a given microfluidic device, the configurations of the channel 122 and the opening 234 will be fixed, whereas the rate of flow 242 of fluidic medium 180 in the channel 122 will be variable. Accordingly, for each sequestration pen 224, a maximal velocity $V_{max}$ for the flow 242 of fluidic medium 180 in channel 122 can be identified that ensures that the penetration depth $D_p$ of the secondary flow 244 does not exceed the length $L_{con}$ of the connection region 236. As long as the rate of the flow 242 of fluidic medium 180 in the channel 122 does not exceed the maximum velocity $V_{max}$, the resulting secondary flow 244 can be limited to the channel 122 and the connection region 236 and kept out of the isolation region 240. The flow 242 of medium 180 in the channel 122 will thus not draw micro-objects 246 out of the isolation region 240. Rather, micro-objects 246 located in the isolation region 240 will stay in the isolation region 240 regardless of the flow 242 of fluidic medium 180 in the channel 122.

Moreover, as long as the rate of flow 242 of medium 180 in the channel 122 does not exceed $V_{max}$, the flow 242 of fluidic medium 180 in the channel 122 will not move miscellaneous particles (e.g., microparticles and/or nanoparticles) from the channel 122 into the isolation region 240 of a sequestration pen 224. Having the length $L_{con}$ of the connection region 236 be greater than the maximum penetration depth $D_p$ of the secondary flow 244 can thus prevent contamination of one sequestration pen 224 with miscellaneous particles from the channel 122 or another sequestration pen (e.g., sequestration pens 226, 228 in FIG. 2D).

Because the channel 122 and the connection regions 236 of the sequestration pens 224, 226, 228 can be affected by the flow 242 of medium 180 in the channel 122, the channel 122 and connection regions 236 can be deemed swept (or flow) regions of the microfluidic device 230. The isolation regions 240 of the sequestration pens 224, 226, 228, on the other hand, can be deemed unswept (or non-flow) regions. For example, components (not shown) in a first fluidic medium 180 in the channel 122 can mix with a second fluidic medium 248 in the isolation region 240 substantially only by diffusion of components of the first medium 180 from the channel 122 through the connection region 236 and into the second fluidic medium 248 in the isolation region 240. Similarly, components (not shown) of the second medium 248 in the isolation region 240 can mix with the first medium 180 in the channel 122 substantially only by diffusion of components of the second medium 248 from the isolation region 240 through the connection region 236 and into the first medium 180 in the channel 122. In some embodiments, the extent of fluidic medium exchange between the isolation region of a sequestration pen and the flow region by diffusion is greater than about 90%, 91%, 92%, 93%, 94% 95%, 96%, 97%, 98%, or greater than about 99% of fluidic exchange. The first medium 180 can be the same medium or a different medium than the second medium 248. Moreover, the first medium 180 and the second medium 248 can start out being the same, then become different (e.g., through conditioning of the second medium 248 by one or more cells in the isolation region 240, or by changing the medium 180 flowing through the channel 122).

The maximum penetration depth $D_p$ of the secondary flow 244 caused by the flow 242 of fluidic medium 180 in the channel 122 can depend on a number of parameters, as mentioned above. Examples of such parameters include: the shape of the channel 122 (e.g., the channel can direct medium into the connection region 236, divert medium away from the connection region 236, or direct medium in a direction substantially perpendicular to the proximal opening 234 of the connection region 236 to the channel 122); a width $W_{ch}$ (or cross-sectional area) of the channel 122 at the proximal opening 234; and a width $W_{con}$ (or cross-sectional area) of the connection region 236 at the proximal opening 234; the velocity V of the flow 242 of fluidic medium 180 in the channel 122; the viscosity of the first medium 180 and/or the second medium 248, or the like.

In some embodiments, the dimensions of the channel 122 and sequestration pens 224, 226, 228 can be oriented as follows with respect to the vector of the flow 242 of fluidic medium 180 in the channel 122: the channel width $W_{ch}$ (or cross-sectional area of the channel 122) can be substantially perpendicular to the flow 242 of medium 180; the width $W_{con}$ (or cross-sectional area) of the connection region 236 at opening 234 can be substantially parallel to the flow 242 of medium 180 in the channel 122; and/or the length $L_{con}$ of the connection region can be substantially perpendicular to the flow 242 of medium 180 in the channel 122. The foregoing are examples only, and the relative position of the channel 122 and sequestration pens 224, 226, 228 can be in other orientations with respect to each other.

As illustrated in FIG. 2C, the width $W_{con}$ of the connection region 236 can be uniform from the proximal opening 234 to the distal opening 238. The width on $W_{con}$ the connection region 236 at the distal opening 238 can thus be in any of the ranges identified herein for the width $W_{con}$ of the connection region 236 at the proximal opening 234. Alternatively, the width $W_{con}$ of the connection region 236 at the distal opening 238 can be larger than the width $W_{con}$ of the connection region 236 at the proximal opening 234.

As illustrated in FIG. 2C, the width of the isolation region 240 at the distal opening 238 can be substantially the same as the width $W_{con}$ of the connection region 236 at the proximal opening 234. The width of the isolation region 240 at the distal opening 238 can thus be in any of the ranges identified herein for the width $W_{con}$ of the connection region 236 at the proximal opening 234. Alternatively, the width of the isolation region 240 at the distal opening 238 can be larger or smaller than the width $W_{con}$ of the connection region 236 at the proximal opening 234. Moreover, the distal opening 238 may be smaller than the proximal opening 234 and the width $W_{con}$ of the connection region 236 may be narrowed between the proximal opening 234 and distal opening 238. For example, the connection region 236 may be narrowed between the proximal opening and the distal opening, using a variety of different geometries (e.g. chamfering the connection region, beveling the connection region). Further, any part or subpart of the connection region 236 may be narrowed (e.g. a portion of the connection region adjacent to the proximal opening 234).

Figure 2D:
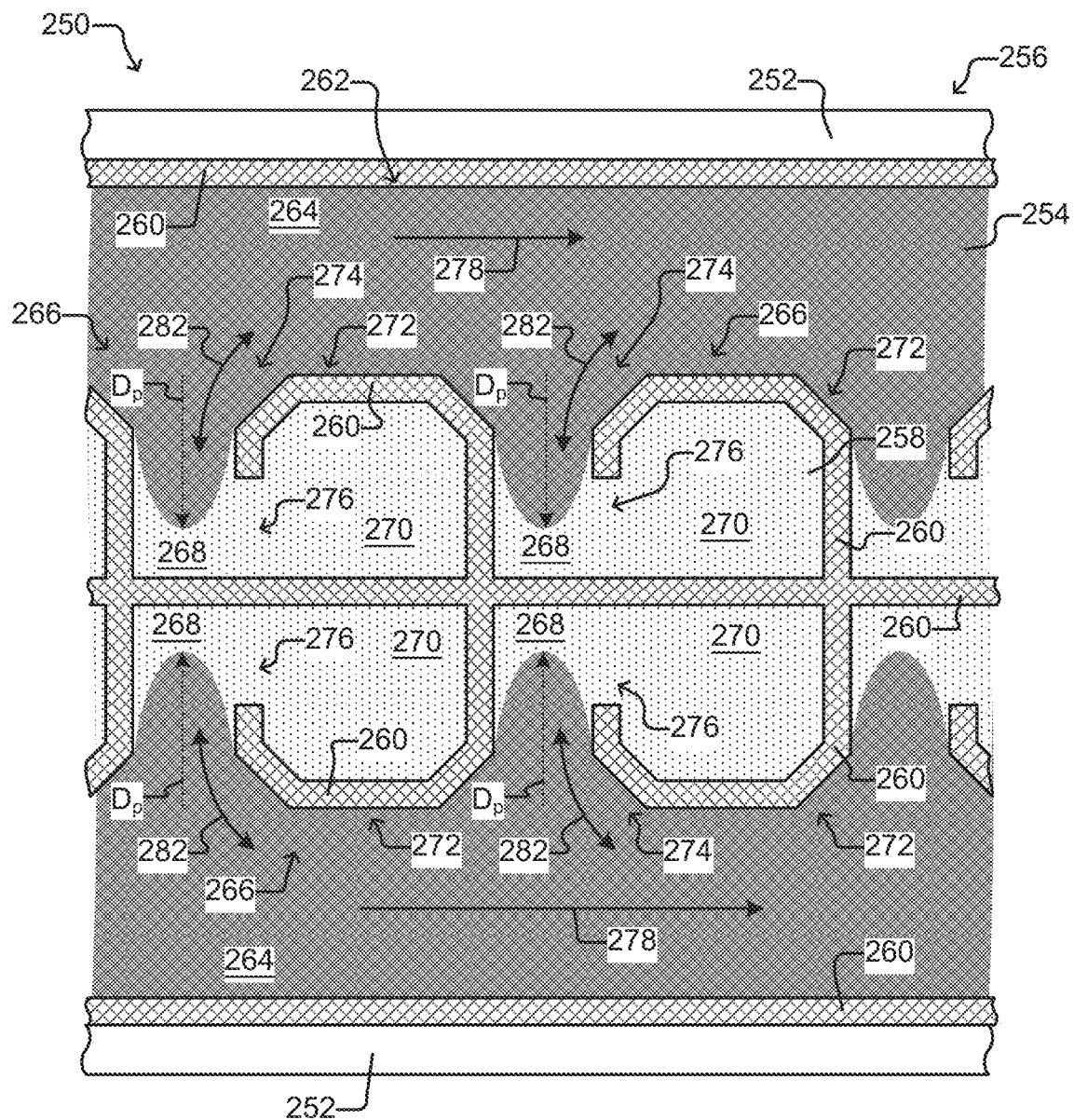
FIGS. 2D-F illustrate sequestration pens according to some other embodiments of the invention.
Figure 2E:
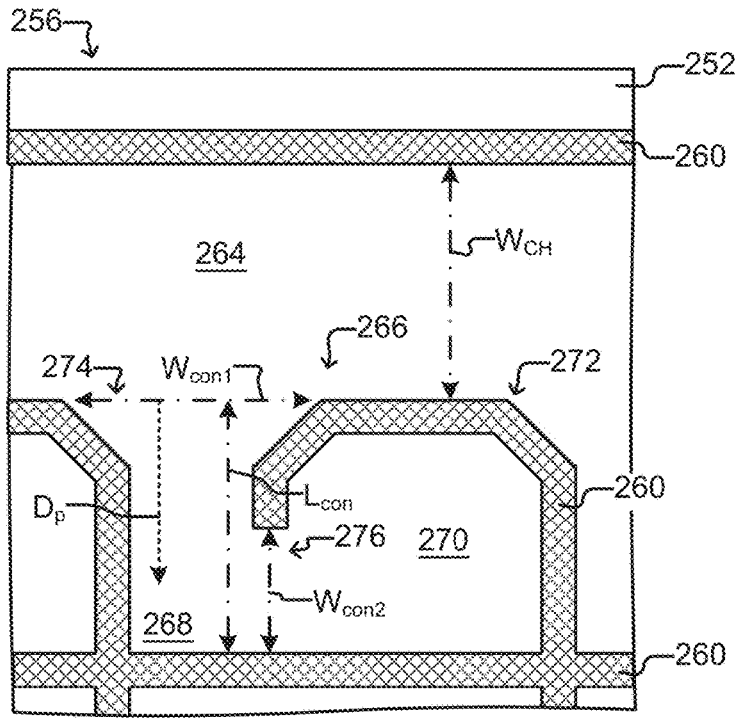
Figure 2F:
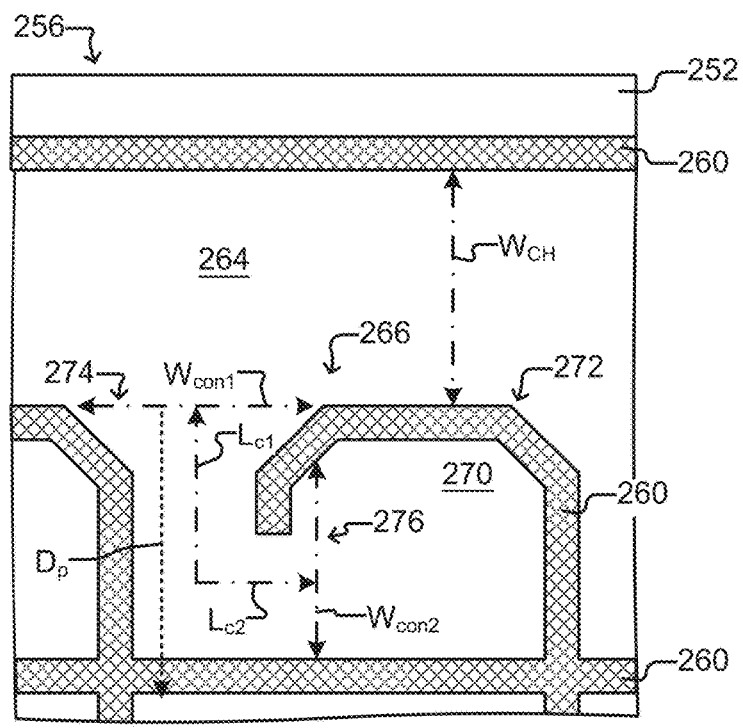

FIGS. 2D-2F depict another exemplary embodiment of a microfluidic device 250 containing a microfluidic circuit 262 and flow channels 264, which are variations of the respective microfluidic device 100, circuit 132 and channel 134 of FIG. 1. The microfluidic device 250 also has a plurality of sequestration pens 266 that are additional variations of the above-described sequestration pens 124, 126, 128, 130, 224, 226 or 228. In particular, it should be appreciated that the sequestration pens 266 of device 250 shown in FIGS. 2D-2F can replace any of the above-described sequestration pens 124, 126, 128, 130, 224, 226 or 228 in devices 100, 200, 230, 280, 290, 300, 400, 500, 600, 700, 800, 900, 1000, 1100, 1200, 1300, 1400, 1500, 1600, 1700, 1800, 1900, 2000, 2100, 2200. Likewise, the microfluidic device 250 is another variant of the microfluidic device 100, and may also have the same or a different DEP configuration as the above-described microfluidic device 100, 200 or microfluidic devices 230, 280, 290, 300, 400, 500, 600, 700, 800, 900, 1000, 1100, 1200, 1300, 1400, 1500, 1600, 1700, 1800, 1900, 2000, 2100, 2200 as well as any of the other microfluidic system components described herein.

The microfluidic device 250 of FIGS. 2D-2F comprises a support structure (not visible in FIGS. 2D-2F, but can be the same or generally similar to the support structure 104 of device 100 depicted in FIG. 1A), a microfluidic circuit structure 256, and a cover (not visible in FIGS. 2D-2F, but can be the same or generally similar to the cover 122 of device 100 depicted in FIG. 1A). The microfluidic circuit structure 256 includes a frame 252 and microfluidic circuit material 260, which can be the same as or generally similar to the frame 114 and microfluidic circuit material 116 of device 100 shown in FIG. 1A. As shown in FIG. 2D, the microfluidic circuit 262 defined by the microfluidic circuit material 260 can comprise multiple channels 264 (two are shown but there can be more) to which multiple sequestration pens 266 are fluidically connected.

Each sequestration pen 266 can comprise an isolation structure 272, an isolation region 270 within the isolation structure 272, and a connection region 268. From a proximal opening 274 at the channel 264 to a distal opening 276 at the isolation structure 272, the connection region 268 fluidically connects the channel 264 to the isolation region 270. Generally, in accordance with the above discussion of FIGS. 2B and 2C, a flow 278 of a first fluidic medium 254 in a channel 264 can create secondary flows 282 of the first medium 254 from the channel 264 into and/or out of the respective connection regions 268 of the sequestration pens 266.

As illustrated in FIG. 2E, the connection region 268 of each sequestration pen 266 generally includes the area extending between the proximal opening 274 to a channel 264 and the distal opening 276 to an isolation structure 272. The length $L_{con}$ of the connection region 268 can be greater than the maximum penetration depth $D_p$ of secondary flow 282, in which case the secondary flow 282 will extend into the connection region 268 without being redirected toward the isolation region 270 (as shown in FIG. 2D). Alternatively, at illustrated in FIG. 2F, the connection region 268 can have a length $L_{con}$ that is less than the maximum penetration depth $D_p$, in which case the secondary flow 282 will extend through the connection region 268 and be redirected toward the isolation region 270. In this latter situation, the sum of lengths $L_{c1}$ and $L_{c2}$ of connection region 268 is greater than the maximum penetration depth $D_p$, so that secondary flow 282 will not extend into isolation region 270. Whether length $L_{con}$ of connection region 268 is greater than the penetration depth $D_p$, or the sum of lengths $L_{c1}$ and $L_{c2}$ of connection region 268 is greater than the penetration depth $D_p$, a flow 278 of a first medium 254 in channel 264 that does not exceed a maximum velocity $V_{max}$ will produce a secondary flow having a penetration depth $D_p$, and micro-objects (not shown but can be the same or generally similar to the micro-objects 246 shown in FIG. 2C) in the isolation region 270 of a sequestration pen 266 will not be drawn out of the isolation region 270 by a flow 278 of first medium 254 in channel 264. Nor will the flow 278 in channel 264 draw miscellaneous materials (not shown) from channel 264 into the isolation region 270 of a sequestration pen 266. As such, diffusion is the only mechanism by which components in a first medium 254 in the channel 264 can move from the channel 264 into a second medium 258 in an isolation region 270 of a sequestration pen 266. Likewise, diffusion is the only mechanism by which components in a second medium 258 in an isolation region 270 of a sequestration pen 266 can move from the isolation region 270 to a first medium 254 in the channel 264. The first medium 254 can be the same medium as the second medium 258, or the first medium 254 can be a different medium than the second medium 258. Alternatively, the first medium 254 and the second medium 258 can start out being the same, then become different, e.g., through conditioning of the second medium by one or more cells in the isolation region 270, or by changing the medium flowing through the channel 264.

As illustrated in FIG. 2E, the width $W_{ch}$ of the channels 264 (i.e., taken transverse to the direction of a fluid medium flow through the channel indicated by arrows 278 in FIG.

2D) in the channel 264 can be substantially perpendicular to a width $W_{con1}$ the proximal opening 274 and thus substantially parallel to a width $W_{con2}$ of the distal opening 276. The width $W_{con1}$ of the proximal opening 274 and the width $W_{con2}$ of the distal opening 276, however, need not be substantially perpendicular to each other. For example, an angle between an axis (not shown) on which the width $W_{con1}$ of the proximal opening 274 is oriented and another axis on which the width $W_{con2}$ of the distal opening 276 is oriented can be other than perpendicular and thus other than 90°. Examples of alternatively oriented angles include angles in any of the following ranges: from about 30° to about 90°, from about 45° to about 90°, from about 60° to about 90°, or the like.

In various embodiments of sequestration pens (e.g. 124, 126, 128, 130, 224, 226, 228, or 266), the isolation region (e.g. 240 or 270) is configured to contain a plurality of micro-objects. In other embodiments, the isolation region can be configured to contain only one, two, three, four, five, or a similar relatively small number of micro-objects. Accordingly, the volume of an isolation region can be, for example, at least $1 \times 10^6$, $2 \times 10^6$, $4 \times 10^6$, $6 \times 10^6$ cubic microns, or more.

In various embodiments of sequestration pens, the width $W_{ch}$ of the channel (e.g., 122) at a proximal opening (e.g. 234) can be within any of the following ranges: about 50-1000 microns, 50-500 microns, 50-400 microns, 50-300 microns, 50-250 microns, 50-200 microns, 50-150 microns, 50-100 microns, 70-500 microns, 70-400 microns, 70-300 microns, 70-250 microns, 70-200 microns, 70-150 microns, 90-400 microns, 90-300 microns, 90-250 microns, 90-200 microns, 90-150 microns, 100-300 microns, 100-250 microns, 100-200 microns, 100-150 microns, and 100-120 microns. In some other embodiments, the width $W_{ch}$ of the channel (e.g., 122) at a proximal opening (e.g. 234) can be in a range of about 200-800 microns, 200-700 microns, or 200-600 microns. The foregoing are examples only, and the width $W_{ch}$ of the channel 122 can be in other ranges (e.g., a range defined by any of the endpoints listed above). Moreover, the $W_{ch}$ of the channel 122 can be selected to be in any of these ranges in regions of the channel other than at a proximal opening of a sequestration pen.

In some embodiments, a sequestration pen has a height of about 30 to about 200 microns, or about 50 to about 150 microns. In some embodiments, the sequestration pen has a cross-sectional area of about $1 \times 10^4$-$3 \times 10^6$ square microns, $2 \times 10^4$-$2 \times 10^6$ square microns, $4 \times 10^4$-$1 \times 10^6$ square microns, $2 \times 10^4$-$5 \times 10^5$ square microns, $2 \times 10^4$-$1 \times 10^5$ square microns or about $2 \times 10^5$-$2 \times 10^6$ square microns.

In various embodiments of sequestration pens, the height $H_{ch}$ of the channel (e.g., 122) at a proximal opening (e.g., 234) can be within any of the following ranges: 20-100 microns, 20-90 microns, 20-80 microns, 20-70 microns, 20-60 microns, 20-50 microns, 30-100 microns, 30-90 microns, 30-80 microns, 30-70 microns, 30-60 microns, 30-50 microns, 40-100 microns, 40-90 microns, 40-80 microns, 40-70 microns, 40-60 microns, or 40-50 microns. The foregoing are examples only, and the height $H_{ch}$ of the channel (e.g., 122) can be in other ranges (e.g., a range defined by any of the endpoints listed above). The height $H_{ch}$ of the channel 122 can be selected to be in any of these ranges in regions of the channel other than at a proximal opening of an sequestration pen.

In various embodiments of sequestration pens a cross-sectional area of the channel (e.g., 122) at a proximal opening (e.g., 234) can be within any of the following ranges: 500-50,000 square microns, 500-40,000 square microns, 500-30,000 square microns, 500-25,000 square microns, 500-20,000 square microns, 500-15,000 square microns, 500-10,000 square microns, 500-7,500 square microns, 500-5,000 square microns, 1,000-25,000 square microns, 1,000-20,000 square microns, 1,000-15,000 square microns, 1,000-10,000 square microns, 1,000-7,500 square microns, 1,000-5,000 square microns, 2,000-20,000 square microns, 2,000-15,000 square microns, 2,000-10,000 square microns, 2,000-7,500 square microns, 2,000-6,000 square microns, 3,000-20,000 square microns, 3,000-15,000 square microns, 3,000-10,000 square microns, 3,000-7,500 square microns, or 3,000 to 6,000 square microns. The foregoing are examples only, and the cross-sectional area of the channel (e.g., 122) at a proximal opening (e.g., 234) can be in other ranges (e.g., a range defined by any of the endpoints listed above).

In various embodiments of sequestration pens, the length $L_{con}$ of the connection region (e.g., 236) can be in any of the following ranges: about 1-600 microns, 5-550 microns, 10-500 microns, 15-400 microns, 20-300 microns, 20-500 microns, 40-400 microns, 60-300 microns, 80-200 microns, or about 100-150 microns. The foregoing are examples only, and length $L_{con}$ of a connection region (e.g., 236) can be in a different range than the foregoing examples (e.g., a range defined by any of the endpoints listed above).

In various embodiments of sequestration pens the width on $W_{con}$ of a connection region (e.g., 236) at a proximal opening (e.g., 234) can be in any of the following ng ranges: 20-500 microns, 20-400 microns, 20-300 microns, 20-200 microns, 20-150 microns, 20-100 microns, 20-80 microns, 20-60 microns, 30-400 microns, 30-300 microns, 30-200 microns, 30-150 microns, 30-100 microns, 30-80 microns, 30-60 microns, 40-300 microns, 40-200 microns, 40-150 microns, 40-100 microns, 40-80 microns, 40-60 microns, 50-250 microns, 50-200 microns, 50-150 microns, 50-100 microns, 50-80 microns, 60-200 microns, 60-150 microns, 60-100 microns, 60-80 microns, 70-150 microns, 70-100 microns, and 80-100 microns. The foregoing are examples only, and the width $W_{con}$ of a connection region (e.g., 236) at a proximal opening (e.g., 234) can be different than the foregoing examples (e.g., a range defined by any of the endpoints listed above).

In various embodiments of sequestration pens, the width Wa connection region of (e.g., 236) at a proximal opening (e.g., 234) can be at least as large as the largest dimension of a micro-object (e.g., biological cell which may be a T cell, B cell, or an ovum or embryo) that the sequestration pen is intended for. For example, the width Won of a connection region 236 at a proximal opening 234 of an sequestration pen that an oocyte, ovum, or embryo will be placed into can be in any of the following ranges: about 100 microns, about 110 microns, about 120 microns, about 130 microns, about 140 microns, about 150 microns, about 160 microns, about 170 microns, about 180 microns, about 190 microns, about 200 microns, about 225 microns, about 250 microns, about 300 microns or about 100-400 microns, about 120-350 microns, about 140-200-200 300 microns, or about 140-200 microns. The foregoing are examples only, and the width W. of a connection region (e.g., 236) at a proximal opening (e.g., 234) can be different than the foregoing examples (e.g., a range defined by any of the endpoints listed above).

In various embodiments of sequestration pens, the width $W_{pr}$ of a proximal opening of a connection region may be at least as large as the largest dimension of a micro-object (e.g., a biological micro-object such as a cell) that the sequestration pen is intended for. For example, the width $W_{pr}$ may be about 50 microns, about 60 microns, about 100 microns, about 200 microns, about 300 microns or may be in a range of about 50-300 microns, about 50-200 microns, about 50-100 microns, about 75-150 microns, about 75-100 microns, or about 200-300 microns In various embodiments of sequestration pens, a ratio of the length $L_{con}$ of a connection region (e.g., 236) to a width $W_{con}$ of the connection region (e.g., 236) at the proximal opening 234 can be greater than or equal to any of the following ratios: 0.5, 1.0, 1.5, 2.0, 2.5, 3.0, 3.5, 4.0, 4.5, 5.0, 6.0, 7.0, 8.0, 9.0, 10.0, or more. The foregoing are examples only, and the ratio of the length Leon of a connection region 236 to a width $W_{con}$ of the connection region 236 at the proximal opening 234 can be different than the foregoing examples.

In various embodiments of microfluidic devices 100, 200, 230, 250, 280, 290, 300, 400, 500, 600, 700, 800, 900, 1000, 1100, 1200, 1300, 1400, 1500, 1600, 1700, 1800, 1900, 2000, 2100, 2200, $V_{max}$ can be set around 0.2, 0.3, 0.4, 0.5, 0.6, 0.7, 0.8, 0.9, 1.0, 1.1, 1.2, 1.3, 1.4, or 1.5 microliters/sec.

In various embodiments of microfluidic devices having sequestration pens, the volume of an isolation region (e.g., 240) of a sequestration pen can be, for example, at least $5\times10^5$, $8\times10^5$, $1\times10^6$, $2\times10^6$, $4\times10^6$, $6\times10^6$, $8\times10^6$, $1\times10^7$, $5\times10^7$, $1\times10^8$, $5\times10^8$, or $8\times10^8$ cubic microns, or more. In various embodiments of microfluidic devices having sequestration pens, the volume of a sequestration pen may be about $5\times10^5$, $6\times10^5$, $8\times10^5$, $1\times10^6$, $2\times10^6$, $4\times10^6$, $8\times10^6$, $1\times10^7$, $3\times10^7$, $5\times10^7$, or about $8\times10^7$ cubic microns, or more. In some other embodiments, the volume of a sequestration pen may be about 1 nanoliter to about 50 nanoliters, 2 nanoliters to about 25 nanoliters, 2 nanoliters to about 20 nanoliters, about 2 nanoliters to about 15 nanoliters, or about 2 nanoliters to about 10 nanoliters.

In various embodiment, the microfluidic device has sequestration pens configured as in any of the embodiments discussed herein where the microfluidic device has about 5 to about 10 sequestration pens, about 10 to about 50 sequestration pens, about 100 to about 500 sequestration pens; about 200 to about 1000 sequestration pens, about 500 to about 1500 sequestration pens, about 1000 to about 2000 sequestration pens, or about 1000 to about 3500 sequestration pens. The sequestration pens need not all be the same size and may include a variety of configurations (e.g., different widths, different features within the sequestration pen.

Figure 2G:
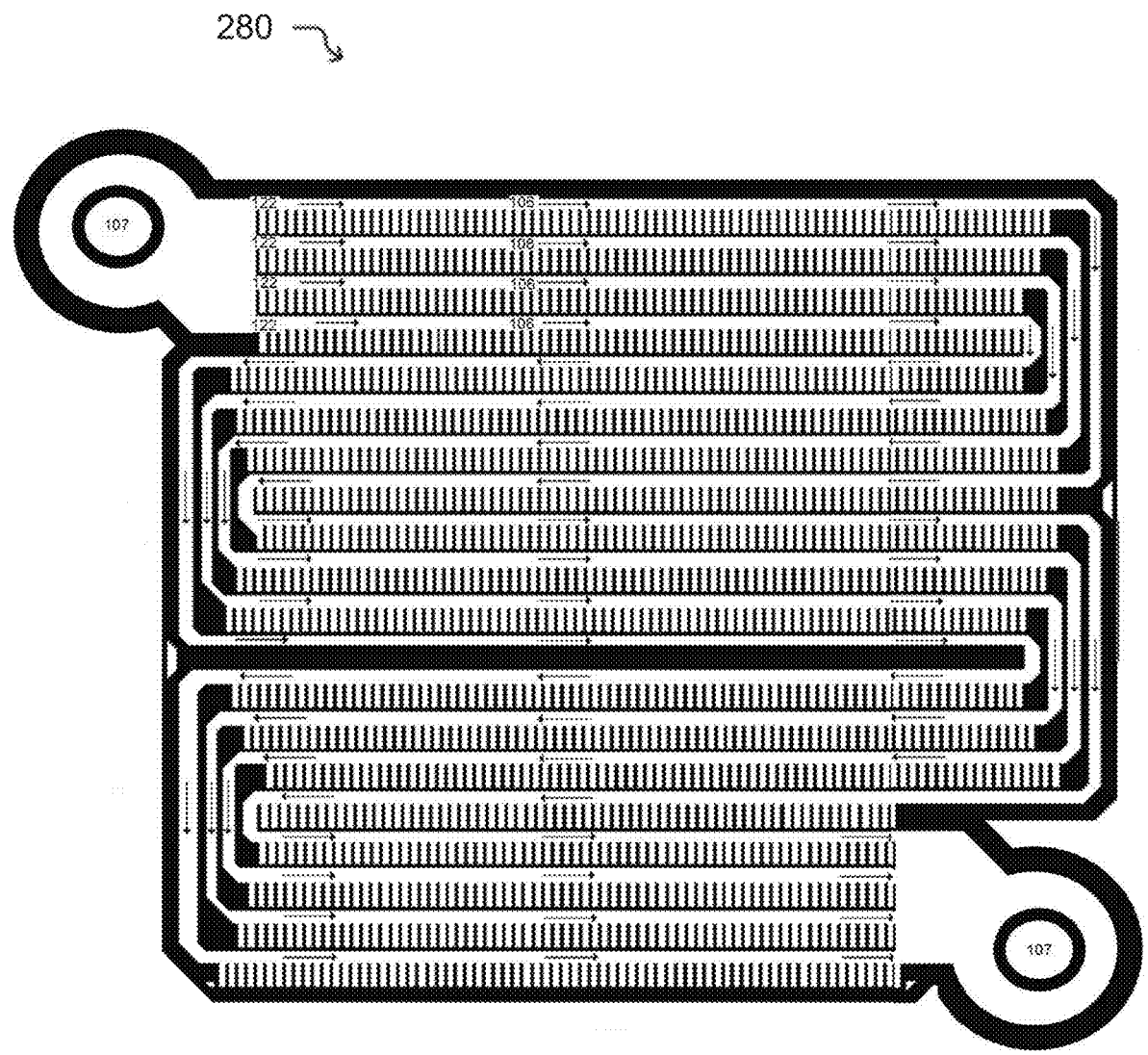
FIG. 2G illustrates a microfluidic device according to an embodiment of the invention.

FIG. 2G illustrates a microfluidic device 280 according to one embodiment. The microfluidic device 280 is illustrated in FIG. 2G is a stylized diagram of a microfluidic device 100. In practice the microfluidic device 280 and its constituent circuit elements (e.g. channels 122 and sequestration pens 128) would have the dimensions discussed herein. The microfluidic circuit 120 illustrated in FIG. 2G has two ports 107, four distinct channels 122 and four distinct flow paths 106. The microfluidic device 280 further comprises a plurality of sequestration pens opening off of each channel 122. In the microfluidic device illustrated in FIG. 2G, the sequestration pens have a geometry similar to the pens illustrated in FIG. 2C and thus, have both connection regions and isolation regions. Accordingly, the microfluidic circuit 120 includes both swept regions (e.g. channels 122 and portions of the connection regions 236 within the maximum penetration depth $D_p$ of the secondary flow 244) and non-swept regions (e.g. isolation regions 240 and portions of the connection regions 236 not within the maximum penetration depth $D_p$ of the secondary flow 244).

Figure 3A:
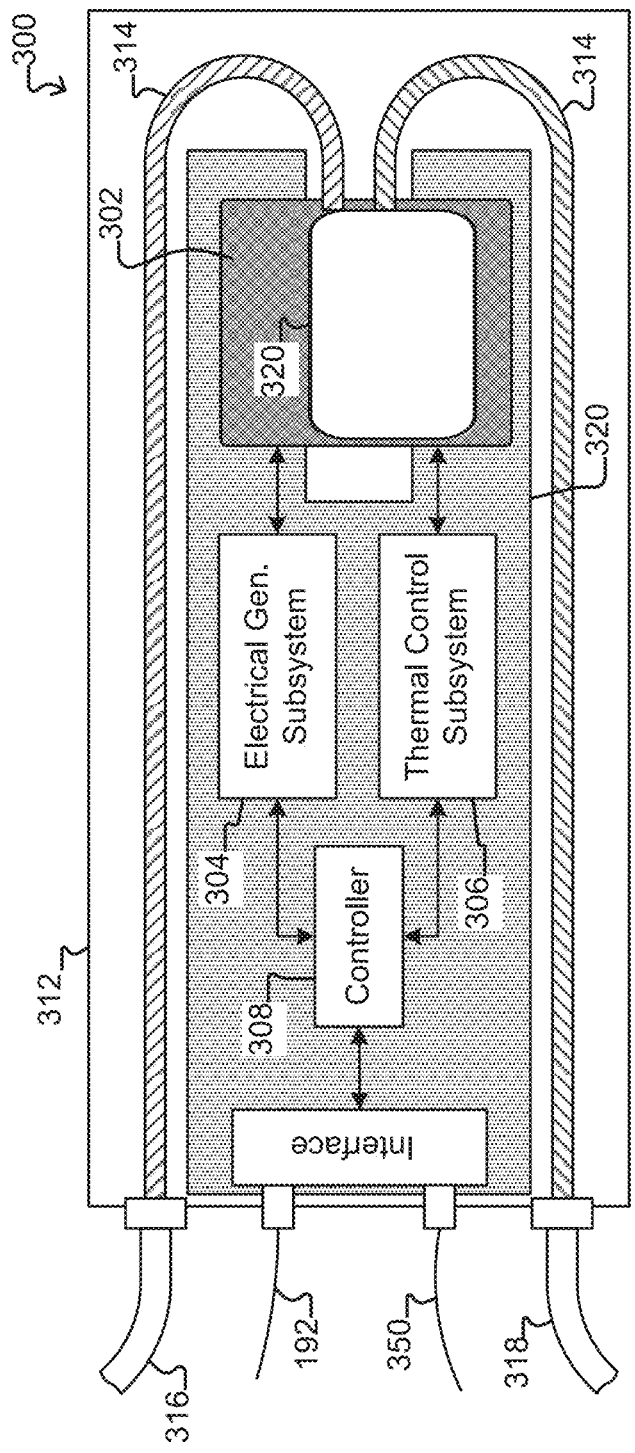
FIG. 3A illustrates a specific example of a system for use with a microfluidic device and associated control equipment according to some embodiments of the invention.
Figure 3B:
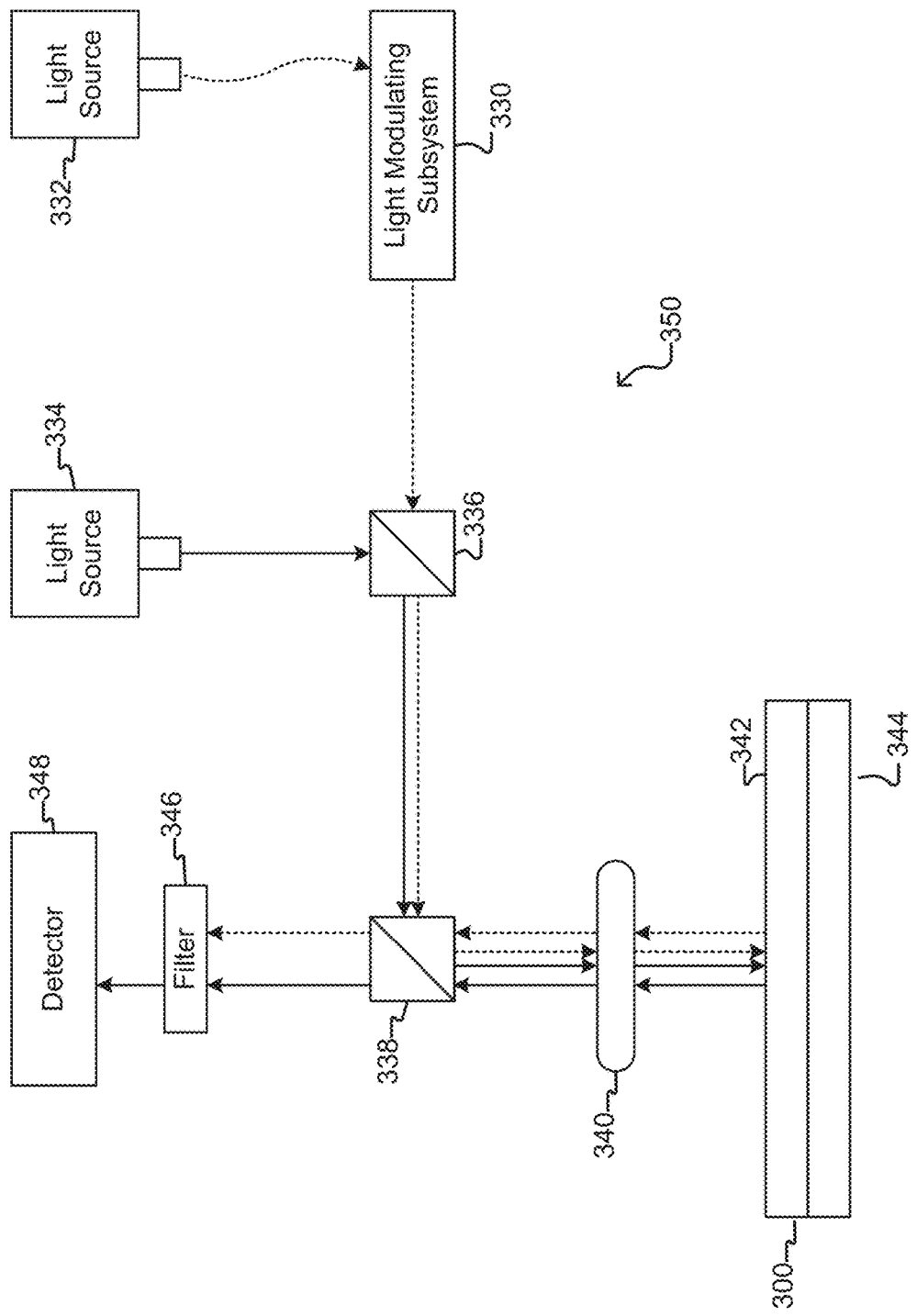
FIG. 3B illustrates an imaging device according to some embodiments of the invention.

FIGS. 3A through 3B shows various embodiments of system 150 which can be used to operate and observe microfluidic devices (e.g. 100, 200, 230, 250, 280, 290, 400, 500, 600, 700, 800, 900, 1000, 1100, 1200, 1300, 1400, 1500, 1600, 1700, 1800, 1900, 2000, 2100, 2200) according to the present invention. As illustrated in FIG. 3A, the system 150 can include a structure ("nest") 300 configured to hold a microfluidic device 100 (not shown), or any other microfluidic device described herein. The nest 300 can include a socket 302 capable of interfacing with the microfluidic device 320 (e.g., an optically-actuated electrokinetic device 100) and providing electrical connections from power source 192 to microfluidic device 320. The nest 300 can further include an integrated electrical signal generation subsystem 304. The electrical signal generation subsystem 304 can be configured to supply a biasing voltage to socket 302 such that the biasing voltage is applied across a pair of electrodes in the microfluidic device 320 when it is being held by socket 302. Thus, the electrical signal generation subsystem 304 can be part of power source 192. The ability to apply a biasing voltage to microfluidic device 320 does not mean that a biasing voltage will be applied at all times when the microfluidic device 320 is held by the socket 302. Rather, in most cases, the biasing voltage will be applied intermittently, e.g., only as needed to facilitate the generation of electrokinetic forces, such as dielectrophoresis or electro-wetting, in the microfluidic device 320.

As illustrated in FIG. 3A, the nest 300 can include a printed circuit board assembly (PCBA) 322. The electrical signal generation subsystem 304 can be mounted on and electrically integrated into the PCBA 322. The exemplary support includes socket 302 mounted on PCBA 322, as well.

Typically, the electrical signal generation subsystem 304 will include a waveform generator (not shown). The electrical signal generation subsystem 304 can further include an oscilloscope (not shown) and/or a waveform amplification circuit (not shown) configured to amplify a waveform received from the waveform generator. The oscilloscope, if present, can be configured to measure the waveform supplied to the microfluidic device 320 held by the socket 302. In certain embodiments, the oscilloscope measures the waveform at a location proximal to the microfluidic device 320 (and distal to the waveform generator), thus ensuring greater accuracy in measuring the waveform actually applied to the device. Data obtained from the oscilloscope measurement can be, for example, provided as feedback to the waveform generator, and the waveform generator can be configured to adjust its output based on such feedback. An example of a suitable combined waveform generator and oscilloscope is the Red Pitaya™.

In certain embodiments, the nest 300 further comprises a controller 308, such as a microprocessor used to sense and/or control the electrical signal generation subsystem 304. Examples of suitable microprocessors include the Arduino™ microprocessors, such as the Arduino Nano™. The controller 308 may be used to perform functions and analysis or may communicate with an external master controller 154 (shown in FIG. 1A) to perform functions and analysis. In the embodiment illustrated in FIG. 3A the controller 308 communicates with a master controller 154 through an interface 310 (e.g., a plug or connector).

In some embodiments, the nest 300 can comprise an electrical signal generation subsystem 304 comprising a Red Pitaya™ waveform generator/oscilloscope unit ("Red Pitaya unit") and a waveform amplification circuit that amplifies the waveform generated by the Red Pitaya unit and passes the amplified voltage to the microfluidic device 100. In some embodiments, the Red Pitaya unit is configured to measure the amplified voltage at the microfluidic device 320 and then adjust its own output voltage as needed such that the measured voltage at the microfluidic device 320 is the desired value. In some embodiments, the waveform amplification circuit can have a +6.5V to −6.5V power supply generated by a pair of DC-DC converters mounted on the PCBA 322, resulting in a signal of up to 13 Vpp at the microfluidic device 100.

As illustrated in FIG. 3A, the support structure 300 can further include a thermal control subsystem 306. The thermal control subsystem 306 can be configured to regulate the temperature of microfluidic device 320 held by the support structure 300. For example, the thermal control subsystem 306 can include a Peltier thermoelectric device (not shown) and a cooling unit (not shown). The Peltier thermoelectric device can have a first surface configured to interface with at least one surface of the microfluidic device 320. The cooling unit can be, for example, a cooling block (not shown), such as a liquid-cooled aluminum block. A second surface of the Peltier thermoelectric device (e.g., a surface opposite the first surface) can be configured to interface with a surface of such a cooling block. The cooling block can be connected to a fluidic path 314 configured to circulate cooled fluid through the cooling block. In the embodiment illustrated in FIG. 3A, the support structure 300 comprises an inlet 316 and an outlet 318 to receive cooled fluid from an external reservoir (not shown), introduce the cooled fluid into the fluidic path 314 and through the cooling block, and then return the cooled fluid to the external reservoir. In some embodiments, the Peltier thermoelectric device, the cooling unit, and/or the fluidic path 314 can be mounted on a casing 312 of the support structure 300. In some embodiments, the thermal control subsystem 306 is configured to regulate the temperature of the Peltier thermoelectric device so as to achieve a target temperature for the microfluidic device 320. Temperature regulation of the Peltier thermoelectric device can be achieved, for example, by a thermoelectric power supply, such as a Pololu™ thermoelectric power supply (Pololu Robotics and Electronics Corp.). The thermal control subsystem 306 can include a feedback circuit, such as a temperature value provided by an analog circuit. Alternatively, the feedback circuit can be provided by a digital circuit.

In some embodiments, the nest 300 can include a thermal control subsystem 306 with a feedback circuit that is an analog voltage divider circuit (not shown) which includes a resistor (e.g., with resistance 1 kOhm+/−0.1%, temperature coefficient +/−0.02 ppm/CO) and a NTC thermistor (e.g., with nominal resistance 1 kOhm+/−0.01%). In some instances, the thermal control subsystem 306 measures the voltage from the feedback circuit and then uses the calculated temperature value as input to an on-board PID control loop algorithm. Output from the PID control loop algorithm can drive, for example, both a directional and a pulse-width-modulated signal pin on a Pololu™ motor drive (not shown) to actuate the thermoelectric power supply, thereby controlling the Peltier thermoelectric device.

The nest 300 can include a serial port 324 which allows the microprocessor of the controller 308 to communicate with an external master controller 154 via the interface 310 (not shown). In addition, the microprocessor of the controller 308 can communicate (e.g., via a Plink tool (not shown)) with the electrical signal generation subsystem 304 and thermal control subsystem 306. Thus, via the combination of the controller 308, the interface 310, and the serial port 324, the electrical signal generation subsystem 304 and the thermal control subsystem 306 can communicate with the external master controller 154. In this manner, the master controller 154 can, among other things, assist the electrical signal generation subsystem 304 by performing scaling calculations for output voltage adjustments. A Graphical User Interface (GUI) (not shown) provided via a display device 170 coupled to the external master controller 154, can be configured to plot temperature and waveform data obtained from the thermal control subsystem 306 and the electrical signal generation subsystem 304, respectively. Alternatively, or in addition, the GUI can allow for updates to the controller 308, the thermal control subsystem 306, and the electrical signal generation subsystem 304.

As discussed above, system 150 can include an imaging device 194. In some embodiments, the imaging device 194 comprises a light modulating subsystem 330 (See FIG. 3B). The light modulating subsystem 330 can include a digital mirror device (DMD) or a microshutter array system (MSA), either of which can be configured to receive light from a light source 332 and transmits a subset of the received light into an optical train of microscope 350. Alternatively, the light modulating subsystem 330 can include a device that produces its own light (and thus dispenses with the need for a light source 332), such as an organic light emitting diode display (OLED), a liquid crystal on silicon (LCOS) device, a ferroelectric liquid crystal on silicon device (FLCOS), or a transmissive liquid crystal display (LCD). The light modulating subsystem 330 can be, for example, a projector. Thus, the light modulating subsystem 330 can be capable of emitting both structured and unstructured light. One example of a suitable light modulating subsystem 330 is the Mosaic™ system from Andor Technologies™. In certain embodiments, imaging module 164 and/or motive module 162 of system 150 can control the light modulating subsystem 330.

In certain embodiments, the imaging device 194 further comprises a microscope 350. In such embodiments, the nest 300 and light modulating subsystem 330 can be individually configured to be mounted on the microscope 350. The microscope 350 can be, for example, a standard research-grade light microscope or fluorescence microscope. Thus, the nest 300 can be configured to be mounted on the stage 344 of the microscope 350 and/or the light modulating subsystem 330 can be configured to mount on a port of microscope 350. In other embodiments, the nest 300 and the light modulating subsystem 330 described herein can be integral components of microscope 350.

In certain embodiments, the microscope 350 can further include one or more detectors 348. In some embodiments, the detector 348 is controlled by the imaging module 164. The detector 348 can include an eye piece, a charge-coupled device (CCD), a camera (e.g., a digital camera), or any combination thereof. If at least two detectors 348 are present, one detector can be, for example, a fast-frame-rate camera while the other detector can be a high sensitivity camera. Furthermore, the microscope 350 can include an optical train configured to receive reflected and/or emitted light from the microfluidic device 320 and focus at least a portion of the reflected and/or emitted light on the one or more detectors 348. The optical train of the microscope can also include different tube lenses (not shown) for the different detectors, such that the final magnification on each detector can be different.

In certain embodiments, imaging device 194 is configured to use at least two light sources. For example, a first light source 332 can be used to produce structured light (e.g., via the light modulating subsystem 330) and a second light source 334 can be used to provide unstructured light. The first light source 332 can produce structured light for optically-actuated electrokinesis and/or fluorescent excitation, and the second light source 334 can be used to provide bright field illumination. In these embodiments, the motive module 164 can be used to control the first light source 332 and the imaging module 164 can be used to control the second light source 334. The optical train of the microscope 350 can be configured to (1) receive structured light from the light modulating subsystem 330 and focus the structured light on at least a first region in a microfluidic device, such as an optically-actuated electrokinetic device, when the device is being held by the nest 300, and (2) receive reflected and/or emitted light from the microfluidic device and focus at least a portion of such reflected and/or emitted light onto detector 348. The optical train can be further configured to receive unstructured light from a second light source and focus the unstructured light on at least a second region of the microfluidic device, when the device is held by the nest 300. In certain embodiments, the first and second regions of the microfluidic device can be overlapping regions. For example, the first region can be a subset of the second region.

In FIG. 3B, the first light source 332 is shown supplying light to a light modulating subsystem 330, which provides structured light to the optical train of the microscope 350 of system 355 (not shown). The second light source 334 is shown providing unstructured light to the optical train via a beam splitter 336. Structured light from the light modulating subsystem 330 and unstructured light from the second light source 334 travel from the beam splitter 336 through the optical train together to reach a second beam splitter (or dichroic filter 338, depending on the light provided by the light modulating subsystem 330), where the light gets reflected down through the objective 336 to the sample plane 342. Reflected and/or emitted light from the sample plane 342 then travels back up through the objective 340, through the beam splitter and/or dichroic filter 338, and to a dichroic filter 346. Only a fraction of the light reaching dichroic filter 346 passes through and reaches the detector 348.

In some embodiments, the second light source 334 emits blue light. With an appropriate dichroic filter 346, blue light reflected from the sample plane 342 is able to pass through dichroic filter 346 and reach the detector 348. In contrast, structured light coming from the light modulating subsystem 330 gets reflected from the sample plane 342, but does not pass through the dichroic filter 346. In this example, the dichroic filter 346 is filtering out visible light having a wavelength longer than 495 nm. Such filtering out of the light from the light modulating subsystem 330 would only be complete (as shown) if the light emitted from the light modulating subsystem did not include any wavelengths shorter than 495 nm. In practice, if the light coming from the light modulating subsystem 330 includes wavelengths shorter than 495 nm (e.g., blue wavelengths), then some of the light from the light modulating subsystem would pass through filter 346 to reach the detector 348. In such an embodiment, the filter 346 acts to change the balance between the amount of light that reaches the detector 348 from the first light source 332 and the second light source 334. This can be beneficial if the first light source 332 is significantly stronger than the second light source 334. In other embodiments, the second light source 334 can emit red light, and the dichroic filter 346 can filter out visible light other than red light (e.g., visible light having a wavelength shorter than 650 nm).

Coating solutions and coating agents. Without intending to be limited by theory, maintenance of a biological micro-object (e.g., a biological cell) within a microfluidic device (e.g., a DEP-configured and/or EW-configured microfluidic device) may be facilitated (i.e., the biological micro-object exhibits increased viability, greater expansion and/or greater portability within the microfluidic device) when at least one or more inner surfaces of the microfluidic device have been conditioned or coated so as to present a layer of organic and/or hydrophilic molecules that provides the primary interface between the microfluidic device and biological micro-object(s) maintained therein. In some embodiments, one or more of the inner surfaces of the microfluidic device (e.g. the inner surface of the electrode activation substrate of a DEP-configured microfluidic device, the cover of the microfluidic device, and/or the surfaces of the circuit material) may be treated with or modified by a coating solution and/or coating agent to generate the desired layer of organic and/or hydrophilic molecules.

The coating may be applied before or after introduction of biological micro-object(s), or may be introduced concurrently with the biological micro-object(s). In some embodiments, the biological micro-object(s) may be imported into the microfluidic device in a fluidic medium that includes one or more coating agents. In other embodiments, the inner surface(s) of the microfluidic device (e.g., a DEP-configured microfluidic device) are treated or "primed" with a coating solution comprising a coating agent prior to introduction of the biological micro-object(s) into the microfluidic device.

In some embodiments, at least one surface of the microfluidic device includes a coating material that provides a layer of organic and/or hydrophilic molecules suitable for maintenance and/or expansion of biological micro-object(s) (e.g. provides a conditioned surface as described below). In some embodiments, substantially all the inner surfaces of the microfluidic device include the coating material. The coated inner surface(s) may include the surface of a flow region (e.g., channel), chamber, or sequestration pen, or a combination thereof. In some embodiments, each of a plurality of sequestration pens has at least one inner surface coated with coating materials. In other embodiments, each of a plurality of flow regions or channels has at least one inner surface coated with coating materials. In some embodiments, at least one inner surface of each of a plurality of sequestration pens and each of a plurality of channels is coated with coating materials.

Coating agent/Solution. Any convenient coating agent/coating solution can be used, including but not limited to: serum or serum factors, bovine serum albumin (BSA), polymers, detergents, enzymes, and any combination thereof.

Polymer-based coating materials. The at least one inner surface may include a coating material that comprises a polymer. The polymer may be covalently or non-covalently bound (or may be non-specifically adhered) to the at least one surface. The polymer may have a variety of structural motifs, such as found in block polymers (and copolymers), star polymers (star copolymers), and graft or comb polymers (graft copolymers), all of which may be suitable for the methods disclosed herein.

The polymer may include a polymer including alkylene ether moieties. A wide variety of alkylene ether containing polymers may be suitable for use in the microfluidic devices described herein. One non-limiting exemplary class of alkylene ether containing polymers are amphiphilic non-ionic block copolymers which include blocks of polyethylene oxide (PEO) and polypropylene oxide (PPO) subunits in differing ratios and locations within the polymer chain. Pluronic® polymers (BASF) are block copolymers of this type and are known in the art to be suitable for use when in contact with living cells. The polymers may range in average molecular mass $M_w$ from about 2000 Da to about 20 KDa. In some embodiments, the PEO-PPO block copolymer can have a hydrophilic-lipophilic balance (HLB) greater than about 10 (e.g. 12-18). Specific Pluronic® polymers useful for yielding a coated surface include Pluronic® L44, L64, P85, and F127 (including F127NF). Another class of alkylene ether containing polymers is polyethylene glycol (PEG $M_w$<100,000 Da) or alternatively polyethylene oxide (PEO, $M_w$>100,000). In some embodiments, a PEG may have an $M_w$ of about 1000 Da, 5000 Da, 10,000 Da or 20,000 Da.

In other embodiments, the coating material may include a polymer containing carboxylic acid moieties. The carboxylic acid subunit may be an alkyl, alkenyl or aromatic moiety containing subunit. One non-limiting example is polylactic acid (PLA). In other embodiments, the coating material may include a polymer containing phosphate moieties, either at a terminus of the polymer backbone or pendant from the backbone of the polymer. In yet other embodiments, the coating material may include a polymer containing sulfonic acid moieties. The sulfonic acid subunit may be an alkyl, alkenyl or aromatic moiety containing subunit. One non-limiting example is polystyrene sulfonic acid (PSSA) or polyanethole sulfonic acid. In further embodiments, the coating material may include a polymer including amine moieties. The polyamino polymer may include a natural polyamine polymer or a synthetic polyamine polymer. Examples of natural polyamines include spermine, spermidine, and putrescine.

In other embodiments, the coating material may include a polymer containing saccharide moieties. In a non-limiting example, polysaccharides such as xanthan gum or dextran may be suitable to form a material which may reduce or prevent cell sticking in the microfluidic device. For example, a dextran polymer having a size about 3 kDa may be used to provide a coating material for a surface within a microfluidic device.

In other embodiments, the coating material may include a polymer containing nucleotide moieties, i.e. a nucleic acid, which may have ribonucleotide moieties or deoxyribonucleotide moieties, providing a polyelectrolyte surface. The nucleic acid may contain only natural nucleotide moieties or may contain unnatural nucleotide moieties which comprise nucleobase, ribose or phosphate moiety analogs such as 7-deazaadenine, pentose, methyl phosphonate or phosphorothioate moieties without limitation.

In yet other embodiments, the coating material may include a polymer containing amino acid moieties. The polymer containing amino acid moieties may include a natural amino acid containing polymer or an unnatural amino acid containing polymer, either of which may include a peptide, a polypeptide or a protein. In one non-limiting example, the protein may be bovine serum albumin (BSA) and/or serum (or a combination of multiple different sera) comprising albumin and/or one or more other similar proteins as coating agents. The serum can be from any convenient source, including but not limited to fetal calf serum, sheep serum, goat serum, horse serum, and the like. In certain embodiments, BSA in a coating solution is present in a range of form about 1 mg/mL to about 100 mg/mL, including 5 mg/mL, 10 mg/mL, 20 mg/mL, 30 mg/mL, 40 mg/mL, 50 mg/mL, 60 mg/mL, 70 mg/mL, 80 mg/mL, 90 mg/mL, or more or anywhere in between. In certain embodiments, serum in a coating solution may be present in a range of from about 20% (v/v) to about 50% v/v, including 25%, 30%, 35%, 40%, 45%, or more or anywhere in between. In some embodiments, BSA may be present as a coating agent in a coating solution at 5 mg/mL, whereas in other embodiments, BSA may be present as a coating agent in a coating solution at 70 mg/mL. In certain embodiments, serum is present as a coating agent in a coating solution at 30%. In some embodiments, an extracellular matrix (ECM) protein may be provided within the coating material for optimized cell adhesion to foster cell growth. A cell matrix protein, which may be included in a coating material, can include, but is not limited to, a collagen, an elastin, an RGD-containing peptide (e.g. a fibronectin), or a laminin. In yet other embodiments, growth factors, cytokines, hormones or other cell signaling species may be provided within the coating material of the microfluidic device.

In some embodiments, the coating material may include a polymer containing more than one of alkylene oxide moieties, carboxylic acid moieties, sulfonic acid moieties, phosphate moieties, saccharide moieties, nucleotide moieties, or amino acid moieties. In other embodiments, the polymer conditioned surface may include a mixture of more than one polymer each having alkylene oxide moieties, carboxylic acid moieties, sulfonic acid moieties, phosphate moieties, saccharide moieties, nucleotide moieties, and/or amino acid moieties, which may be independently or simultaneously incorporated into the coating material.

Covalently linked coating materials. In some embodiments, the at least one inner surface includes covalently linked molecules that provide a layer of organic and/or hydrophilic molecules suitable for maintenance/expansion of biological micro-object(s) within the microfluidic device, providing a conditioned surface for such cells.

The covalently linked molecules include a linking group, wherein the linking group is covalently linked to one or more surfaces of the microfluidic device, as described below. The linking group is also covalently linked to a moiety configured to provide a layer of organic and/or hydrophilic molecules suitable for maintenance/expansion of biological micro-object(s).

In some embodiments, the covalently linked moiety configured to provide a layer of organic and/or hydrophilic molecules suitable for maintenance/expansion of biological micro-object(s) may include alkyl or fluoroalkyl (which includes perfluoroalkyl) moieties; mono- or polysaccharides (which may include but is not limited to dextran); alcohols (including but not limited to propargyl alcohol); polyalcohols, including but not limited to polyvinyl alcohol; alkylene ethers, including but not limited to polyethylene glycol; polyelectrolytes (including but not limited to polyacrylic acid or polyvinyl phosphonic acid); amino groups (including derivatives thereof, such as, but not limited to alkylated amines, hydroxyalkylated amino group, guanidinium, and heterocylic groups containing an unaromatized nitrogen ring atom, such as, but not limited to morpholinyl or piperazinyl); carboxylic acids including but not limited to propiolic acid (which may provide a carboxylate anionic surface); phosphonic acids, including but not limited to ethynyl phosphonic acid (which may provide a phosphonate anionic surface); sulfonate anions; carboxybetaines; sulfobetaines; sulfamic acids; or amino acids.

In various embodiments, the covalently linked moiety configured to provide a layer of organic and/or hydrophilic molecules suitable for maintenance/expansion of biological micro-object(s) in the microfluidic device may include non-polymeric moieties such as an alkyl moiety, a substituted alkyl moiety, such as a fluoroalkyl moiety (including but not limited to a perfluoroalkyl moiety), amino acid moiety, alcohol moiety, amino moiety, carboxylic acid moiety, phosphonic acid moiety, sulfonic acid moiety, sulfamic acid moiety, or saccharide moiety. Alternatively, the covalently linked moiety may include polymeric moieties, which may be any of the moieties described above.

In some embodiments, the covalently linked alkyl moiety may comprises carbon atoms forming a linear chain (e.g., a linear chain of at least 10 carbons, or at least 14, 16, 18, 20, 22, or more carbons) and may be an unbranched alkyl moiety. In some embodiments, the alkyl group may include a substituted alkyl group (e.g., some of the carbons in the alkyl group can be fluorinated or perfluorinated). In some embodiments, the alkyl group may include a first segment, which may include a perfluoroalkyl group, joined to a second segment, which may include a non-substituted alkyl group, where the first and second segments may be joined directly or indirectly (e.g., by means of an ether linkage). The first segment of the alkyl group may be located distal to the linking group, and the second segment of the alkyl group may be located proximal to the linking group.

In other embodiments, the covalently linked moiety may include at least one amino acid, which may include more than one type of amino acid. Thus, the covalently linked moiety may include a peptide or a protein. In some embodiments, the covalently linked moiety may include an amino acid which may provide a zwitterionic surface to support cell growth, viability, portability, or any combination thereof.

In other embodiments, the covalently linked moiety may include at least one alkylene oxide moiety, and may include any alkylene oxide polymer as described above. One useful class of alkylene ether containing polymers is polyethylene glycol (PEG $M_w$<100,000 Da) or alternatively polyethylene oxide (PEO, $M_w$>100,000). In some embodiments, a PEG may have an $M_w$ of about 1000 Da, 5000 Da, 10,000 Da or 20,000 Da.

The covalently linked moiety may include one or more saccharides. The covalently linked saccharides may be mono-, di-, or polysaccharides. The covalently linked saccharides may be modified to introduce a reactive pairing moiety which permits coupling or elaboration for attachment to the surface. Exemplary reactive pairing moieties may include aldehyde, alkyne or halo moieties. A polysaccharide may be modified in a random fashion, wherein each of the saccharide monomers may be modified or only a portion of the saccharide monomers within the polysaccharide are modified to provide a reactive pairing moiety that may be coupled directly or indirectly to a surface. One exemplar may include a dextran polysaccharide, which may be coupled indirectly to a surface via an unbranched linker.

The covalently linked moiety may include one or more amino groups. The amino group may be a substituted amine moiety, guanidine moiety, nitrogen-containing heterocyclic moiety or heteroaryl moiety. The amino containing moieties may have structures permitting pH modification of the environment within the microfluidic device, and optionally, within the sequestration pens and/or flow regions (e.g., channels).

The coating material providing a conditioned surface may comprise only one kind of covalently linked moiety or may include more than one different kind of covalently linked moiety. For example, the fluoroalkyl conditioned surfaces (including perfluoroalkyl) may have a plurality of covalently linked moieties which are all the same, e.g., having the same linking group and covalent attachment to the surface, the same overall length, and the same number of fluoromethylene units comprising the fluoroalkyl moiety. Alternatively, the coating material may have more than one kind of covalently linked moiety attached to the surface. For example, the coating material may include molecules having covalently linked alkyl or fluoroalkyl moieties having a specified number of methylene or fluoromethylene units and may further include a further set of molecules having charged moieties covalently attached to an alkyl or fluoroalkyl chain having a greater number of methylene or fluoromethylene units, which may provide capacity to present bulkier moieties at the coated surface. In this instance, the first set of molecules having different, less sterically demanding termini and fewer backbone atoms can help to functionalize the entire substrate surface and thereby prevent undesired adhesion or contact with the silicon/silicon oxide, hafnium oxide or alumina making up the substrate itself. In another example, the covalently linked moieties may provide a zwitterionic surface presenting alternating charges in a random fashion on the surface.

Conditioned surface properties. Aside from the composition of the conditioned surface, other factors such as physical thickness of the hydrophobic material can impact DEP force. Various factors can alter the physical thickness of the conditioned surface, such as the manner in which the conditioned surface is formed on the substrate (e.g. vapor deposition, liquid phase deposition, spin coating, flooding, and electrostatic coating). In some embodiments, the conditioned surface has a thickness in the range of about 1 nm to about 10 nm; about 1 nm to about 7 nm; about 1 nm to about 5 nm; or any individual value therebetween. In other embodiments, the conditioned surface formed by the covalently linked moieties may have a thickness of about 10 nm to about 50 nm. In various embodiments, the conditioned surface prepared as described herein has a thickness of less than 10 nm. In some embodiments, the covalently linked moieties of the conditioned surface may form a monolayer when covalently linked to the surface of the microfluidic device (e.g., a DEP configured substrate surface) and may have a thickness of less than 10 nm (e.g., less than 5 nm, or about 1.5 to 3.0 nm). These values are in contrast to that of a CYTOP® (Asahi Glass Co., Ltd. JP) fluoropolymer spin coating, which has a thickness in the range of about 30 nm. In some embodiments, the conditioned surface does not require a perfectly formed monolayer to be suitably functional for operation within a DEP-configured microfluidic device.

In various embodiments, the coating material providing a conditioned surface of the microfluidic device may provide desirable electrical properties. Without intending to be limited by theory, one factor that impacts robustness of a surface coated with a particular coating material is intrinsic charge trapping. Different coating materials may trap electrons, which can lead to breakdown of the coating material. Defects in the coating material may increase charge trapping and lead to further breakdown of the coating material. Similarly, different coating materials have different dielectric strengths (i.e. the minimum applied electric field that results in dielectric breakdown), which may impact charge trapping. In certain embodiments, the coating material can have an overall structure (e.g., a densely-packed monolayer structure) that reduces or limits that amount of charge trapping.

In addition to its electrical properties, the conditioned surface may also have properties that are beneficial in use with biological molecules. For example, a conditioned surface that contains fluorinated (or perfluorinated) carbon chains may provide a benefit relative to alkyl-terminated chains in reducing the amount of surface fouling. Surface fouling, as used herein, refers to the amount of indiscriminate material deposition on the surface of the microfluidic device, which may include permanent or semi-permanent deposition of biomaterials such as protein and its degradation products, nucleic acids and respective degradation products and the like.

Unitary or Multi-part conditioned surface. The covalently linked coating material may be formed by reaction of a molecule which already contains the moiety configured to provide a layer of organic and/or hydrophilic molecules suitable for maintenance/expansion of biological micro-object(s) in the microfluidic device, as is described below. Alternatively, the covalently linked coating material may be formed in a two-part sequence by coupling the moiety configured to provide a layer of organic and/or hydrophilic molecules suitable for maintenance/expansion of biological micro-object(s) to a surface modifying ligand that itself has been covalently linked to the surface.

Methods of preparing a covalently linked coating material. In some embodiments, a coating material that is covalently linked to the surface of a microfluidic device (e.g., including at least one surface of the sequestration pens and/or flow regions) has a structure of Formula 1 or Formula 2. When the coating material is introduced to the surface in one step, it has a structure of Formula 1, while when the coating material is introduced in a multiple step process, it has a structure of Formula 2.

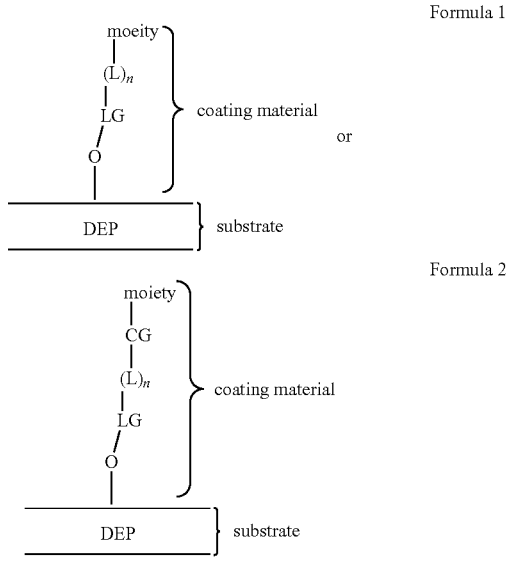

The coating material may be linked covalently to oxides of the surface of a DEP-configured or EW-configured substrate. The DEP- or EW-configured substrate may comprise silicon, silicon oxide, alumina, or hafnium oxide. Oxides may be present as part of the native chemical structure of the substrate or may be introduced as discussed below.

The coating material may be attached to the oxides via a linking group ("LG"), which may be a siloxy or phosphonate ester group formed from the reaction of a siloxane or phosphonic acid group with the oxides. The moiety configured to provide a layer of organic and/or hydrophilic molecules suitable for maintenance/expansion of biological micro-object(s) in the microfluidic device can be any of the moieties described herein. The linking group LG may be directly or indirectly connected to the moiety configured to provide a layer of organic and/or hydrophilic molecules suitable for maintenance/expansion of biological micro-object(s) in the microfluidic device. When the linking group LG is directly connected to the moiety, optional linker ("L") is not present and n is 0. When the linking group LG is indirectly connected to the moiety, linker L is present and n is 1. The linker L may have a linear portion where a backbone of the linear portion may include 1 to 200 non-hydrogen atoms selected from any combination of silicon, carbon, nitrogen, oxygen, sulfur and phosphorus atoms, subject to chemical bonding limitations as is known in the art. It may be interrupted with any combination of one or more moieties selected from the group consisting of ether, amino, carbonyl, amido, or phosphonate groups, arylene, heteroarylene, or heterocyclic groups. In some embodiments, the backbone of the linker L may include 10 to 20 atoms. In other embodiments, the backbone of the linker L may include about 5 atoms to about 200 atoms; about 10 atoms to about 80 atoms; about 10 atoms to about 50 atoms; or about 10 atoms to about 40 atoms. In some embodiments, the backbone atoms are all carbon atoms.

In some embodiments, the moiety configured to provide a layer of organic and/or hydrophilic molecules suitable for maintenance/expansion of biological micro-object(s) may be added to the surface of the substrate in a multi-step process, and has a structure of Formula 2, as shown above. The moiety may be any of the moieties described above.

In some embodiments, the coupling group CG represents the resultant group from reaction of a reactive moiety $R_x$ and a reactive pairing moiety $R_{px}$ (i.e., a moiety configured to react with the reactive moiety $R_x$). For example, one typical coupling group CG may include a carboxamidyl group, which is the result of the reaction of an amino group with a derivative of a carboxylic acid, such as an activated ester, an acid chloride or the like. Other CG may include a triazolylene group, a carboxamidyl, thioamidyl, an oxime, a mercaptyl, a disulfide, an ether, or alkenyl group, or any other suitable group that may be formed upon reaction of a reactive moiety with its respective reactive pairing moiety. The coupling group CG may be located at the second end (i.e., the end proximal to the moiety configured to provide a layer of organic and/or hydrophilic molecules suitable for maintenance/expansion of biological micro-object(s) in the microfluidic device) of linker L, which may include any combination of elements as described above. In some other embodiments, the coupling group CG may interrupt the backbone of the linker L. When the coupling group CG is triazolylene, it may be the product resulting from a Click coupling reaction and may be further substituted (e.g., a dibenzocylcooctenyl fused triazolylene group).

In some embodiments, the coating material (or surface modifying ligand) is deposited on the inner surfaces of the microfluidic device using chemical vapor deposition. The vapor deposition process can be optionally improved, for example, by pre-cleaning the cover 110, the microfluidic circuit material 116, and/or the substrate (e.g., the inner surface 208 of the electrode activation substrate 206 of a DEP-configured substrate, or a dielectric layer of the support structure 104 of an EW-configured substrate), by exposure to a solvent bath, sonication or a combination thereof. Alternatively, or in addition, such pre-cleaning can include treating the cover 110, the microfluidic circuit material 116, and/or the substrate in an oxygen plasma cleaner, which can remove various impurities, while at the same time introducing an oxidized surface (e.g. oxides at the surface, which may be covalently modified as described herein). Alternatively, liquid-phase treatments, such as a mixture of hydrochloric acid and hydrogen peroxide or a mixture of sulfuric acid and hydrogen peroxide (e.g., piranha solution, which may have a ratio of sulfuric acid to hydrogen peroxide in a range from about 3:1 to about 7:1) may be used in place of an oxygen plasma cleaner.

In some embodiments, vapor deposition is used to coat the inner surfaces of the microfluidic device 200 after the microfluidic device 200 has been assembled to form an enclosure 102 defining a microfluidic circuit 120. Without intending to be limited by theory, depositing such a coating material on a fully-assembled microfluidic circuit 120 may be beneficial in preventing delamination caused by a weakened bond between the microfluidic circuit material 116 and the electrode activation substrate 206 dielectric layer and/or the cover 110. In embodiments where a two-step process is employed the surface modifying ligand may be introduced via vapor deposition as described above, with subsequent introduction of the moiety configured provide a layer of organic and/or hydrophilic molecules suitable for maintenance/expansion of biological micro-object(s). The subsequent reaction may be performed by exposing the surface modified microfluidic device to a suitable coupling reagent in solution.

Figure 2H:
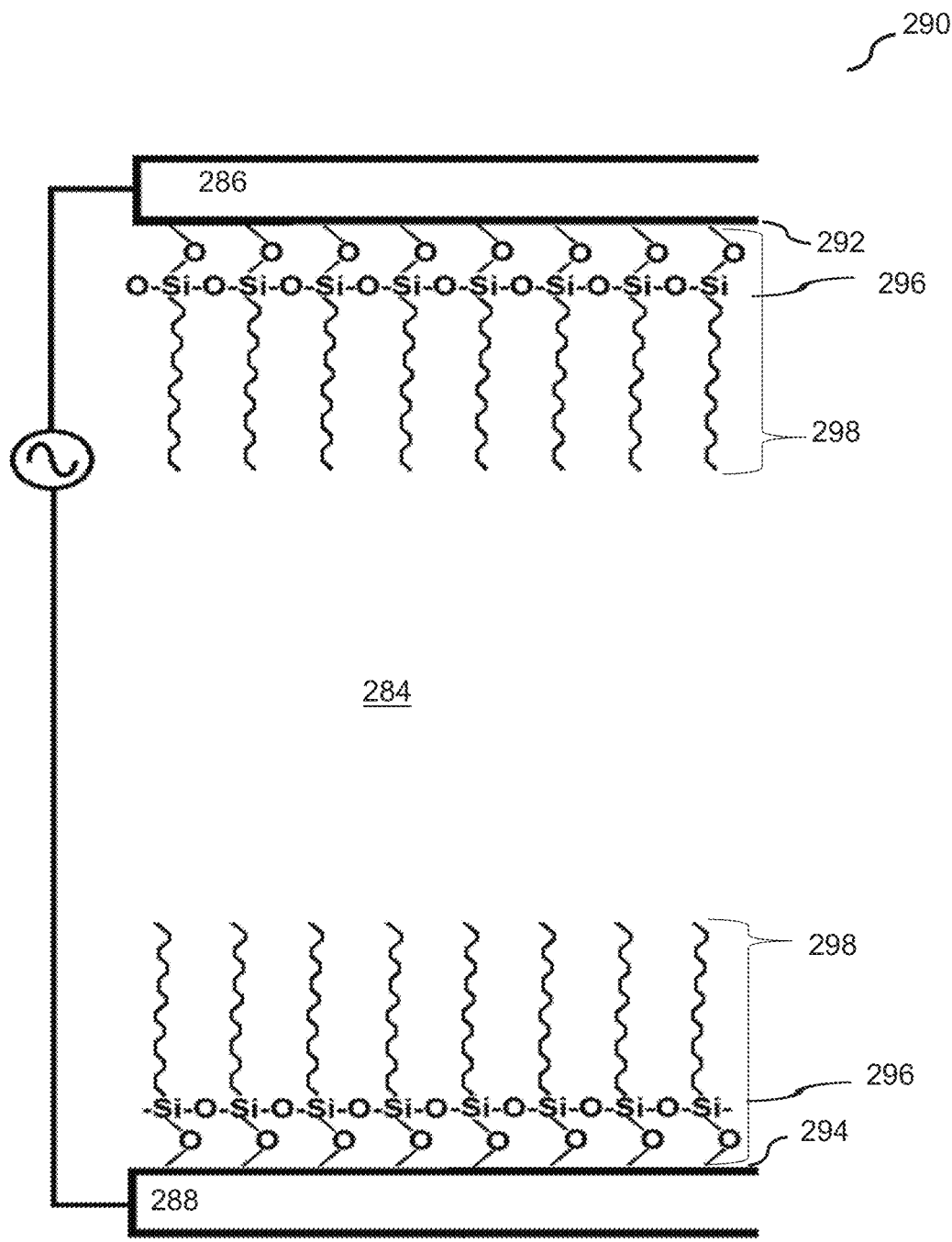
FIG. 2H illustrates a coated surface of the microfluidic device according to an embodiment of the invention.

FIG. 2H depicts a cross-sectional views of a microfluidic device 290 having an exemplary covalently linked coating material providing a conditioned surface. As illustrated, the coating materials 298 (shown schematically) can comprise a monolayer of densely-packed molecules covalently bound to both the inner surface 294 of the substrate 286 and the inner surface 292 of the cover 288 of the microfluidic device 290. The coating material 298 can be disposed on substantially all inner surfaces 294, 292 proximal to, and facing inwards towards, the enclosure 284 of the microfluidic device 290, including, in some embodiments and as discussed above, the surfaces of microfluidic circuit material (not shown) used to define circuit elements and/or structures within the microfluidic device 290. In alternate embodiments, the coating material 298 can be disposed on only one or some of the inner surfaces of the microfluidic device 290.

In the embodiment shown in FIG. 2H, the coating material 298 can include a monolayer of organosiloxane molecules, each molecule covalently bonded to the inner surfaces 292, 294 of the microfluidic device 290 via a siloxy linker 296. Any of the above-discussed coating materials 298 can be used (e.g. an alkyl-terminated, a fluoroalkyl terminated moiety, a PEG-terminated moiety, a dextran terminated moiety, or a terminal moiety containing positive or negative charges for the organosiloxy moieties), where the terminal moiety is disposed at its enclosure-facing terminus (i.e. the portion of the monolayer of the coating material 298 that is not bound to the inner surfaces 292, 294 and is proximal to the enclosure 284).

In other embodiments, the coating material 298 used to coat the inner surface(s) 292, 294 of the microfluidic device 290 can include anionic, cationic, or zwitterionic moieties, or any combination thereof. Without intending to be limited by theory, by presenting cationic moieties, anionic moieties, and/or zwitterionic moieties at the inner surfaces of the enclosure 284 of the microfluidic circuit 120, the coating material 298 can form strong hydrogen bonds with water molecules such that the resulting water of hydration acts as a layer (or "shield") that separates the biological micro-objects from interactions with non-biological molecules (e.g., the silicon and/or silicon oxide of the substrate). In addition, in embodiments in which the coating material 298 is used in conjunction with coating agents, the anions, cations, and/or zwitterions of the coating material 298 can form ionic bonds with the charged portions of non-covalent coating agents (e.g. proteins in solution) that are present in a medium 180 (e.g. a coating solution) in the enclosure 284.

In still other embodiments, the coating material may comprise or be chemically modified to present a hydrophilic coating agent at its enclosure-facing terminus. In some embodiments, the coating material may include an alkylene ether containing polymer, such as PEG. In some embodiments, the coating material may include a polysaccharide, such as dextran. Like the charged moieties discussed above (e.g., anionic, cationic, and zwitterionic moieties), the hydrophilic coating agent can form strong hydrogen bonds with water molecules such that the resulting water of hydration acts as a layer (or "shield") that separates the biological micro-objects from interactions with non-biological molecules (e.g., the silicon and/or silicon oxide of the substrate).

Further details of appropriate coating treatments and modifications may be found at U.S. application Ser. No. 15/135,707, filed on Apr. 22, 2016, and is incorporated by reference in its entirety.

Additional system components for maintenance of viability of cells within the sequestration pens of the microfluidic device. In order to promote growth and/or expansion of cell populations, environmental conditions conducive to maintaining functional cells may be provided by additional components of the system. For example, such additional components can provide nutrients, cell growth signaling species, pH modulation, gas exchange, temperature control, and removal of waste products from cells.

In situ-generated isolation structures. In many applications of microfluidic cell manipulation, it is useful to have the ability to alter structures within the microfluidic environment, based upon optical feedback of the microfluidic contents such micro-objects, cells, beads and the like. It had been difficult within the microfluidics field to make changes to a microfluidic device to alter valving function, to direct flows of media, to direct cells to selected portions of the microfluidic chip, and to select cells using real-time information. In addition, it can be desirable to remove structures as part of a method of processing micro-objects. While optically actuated dielectrophoresis or opto-electrowetting cell and fluid manipulation modes are highly useful for many of these functions, having yet another mode of micro-object and media flow manipulation that provides real-time ability to change the microfluidic flow region and pen environment within the microfluidic device, and to select, isolate and direct cells and fluidic flow therein, is desirable.

It has been surprisingly discovered that a wide variety of isolation structures can be generated in situ within a microfluidic (or nanofluidic) device as described herein. In many embodiments, in situ-generated isolation structures may be fabricated in the presence of biological cells without disturbing general viability. These in situ-generated isolation structures may be used for selectively isolating one cell from a set of cells within a microfluidic device; for selective and reversible valving of media flows, sample-containing flows, or reagent flows; concentration of cells from a dilute input source; assaying cells from a clonal population within the same device; controlled laminar flows; selectively mixed laminar flows; or directed cell line development, amongst other uses. Applicant describes microfluidic devices, compositions and methods of use for these classes of devices having in situ-generated isolation structures.

A microfluidic (or nanofluidic) device is provided which includes an enclosure comprising a substrate, a flow region located within the enclosure, and at least one in situ-generated isolation structure disposed on the substrate. The in situ-generated isolation structure may include a solidified polymer network. The solidified polymer network may include a photoinitiated polymer. In some embodiments, the solidified polymer network does not include a silicone polymer. In some embodiments, the solidified polymer network does not include silicon. In some embodiments, the solidified polymer network may include a thermosensitive polymer. The solidified polymer network may be solidified in situ. All or part of the in situ-generated isolation structure may consist of the solidified polymer network.

The in situ-generated isolation structure may be a fully enclosed structure, a structure open at a portion of its periphery large enough to admit passage of a micro-object, a barrier, or any combination thereof. In some embodiments, the in situ-generated isolation structure can be configured like a pen. Some nonlimiting examples are shown in FIGS. 9C, 9D, and 11B. The in situ-generated isolation structure may be configured in any convenient shape to isolate one or more micro-objects, or a subset of a plurality of micro-objects. The in situ-generated isolation structure can be of a size to contain a single cell or may contain a plurality of cells. An in situ-generated isolation structure can be configured like a sequestration pen where the sequestration pen has an isolation region and a connection region, and the connection region has a proximal opening to the flow region (which can be a flow channel) and has a distal opening to the isolation region. In some embodiments, the in situ-generated isolation structure may be a pen having an opening to the flow region/channel but the in situ-generated pen may not necessarily have the connection region of a sequestration pen.

An in situ-generated isolation structure may also be an in situ-generated barrier. The in situ-generated pen or barrier may include a plurality of in situ-generated modules which together form the pen or barrier. In various embodiments, the at least one in situ-generated isolation structure may include a plurality of in situ-generated isolation modules disposed in the flow region, where the in situ-generated isolation modules may be configured to substantially restrict passage of micro-objects into, out of, and/or through the at least one in situ-generated isolation structure in a size dependent manner. In some embodiments, each of the plurality of in situ-generated isolation modules may be spaced apart from each other such that micro-objects having a diameter of 5 microns or greater may be substantially prevented from passing into, out of, and/or through the at least one in situ-generated isolation structure. In some embodiments, the plurality of in situ-generated isolation modules may be configured to discriminate between two different types of biological micro-objects, allowing a first type of biological micro-object to pass in and out of the at least one in situ-generated isolation structure and substantially preventing a second type of biological micro-object from passing into, out of, and/or through the at least one in situ-generated isolation structure. In various embodiments, the plurality of in situ-generated isolation modules may be configured to substantially prevent passage of a microbead into, out of, and/or through the at least one in situ-generated isolation structure.

In some embodiments, more than one in situ-generated isolation structure may be generated in the microfluidic device. The microfluidic device may have a plurality of in situ-generated isolation structures. When more than one in situ-generated isolation structure is generated in a microfluidic device, there may be more than one kind of in situ-generated isolation structure generated, and in any combination.

The in situ-generated isolation structure may be designed to be temporary or it may be kept in place until the conclusion of the experiment/assay/sorting/cloning process being performed in the microfluidic device. The solidified polymer network of the in situ-generated isolation structure may be at least partially removable by application of increased fluid flow through the flow region, hydrolysis, proteolysis, osmotic change, temperature change, or optical illumination. In some embodiments, at least a portion of the in situ-generated isolation structure may be removable using a flow of a fluidic medium in the flow region, for one non-limiting example.

In some embodiments, the microfluidic device may further include a plurality of in situ-generated pens. Each of the plurality of in situ-generated pens may be disposed to be arranged adjacent to each other. Each of the plurality of in situ-generated pens may have the proximal opening disposed contiguously to each other. In some embodiments, there may be more than one plurality of in situ-generated pens formed within a flow region or there may be multiple channels having in situ-generated pens disposed along each channel. FIGS. 9C, 9D, and 11B show a variety of in situ-generated pens.

The microfluidic (or nanofluidic) device may further include at least one sequestration pen, which may include an isolation region and a connection region, where the connection region has a proximal opening to the flow region and a distal opening to the isolation region. In some embodiments, the sequestration pen may be an in situ-generated isolation structure. In various embodiments, the at least one sequestration pen is not an in situ-generated isolation structure. In some embodiments, the in situ-generated isolation structure may include an in situ-generated barrier. In some embodiments, the microfluidic device may further include a plurality of sequestration pens. The device may further include a microfluidic channel. The plurality of sequestration pens may be located adjacent to each other along the channel. Each of the plurality of sequestration pens may be aligned in a row, with each sequestration pen of the plurality opening off of one side of the microfluidic channel (e.g., opening in a common direction from a wall defining the microfluidic channel). In some embodiments, there may be more than one plurality of sequestration pens within a flow region or there may be multiple channels having sequestration pens disposed along each channel. When more than one plurality of sequestration pens is present within a flow region of a microfluidic device, one or more of the pluralities of sequestration pens may be an in situ-generated isolation structure. Alternatively, within each plurality of sequestration pens, some or all of the sequestration pens may be in situ-generated sequestration pens.

The proximal opening of the sequestration pen to the flow region may be oriented substantially parallel to a flow of fluidic medium in the flow region. In some embodiments, the proximal opening of the sequestration pen to the flow region may be oriented to not directly receive a flow of fluidic medium. Fluidic medium in the flow region (or flow channel) may exchange with the fluidic medium in the isolation region of the sequestration pen substantially only by diffusion. The proximal opening may be oriented at an angle to the fluidic flow such that a micro-object is not removed from the sequestration pen, even if it receives some flow. As an in situ-generated isolation structure may be generated in real time, orientation may not be square to the flow or may be chosen to not be square to the flow.

In some embodiments, the solidified polymer network may be configured to be porous to a flow of fluidic medium.

The solidified polymer network may not be porous to at least a subset of a plurality of micro-objects. In some embodiments, the solidified polymer network is substantially non-porous to micro-object having a diameter of greater than about 500 nm, 600 nm, 700 nm, 800 nm, 900 nm, 1 micron, 2 microns, 3 microns, 4 microns, 5 microns, 6 microns, 7 microns, 8 microns, 9 microns, 10 microns, 11 microns, 12 microns, 13 microns, 14 microns, 15 microns, or more.

The solidified polymer network may further have at least a portion formed from photoinitiated polymer. In some embodiments, all of the solidified polymer network may be formed from photoinitiated polymer. In other embodiments, the solidified polymer network may have at least a portion formed from thermosensitive polymer. In some embodiments, the polymer of the solidified polymer network may be a synthetic polymer, a modified synthetic polymer, or a biological polymer. The biological polymer may be light or thermally activatable. The synthetic polymer modifications may include size modification motifs, cleavage motifs, or cell recognition motifs. In some embodiments, the polymer may be a modified polyethylene glycol. The solidified polymer network may be any suitable polymer described herein and more fully discussed below The microfluidic device may further include a thermal pad. The thermal pad may be disposed on the substrate at a location of the in situ-generated isolation structure. The thermal pad may include a material that has a high thermal conductivity, and optionally, absorbs visible and/or infrared electromagnetic radiation. The thermal pad may be created by deposing a metal shape onto the substrate. The thermal pad can comprise any type of metal that can be excited by a light source to produce heat. Suitable metals include chromium, gold, silver, aluminum, indium tin oxide, or any combination thereof. Metals may be combined in a multi-layered thermal pad, e.g., a layer of chromium, a layer of titanium, a layer of gold. Other metals (and alloys) are known in the art. The thermal pad can comprise a continuous metal surface or can comprise a pattern of metal (e.g. metal shapes such as dots, squares, lines, cones, irregular forms). In some embodiments, a thermal pad may be located beneath all or part of a location where an in situ-generated isolation will be/has been generated. The thermal pad may be used to generate heat to gel, swell, reduce, or remove an in situ-generated isolation structure. Heat may be generated by directing light into the microfluidic device at the location where such gelling, swelling, reduction or removal is desired. Alternatively, the heat may be generated electrically (e.g., by an electrical resistor that is part of or coupled to the thermal pad).

The microfluidic device may include a cover, which may be substantially transparent to illumination having wavelengths in the range for photoactivation of the polymer to form the solidified polymer network of the in situ-generated isolation structures. The cover may also be substantially transparent to illumination in the range suitable for photocleavage and degradation of an in situ-generated isolation structure, thereby allowing the reduction and/or removal of the structure. In various embodiments, the cover may transmit more than about 40%, 50%, 60%, 70%, 80%, or 90% of the light directed through it. A cover may have a lower percentage of light transmission and still be utilizable by increasing the time of exposure.

The enclosure of the microfluidic (or nanofluidic) device may further include a selection sector. In some embodiments, the enclosure may also include an isolation sector. The flow region may be part of the selection sector and may further extend into the isolation sector. The flow region may be configured as a channel which may be disposed in either the selection sector, the isolation sector, or both. In some embodiments, the flow region may not have a channel in the selection sector but may have a channel in the isolation sector. In other embodiments, the flow region occupies both the selection sector and the isolation sector. An in situ-generated isolation structure may be disposed in the selection sector. FIGS. 5A, 5B, 6, 7, 8, 9A, 9B, 11B, 13A-C, and 17, are some examples of in situ-generated isolation structure in the selection sector.

In other embodiments, an in situ-generated isolation structure may be disposed in the isolation sector. FIGS. 9C, 9D, 10C, 12B, 16, and 19B show non-limiting examples of an isolation structure located in the isolation sector. The isolation sector may include at least one sequestration pen, which may be further disposed along a channel. In some embodiments, the isolation section may include a plurality of sequestration pens. One or more sequestration pens in the isolation sector may be in situ-generated isolation structures. For example, depending on the configuration and dimensions of the in situ-generated structures of FIG. 9D or 11B, these structures may be considered sequestration pens. The isolation sector may include at least one sequestration pen that is not an in situ-generated isolation structure.

An in situ-generated isolation structure may have a plurality of in situ-generated isolation modules disposed in the flow region and configured to prevent exit of at least one of a plurality of micro-objects. The plurality of in situ-generated isolation modules may be referred to interchangeably as in situ-generated barrier modules and the overall in situ-generated isolation structure formed by the in situ-generated isolation modules may be a member of a group of in situ-generated isolation structures referred to herein as in situ-generated barriers. FIGS. 6, 7, 8A, 8B, 9A-C, show non-limiting examples. In situ-generated isolation modules may be used to differentially permit passage of smaller micro-objects while retaining the larger micro-objects (e.g., biological cells). For example, micro-objects such as beads or microbeads may have a diameter in the range of about 1 micron to about 5 microns, about 5 microns to about 10 microns, or about 5 microns to about 15 microns. In contrast, biological cells may have a diameter, for example, of about 2 microns to about 5 microns for bacterial cells, about 9 microns to about 30 microns for Eukaryotic animal somatic cells, about 10 microns to about 100 microns for Eukaryotic plant cells, and about 100 microns for human oocytes. Each of the plurality of in situ-generated isolation modules may be spaced apart from each other at a distance to prevent micro-objects of a certain diameter from passing into, out of, and/or through the in situ-generated barrier so formed. The size of the openings between the in situ-generated barrier modules may be sized so that at least one subset of the plurality of micro-objects are prevented from exiting the in situ-generated isolation structure. For one non-limiting example, beads or microbeads having a diameter of less than about 10 microns may pass through the in situ-generated barrier having modules spaced about 10 microns apart, while human cells having a diameter of 10 microns or more may be prevented from passing into, out of, and/or through the in situ-generated barrier modules. Thus, the in situ-generated isolation structure may be a in situ-generated barrier acting to sort one type of micro-object from second type of micro-object where the micro-objects have a diameter in the range of about 1 microns to about 20 microns. A sample containing multiple types of micro-objects, including, for example differently sized biological cells, may be sorted by introducing the sample into the flow region of the microfluidic device into the sector having an in situ-generated barrier comprising barrier modules. The barrier may be sized to permit the smaller cells to pass through the gaps in the barrier, while preventing the larger cells from passing through the in situ-generated barrier. In some embodiments, the one type of micro-object that is permitted to pass through the in situ-generated barrier may be a bead rather than a biological cell. The in situ-generated barrier having in situ-generated barrier modules may be located in the selection sector.

Figure 4:
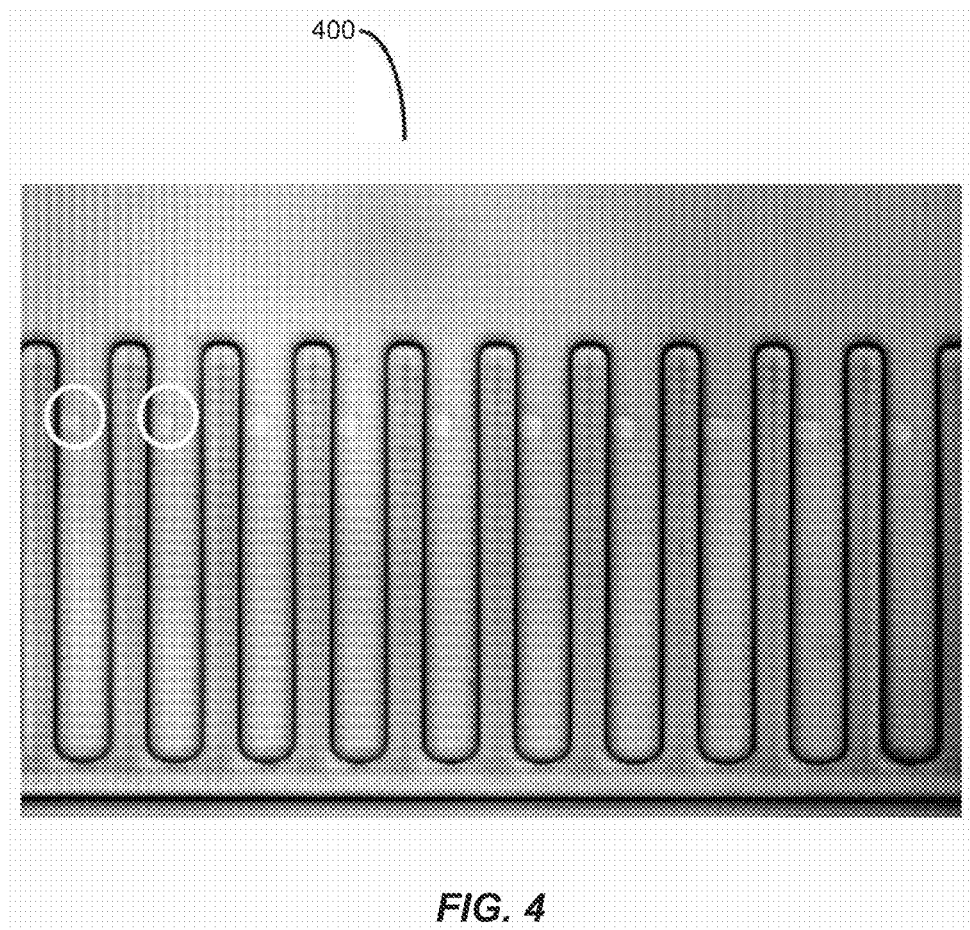
FIG. 4 is a photographic representation of one embodiment of in situ-generated isolation structures.
Figure 5A:
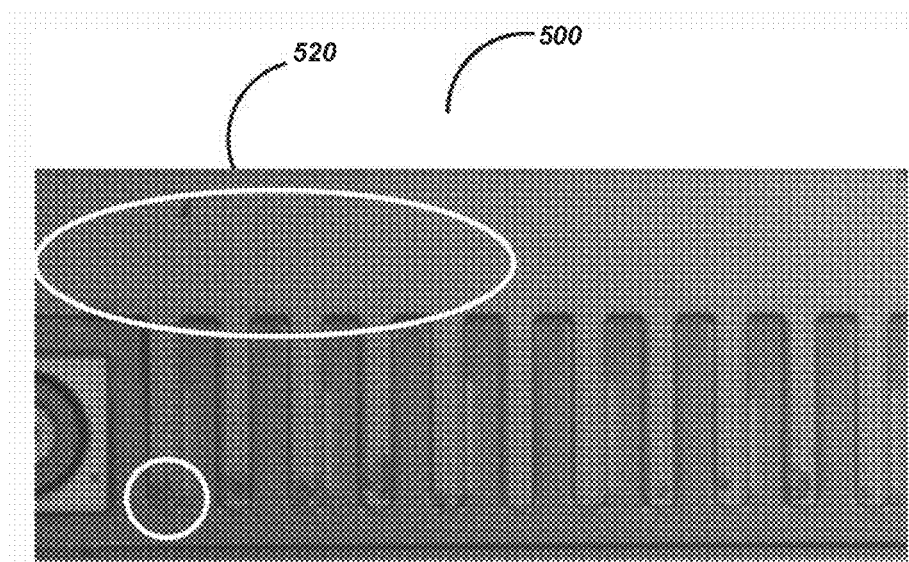
FIGS. 5A and 5B are photographic representations of another embodiment of in situ-generated isolation structures within a microfluidic (or nanofluidic) channel.

In some embodiments, the enclosure may include a flow region, at least one sequestration pen having a proximal opening to the microfluidic channel, and an in situ-generated barrier, where the flow region further is or further has a microfluidic channel. The in situ-generated barrier may be at least part of an in situ-generated isolation structure, and may act to isolate a micro-object within the sequestration pen or to isolate selected sequestration pens from other sequestration pens. FIGS. 4, 5A and B, 8A and B, 10A-C, 12A and B, 13A-C, 14A and B, 15, 16, 17, 19B, 21A-C, and 22 show non-limiting examples of such configurations.

The in situ-generated barrier may be located within the enclosure, in a selection sector or an isolation sector, if present, to provide at least a partial blockade of one of the microfluidic channel or the sequestration pen. In some embodiments, the in situ-generated barrier may be located in the isolation region of the sequestration pen. FIGS. 10A-C and 12B show non-limiting examples of in situ-generated barriers in an isolation region of a sequestration pen. In some embodiments, a width of the in situ-generated barrier is about ¼ to about ¾, about ¼ to about ½, or about ¼ to about ⅝ of a width of the isolation region. A width of the in situ-generated barrier across the isolation region may be about 3 microns to about 50 microns, about 5 microns to about 40 microns, about 5 microns to about 30 microns, about 5 microns to about 20 microns, or about 7 microns to about 2 microns. A width of the isolation region may be about 30 microns to about 50 microns, about 20 microns to about 40 microns, about 30 microns to about 60 microns, about 30 microns to about 90 microns, about 30 microns to about 120 microns, or about 30 microns to about 250 microns. A size of the in situ-generated barrier may be reduced by temperature change or optical illumination sufficiently to permit the isolated micro-object to exit past the reduced in situ-generated barrier.

Figure 10A:
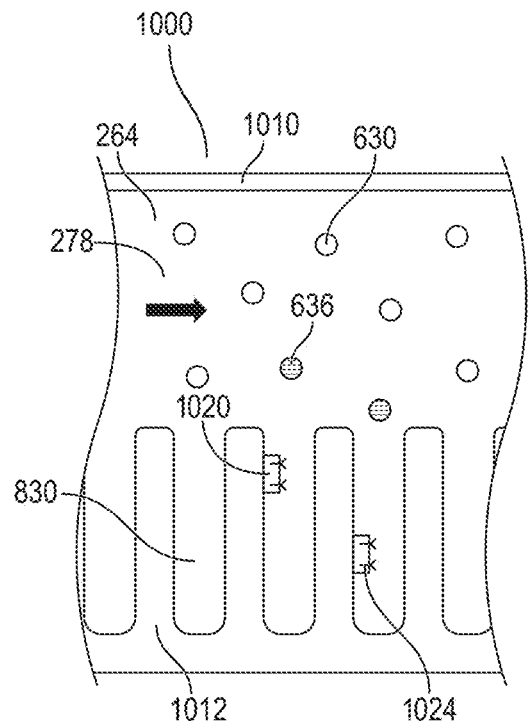
FIGS. 10A-C are graphical representations of another embodiment of in situ-generated isolation structures within a microfluidic (or nanofluidic) flow region.
Figure 10B:
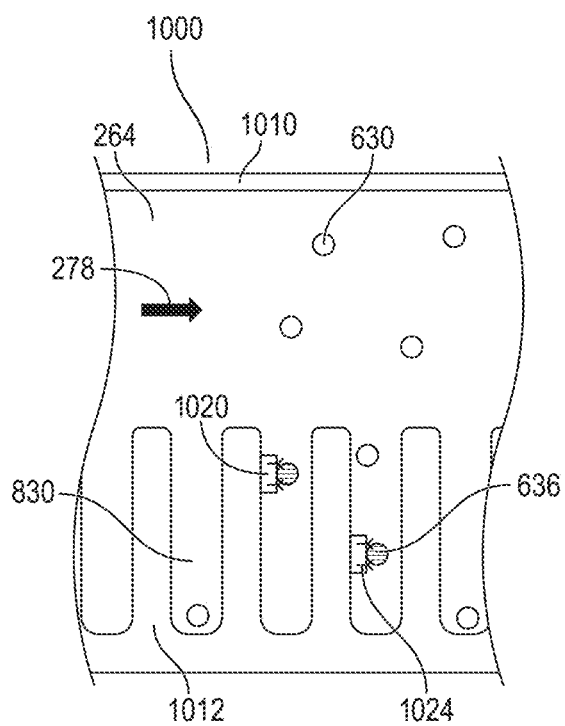
Figure 10C:
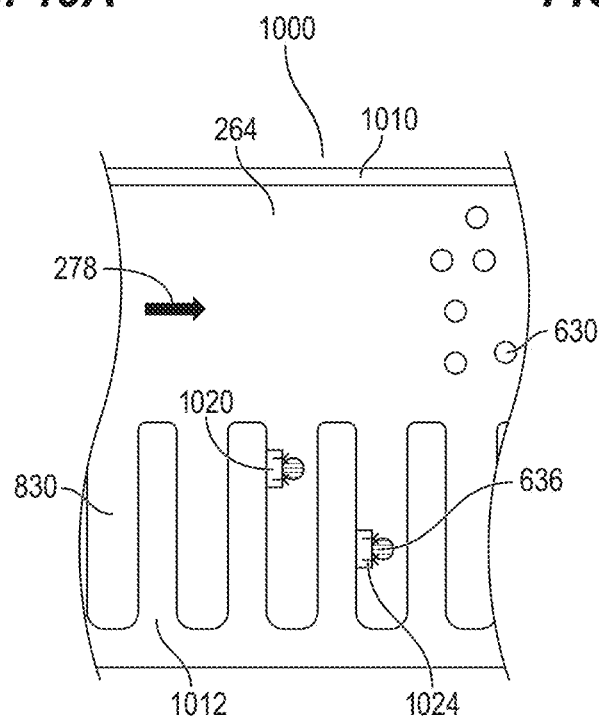

The barrier may further include a capture moiety configured to capture at least one subset of micro-objects disposed in a sequestration pen or a sector that the barrier surrounds. FIGS. 10A-C shows one non-limiting example of a barrier having a capture moiety incorporated therein, which may include, but is not limited to an antibody, a peptide/protein including a binding motif, an oligonucleotide, an oligosaccharide, or any combination thereof.

In other embodiments, the in situ-generated barrier may be disposed within the connection region of the sequestration pen. FIGS. 4, 16, 21 and 22 show non-limiting examples of such in situ-generated barriers. The in situ-generated barrier may have a dimension across a width of the connection region of the sequestration pen sized to block exit of at least one subset of a plurality of micro-objects disposed in the isolation region of the sequestration pen. The at least one subset of micro-objects may be biological cells, and may further be one type of biological cells that are blocked by the in situ-generated barrier. In other embodiments, the barrier may be sized to permit exit of a bead. The barrier may further include a capture moiety, which may include, but is not limited to an antibody, a peptide/protein including a binding motif, an oligonucleotide, an oligosaccharide, or any combination thereof, configured to capture at least one subset of micro-objects disposed in a sequestration pen (or connection region thereof) or a sector that the barrier surrounds. FIGS. 10A-C shows one non-limiting example of a barrier having a capture moiety incorporated therein. In some embodiments, a portion of the in situ-generated barrier may extend from within the connection region into the microfluidic channel. In some embodiments, the portion of the in situ-generated barrier extending into the microfluidic channel comprises less than about 50%, about 40%, about 30%, about 20%, about 10% or about 5% of a volume of the in situ-generated barrier.

Figure 16:
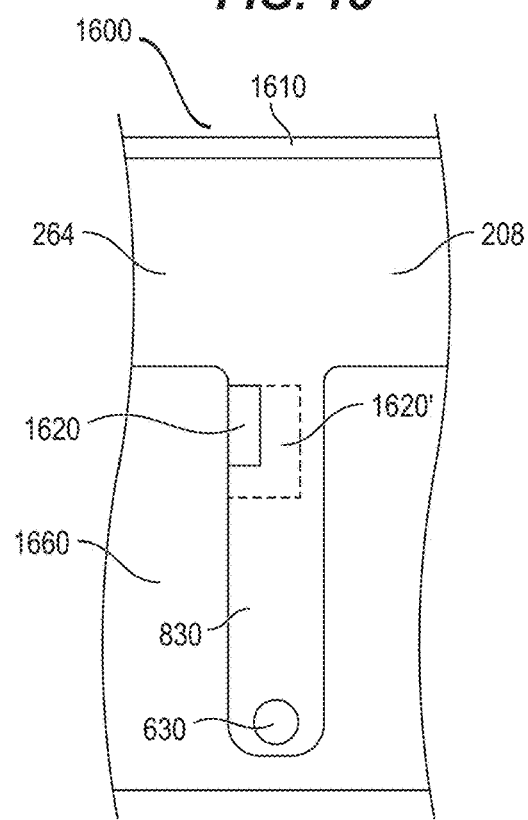
FIG. 16 is a graphical representation of another embodiment of an in situ-generated isolation structure within an isolation pen
Figure 22:
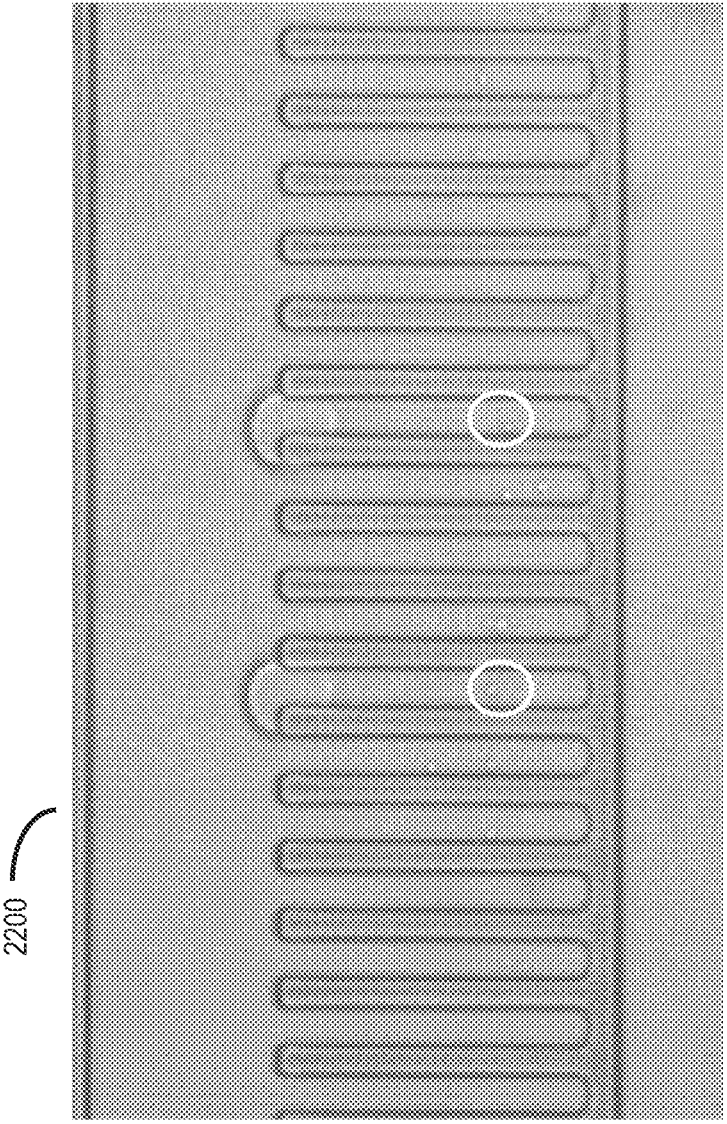
FIG. 22 is a photographic representation of an embodiment of in situ-generated isolation structures within sequestration pens of a microfluidic (or nanofluidic) device.

In some embodiments, a width of the in situ-generated barrier is about ¼ to about ¾, about ¼ to about ½, or about ¼ to about ⅝ of a width of the connection region. A width of the in situ-generated barrier across the connection region may be about 3 microns to about 50 microns about 5 microns to about 40 microns, about 5 microns to about 30 microns, about 5 microns to about 20 microns, or about 7 microns to about 25 microns. A width of the connection region may be about 30 microns to about 50 microns, about 20 microns to about 40 microns, about 30 microns to about 60 microns, or about 30 microns to about 90 microns. In some embodiments, the in situ-generated barrier may be configured have a first state and a second state, wherein when the in situ-generated barrier is in the first state, it is configured to prevent exit of at least one subset of the plurality of micro-objects from the sequestration pen and when the in situ-generated barrier is in the second state it is configured to permit the at least one subset to pass out of the sequestration pen. In various embodiments, the in situ-generated barrier is configured have a first state and a second state, where when the in situ-generated barrier is in the first state, it has a size configured to prevent exit of at least one subset of the plurality of micro-objects having a diameter of between 1 microns to 20 microns from the sequestration pen, and when the in situ-generated barrier is in the second state it has a size configured to permit the at least one subset of the plurality of micro-objects to pass out of the sequestration pen. A size of the in situ-generated barrier may be reduced by temperature change or optical illumination sufficiently to permit the isolated micro-object to exit past the reduced barrier. FIGS. 4, 21 and 22 show nonlimiting examples of an in situ-generated barrier in a connection region of a sequestration pen. The size of one of the dimensions of the in situ-generated barrier may be configured to be sufficiently reducible to permit exit of the at least one subset of the plurality of micro-objects. A size of the in situ-generated barrier can be reducible upon application of increased fluid flow through the flow region, hydrolysis, proteolysis, osmotic change, temperature change, or optical illumination. FIG. 16 shows one non-limiting example.

In other embodiments, the in situ-generated barrier is disposed in the microfluidic channel. FIGS. 5A and B, 6, 7, 8A and B, 13A-C, 14A and B, and 15 show non-limiting examples of an in situ-generated barrier that is located in a channel of a microfluidic device. In some embodiments, the in situ-generated barrier that is located in a channel, may extend into one or more sequestration pens, such as for example, FIGS. 5A and B, 21A-C, and 22.

In some embodiments, the in situ-generated barrier may be located close to or at a proximal opening of a sequestration pen. FIGS. 5A and B, 21A-C, and 22 show non-limiting examples. The in situ-generated barrier may be disposed at the edge of the proximal opening of a selected sequestration pen of the plurality of sequestration pens. The edge can be a distal edge (as determined relative to a direction of intended flow of medium in the flow region/channel). One non-limiting example is FIGS. 8A-C, where the in situ-generated barrier 820, having in situ-generated barrier modules 822, with gaps 824 between each of the in sit-generated barrier modules may be used to retain larger micro-objects 630, while permitting smaller micro-objects 632, 634 to pass through the gaps 824, thereby concentrating and/or sorting the desired micro-objects 630. The pen selected to be the site of solidification of the in situ-generated barrier may be the sequestration pen located at the end of the row of sequestration pens.

In some embodiments, where a plurality of sequestration pens is present, the plurality of sequestration pens may form a row along the channel. The in situ-generated barrier may prevent at least one subset of a plurality of micro-objects having a diameter of between 1 microns to 20 microns from moving past the in situ-generated barrier in the channel. FIGS. 5A and B, 8A and B, and 13A-C, 14B and 15 show non-limiting examples. In some embodiments, the in situ-generated barrier is located at a distal edge of the proximal opening of a sequestration pen located at the end of the row of sequestration pens.

Figure 7:
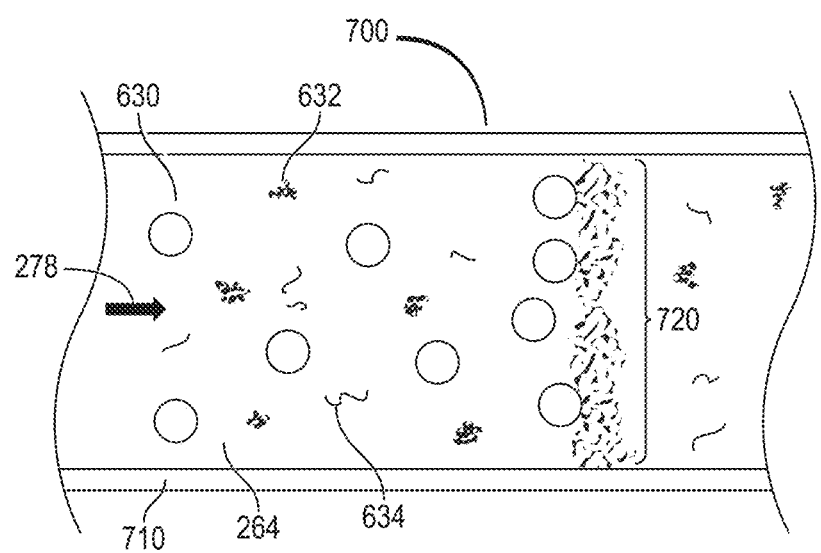
FIG. 7 is a graphical representation of another embodiment of an in situ-generated isolation structure in a microfluidic (or nanofluidic) channel.

In some embodiments, the in situ-generated barrier may include a plurality of in situ-generated barrier modules disposed in the channel. The in situ-generated barrier may be porous to a flow of fluidic medium, but still prevent at least one subset of micro-objects from moving past the barrier. The in situ-generated barrier may include a plurality of in situ-generated barrier modules disposed in the microfluidic channel, which permits fluidic medium to pass through the gaps between the plurality of in situ-generated barrier modules. Alternatively, the barrier may extend from one wall of the microfluidic channel (or proximal openings of sequestration pens) to the opposing wall of the microfluidic channel, while being porous to a fluidic medium. FIG. 7 shows one such in situ-generated barrier. The in situ-generated barrier 720 may be porous to a fluidic medium but not permit at least one type of micro-object to pass into, out of and/or through the in situ-generated barrier 720. A porous in situ-generated barrier may be located within a microfluidic channel 264 having no sequestration pens adjacent to the in situ-generated porous in situ-generated barrier as shown in FIG. 7, where the porous in situ-generated barrier may concentrate and/or sort a sample containing a multiplicity of micro-objects of differing sized. A porous in situ-generated barrier may also be located within a microfluidic channel having one or more sequestration pens opening off one (or both) sides of the microfluidic channel, where the porous barrier may concentrate and/or sort micro-objects and may further retain a sub-set of micro-objects for subsequent placement within sequestration pens just above the location of the porous in situ-generated barrier along the microfluidic channel.

Figure 8A:
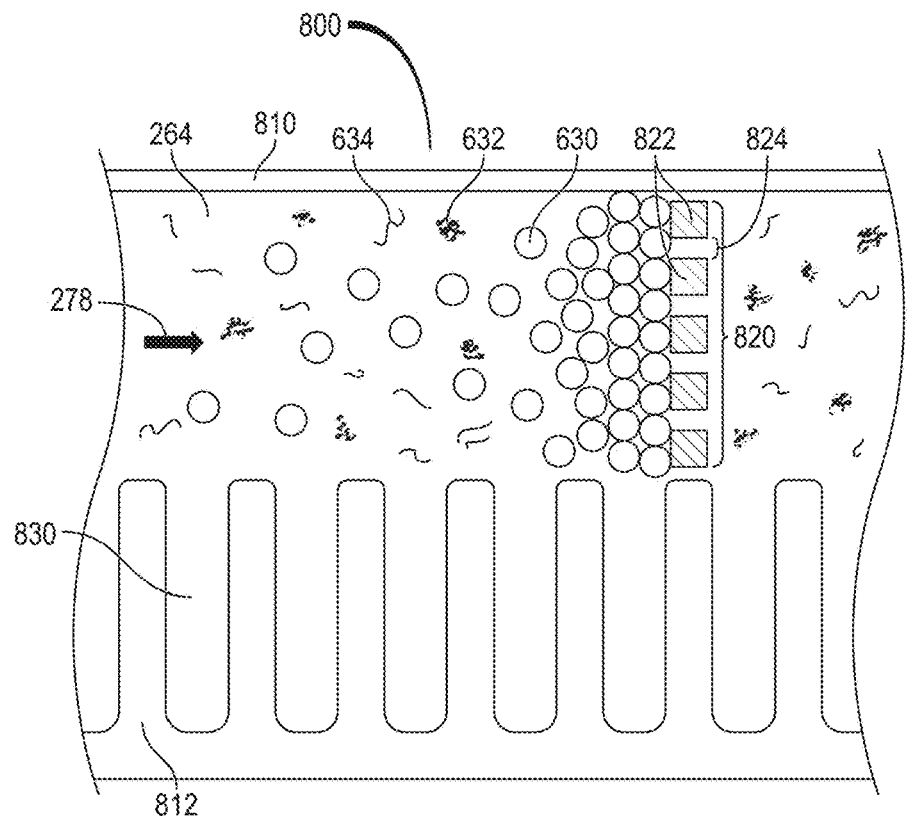
FIGS. 8A and 8B are graphical representations of another embodiment of an in situ-generated isolation structure in a microfluidic (or nanofluidic) channel located at the proximal opening of an isolation pen.
Figure 13A:
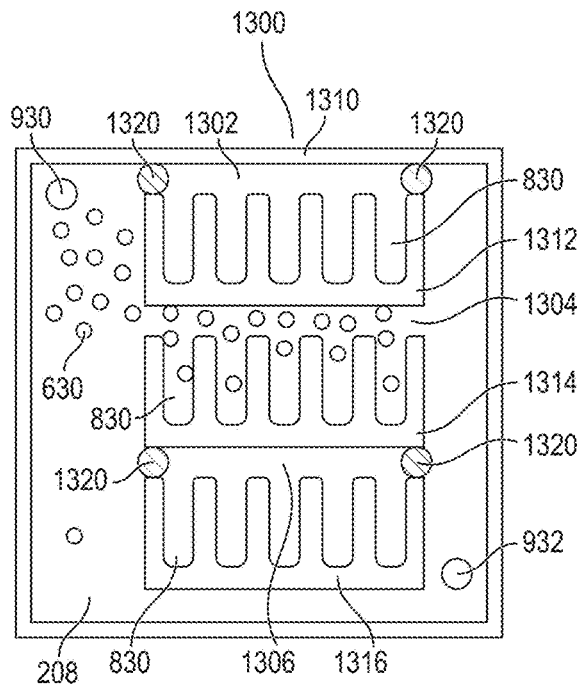
FIG. 13A-C are graphical representations of another embodiment of in situ-generated isolation structures within microfluidic channels in a flow region of a microfluidic (or nanofluidic) device.
Figure 13B:
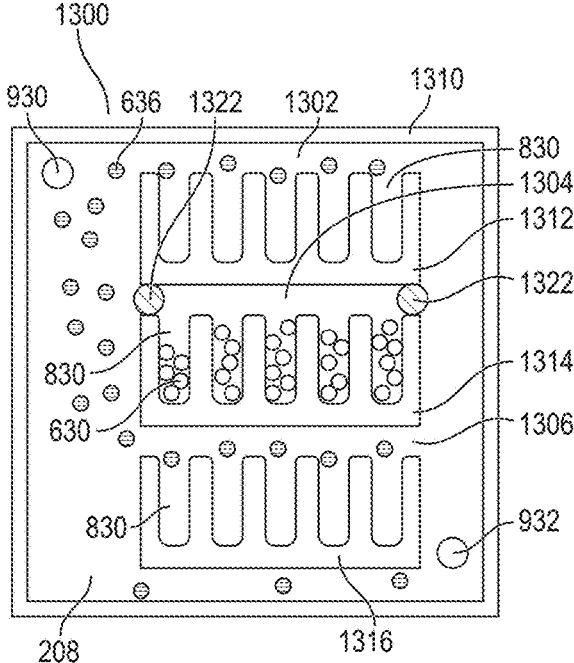
Figure 13C:
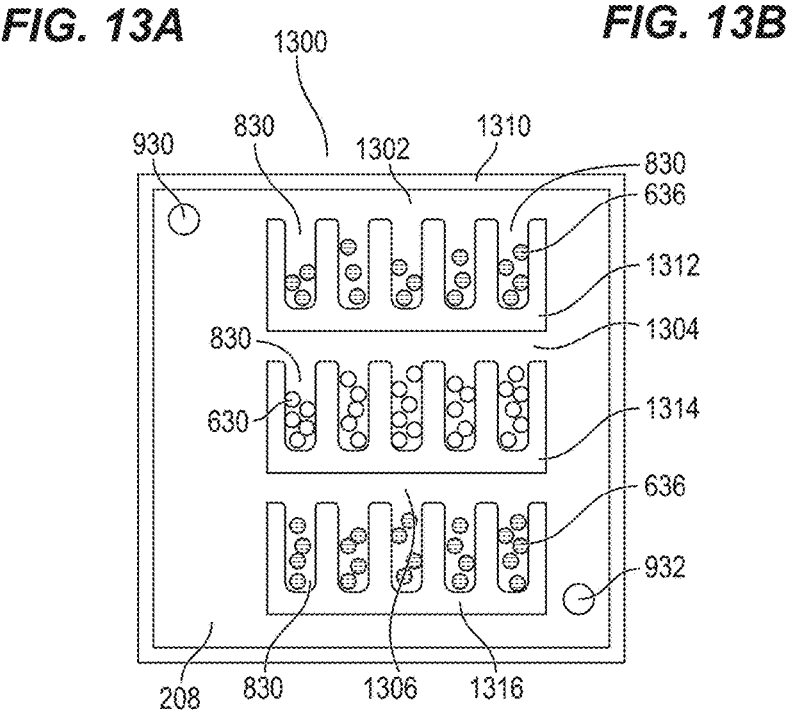

The in situ-generated barrier may be disposed at one edge of the proximal opening of a selected pen of the plurality of pens. FIGS. 8A and B shows non-limiting examples. Alternatively, the in situ-generated barrier may be disposed at the distal edge of the proximal opening of a first (or an outer-most) sequestration pen of a row of pens. FIGS. 13A-C show one non-limiting example in which in situ-generated barriers are disposed at the distal edge of the proximal opening of both the first and last sequestration pens in a row of pens.

In some embodiments, there may be a first plurality of pens and a first channel, and additionally, at least a second plurality of pens disposed along a second channel. FIGS. 13A-C show one non-limiting example. The in situ-generated barrier may be located at a distal edge of the first sequestration pen of the first plurality of pens in the first channel, and may optionally be non-porous, blocking entry to the entire first channel. The barrier may direct all flow to the second (or more) channels within the flow region, thus directing flow and any micro-objects contained therein to a different portion of the enclosure. This in situ-generated barrier can direct flow away from the first channel and may be removed when no longer needed. Either before or after the first in situ-generated barrier is removed, a new in situ-generated barrier may be introduced in another part of the flow region (e.g., a second, third, etc. channel), to re-direct flow to another portion of the flow region. Many other configurations are possible to use the in situ-generated barriers as mechanisms to direct flow, including sample flows containing micro-objects, within the flow region or a channel of a microfluidic device.

In other embodiments, the in situ-generated barrier may block the proximal openings of at least two contiguous sequestration pens. In some embodiments, a portion of the in situ-generated barrier may extend from the channel into the connection region. FIGS. 5A and B show one non-limiting example.

The in situ-generated barrier blocking the proximal openings may have a dimension of at least 50 microns to about 500 microns, 50 microns to about 300 microns, 50 microns to about 200 microns, 70 microns to about 500 microns or about 70 microns to about 400 microns. In some embodiments, the barrier may have a dimension of about 50 microns, 70 microns, 90 microns, 100 microns, 120 microns, 140 microns, 160 microns, 180 microns, 200 microns, 220 microns, 250 microns, 290 microns, 300 microns, 320 microns, 340 microns, 360 microns, 380 microns, 400 microns, 420 microns, 440 microns, 460 microns, 480 microns, 500 microns, or any range defined by two of the foregoing dimensions.

Figure 14A:
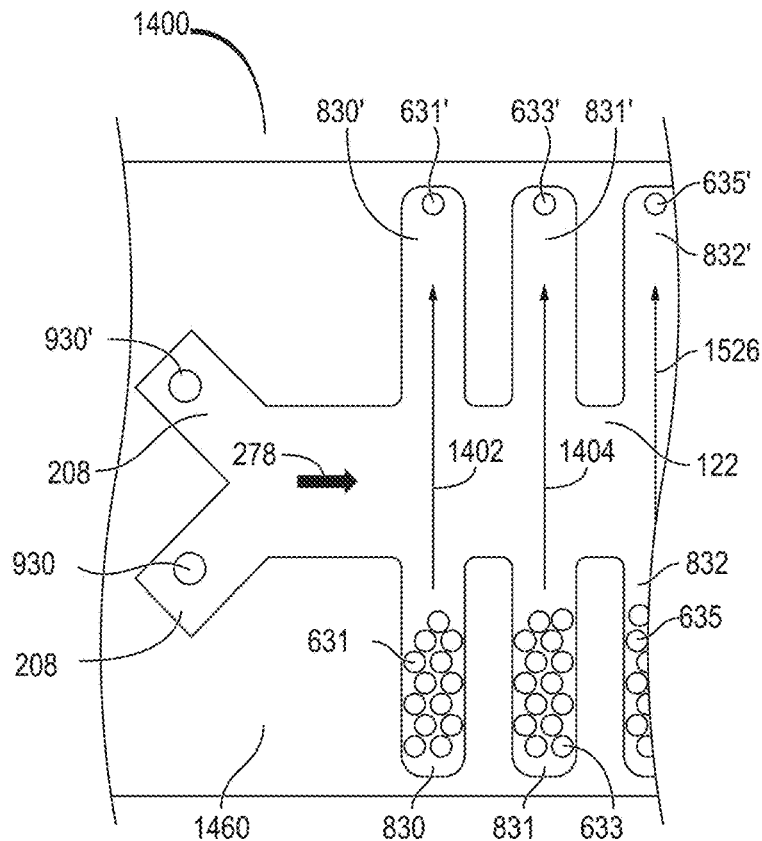
FIGS. 14A and 14B are graphical representation of another embodiment of an in situ-generated isolation structure within a microfluidic (or nanofluidic) channel.

In various embodiments, a microfluidic device is provided, including an enclosure comprising: a substrate; a flow region including a microfluidic channel configured to contain a fluidic medium; a first plurality of sequestration pens disposed adjacent to each other such that each sequestration pen of the first plurality opens off a first side of the microfluidic channel; and a second plurality of sequestration pens disposed adjacent to each other such that each sequestration pen of the second plurality opens off a second opposing side of the microfluidic channel. One nonlimiting example is shown in FIG. 14A. Each sequestration pen of the first plurality and the second plurality of sequestration pens can include an isolation region and a connection region, the connection region having a proximal opening to the microfluidic channel and a distal opening to the isolation region. The first side of the microfluidic channel may be configured to receive a first fluidic medium, and the second side of the microfluidic channel may be configured to receive a second fluidic medium. The first fluidic medium may be introduced into the first side of microfluidic the channel via a first fluidic inlet and the second fluidic medium is introduced into the second side of the microfluidic channel via a second fluidic inlet. The first fluidic medium may flow out of the first side of the microfluidic channel via a first outlet and the second fluidic medium may flow out of the second side of the microfluidic channel via a second outlet; alternatively, the first and second fluidic media may flow out of a single common outlet. The first fluidic medium and the second fluidic medium may flow in the same direction, along the microfluidic channel. The proximal opening of each sequestration pen to the microfluidic channel may be oriented substantially parallel to a flow of fluidic medium in the microfluidic channel.

The microfluidic device so configured may be used for culturing and assaying clonal populations of cells, but is not so limited, and may be used for any method of culturing, sorting or assaying. The microfluidic device is configured such that a clonal population may be disposed in at least one of the sequestration pens of the first plurality of pens and one or more cells of the clonal population may be disposed in the respective sequestration pen of the second plurality of sequestration pens.

The microfluidic device may further include a barrier dividing the microfluidic channel into a first sub-channel configured to provide a first sub-flow of fluidic medium past the first plurality of sequestration pens and a second sub-channel configured to provide a second sub-flow of fluidic medium past the second plurality of sequestration pens, wherein the barrier is punctuated by at least one gap aligned between a proximal opening (to the first sub-channel) of the first pen of the first plurality of pens and a proximal opening (to the second sub-channel) of a first pen of the second plurality of pens. The barrier may further include a plurality of gaps along a length of the barrier in the microfluidic channel. In some embodiments, each gap may be aligned between a proximal opening (to the first sub-channel) of each pen of the first plurality of pens and a proximal opening (to the second sub-channel) of each respective pen of the second plurality of pens. Other arrangements of the plurality of gaps along the length of the barrier are possible. For example, each of the plurality of gaps along the barrier may be offset from the proximal opening (to the first sub-channel) of each sequestration pen of the first plurality of sequestration pens and the proximal opening (to the second sub-channel) of the respective sequestration pen of the second plurality of sequestration pens. The barrier may have a length that extends from a first end of the channel to a second end of the channel. The barrier may be a permanent barrier and may be formed from the same microfluidic circuit materials that form the sequestration pens and/or channel walls. The one or more cells of the clonal population may be moved from the sequestration pen of the parent clonal population to the respective pen of the second plurality of sequestration pens by being transported through the gap aligned with the pen of the first plurality and the pen of the second plurality. When the barrier is a permanent barrier having one or more gaps along its length in the channel, polymerization may be activated at the one or more gaps, to introduce one or more in situ-generated barriers closing the one or more gaps along its length, where the in situ-generated barriers may comprise a solidified polymer network like any described herein. The solidification of the one or more gaps may separate the first sub-channel from the second sub-channel, and prevent cells from moving from the first sub-channel to the second sub-channel, and vice versa. In some embodiments, the microfluidic device comprises a plurality of in situ-generated barriers, closing a plurality of gaps in the barrier punctuated by a plurality of gaps.

Figure 14B:
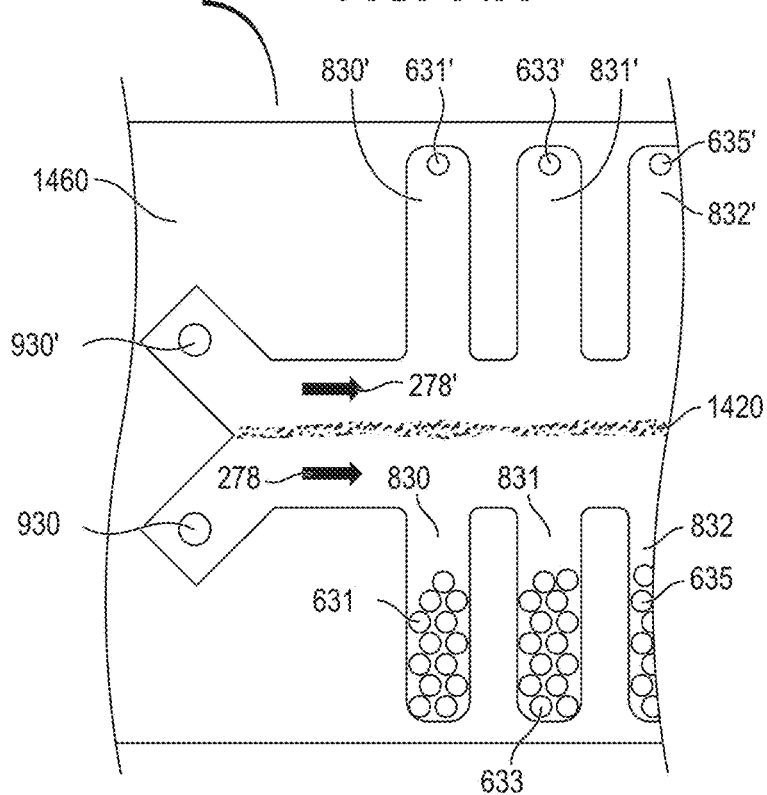
Figure 15:
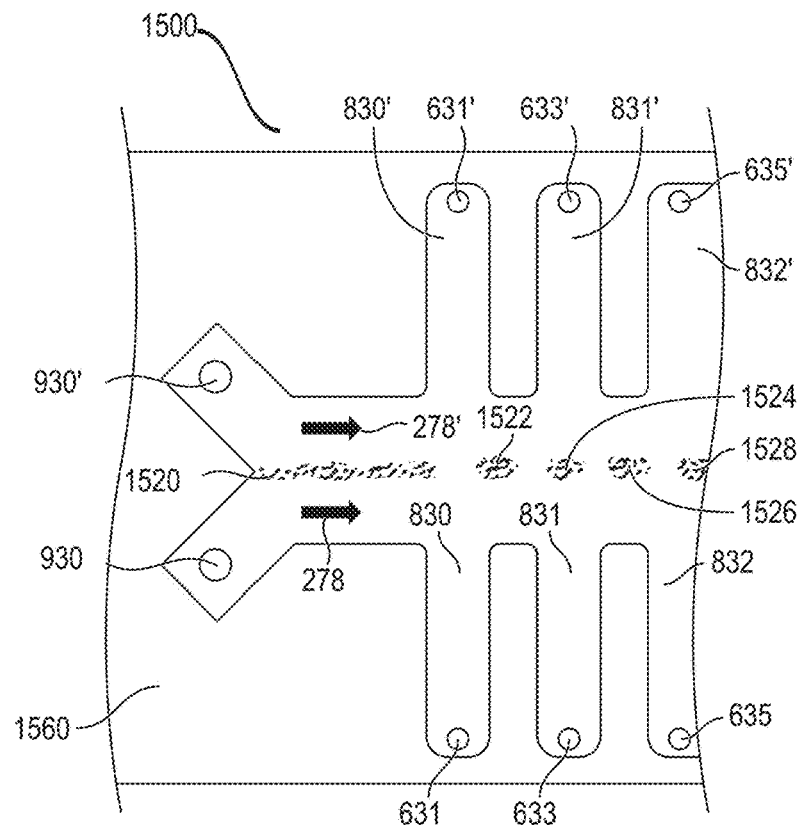
FIG. 15 is a graphical representation of another embodiment of an in situ-generated isolation structure within a microfluidic (or nanofluidic) channel.

In other embodiments, the microfluidic device includes an in situ-generated barrier, wherein the in situ-generated barrier is disposed along a length of the microfluidic channel, dividing the microfluidic channel into a first sub-channel configured to provide a first sub-flow of fluidic medium past the first plurality of sequestration pens and a second sub-channel configured to provide a second sub-flow of fluidic medium past the second plurality of sequestration pens. In some embodiments, the in situ-generated barrier prevents cells from moving from the first sub-channel to the second sub-channel, and vice versa. FIG. 14B shows one non-limiting example. In other embodiments, the in situ-generated barrier comprises one or more gaps, as discussed above in the context of permanent barriers. FIG. 15 shows one non-limiting example.

Processing of the one or more cells (e.g., one or more cells taken from a clonal population) may be performed in a sequestration pen of the second plurality of sequestration pens. The processing may be performed without disruption of the ongoing culture conditions of the parent clonal population located in the corresponding sequestration pen of the first plurality of sequestration pens.

In other embodiments, a microfluidic device is provided, which includes an enclosure having: a substrate; a channel; at least one sequestration pen; and an in situ-generated barrier. The sequestration pen may include an isolation region and a connection region, the connection region having a proximal opening to the channel and a distal opening to the isolation region. FIGS. 4, 5, 8A and B, 10A-C, 12A and B, 13A-C, 14A and B, 15, 16, 19A and B, 21A-C and 22 show non-limiting examples. The in situ-generated barrier may be located within the enclosure to provide at least a partial blockade of the channel and/or one or more of the at least one sequestration pen. The in situ-generated barrier may include an in situ-generated solidified polymer network. The solidified polymer network may include a photoinitiated polymer. The solidified polymer network may include a temperature sensitive polymer. The device may further include a substrate having a thermal pad disposed on the substrate at a location beneath the solidified polymer network. The thermal pad may be used to assist gelling, swelling, reduction or removal of the barrier. In one non-limiting example, the device shown in FIGS. 13A-C may include one or more metal pads, such as gold, to assist in forming and removing the in situ-generated barriers shown.

The in situ-generated barrier may be disposed in the isolation region of the sequestration pen. The in situ-generated barrier disposed in an isolation region of a sequestration pen may have a size as described above. In some embodiments, the size of the in situ-generated barrier may be reduced by temperature change or optical illumination. The in situ-generated barrier may further include a capture moiety configured to capture at least one micro-object disposed in the sequestration pen. FIG. 10C shows one such exemplary barrier.

The in situ-generated barrier may be disposed within the connection region of the sequestration pen. The in situ-generated barrier may have a dimension across a width of the connection region of the sequestration pen sized to block exit of at least one subset of a plurality of micro-objects disposed in the isolation region of the sequestration pen. The in situ-generated barrier may be sized to block exit of a biological micro-object. The in situ-generated barrier may be sized to permit exit of a bead. The in situ-generated barrier may further include a capture moiety configured to capture at least one micro-object disposed in the sequestration pen. The in situ-generated barrier disposed in a connection region of a sequestration pen may have a size as described above. A portion of the in situ-generated barrier may extend from the connection region into the channel. The portion of the in situ-generated barrier extending into the channel may be less than 50% of a volume of the barrier In some embodiments, the in situ-generated barrier may be configured have a first state and a second state, wherein when the in situ-generated barrier is in the first state, it is configured to prevent exit of at least one subset of the plurality of micro-objects from the sequestration pen and when the in situ-generated barrier is in the second state it is configured to permit the at least one subset to pass out of the sequestration pen. In the first state, the in situ-generated barrier may have a larger size to prevent exit of the subset of micro-objects. In the second state, the size of the in situ-generated barrier may be at least reduced to permit exit of the at least one subset of the plurality of micro-objects. A size of the in situ-generated barrier may be at least reduced by application of increased fluid flow through the flow region, hydrolysis, proteolysis, osmotic change, temperature change, or optical illumination.

In various embodiments, the in situ-generated barrier may be disposed in the microfluidic channel. The barrier may be located at one edge of the proximal opening of the sequestration pen, and may extend from the proximal opening across the microfluidic channel. The in situ-generated barrier may prevent at least one subset of a plurality of micro-objects having a diameter of between 1 micron to 20 microns from moving past the barrier in the microfluidic channel. In various embodiments, the in situ-generated barrier may include a plurality of in situ-generated barrier modules disposed in the microfluidic channel. The in situ-generated barrier may be porous to a fluidic medium. The at least one sequestration pen may further include a plurality of sequestration pens. The plurality of sequestration pens may form a row along the microfluidic channel. The in situ-generated barrier may be disposed at the distal edge of the proximal opening of a selected sequestration pen of the plurality of sequestration pens. The pen selected to be the site of solidification of the in situ-generated barrier may be the sequestration pen located at the end of the row of sequestration pens. The barrier may be disposed at a distal edge of the proximal opening of a first sequestration pen of the plurality of sequestration pens. The barrier may prevent at least one subset of a plurality of micro-objects from moving into, out of, and/or through the barrier in the microfluidic channel.

The in situ-generated barrier may include a plurality of in situ-generated barrier modules disposed in the microfluidic channel, which permits fluidic medium to pass through the gaps between the plurality of in situ-generated barrier modules.

The plurality of pens may be a first plurality of pens and the channel is a first channel, and the device further comprises a second plurality of pens disposed along a second channel. The in situ-generated barrier may be located at a distal edge of the proximal opening of the first sequestration pen of the first plurality of sequestration pens. When configured in this manner, the barrier may block the entry of any micro-objects into the first channel, and direct flow of fluidic medium and any micro-objects contained therein to a different portion of the enclosure. The in situ-generated barrier may also or alternatively be formed proximal to the first pen of the second plurality of sequestration pens, where it may block entry of any micro-objects to the second channel.

The in situ-generated barrier may block the proximal openings of at least two contiguous sequestration pens. The barrier blocking the proximal openings may have a dimension of at least 50 microns to about 500 microns across the proximal openings. FIGS. 5A and B shows one non-limiting example.

In yet another embodiment, the microfluidic device may include a first plurality of sequestration pens disposed in a row, wherein each sequestration pen of the first plurality opens off a first side of the microfluidic channel; and a second plurality of sequestration pens disposed in a row, wherein each sequestration pen of the second plurality opens off a second opposing side of the microfluidic channel, wherein the in situ-generated barrier is disposed along a length of the microfluidic channel, dividing the microfluidic channel into a first sub-channel configured to provide a first sub-flow of fluidic medium past the first plurality of sequestration pens and a second sub-channel configured to provide a second sub-flow of fluidic medium past the second plurality of sequestration pens, wherein the barrier prevents cells from moving from the first sub-channel to the second sub-channel, and vice versa. The in situ-generated barrier may include a plurality of in situ-generated barrier modules. The in situ-generated barrier modules may be spaced apart from each other such that the openings between two modules is smaller than the size of a selected micro-object, which may have a size of about 1-20 microns. The in situ-generated barrier may be porous to a flow of fluidic medium. The in situ-generated barrier may be porous to a fluidic medium but not permit at least one type of micro-object to pass into, out of, and/or through the barrier. FIG. 14B shows one non-limiting example. The first side of the channel may be configured to receive a first fluidic medium, the second side of the channel may be configured to receive a second fluidic medium, and the first fluidic medium and the second fluidic medium may each flow along the in situ-generated barrier to respective first and second outputs of the device. The in situ-generated barrier may be configured to prevent a micro-object from moving from the first sub-channel to the second sub-channel. The in situ-generated barrier may be reducible by application of increased fluid flow through the flow region, hydrolysis, proteolysis, osmotic change, temperature change, or optical illumination, which may thereby erode the in situ-generated barrier or portions therein. FIG. 15 shows one non-limiting example. For example, proteolysis may degrade the exterior of the barrier, causing erosion. The barrier may be reducible by reducing a size of the barrier. If the barrier is composed of barrier modules, the barrier may be reducible by removing one or more of the modules. The barrier may be removable by application of increased fluid flow through the flow region, hydrolysis, proteolysis, osmotic change, temperature change, or optical illumination. Individual barrier modules may be selectively removed, leaving a less restrictive barrier in place. Reducing or removing portions/modules of the in situ-generated barrier may permit different components of the fluidic media to exchange or may permit different subsets of micro-objects to exchange past the in situ-generated barrier.

In any of the embodiments of the microfluidic device having at least one in situ-generated isolation structure, the substrate may be configured to generate dielectrophoresis (DEP) forces within the enclosure as described herein for microfluidic devices 100, 200, 230, 250, 28, 290, 300 and the like. The DEP forces may be optically actuated. In other embodiments, the substrate of the microfluidic device may be configured to comprise an opto-electrowetting surface, as described herein, and described in more detail in International Application No. PCT/US2016/059234, filed on Oct. 27, 2016, and its disclosure is herewith incorporated in its entirety by reference. The opto-electrowetting surface may be photoresponsive and be optically actuated. In some embodiments, the opto-electrowetting surface may be photoconductive.

In any of the embodiments, at least one inner surface of the enclosure of the microfluidic device may include a conditioned surface. The at least one inner surface may include a surface of the substrate. In some embodiments, all the internal surfaces of the enclosure of the microfluidic device may include a conditioned surface. In various embodiments, the conditioned surface may be a covalently modified surface. In various embodiments, the covalently modified surface may be hydrophilic.

A fuller understanding of the invention may be had by referring to some of the embodiments described in the following Figures.

FIG. 4 shows precisely formed barriers located inside each sequestration pen of microfluidic device 400, which may be located within a short distance from the top of the pen, which may be employed in methods of isolating, sorting, or assaying. In some instances, the barrier may be introduced within the connection region thereof. In one example of a process to introduce a polymer barrier within a microfluidic device, a solution containing 10% w/v PEGDA (5 Kd) and 1% photoinitiator (IRGACURE 2959, 200 Da) was flowed into the device. After allowing equilibration for less than 10 min, the desired region was illuminated with UV light at approximately 340 nm (+/−20 nm), having a power of 400 mW/cm$^2$, for 1 second, to initiate polymerization creating a barrier such as that shown. Several of the precisely formed barriers are shown within white circles (for emphasis). Forming barriers in precise locations may be particularly useful for gravity export of selected cells in the presence of a second set of cells that will not exit the pen in the presence of the in situ-generated barrier. Another variant of this may also include a small portion of polymer barrier protruding into the channel, permitting removal by increased flow in the channel after export of a first set of cells. In some embodiments, barriers may be formed only within selected sequestration pens, and not within every pen. This may be used to isolate only selected ones of micro-objects present in the sequestration pens of the device, by generating the in situ-generated barrier only within or proximal to the openings of the selected sequestration pens. In some embodiments, the isolated pens (e.g., those having an in situ-generated barrier) isolate micro-objects that do not have a desired characteristic, such as production or secretion of a biological product of the micro-object. The remaining micro-objects in remaining un-isolated sequestration pens may be exported from the sequestration pen and may further be exported from the microfluidic device. In other embodiments, micro-objects in the one or more sequestration pens having an in situ-generated barrier isolating the micro-objects, may be the micro-objects having a selected characteristic. In this embodiment, the remaining micro-objects in the remaining, non-selected sequestration pens may be exported out of the un-isolated sequestration pens, and may be further exported out of the microfluidic device. After such export, the in situ-generated barriers may be removed, permitting further processing of the previously isolated micro-objects.

Figure 5B:
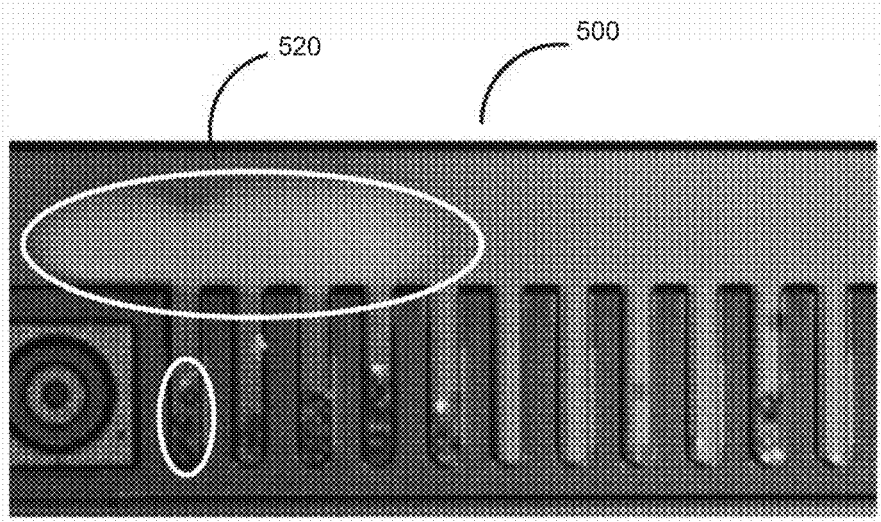

FIGS. 5A and B show an in situ-generated barrier 520 generated across a number of contiguous pens, where the barrier is shown within the white circle in the microfluidic channel. The same conditions for introducing the polymerizable polymer were used as for the embodiment shown in FIG. 4, but the exposure time for this example was 7.5 seconds, and the power of the UV light was 100 microW/cm$^2$, and is discussed in further detail in Example 1 below, and demonstrated that the polymer in situ-generated barrier 520 can be introduced and kept in place for several days, while still permitting cell growth within the group of sequestration pens isolated by the in situ-generated barrier, as shown in FIG. 5B, where the number of biological cells have increased in each pen. An in situ-generated barrier like that of FIGS. 5A and 5B may be used in any variety of method to isolate, sort, or assay selectively chosen groups of biological cells.

Figure 6:
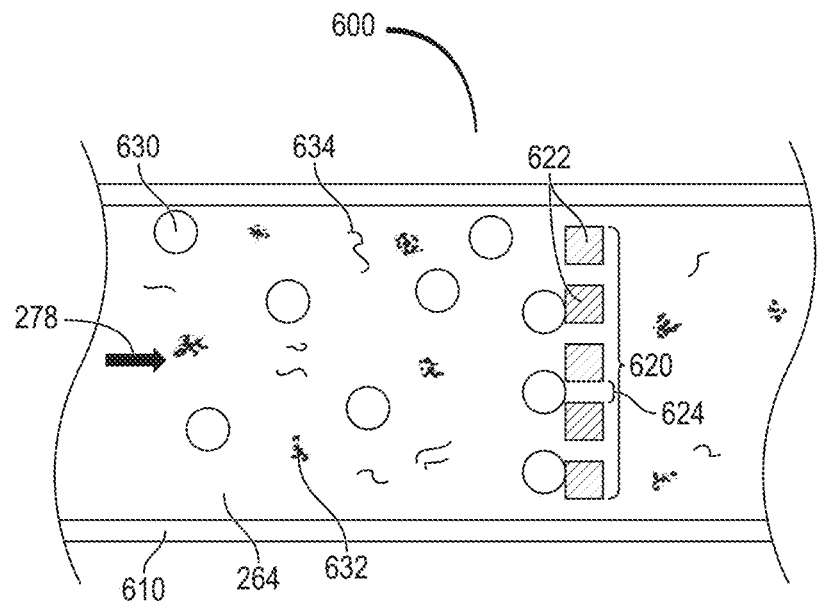
FIG. 6 is a graphical representation of another embodiment of an in situ-generated isolation structure in a microfluidic (or nanofluidic) channel.

FIG. 6 shows an example of an in situ-generated barrier 620 having in situ-generated barrier modules 622 placed into a channel 264, defined by channel walls 610, of microfluidic device 600. The solidification of barrier modules 622 can be performed to leave gaps 624 between each barrier module 622 and its adjacent module 622. The flowable polymer may be introduced within the microfluidic channel 264, and solidified by illuminating selected points within the microfluidic channel 264 to solidify the polymer network of the in situ-generated barrier 620. A sample containing micro-objects 630 along with undesired materials 632, and 634 may be introduced into the microfluidic device 600 with flow 278 towards the barrier 620. The size of the gap can be selected to permit some species of micro-objects to pass through the gap(s) 624 while preventing larger micro-objects such as cells 630 from passing through the barrier 620, thereby isolating cells 630 behind the barrier. Smaller micro-objects may include beads (not shown), smaller micro-objects (not shown), cellular debris 632, or micro-objects 634 such as organelles, insoluble proteins, nucleic acids and the like. The barrier 620 may therefore be used as a sieving/sorting structure to concentrate samples loaded onto the microfluidic device 600. Once the sample has been concentrated, e.g., desired micro-objects 630 have been collected at barrier 620, the barrier may be removed or reduced sufficiently to permit micro-objects 630 to be moved by any combination of flow, gravity or electrokinetic forces such as DEP forces to another part of the microfluidic device for further culturing or processing. Alternatively, the concentrated set of micro-objects 630 may be exported by any suitable motive means out of the microfluidic device 600. Concentration of micro-objects does not require that only micro-objects 630 are retained by barrier 620, only that a percentage of the undesired 632, 634 materials is reduced relative to the sample introduced into microfluidic device 600. Further, in some embodiments, the mixture of materials introduced into microfluidic device 600 may not have undesired micro-objects 632, 634, but may simply be very dilute. Barrier 620 may concentrate a dilute sample containing for example, rare cells, and permit isolation or export of a concentrated sample of the desired micro-objects.

FIG. 7 shows an example of an in situ-generated barrier 720 stretching substantially across a channel 264, defined by channel wall(s) 710, in microfluidic device 700. Barrier 720 performs in a similar manner to the embodiment of FIG. 6, differing in that barrier 720 does not have barrier modules having gaps, but instead has a defined porosity, permitting some components of a sample flowed in with flow 278 across barrier 720 (e.g., materials 632, 634, defined as above) but not permitting a selected micro-object 630 (e.g., a biological cell) of interest across, thereby concentrating or sorting desired micro-objects 630 away from other components of a sample.

For the embodiments of FIGS. 6 and/or 7, after the desired cells 630 are concentrated at the region adjacent to the in situ-generated barrier, the in situ-generated barrier may be removed. For example, the solidified polymer network of the in situ-generated barrier may be susceptible to photocleavage, when illuminated with light of a wavelength configured to cleave portions of the solidified polymer network. After removal of the in situ-generated barrier, the concentrated cells 630 may be moved selectively using any suitable motive means, including DEP forces (including optically actuated DEP (OET)), gravity or fluidic flow.

Figure 8B:
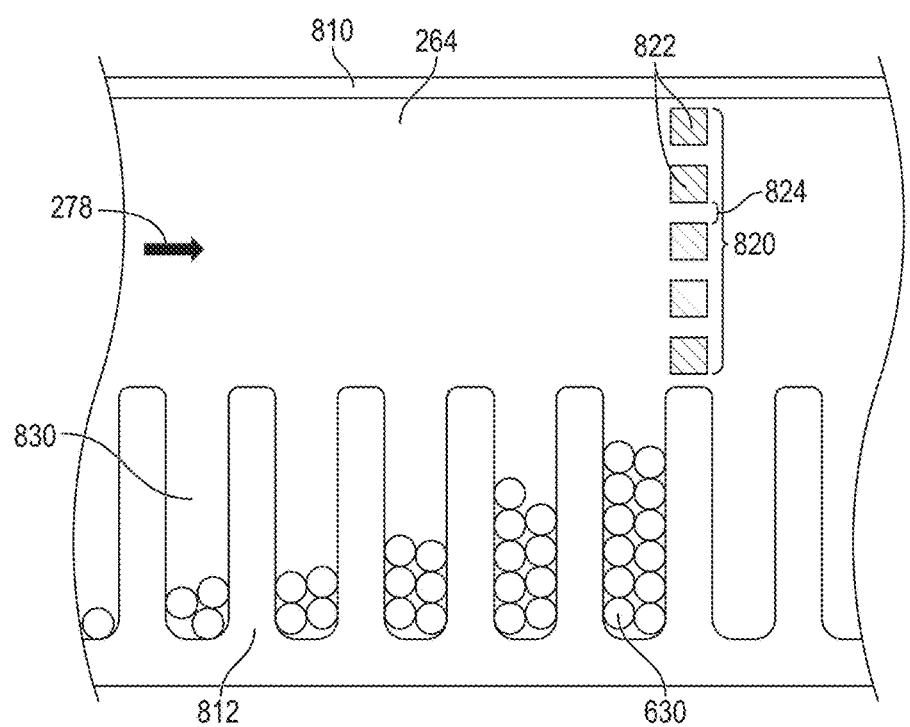

FIGS. 8A-C show another exemplar of an in situ-generated barrier 820 that can be used to concentrate dilute samples, and additionally assist in selective disposition of micro-objects 630 into selected sequestration pens 830 in microfluidic device 800. In situ-generated barrier 820 is generated in situ within channel 264, defined by channel wall 810 and sequestration pen wall material 812, similarly as in FIGS. 4-7 as described above. The barrier 820 includes in situ-generated barrier modules 822 spaced apart from each other by gap(s) 824, which are selected to permit undesired materials 632,634 (which may be any undesired materials within a sample, having a size smaller than the size of the gap 822). Dilute sample is flowed in within the microfluidic channel 264 with flow 278 and cells are concentrated at the in situ-generated barrier 820. The flow can be stopped, then the concentrated cells 630 can be loaded, for example, by flow, gravity, OET forces, or any other suitable method into the sequestration pens 830 near the barrier 820. Flow through the channel can be reinstituted to dislodge the barrier module 822, or the barrier modules 822 may be removed by any of optical illumination, hydrolysis, proteolysis, or thermal change. This process can be repeated with a second, newly generated barrier 820' (not shown) located at a second or more set of pens differing from the location of the first set of pens, in order to load and concentrate multiple dilute aliquots of cell-bearing samples. The multiple aliquots of cell-bearing samples may all be derived from the same source (e.g., same mammal, same cell line, and the like) or may each be derived from a different one of a mammal, a cell line and the like.

Figure 9A:
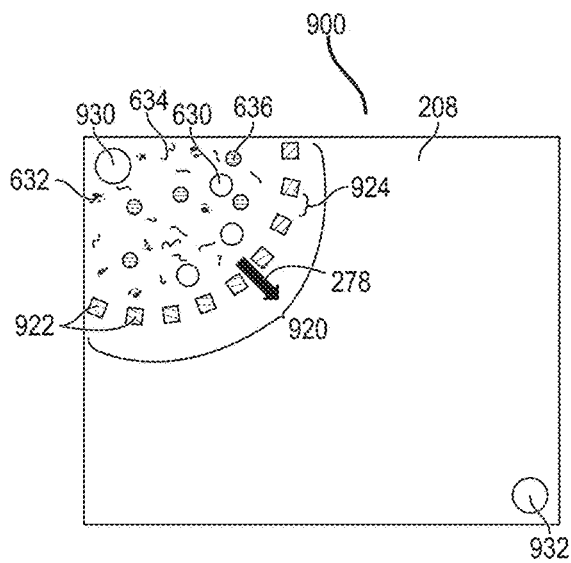
FIGS. 9A-D are graphical representations of another embodiment of in situ-generated isolation structures within isolation pens.
Figure 9B:
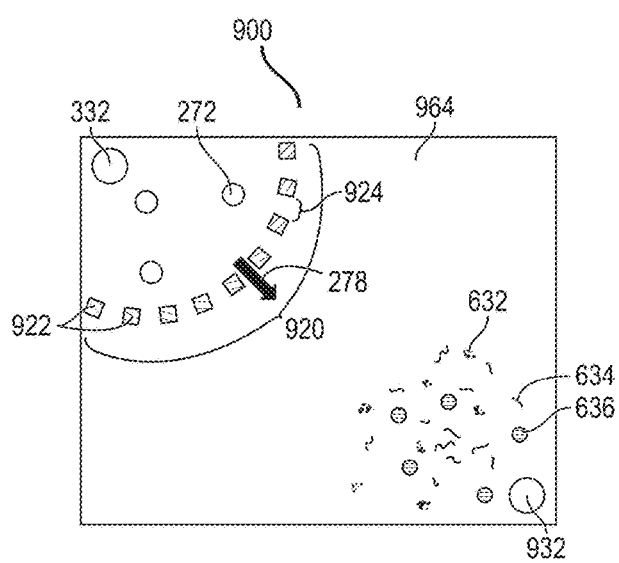
Figure 9C:
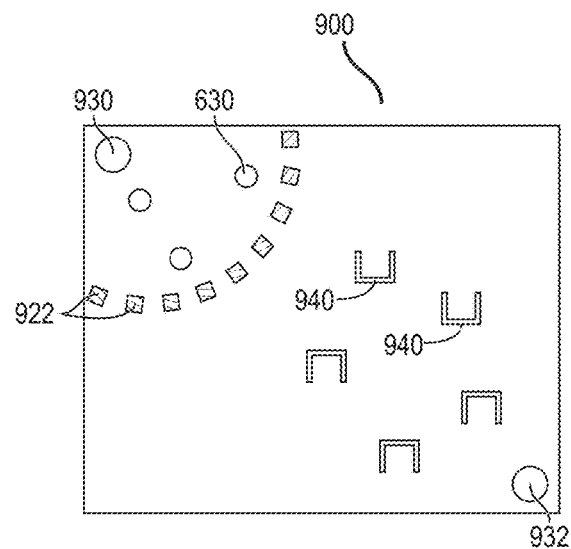
Figure 9D:
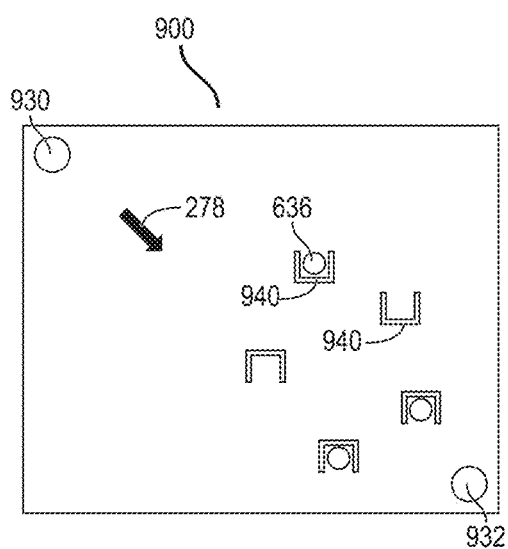

FIGS. 9A-D shows a microfluidic device 900 having a fluidic inlet 930 and a fluidic outlet 932. Flowable polymer is introduced at inlet 930 flowed to points within the substrate. An in situ-generated isolation structure 920 forming a barrier is provided, by activating solidification of a plurality of barrier modules 922, having a gap 924 between each barrier module and its neighboring barrier module, by illuminating selected portions of the substrate 208. The spacing may be selected to permit materials such as cellular debris 632, or micro-objects 634 such as organelles, insoluble proteins, nucleic acids and the like. A sample may be introduced at inlet 930. As the flow 278 continues through the barrier 920, undesired materials 632 and 634, which have a size smaller than the gap between the barrier modules 922, may pass through the isolation structure 920, and may be further exported out of the microfluidic device via fluidic outlet 932, as shown in FIG. 9B. In a further embodiment, in situ-generated pens 940 may be introduced as shown in FIG. 9C. Depending on the dimensions of pen 940, it may be an in situ-generated sequestration pen. The isolation structure 920 may be removed by any suitable method such as optical illumination (if the solidified polymer network of the barrier modules is susceptible to photocleavage). The released micro-objects 630 may be selected and moved to be isolated within in situ-generated pens 940, for further processing.

FIG. 10 shows the use of small localized in situ-generated barriers 1020, acting as pre-selected traps. The barrier traps may be functionalized in situ-generated barriers, which can have a capture moiety 1024 such as antibodies or other cell surface recognition motifs such as an RGD motif peptide. For simplicity, the capture moiety 1024 is shown as an antibody but the in situ generated barrier traps are not so limited. A sample including desired cells 630 and other, not desired cells 636, can be introduced in fluidic flow 278 within microfluidic channel 264, and the subset of cells, for example, cells 636, that can bind to the capture moiety 1024 can be immobilized by its interaction with the capture moiety 1024 on the localized in situ-generated barriers 1020. The in situ-generated barrier traps (1020 plus 1024) can be located either near the proximal opening to the channel within the pen or can be located within a more distal section of the connection region or even within the isolation region of the pen. The remainder of the cells (e.g., cells 630) which do not have any cell surface motif that can bind to the in situ-generated barrier trap (1020+1024) can be exported out of the microfluidic device by increasing the flow rate in the channel, or may be moved to another region within the microfluidic device for further processing. In other embodiments, cells 636 may be the desired portion of the introduced sample flow, and after isolating cells 636 as described, undesired cells 630 may be exported out of the microfluidic channel, and optionally, out of the microfluidic device.

The in situ-generated barrier trap (1020+1024) can be formed by copolymerizing two polymers, one having, for example, an RGD peptide motif, or by modifying a precursor prepolymer to have such motif. Another alternative is to immobilize antibodies within the in situ-generated barrier trap or immobilizing the antibodies after the barrier trap has been formed. In one example, biotinylated or streptavidin sites can be introduced either throughout the trap or just on the surface of the in situ-generated barrier 1020, and streptavidin or biotin labeled antibodies may associate with the biotin. Alternatively, modified antibodies may be devised, containing a photoactivatable functionality, such as benzophenone, which may be subjected to photoinitiated insertion into the surface of the polymer barrier at the same time, or after formation of the in situ-generated barrier.

Figure 11A:
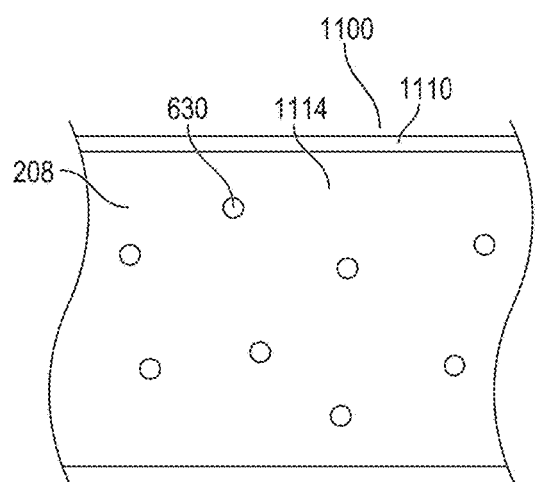
FIGS. 11A and 11B are graphical representations of another embodiment of an in situ-generated isolation structure within an isolation pen.
Figure 11B:
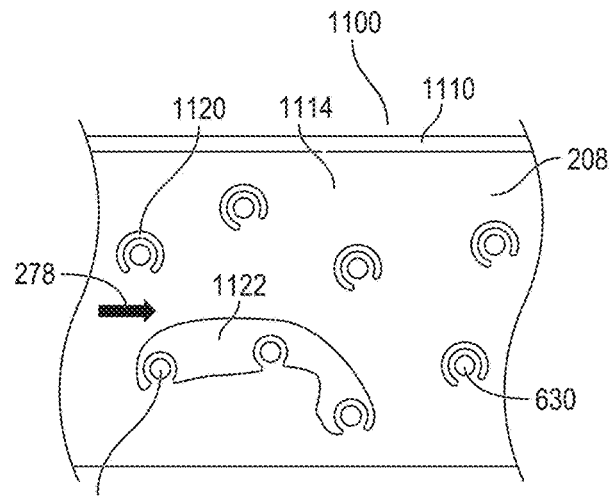

FIGS. 11A and B show pens made upon demand upon loading cells 630 to a flow region 1114, bounded by wall 1110 of a microfluidic device 1100. Before, contemporaneously, or after cells 630 have been introduced, the flowable polymer is also introduced. In situ-generated isolation structure 1122 and in situ-generated pens 1120 may be formed by illuminating the desired locations on the substrate 208 surface to initiate polymerization. The in situ-generated pens 1120 and structure 1122 may be oriented such that the typical flow direction 278 may not disturb the cell 630 from its newly encompassing pen/structure. Testing, sorting and culturing may be performed on the cells 630 isolated in the in situ-generated pen 1120 or structure 1122. However, one common direction of each of the pens 1120 or structure 1122 created around each of the cells 630 may be open, thus permitting each of the cells 630 to be exported changing the flow direction, for example, to flush the cells out of the in situ-generated pens. Alternatively, each cell 630 may be selected and moved individually by, for example, using DEP forces, which may be optically actuated.

Figure 12A:
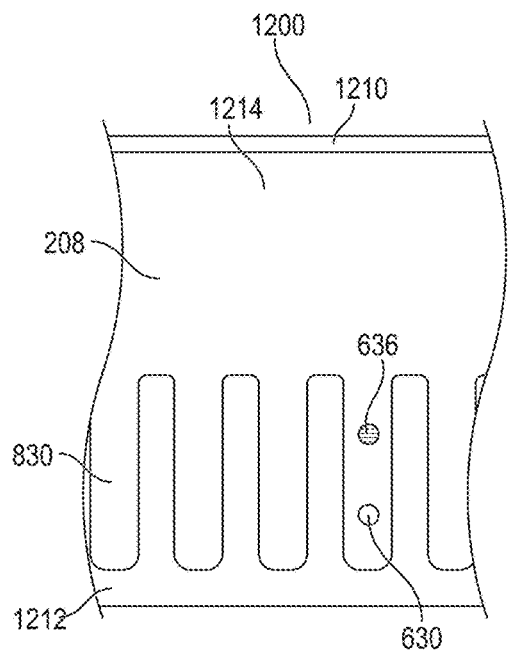
FIGS. 12A and 12B are graphical representations of another embodiment of in situ-generated isolation structures within a microfluidic (or nanofluidic) flow region.
Figure 12B:
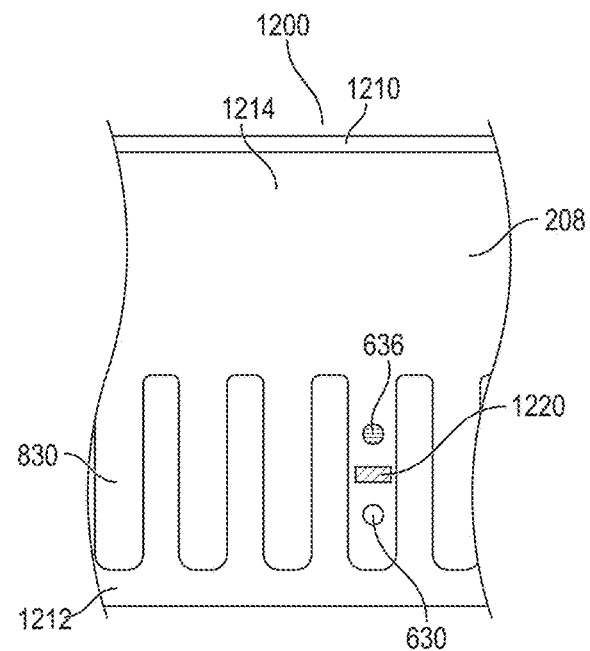

FIGS. 12A and B show an in situ-generated barrier 1220 introduced within a sequestration pen 830 of microfluidic device 1200 to subdivide the isolation region. One exemplary use may be to controllably remove a subset of the cell population 636, while ensuring that other subsets 630 are retained within the pen. Before, contemporaneously, or after cells 630 and 636 have been introduced to the flow region 1214 and are then disposed within the sequestration pen, flowable polymer is introduced into the isolation region of the sequestration pen 830. Photo-initiated polymerization of in situ-generated barrier is performed by illuminating a selected portion of the substrate 208 at the desired location. A thermoreversible (which could include light actuated thermally reversible) or photocleavable polymer may be employed to selectively remove sections of the in situ-generated barriers thereby permitting selective cell export.

FIG. 13A-C show another form of an in situ-generated barrier 1320 can include valve type structures. In situ-generated barriers 1320 can be used to direct flows including cells in to preselected regions of the chip, while blocking them from flowing into nonselected regions. The selective introduction and removal of in situ-generated barrier 1320 may be useful for performing multiplex experiments within the microfluidic device 1300. Prior to introduction of any cells, flowable polymer may be introduced at inlet 930. Photoinitiation of polymerization, at selected points of the substrate surface 208, at the distal edge of the opening of the first pen 830 of the first row of sequestration pens 1312 and at the edge of the opening of the last pen of the row of sequestration pens 830, all of which open to first channel 1302, forms a set of in situ-generated barriers 1320 excluding entry of cells to the first channel 1302. Similarly, in situ-generated barriers 1320 are introduced at the entrance and exits of third channel 1306 having a third plurality (arranged in a row) of sequestration pens 1316. As shown in FIG. 13A, a flow of cells 630 may be introduced and are directed to flow into the second channel 1304. The cells are prevented from entering first channel 1302 and from third channel 1306. Cells 630 are constrained to enter un-blocked channel 1304 to be placed into pens 830 within channel 1304. Once delivery of cells 630 is completed, a second set of in situ-generated barriers 1320 may be created at the ends of the second channel 1304. The first set of in situ-generated barriers 1320 blocking channel 1302 and 1306 may then be removed, in any way described herein. A second fluidic flow containing cells 636 may then be introduced via inlet 930. Cells 636 may be constrained to enter channels 1302 and 1306 but may not enter channel 1304, as shown in FIG. 13B. Cells not entering any channel may be swept with fluidic flow to outlet 932. The order of removing the first set of in situ-generated barriers 1320 at channels 1302 and 1306 and generating the second set of in situ-generated barriers 1320 blocking channel 1304 may be reversed. In other variations, each channel 1302, 1304, 106 may each in turn be made accessible to cells being flowed into microfluidic device 1300.

In another variation, microfluidic device 1300 may include thermal pads (not shown) at the points where one wishes to introduce in situ-generated barriers 1320 at channels 1302, 1304, 1306. Heating the thermal pads with a laser to locally increase the temperature, in the presence of a temperature sensitive polymer, can form a hydrogel in the area defined by the thermal pad and laser. As the light is removed, it cools and the hydrogel may dissolve.

FIG. 13C shows microfluidic device 1300 having differentially loaded channels having different cells in each channel, as selected. The different cells of each channel may be derived from different samples, e.g., different biopsy samples, different clonal populations or any kind of multiplex sample, and any sort of processing may be performed on the cells 630, 636 specifically disposed in microfluidic device 1300.

FIGS. 14A and B show another use for an in situ-generated barrier, which may be used to divide more precisely a laminar flow in microfluidic device 1400. A known problem with laminar flow is that the laminar nature of the flow fails with distance, and may require rigorous performance criteria to function at all. In one non-limiting example of how an in-situ generated barrier may provide benefit when using laminar flow-dependent methods. In microfluidic device 1400, as shown in FIG. 14A, there may be a substrate 208; a flow region including a microfluidic channel 122 configured to contain a fluidic medium flow 278; a first plurality of sequestration pens (830, 831, 832) disposed adjacent to each other such that each sequestration pen of the first plurality opens off a first side of the microfluidic channel 122; and a second plurality of sequestration pens (830', 831', 832') disposed adjacent to each other such that each sequestration pen of the second plurality opens off a second opposing side of the microfluidic channel 122. The first and second plurality of pens and the microfluidic circuit may be made of microfluidic circuit material 1460. The first side of the microfluidic channel may be configured to receive a first fluidic medium, and the second side of the microfluidic channel may be configured to receive a second fluidic medium. The first fluidic medium may be introduced into the first side of microfluidic the channel via a first fluidic inlet 930 and the second fluidic medium is introduced into the second side of the microfluidic channel via a second fluidic inlet 930'. One or more cells may be introduced to pens 830, 831, 832 of the first plurality of sequestration pens. In FIG. 14A, a first clonal population of cells 631 may be disposed in sequestration pen 830; a second clonal population of cells 633 may be disposed in the second sequestration pen 831; and a third clonal population of cells 635 may be disposed in sequestration pen 832. In some embodiments, only one cell 631, 633, 635 may be provided to respective pens 830, 82, 833 and each cell may be cultured to provide each respective clonal population. One (or optionally more) cell of each clonal population may be selected and then delivered across microfluidic channel 122 to a corresponding pen on the opposite side of the microfluidic device. For example, cell 631' may be selected from clonal population of cells 630 in sequestration pen 830, and moved, using any suitable motive means including DEP forces (which may be optically actuated) to corresponding sequestration pen 830' of the second plurality of sequestration pens. This may be repeated for each respective one or more cell 633' of clonal population of cell 633 in pen 831, and cell 633' may be delivered to pen 831', and so on. Flowable polymer may be introduced to the microfluidic channel 122 at that point, or at any earlier point. An in situ-generated barrier 1420 may be then introduced along the length of the microfluidic channel 122, dividing the microfluidic channel into a first sub-channel bordering the first plurality of sequestration pens 830, 831, 832 and a second sub-channel bordering the second plurality of sequestration pens 830', 831', 832', and preventing cells from crossing from the first sub-channel to the second sub-channel, and vice versa. The in situ-generated barrier 1420 may not be porous, and may permit a second medium to be introduced in second flow 278', which may differ in some respect from a first medium in first flow 278 in the first sub-channel. The second fluidic medium may be introduced to only the one or more cell(s) in each sequestration pen of the second plurality of sequestration pens, and not to the remainder of the clonal populations. The second medium may contain assay reagents for evaluation of the cell(s) 631', 633', 635'. One or more assays may be performed on the set of cell(s) 631', 633', 635' in the second plurality of sequestration pens or one or more of cell(s) 631', 633', 635' may be exported. Any sort of further processing may be performed on the cells 631', 633', 635' which may identify a selected characteristic of the clonal population from which cell 631', 633', 635' is derived.

In some embodiments, the in situ-generated barrier may be removed, and a second set of one or more cell(s) derived from each or a selected number of the clonal populations of the first plurality of sequestration pens may be introduced to the opposing pens. A second in-situ-generated barrier may be introduced and subsequent assaying or other processing may be performed upon them.

In some embodiments, the microfluidic device may have a barrier present when cells are introduced, wherein the barrier is punctuated with one or more gaps (not shown). The barrier punctuated with one or more gaps may not be an in situ-generated barrier, but may be formed from the same microfluidic circuit material that forms the sequestration pens and the microfluidic channel wall. The gap(s) are aligned adjacent to the opening of a first pen (e.g., 830) of the first plurality of sequestration pens and also aligned with the opening of the respective first pen (e.g., 830') of the second plurality of sequestration pens. The one or more gaps have a size configured to permit the one or more cell of the first clonal population to be selected and moved from the first pen of the first plurality of pens on the first side of the microfluidic channel to the first pen of the second plurality of pens on the opposing second side of the microfluidic channel. After delivery of the cells 631', 633', 635', the one or more gaps may be closed with one or more in situ-generated barriers as described above. The cells 631', 633', 635' may be further processed in any suitable method as described herein and may be assayed to identify desirable clonal populations of cells. The desirable clonal population of cells may be exported for further expansion or development, or may be cultured in place in the sequestration pens of microfluidic device 1400. Clonal populations identified as not desirable may be exported from the sequestration pens and may further be exported from the microfluidic device 1400.

FIG. 15 shows another variation, microfluidic device 1500, of the microfluidic device 1400. In some embodiments, the in situ-generated barrier 1500 may additionally have varying degrees of porosity, effected by either small ruptures in the barrier 1520 or by increasing porosity of the barrier 1520 itself. The in situ-generated barrier may be disrupted to have increasing spaced in situ-generated barrier modules 1522, 1524, 1526, 1528. In this approach, differing amounts of a first medium, introduced at first inlet 930, flowing in the first sub-channel in medium flow 278 and a second fluidic medium, introduced at second inlet 930', and flowing in the second sub-channel in medium flow 278', can permeate the barrier and affect the pairs of cells 631, 631'; 633, 633' 635, 635' in pens on either side of the barrier via diffusion, and may affect cell development.

Any of these laminar in situ-generated barriers (FIG. 14B or 15) may be useful for directed cell line development.

FIG. 16 show an in situ-generated polymer barrier that may be swelled or de-swelled using media or solvent changes. After a cell 630 has been disposed in sequestration pen 830 made of microfluidic circuit material 1660 (which may be the same or different from the microfluidic circuit material forming channel wall 1620), and flowable polymer has been introduced into the fluidic channel 264, the in situ-generated barrier 1620 may be introduced by, for example, illuminated a selected point on the substrate 208, to effect polymerization of barrier 1620. In some embodiments, the photoinitiated solidified polymer network may be swelled to state 1620', while performing other sorting or processing steps on other pens (not shown) in the microfluidic device 1600, preventing exit of the cell 630. The barrier may also prevent soluble media from entering the pen 830 during the processing steps, shielding the cell 630. The in situ-generated barrier may be de-swelled to state 1620 and permit exit of cell 630.

Figure 17:
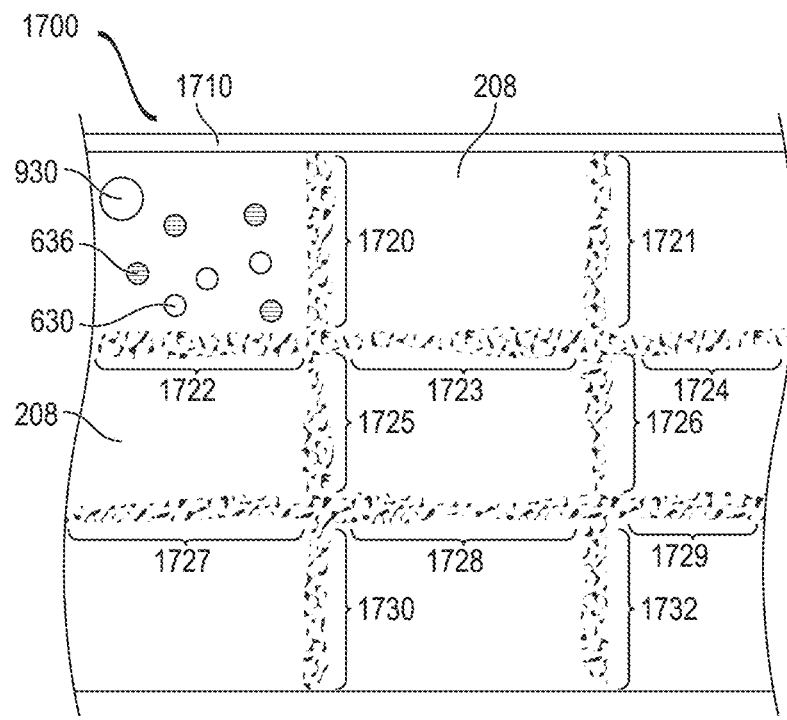
FIG. 17 is a graphical representation of another embodiment of in situ-generated isolation structures within a microfluidic (or nanofluidic) flow region.

FIG. 17 shows a microfluidic device 1700 having a plurality of in situ-generated barrier modules 1720 to 1732 introduced before or after introduction of micro-objects 630 and micro-objects 636. Each section of the field of the microfluidic device may be examined and tested for a desired micro-object 630. Individual barrier modules may be removed by suitable methods as described herein, and the micro-objects may be sorted to different portions of microfluidic device 1700.

Figure 18:
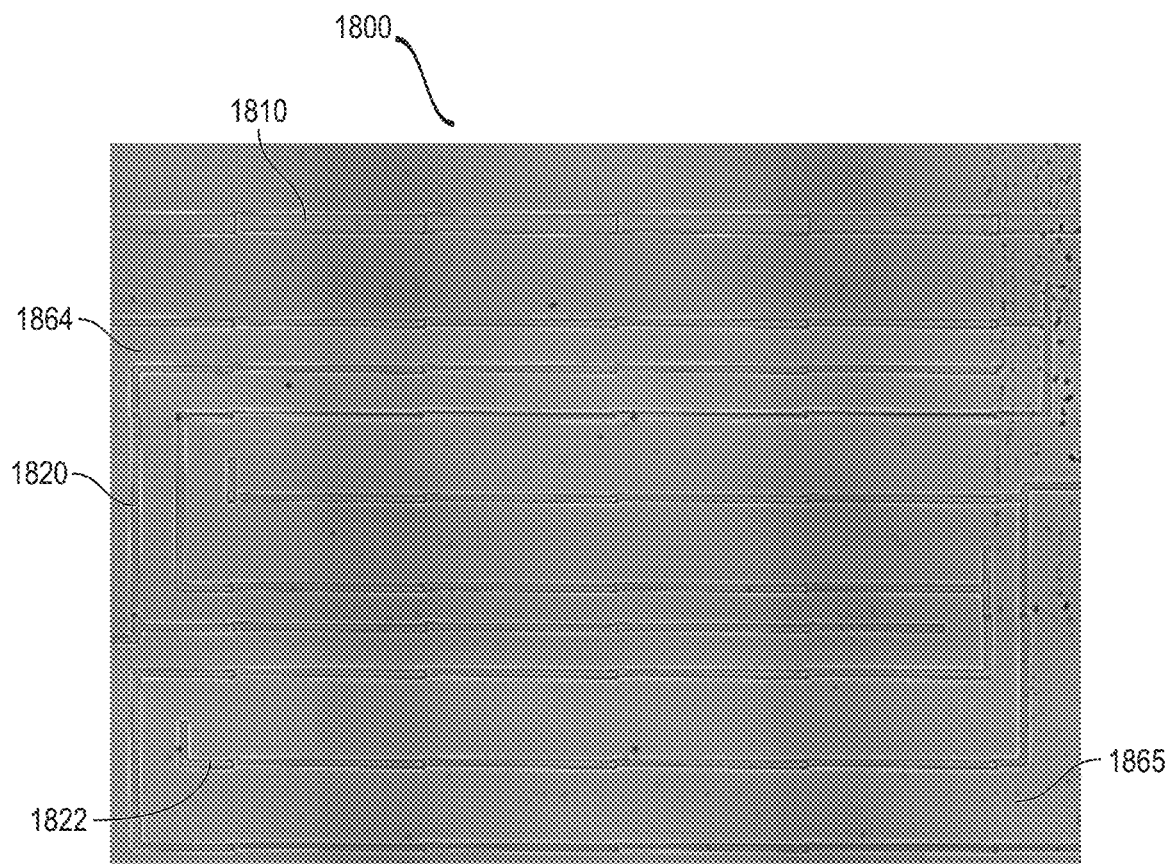
FIG. 18 is a photographic representation of a rapidly prototyped microfluidic (or nanofluidic) enclosure using in situ-generated isolation structures.

FIG. 18 shows an example of in situ-generated isolation structures used for prototyping of features for a microfluidic device 1800. Elements such as flow region wall(s) 1810, isolation structure sub-units 1820 and 1822, and prototyped channel units 1864, 1865 may be introduced and recombined rapidly to test new designs by adding the new design aspects via in situ-generated barrier/isolation structures. This can be an alternative for expensive experimental masks.

Figure 19A:
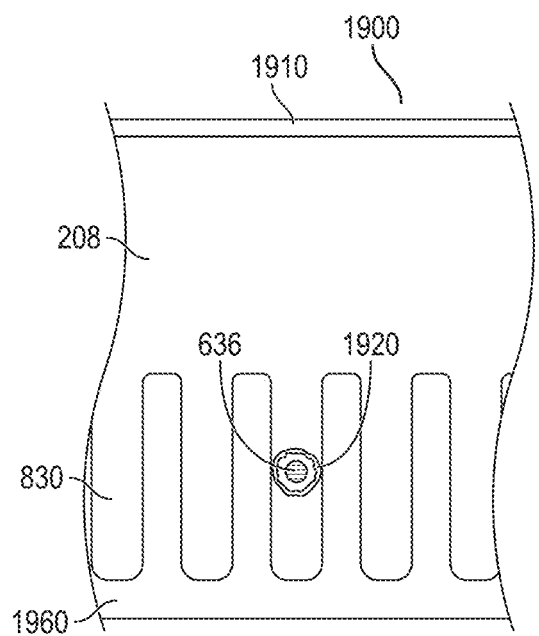
FIGS. 19A and 19B are graphical representations of other embodiments of in situ-generated isolation structures within microfluidic (or nanofluidic) flow regions.
Figure 19B:
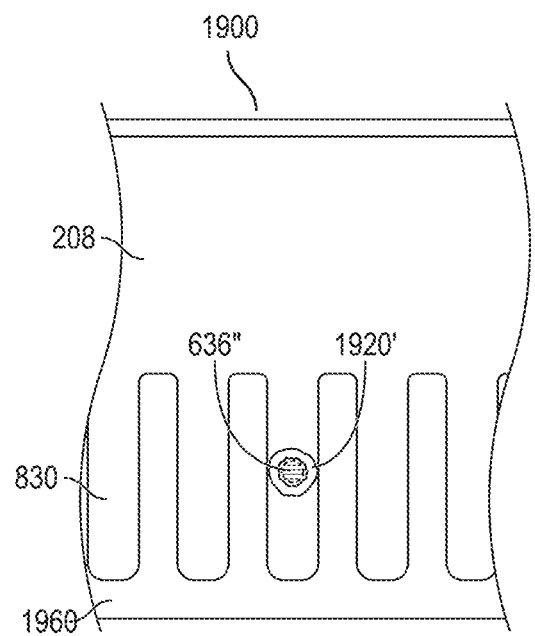
Figure 20A:
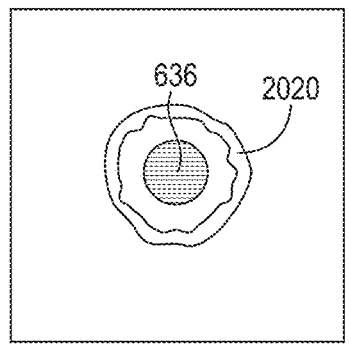
FIGS. 20A and 20B are graphical representations of other embodiments of in situ-generated isolation structures within isolation pens of a microfluidic (or nanofluidic) device.
Figure 20B:
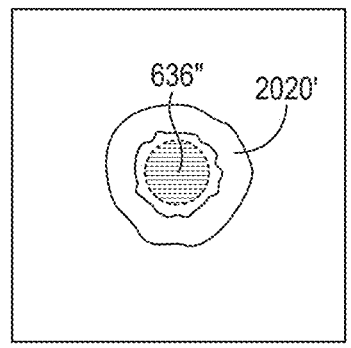

FIGS. 19A and 19B show examples of an in situ-generated enclosure 1920 in a sequestration pen of a microfluidic device 1900 to define and isolate a selected cell 636. It can also be used to isolate a cell with reagents to initiate transfection In some embodiments, the enclosure may be swelled to a swelled state 1920', as described herein, and may optionally swell sufficiently to permeabilize the cell 636". FIGS. 20A and 20B show a microfluidic device 2000 utilizing a similar enclosure 2020 outside of any sequestration pen, to isolate a cell to identify its location and optionally to swell (2020') and permeabilize cell 636".

The microfluidic device 400, 500, 600, 700, 800, 900, 1000, 1100, 1200, 1300, 1400, 1500, 1600, 1700, 1800, 1900, 2000 may have any combination of features, components or dimensions as described for microfluidic devices 100, 200, 230,250, 280, 290, 300 and may be suitably used for any method described. Microfluidic device 400, 500, 600, 700, 800, 900, 1000, 1100, 1200, 1300, 1400, 1500, 1600, 1700, 1800, 1900, 2000 may further be combined with any feature described for a respective other of microfluidic device 400, 500, 600, 700, 800, 900, 1000, 1100, 1200, 1300, 1400, 1500, 1600, 1700, 1800, 1900, 2000, 2100, 2200, in any suitable combination and used in any suitable method described herein, as one of skill would select.

Polymers for use in the solidified polymer network of the in situ-generated isolation structure. In various embodiments of the solidified polymer network of an isolation structure, the solidified polymer network may be a synthetic polymer, a modified synthetic polymer, or a light or temperature activatable biological polymer. The biological polymer may be configured to be temperature or light activatable to form a solidified polymer network. In some embodiments, the biological polymer may be modified to incorporate moieties providing the ability to be temperature or light activatable. The synthetic polymer modifications may include size modification motifs, cleavage motifs, reactive terminal moieties, and/or cell recognition motifs in any combination.

In some embodiments of the solidified polymer network of an isolation structure, the solidified polymer network may include at least one of a polyethylene glycol, modified polyethylene glycol, polylactic acid (PLA), modified polylactic acid, polyglycolic acid (PGA), modified polyglycolic acid, polyacrylamide (PAM), modified polyacrylamide, poly-N-isopropylacrylamide (PNIPAm), modified poly-N-isopropylacrylamide, polyvinyl alcohol (PVA), modified polyvinyl alcohol, polyacrylic acid (PAA), modified polyacrylic acid, polycaprolactone (PCL), modified polycaprolactone, fibronectin, modified fibronectin, collagen, modified collagen, laminin, modified laminin, polysaccharide, modified polysaccharide, or a co-polymer in any combination. In other embodiments, the polymer may include at least one of a polyethylene glycol, modified polyethylene glycol, polylactic acid (PLA), modified polylactic acid, polyglycolic acid (PGA), modified polyglycolic acid, polyvinyl alcohol (PVA), modified polyvinyl alcohol, polyacrylic acid (PAA), modified polyacrylic acid, polycaprolactone (PCL), modified polycaprolactone, fibronectin, modified fibronectin, collagen, modified collagen, laminin, modified laminin, polysaccharide, modified polysaccharide, or a co-polymer in any combination. In yet other embodiments, the polymer may include at least one of a polyethylene glycol, modified polyethylene glycol, polylactic acid (PLA), modified polylactic acid, polyglycolic acid (PGA), modified polyglycolic acid, polyvinyl alcohol (PVA), modified polyvinyl alcohol, polyacrylic acid (PAA), modified polyacrylic acid, fibronectin, modified fibronectin, collagen, modified collagen, laminin, modified laminin, or a co-polymer in any combination. In some embodiments, the solidified polymer network does not include a silicone polymer. In some embodiments, the solidified polymer network may not include a polylactic acid (PLA) or a modified polylactic acid polymer. In other embodiments, the solidified polymer network may not include a polyglycolic acid (PGA) or a modified polyglycolic polymer. In some embodiments, the solidified polymer network may not include a polyacrylamide or a modified polyacrylamide polymer. In yet other embodiments, the solidified polymer network may not include a polyvinyl alcohol (PVA) or a modified polyvinyl alcohol polymer. In some embodiments, the solidified polymer network may not include a polyacrylic (PAA) or modified PAA polymer. In some other embodiments, the solidified polymer network may not include a polycaprolactone (PCL) or a modified polycaprolactone polymer. In other embodiments, the solidified polymer network may not be formed from a fibronectin or a modified fibronectin polymer. In some other embodiments, the solidified polymer network may not be formed from a collagen or a modified collagen polymer. In some other embodiments, the solidified polymer network may not be formed from a laminin or a modified laminin polymer.

Physical and chemical characteristics determining suitability of a polymer for use in the solidified polymer network may include molecular weight, hydrophobicity, solubility, rate of diffusion, viscosity (e.g., of the medium), excitation and/or emission range (e.g., of fluorescent reagents immobilized therein), known background fluorescence, characteristics influencing polymerization, and pore size of a solidified polymer network. The solidified polymer network is formed upon polymerization or thermal gelling of a flowable polymer (e.g., a pre-polymer solution,)

One type of polymer, amongst the many polymers that may be used, is polyethylene glycol diacrylate (PEGDA). The mechanism of light initiated polymerization is shown in Equation 1. The free radical initiator Igracure® 2959 (BASF), a highly efficient, non-yellowing radical, alpha hydroxy ketone photoinitiator, is typically used for initiation at wavelengths in the UV region (e.g., 365 nm), but other initiators may be used. An example of another useful photoinitiator class for polymerization reactions is the group of lithium acyl phosphinate salts, of which lithium phenyl 2,4,6,-trimethylbenzolylphosphinate has particular utility due to its more efficient absorption at longer wavelengths (e.g., 405 nm) than that of the alpha hydroxy ketone class.

Equation 1.

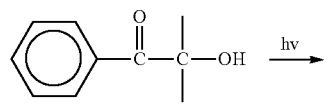

Initiator (Irgacure 2959)

-continued

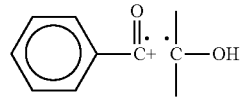

Free radical based Initiator

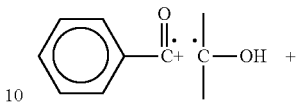

Free radical based Initiator

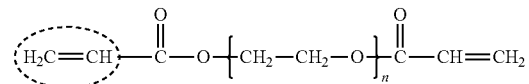

PEGDA → Chain Reaction

Other types of PEG that may be photopolymerized include PEG dimethylacrylate, and/or multiarm PEG (n-PEG) acrylate (n-PEG-Acr). Other polymer classes that may be used include poly vinyl alcohol (PVA), polylactic acid (PLA) polyacrylic acid (PAA), polyacrylamide (PAM), polyglycolic acid (PGA) or polycaprolactone (PCL).

The molecular weight range of the polymer may be varied as required for the performance of the isolation structures of the invention. A wide range of molecular weights of the flowable polymer may be suitable, depending upon the structure of the polymer. A useful star type polymer may have Mw (weight average molecular weight) in a range from about 500 Da to about 20 kDa (e.g., four arm polymer), or up to about 5 kDa for each arm or for a linear polymer, or any value therebetween. In some embodiments, a polymer having a higher molecular weight range, may be used at lower concentrations in the flowable polymer, and still provide an in situ-generated barrier or isolation structure that may be used in the methods described herein.

Various co-polymer classes may be used, including but not limited to: any of the above listed polymer, or biological polymers such as fibronectin, collagen or laminin. Polysaccharides such as dextran or modified collagens may be used. Biological polymers having photoactivatable functionalities for polymerization may also be used.

Crosslinking may be performed by radiation of linear or branched PEG polymers, free radical polymerization of PRG acrylates, and specifically tailored chemical reactions such as Michael addition, condensation, Click chemistry, native chemical ligation and/or enzymatic reactions.

The polymers may be selected to have a desired range of crosslinking based on the nature of the polymer (configuration of the flowable polymers such as star, multiarm or comb polymers, length of polymer segments between crosslinkable functionalities) and polymerization conditions (extent of temperature or photoinitiation, amount of photoactivatable initiator present, amount of radical terminator species present, and the like).

In some embodiments, the polymer of the solidified polymer network may be a modified PEG polymer. The polymer may be a star, 4-arm or 2-arm PEG diacrylate polymer.

Swellable polymers. PEG polymers may be swellable under various conditions and may be reversed by reverting back to the original media/temperature. Poly-N-isopropylacrylamide (PNIPAm) may be swelled by increasing temperature, and de-swelled by cooling.

Size modification motifs. Some hydrogels, including poly-N-isopropylacrylamide (PNIPAm) or poly acrylamide (PAM), may also incorporate specific moieties such as azobenzene which changes cis/trans orientation upon exposure to light at the surface of the functionalized polymer. This shift can provide significant change in size of the portion of polymer such as an isolation structure within a pen. These polymers may alternatively include cinnamic acid functionalities that cross link upon exposure to UV light, which is reversible upon removal of the light. The cross-linked polymer is elongated compared to the non-crosslinked state. Another moiety which may be introduced to these polymers includes triphenyl leucomethane, which forms ion pairs upon application of light, reversibly, upon exposure to light. The wavelength of activating light can be brought into the visible range if trisodium copper chlorophyllin is incorporated into the polymer.

Other modifications for functionalization. A polymer (e.g., PEG) may be modified by incorporating one or more different motifs within the (PEG) polymer. The motifs may include size modification motifs, cleavage motifs, reactive terminal motifs, and/or cell recognition motifs, in any combination. A size modification motif may include susceptibility to changes in temperature, ionic strength or pH of a surrounding medium that may cause a change in physical size of the solidified polymer network, thereby causing a change in size of the isolation structure. A non-limiting example may include a Lower Critical Solution Temperature (LCST) or an Upper Critical Solution Temperature (UCST) polymer, such as poly N-isopropylacrylamide (PNIPAm). Another example is the incorporation of disulfide bonds within a polymer such as PEB.

A cleavage motif may include a peptide sequence inserted into the polymer that is a substrate for one or more proteases, including but not limited to a matrix metalloproteinase, a collagenase, or a serine proteinase such as Proteinase K. Another category of cleavage motif may include a photocleavable motif such as a nitrobenzyl photocleavable linker which may be inserted into selected locations of the prepolymer. In some embodiments, a nitrobenzyl photocleavable linker may include a 1-methinyl, 2-nitrobenzyl moiety configured to be photocleavable. In other embodiments, the photocleavable linker may include a benzoin moiety, a 1,3 nitrophenolyl moiety, a coumarin-4-ylmethyl moiety or a 1-hydroxy 2-cinnamoyl moiety. A cleavage motif may be utilized to remove the solidified polymer network of an isolation structure. In other embodiments, the polymer may include cell recognition motifs including but not limited to a RGD peptide motif, which is recognized by integrins.

Reversing/removing/minimizing the in situ-generated isolation structure. A number of mechanisms may be used to remove or reduce the in situ-generated isolation structure when there is no further purpose for it. For example, once an assay is completed and desirable biological cells have been identified, it may be useful to remove the isolation structure in order to continue culturing and expanding the biological cell demonstrating desirable activities or properties.

Mechanical force. Increasing flow can be used if at least a portion of the isolation structure is located within a flow region as opposed to an isolation region of a pen. For example, the at least one isolation structure may be located within an isolation region of a sequestration pen, and after the assay is complete, the sequestration pen or the isolation region therein may be modified to bring flow through the isolation region.

Hydrolytic susceptibility: Porogens, including polymers which are incapable of being chemically linked to the photoinitiated polymer(s), may be including when forming the isolation structure. The degree/size of openings within the formed hydrogel can customize the hydrolysis rate via accessibility within the isolation structure). In other embodiments, the pores formed may be employed to permit secreted materials or chemical reagents to pass through the isolation structure but prevent a cell from moving into, out of, and/or through the isolation structure. In other embodiments, degradability of these polymers may be increased by introducing degradable segments such as polyester, acetal, fumarate, poly(propylene fumarate) or polyhydroxyacids into polymers (e.g., PEG polymers).

Reducing agents: PEG may be formed with disulfide linkages at intervals along the macromere, which may be random or predetermined. The disulfide bonds may be broken by Dithiothreitol (DTT), mercaptoethanol, or TCEP.

Thermal: poly N-isopropylacrylamide (PNIPAm) or other suitable LCST polymers may be used to introduce isolation structures upon heating. They may be removed by decreasing the temperature of the formed polymer isolation structure. The polymers may include ELPs or other motifs that also permit removal by other mechanisms such as hydrolysis or proteolysis. In particular, PNIPAm may be used to create a surface for adherent cells, but then switched to permit export.

Proteolytic susceptibility: Hydrogels may have any sort of peptide sequence engineered in, such that selective proteolysis upon a selected motif by a selected protease can remove/reverse/or minimize a hydrogel isolation structure. Some classes of modified PEG include PEG having elastin like peptide (ELP) motifs and/or having peptide motifs for susceptibility to a variety of proteases (enzyme sensitive peptide ESP). A large number of these motifs are known. One useful motif is RGD which may be constrained to be cyclic.

Osmotic susceptibility: Calcium concentration/other osmotic strategies can be employed to degrade and remove an isolation structure. As above, changes of media flowed through the channel or flow region may dimensionally swell or de-swell isolation structures.

Photocleavage: As described above, if a polymer of the solidified polymer network includes a photocleavable moiety, directing illumination of an exciting wavelength to the solidified polymer network will cause cleavage within sections of the solidified polymer network. This cleavage may provide complete or partial disruption of the solidified polymer network, thereby removing or reducing the isolation structure. If a partial disruption of the solidified polymer network is provided by the photocleavage, complete disruption (e.g., complete removal of this isolation structure) may be effected by flowing a fluidic medium in the channel or flow region to sweep partially disrupted portions of the solidified polymer network away from the isolated one or more micro-objects.

In some applications, the isolation structure may not be removed but may simply be swelled or de-swelled using light or media\solvent changes. Some types of hydrogels may incorporate moieties that respond reversibly to light (for example, change regiochemistry about a rigid bond; form reversible crosslinks within the polymer, or form/break ion pairs).

Microfluidic (or nanofluidic) device assisted heating. The microfluidic device may further include a metal pad disposed on the substrate at a location of the in situ-generated isolation structure. The metal pad may be created by depositing a contiguous metal shape or a pattern of metal shapes onto the substrate. The thermal pad can comprise any type of metal that can be excited by a light source to produce heat. Suitable metals include chromium, gold, silver, aluminum, indium tin oxide, or any combination thereof. Metals may be combined in a multi-layered thermal pad, e.g., a layer of chromium, a layer of titanium, a layer of gold. Other metals (and alloys) are known in the art. The thermal pad can comprise a continuous metal surface or can comprise a pattern of metal (e.g. metal shapes such as dots, squares, lines, cones, irregular forms). In some embodiments, a gold pad may be disposed on the substrate at a location where an in situ-generated isolation structure will be/has been generated. The thermal pad may be used to generate heat to gel, swell, reduce, or remove an in situ-generated isolation structure. Heat may be generated by directing light into the microfluidic device at the location where such gelling, swelling, reduction or removal is desired. In some embodiments, the solidified polymer network may include a thermosensitive polymer. When a solidified polymer network of an isolation structure includes a thermosensitive polymer, the device may further include a thermal pad disposed on the substrate at a location beneath the at least one in situ-generated isolation structure will be introduced.

Methods. In situ-generated isolation structures, which may fully enclose a region within the microfluidic device or partially enclose a region in the manner of a pen or sequestration pen, and which may be an in situ-generated barrier, may be introduced either before or after introduction of cells to the microfluidic (or nanofluidic) device. The in situ-generated isolation structures may be designed to be temporary or may be kept in place for at least the duration of a sorting and/or concentrating and/or processing procedure.

The in situ-generated isolation structures may be introduced by photoactivation, temperature change, or osmotic change which can cause a polymer solution present within the microfluidic to form an isolation structure capable of preventing a biological cell or a bead from crossing the isolation structure. Depending on the mesh size of the polymeric in situ-generated barrier/isolation structure, different categories of chemical species may be permitted to pass through the barrier. If the mesh size is chosen to be about 2 nm, only small molecule components may be permitted to pass, but proteins, etc. may sequestered by the isolation structure/barrier. The in situ-generated isolation structure/barrier may be formed of a polymer having a larger mesh size that may not prevent smaller substances such as proteins, nucleic acids, organelles, or signaling molecules from crossing the barrier. The in situ-generated isolation structure/barrier may permit media to pass through while not permitting a cell or a bead to enter, exit and/or pass through the in situ-generate structure/barrier. The in situ-generated isolation structure/barrier may have a mesh size (effective size of openings or voids between crosslinked polymer strands) that permits a bead (including but not limited to a magnetic bead, polystyrene bead or glass bead) to enter, exit and/or pass through the isolation structure/barrier while retaining a biological cell.

The process of introducing light activated polymerization can be performed within the microfluidic device, and may additionally be performed in the presence of cells. A photoactivatable polymerization initiator may be introduced before, contemporaneously, or after addition of the flowable polymer. Diffusion can compete with the polymerization process, so the ability to quickly create free radicals may be useful. Additionally, free radicals can quickly combine with free oxygen. While photopolymerization may be very efficient and quick in the absence of oxygen in the media, when biological cells are present (thus requiring the presence of oxygen), adjustments to the number of initiating radicals may be made to compensate. In fact, for the introduction of many of the types of barriers useful within a microfluidic device, the limiting effect of oxygen may be helpful as chain termination may happen more quickly and may limit the amount of extraneous polymer formed, particularly when introducing limited amounts of polymer to form small barriers that do not entirely block a pen or a channel.

In the methods of isolating micro-objects with in situ generated isolation structures, including any variations described herein, a microfluidic environment is provided where micro-objects may be sorted, concentrated, and/or selectively disposed in preselected regions or sequestration pens of a microfluidic device. Micro-objects isolated by the in situ-generated isolation structures described herein may be selectively retained within the microfluidic device while non-isolated micro-objects are exported, and may further be selectively released thereafter for further processing in the absence of the micro-objects not selected by the isolation process. Additionally, either isolated micro-objects or non-isolated micro-objects may further be selectively processed in the microfluidic device, which may include any type of assay or preparation for further processing such as lysis, gene editing or genotyping.

In one aspect, a method of isolating a micro-object in a microfluidic device is provided, including the steps of: providing the microfluidic device, where the microfluidic device includes an enclosure including a substrate and a flow region; introducing a first fluidic medium into the enclosure of the microfluidic device; introducing a plurality of micro-objects in the fluidic medium into the enclosure; introducing a flowable polymer into the enclosure before or after the introducing of the plurality of micro-objects; activating solidification of the flowable polymer at at least one selected area of the flow region, thereby forming an in situ-generated isolation structure; and isolating at least one of the plurality of micro-objects with the in situ-generated isolation structure.

In various embodiments of the method, the method may further include exporting a remainder of the plurality of micro-objects from the microfluidic device. The remainder of the plurality of micro-objects may be a selected portion of the plurality of micro-objects. In other embodiments, the at least one micro-object isolated by the in situ-generated isolation structure may be the selected portion of the plurality of micro-objects.

In various embodiments of the method, the method may further include the step of reducing or removing the in situ-generated isolation structure (which may include an in situ-generated barrier, one or more in situ-generated barrier modules, and/or one or more in situ-generated isolation modules) by increasing flow of a fluidic medium, introducing a hydrolytic agent, introducing a proteolytic agent, increasing/decreasing osmolality of the fluidic medium, changing temperature of the in situ-generated isolation structure, or optically illuminating the in situ-generated isolation structure, thereby releasing the at least one micro-object from being isolated. The step of changing the temperature may further include optically illuminating a thermal pad on the substrate adjacent to or under the in situ-generated isolation structure. In various embodiments of the method, the method may further include the step of exporting the at least one released micro-object from the microfluidic device. In various embodiments of the method, exporting the selected portion of the plurality of micro-objects from the microfluidic device may further include moving the selected portion of the plurality of micro-objects to a different portion of the substrate of the microfluidic device.

In various embodiments of the method, the in situ-generated isolation structure may be porous to a flow of a fluidic medium, while preventing some or all subsets of micro-objects from entering, exiting and/or passing through the in situ-generated isolation structure.

In various embodiments of the method, the step of activating solidification of the flowable polymer may form an in situ-generated isolation structure that may be an in situ-generated pen. FIG. 9C shows one non-limiting example. The in situ-generated pen may be selected from the group consisting of: an in situ-generated sequestration pen including an isolation region and a connection region, the connection region having a proximal opening to the flow region and a distal opening to the isolation region; an in situ-generated wall completely enclosing the at least one micro-object; and an in situ-generated pen partially enclosing the at least one micro-object where the in situ-generated pen has one opening in its periphery sufficiently large to permit entrance/exit of at least one micro-object. In some embodiments, the method may further include the step of swelling the in situ-generated pen around the at least one isolated micro-object, thereby applying pressure to and permeabilizing the micro-object. FIG. 20A shows a non-limiting example.

The step of activating solidification of the flowable polymer may further include forming an in situ-generated pen having a plurality of in situ-generated pen modules, each of the plurality of sub-units spaced apart from each other at a distance preventing the at least one isolated micro-object from exiting the pen. In some embodiments, the plurality of in situ-generated pen modules may be spaced apart from each other at a distance preventing at least one subset of micro-objects of the plurality of micro-objects from passing through the in situ-generated pen. The micro-objects may have a diameter between about 1-20 microns. In some embodiments, the at least one subset of micro-objects includes at least one type of biological cell.

In some embodiments, the step of activating solidification of the flowable polymer may form an in situ-generated isolation structure including an in situ-generated barrier configured to prevent the at least one micro-object from passing through the barrier. In some embodiments, a plurality of barriers may be introduced, and the plurality of barriers may be configured to allow isolation of respective sub-sets of at least one micro-object of the plurality of micro-objects. The method may include a step of reducing a size or removing the in-situ generated isolation structure, thereby releasing the at least one micro-object.

In various embodiments of the method, the method may further include the step of exporting the one or more sub-sets of the at least one released micro-object from the microfluidic device. Exporting the one or more sub-sets of the at least one micro-object may include moving the one or more sub-sets of the at least one micro-object to a different portion of the microfluidic device. The other portion of the microfluidic device may include a sequestration pen.

In various embodiments of the method, the step of activating solidification may further include forming an in situ-generated barrier having a plurality of in situ-generated barrier modules, each of the plurality of in situ-generated modules spaced apart from each other at a distance preventing the at least one micro-object from passing through the in situ-generated barrier. In various embodiments of the method, the method may further include the step of spacing the plurality of in situ-generated barrier modules apart from each other thereby forming an in situ-generated barrier preventing at least one subset of micro-objects of the plurality of micro-objects from passing through the in situ-generated barrier. The at least one subset of micro-objects may include at least one type of biological cell.

In various embodiments of the method, the enclosure of the microfluidic device may further include at least one sequestration pen including an isolation region and a connection region, the connection region having a proximal opening to the flow region and a distal opening to the isolation region. The enclosure may include a plurality of sequestration pens. The plurality of sequestration pens may be aligned in a row, and the proximal opening of each of the plurality of sequestration pens may be disposed contiguously to each other. In some embodiments, the flow region may include a channel and the proximal opening of each of the plurality of sequestration pens may open off one side of the channel.

In various embodiments of the method, the step of activation of solidification may be performed inside a sequestration pen. In some embodiments, the step of activating solidification may be performed within the isolation region or the connection region. FIGS. 4, 10A-C, 12B, 16, 19, 21A-C and 22 show non-limiting examples. In some embodiments, the step of activating solidification within the sequestration pen may form an in situ-generated pen. The in situ-generated pen may encompass a single biological micro-object. In some embodiments, the method may further include the step of swelling the in situ-generated pen thereby more tightly surrounding the single biological cell. The method may further include the step of swelling the in situ-generated pen until the single biological cell is permeabilized. FIG. 20A shows one non-limiting example. In various embodiments of the method, the step of activating solidification of the flowable polymer within the sequestration pen may form an in situ-generated barrier. In some embodiments, the in situ-generated barrier may be disposed in the isolation region of the sequestration pen. The in situ-generated barrier may have a width across the isolation region that may be about ¼ to about ¾ of a width of the isolation region. The width of the in situ-generated barrier across the isolation region may be about 5 microns to about 20 microns. The width of the isolation region may be about 30 microns to about 50 microns. FIGS. 12A and B shows one non-limiting example. The method may include the step of exporting a remainder of the plurality of micro-objects not isolated by the barrier from the microfluidic device. In various embodiments of the method, the method may further include the step of reducing or removing the in situ-generated barrier by optically illuminating or changing a temperature around the in situ-generated barrier, thereby releasing the at least one micro-object. In various embodiments of the method, the method may further include the step of exporting the at least one micro-object from the microfluidic device.

In some embodiments, the step of activating solidification of the flowable polymer may generate an in situ-generated barrier in the connection region. The method may further include the step of modifying the in situ-generated barrier to include a capture moiety configured to capture at least one micro-object disposed in the sequestration pen. The in situ-generated barrier may have a width across the connection region that may be about ¼ to about ¾ of a width of the connection region. In some embodiments, the width of the in situ-generated barrier across the connection region may be about 5 microns to about 20 microns. FIGS. 10A-C show one non-limiting example. In various embodiments, the connection region may have a width of about 30 microns to about 5 microns.

In some embodiments, the method may further include the step of exporting a remainder of the plurality of micro-objects not isolated by the in situ-generated barrier from the microfluidic device.

In various embodiments of the method, the method may further include a step of reducing or removing one or more of the plurality of in situ-generated barriers, thereby releasing the at least one micro-object from isolation. In various embodiments, the method may further include the step of exporting the at least one micro-object from the microfluidic device, after it has been released from isolation by the in situ-generated barrier.

In some embodiments, the step of activating solidification of the flowable polymer may form an in situ-generated barrier in the channel. In various embodiments, the step of activating solidification of the flowable polymer may dispose the in situ-generated barrier adjacent to a proximal opening of at least one sequestration pen of the plurality of sequestration pens. In some embodiments, where a plurality of sequestration pens may be present and the plurality of sequestration pens form a row, and the step of activating solidification of the flowable polymer may dispose the in situ-generated barrier adjacent to a distal edge of the proximal opening of a sequestration pen located at the end of the row of sequestration pens. In some embodiments of the method, the isolating step may include preventing the at least one micro-object of the plurality of micro-objects from moving past the in situ-generated barrier in the channel. In other embodiments, the isolating step may include preventing at least one subset of the plurality of micro-objects from moving past the in situ-generated barrier in the channel. FIGS. 6, 7, 8, and 13A-C show non-limiting examples.

In various embodiments of the method, the step of activating solidification of the flowable polymer may further include forming an in situ-generated barrier having a plurality of in situ-generated barrier modules, each of the plurality of modules spaced apart from each other at a distance preventing the at least one micro-object of the plurality of micro-objects from moving past the barrier in the channel. In some embodiments, the step activating solidification of the flowable polymer may further include forming the plurality of in situ-generated barrier modules at a distance preventing at least one subset of micro-objects of the plurality of micro-objects from moving past the barrier. In some embodiments, where a plurality of sequestration pens may be present and the plurality of sequestration pens form a row, and the step of activating solidification of the flowable polymer may dispose the barrier adjacent to a distal edge of the proximal opening of a sequestration pen located at the end of the row of sequestration pens. In various embodiments, the isolating step may include preventing the at least one micro-object from passing the selected sequestration pen. FIGS. 9A-D shows a non-limiting example. In some embodiments, the isolating step may further include disposing the at least one micro-object into the selected sequestration pen. The at least one micro-object may be all of the plurality of micro-objects.

In some embodiments, the step of activating solidification of the flowable polymer may form an in situ-generated barrier sized to block the proximal openings of at least two contiguous sequestration pens. The in situ-generated barrier blocking the proximal openings may have a dimension of at least 50 microns to about 500 microns. FIGS. 5A and B show one non-limiting example. In various embodiments, the method may further include the step of exporting a remainder of a remainder of the plurality of micro-objects not isolated by the barrier from the microfluidic device.

In some embodiments, the step of activating solidification of the flowable polymer may form the barrier at a distal edge of the proximal opening of a first sequestration pen of the plurality of pens. FIGS. 13A-C shows one non-limiting example. In some embodiments, the plurality of sequestration pens may be a first plurality of sequestration pens and the channel may be a first channel, and the microfluidic device may further include a second plurality of sequestration pens disposed along a second channel, and the barrier may prevent at least one micro-object from passing the in situ-generated barrier into the first channel. The barrier may direct flow of fluidic medium to another portion of the enclosure. In some embodiments, the barrier may prevent all of the plurality of micro-objects from passing the barrier into the first channel. In some embodiments, the isolating step may further include directing the plurality of micro-objects into the second channel. In some embodiments, the isolating step may further include disposing the plurality of micro-objects into the second plurality of sequestration pens in the second channel.

In various embodiments of the method, the microfluidic device may include a first plurality of sequestration pens disposed adjacent to each other on a first side of the channel and the microfluidic device further includes a second plurality of sequestration pens disposed adjacent to each other on a second opposing side of the microfluidic channel. FIGS. 14A-B and 15 show non-limiting examples. In some embodiments, the step of introducing the plurality of micro-objects may include introducing a plurality of micro-objects to each of the first plurality of sequestration pens in a first fluidic medium. Each of the plurality of micro-objects may be a clonal population of biological micro-objects. In various embodiments of the method, the step of introducing may further include introducing a first biological micro-object of the first clonal population to a first sequestration pen of the second plurality of sequestration pens in the first fluidic medium. In some embodiments, the step of introducing may further include introducing a first biological micro-object of each respective clonal population in each sequestration pen of the first plurality of sequestration pens to a respective sequestration pen in the second plurality of sequestration pens in the first fluidic medium.

In some embodiments, the step of activating solidification of the flowable polymer may include activating solidification of the flowable polymer along a length of the microfluidic channel, thereby forming an in situ-generated isolation structure including an in situ-generated barrier dividing the microfluidic channel into a first sub-channel configured to provide a first sub-flow of a fluidic medium past the first plurality of sequestration pens and a second sub-channel configured to provide a second sub-flow of fluidic medium past the second plurality of pens, wherein the in situ-generated barrier prevents micro-objects from moving from the first sub-channel to the second sub-channel, and vice versa.

In other embodiments, the microfluidic device may further include a barrier dividing the microfluidic channel into a first sub-channel configured to provide a first sub-flow of a fluidic medium past the first plurality of sequestration pens and a second sub-channel configured to provide a second sub-flow of fluidic medium past the second plurality of pens, the barrier punctuated by at least one gap aligned with a proximal opening to the first sub-channel of a first sequestration pen of the first plurality of sequestration pens and aligned with a proximal opening to a proximal opening to the second sub-channel of a first pen of the second plurality of sequestration pens; and further wherein the step of activating polymerization may include activating polymerization at the at least one gap to form at least one in situ-generated barrier in the at least one gap, thereby preventing micro-objects from moving from the first sub-channel to the second sub-channel, and vice versa. In some embodiments, when the microfluidic device includes a barrier punctuated by at least one gap, the step of moving the at least one cell of each clonal population in the first plurality of sequestration pens comprises moving the at least one cell to the respective sequestration pen of the second plurality of pens through the at least one gap. In some embodiments, the barrier has a plurality of gaps. Each gap may be aligned across from the proximal opening (to the microfluidic channel) of each sequestration pen of the first plurality of sequestration pens and, optionally, also aligned with the proximal opening of each respective sequestration pen of the second plurality of sequestration pens to the microfluidic channel. The step of activating solidification can include forming a one or more in situ-generated barriers closing the one or more of the plurality of gaps. In various embodiments of the method, the method may further include the step of introducing a second fluidic medium into the second sub-channel. The method may further include the step of flowing the first fluidic medium in the first sub-channel and flowing the second fluidic medium in the second sub-channel along the in situ-generated barrier to respective first and second outputs of the device. In some embodiments, the isolating step may further include preventing the first medium from mixing with the second medium in the second sub-channel. In yet further embodiments, the isolating step may further include growing each of the first biological micro-objects of each respective clonal populations in the second fluidic medium, whereby the first biological micro-objects in the second plurality of sequestration pens grow differently from the respective clonal populations in the first plurality of sequestration pens. The method may further include the step of expanding each of the first biological micro-objects in each of the second plurality of sequestration pens to provide new clonal populations of biological micro-objects. In various embodiments, the step of activating solidification of the flowable polymer may further include forming a barrier having a plurality of in situ-generated barrier modules, each of the plurality of modules spaced apart from each other at a distance preventing the at least one micro-object from passing through the barrier. The step of activating solidification of the flowable polymer may further include spacing the plurality of in situ-generated barrier modules apart from each other thereby forming an in situ-generated barrier preventing at least one subset of micro-objects of the plurality of micro-objects from passing through the barrier. The in situ-generated barrier has a length along the microfluidic channel. In some embodiments, the step of activating solidification of the flowable polymer may further include forming a first module of the plurality of in situ-generated modules having a length of at least 40% of the length of the in situ-generated barrier. FIG. 15 shows one non-limiting example. In other embodiments, the step of activating solidification of the flowable polymer may further include forming each of a remainder of the plurality of in situ-generated barrier modules having a length no greater than 20% of the length of the barrier. The in situ-generated barrier may have a first upstream (e.g., closer to a fluidic inlet) end and a second downstream end (e.g., closer to a fluidic outlet), and a length there between. In some embodiments, the step of activating solidification of the flowable polymer may further include forming the barrier, where the in situ-generated barrier may not be porous to a flow of the first or second fluidic medium at the first end and may be porous to at least a portion of the flow of the first or the second fluidic medium at a point that is at least 40% of the length of the in situ-generated barrier.

In various embodiments of the method, the method may further include the step of reducing a dimension of or removing the in situ-generated barrier. In some embodiments, when the in situ-generated barrier includes a plurality of modules, the in situ-generated barrier may be reduced by removing at least a portion of the plurality of barrier modules. Fewer or more of the in situ-generated barrier modules may be removed to reduce the barrier. In various embodiments of the method, the method may further include the step of growing each of the first biological micro-objects of each respective clonal populations in a differing composition of fluidic medium depending on an extent of the first fluidic medium and the second fluidic medium mixing.

In any of the embodiments of the method, the method may include a step of processing an isolated micro-object. Alternatively, the method may include a step of processing a micro-object that has not been isolated, while another micro-object in the microfluidic device is isolated.

In another aspect, a method of isolating a micro-object in a microfluidic device is provided, including the steps of: providing a microfluidic device including an enclosure having a substrate, a flow region including a channel, and a plurality of sequestration pens; disposing a fluidic medium including a plurality of micro-objects into the channel of the microfluidic device, where the fluidic medium includes a flowable polymer; disposing select micro-objects of the plurality of micro-objects in at least a portion of the plurality of sequestration pens thereby forming a plurality of populated sequestration pens, each containing at least one micro-object; selecting at least one of the plurality of populated sequestration pens; initiating polymerization of the flowable polymer at a selected point within the connection region, the isolation region, or at the proximal opening of the connection region of the at least one selected sequestration pen, where the polymerized polymer of the flowable polymer generates at least a partial in situ-generated barrier; and prevents the at least one micro-object from exiting the at least one selected sequestration pen. FIGS. 4 and 5 are nonlimiting examples of this method. Each of the plurality of sequestration pens may include an isolation region and a connection region, the connection region having a proximal opening to the channel and a distal opening to the isolation region. In some embodiments, polymerization of the flowable polymer forms a solidified polymer network. In various embodiments, the method may further include the step of removing at least one of the plurality of micro-objects from one or more unselected populated sequestration pens. The method may further include the step of subsequently permitting the at least one micro-object to exit the at least one selected sequestration pen.

The method may further include the step of permitting the at least one micro-object to exit the at least one selected sequestration pen further includes at least reducing the at least partial in situ-generated barrier, thereby releasing the at least one micro-object. Reducing an in situ-generated barrier can include shrinking a size of the in situ-generated barrier or can include shifting the in situ-generated barrier into a second state that has a smaller size. Reducing may also include increasing porosity of the remaining portion(s) of the barrier. Reducing may further include removing a portion of the modules of an in situ-generated barrier such that the reduced in situ-generated barrier may permit more types of micro-objects to pass in and out through the reduced in situ-generated barrier. In some embodiments, the method may further include the step of reducing or removing the at least partial in situ-generated barrier by increasing flow of a fluidic medium, introducing a hydrolytic agent, introducing a proteolytic agent, increasing/decreasing osmolality of the fluidic medium, changing temperature of the at least partial barrier, or optically illuminating the in situ-generated barrier, thereby releasing the at least one micro-object from isolation. The step of changing temperature may further include optically illuminating a thermal pad on the substrate adjacent or under the barrier. In some embodiments, the step of forming an in situ-generated barrier may further include forming a substantially complete in situ-generated barrier. In various embodiments, the substantially complete in situ-generated barrier may be formed at the proximal opening to the channel of the at least one sequestration pen. The forming step may further include forming the substantially complete in situ-generated barrier at the proximal opening of more than one sequestration pen. In some embodiments, the enclosure of the microfluidic device may further include a plurality of contiguous sequestration pens. In various embodiments, the substantially complete in situ-generated barrier may be removed by an increased flow of fluidic medium in the channel.

Directing fluidic flow which may include micro-objects. In another aspect, a method of directing fluidic flow within a microfluidic device is provided, including the steps of: providing a microfluidic device including an enclosure having a substrate and a flow region configured to contain a fluidic medium that divides into at least a first flow region and a second flow region; generating an in situ-generated barrier in situ that blocks fluid flow into the first flow region; introducing the fluidic medium into the flow region; and flowing the fluidic medium through the enclosure, such that the in situ-generated barrier directs the flow of the fluidic medium through the second flow region. In various embodiments, the fluidic medium may include at least one micro-object. In some embodiments, the at least one micro-object may be directed into the second flow region. FIGS. 13A-C show one nonlimiting example of this method.

In various embodiments of the method, the method may further include the step of disposing the at least one micro-object within a sequestration pen disposed within the second flow region. The sequestration pen may include an isolation region and a connection region, the connection region having a proximal opening to the second flow region and a distal opening to the isolation region. The at least first micro-object may be disposed within the isolation region of the sequestration pen.

In various embodiments of the method, the method may further include the step of removing the in situ-generated barrier to substantially unblock the first flow region. The step of substantially unblocking the first portion of the flow region may further include allowing flow of the fluidic medium containing a micro-object into the first flow region. In some embodiments, at least a portion of the in situ-generated barrier may be removable by application of increased flow in the flow region, hydrolysis, proteolysis, osmotic change, temperature change of the barrier, or optical illumination.

In various embodiments of the method, the method may further include the step of introducing a second in situ-generated barrier configured to block the second flow region.

In some embodiments, the method may further include the step of introducing at least one micro-object into the first flow region. The method may further include the step of flowing the fluidic medium through the flow region, thereby directing the at least one micro-object to the first flow region. In some embodiments, the directing step may further include disposing the at least one micro-object within a sequestration pen disposed within the first flow region. The sequestration pen may include an isolation region and a connection region, the connection region having a proximal opening to the flow region and a distal opening to the isolation region, and further where the at least one micro-object is disposed within the isolation region of the sequestration pen. In various embodiments of the method, the method may further include the step of removing the second in situ-generated barrier.

In various embodiments of the method, the method may further include the step of processing the at least one micro-object. The further processing step may include assaying, sorting, permeabilizing, transfecting or exporting the at least one micro-object.

In various embodiments, the generating step may include initiating solidification of a flowable polymer present in the fluidic medium.

In various embodiments, the at least first micro-object and/or the at least second micro-object may be a biological micro-object.

Concentrating micro-objects, which may include concentrating biological cells. In another aspect, a method of concentrating micro-objects in a microfluidic device may be provided, including the steps of: providing a microfluidic device including an enclosure having a substrate and a flow region configured to contain a fluidic medium; introducing an in situ-generated isolation structure in a first sector of the flow region, where the in situ-generated isolation structure is configured to permit the fluidic medium to flow through the in situ-generated isolation structure but does not permit at least one micro-object in the fluidic medium to pass through the isolation structure; introducing a first plurality of micro-objects in a first volume of the fluidic medium into the first sector of the flow region; and concentrating at least a first subset of the first plurality of micro-objects in the first sector of the flow region. FIGS. 6, 7, 8A-B, 9A-D, 10A-C show some embodiments of the method. In various embodiments, the first volume of the fluidic medium may be larger than a volume of the first sector of the flow region.

In some embodiments, the in situ-generated isolation structure may not permit a first subset of the first plurality of micro-objects to flow through the isolation structure but may permit a second subset of the first plurality of micro-objects to flow through the in situ-generated isolation structure. In some embodiments, the step of concentrating the at least first subset of the first plurality of micro-objects in the first sector may further include sorting the second subset of micro-objects from the first subset of micro-objects of the first plurality of micro-objects.

In various embodiments of the method, the method may further include the step of disposing the at least first subset of the first plurality of micro-objects within at least one sequestration pen located within the first sector. Each sequestration pen may include an isolation region and a connection region, the connection region having a proximal opening to the flow region and a distal opening to the isolation region.

In various embodiments of the method, the method may further include the step of introducing a second plurality of micro-objects into the flow region, and flowing the second volume of fluidic medium through the first sector of the flow region; and concentrating at least a first subset of the second plurality of micro-objects along with the at least first subset of the first plurality in the first sector of the flow region. The method may further include the step of disposing the at least first subset of the first plurality and the at least first subset of the second plurality of micro-objects within at least one sequestration pen located within the first sector.

In various embodiments of the method, the method may further include the step of introducing a second plurality of micro-objects in a second volume of fluidic medium into the first sector of the flow region, thereby sorting a first subset of micro-objects from a second subset of micro-objects of the second plurality of micro-objects and concentrating the at least first subset of the first plurality of micro-objects and the at least first subset of the second plurality of micro-objects in the first sector of the substrate.

In some embodiments, the method may further include the step of disposing the at least first subset of the first plurality of micro-objects and the first subset of the second plurality of micro-objects into at least one sequestration pen located within the first sector, where each sequestration pen includes an isolation region and a connection region, the connection region having a proximal opening to the flow region and a distal opening to the isolation region.

In various embodiments of the method, the method may further include the step of removing or reducing at least a portion of the isolation structure, thereby permitting a volume of fluidic medium containing micro-objects to flow to at least a second sector of the flow region. In various embodiments of the method, the method may further include the step of introducing a second in situ-generated isolation structure in the second sector of the flow region. In some embodiments of the method, the method may further include the step of introducing a second plurality of micro-objects in a second volume of fluidic medium into the first sector of the flow region; and concentrating the at least first subset of the plurality of micro-objects within the second sector of the flow region. The method may further include the step of disposing the at least first subset of the second plurality of micro-objects within at least one sequestration pen located within the second sector of the flow region. The method may further include the step of removing or reducing at least a portion of the second isolation structure, thereby permitting unrestricted flow throughout the flow region.

In various embodiments of the method, the in situ-generated isolation structure may be a fully enclosed pen encompassing a selected micro-object, a pen open at a portion of its periphery large enough to admit passage of a micro-object, a sequestration pen including an isolation region and a connection region, the connection region having a proximal opening to the flow region and a distal opening to the isolation region, or a barrier. In some embodiments, the in situ-generated barrier may include a plurality of in situ-generated barrier modules, each spaced from the remainder of the plurality such that a size of an opening between two in situ-generated modules is smaller than a size of a selected micro-object. The micro-objects may have a diameter from between about 1-20 µm.

In some embodiments, the in situ-generated isolation structure may be an in situ-generated barrier and may be substantially disposed within the isolation region or connection region of the sequestration pen. In other embodiments, the in situ-generated isolation structure may be an in situ-generated barrier and may be substantially disposed within the flow region.

In various embodiments, the first plurality of micro-objects may include a biological micro-object. In some embodiments, the first subset and the second subset of the first plurality of micro-objects may include different types of micro-objects. In various embodiments, the second plurality of micro-objects may include a biological micro-object. When both pluralities of micro-objects are biological micro-objects, the first subset and the second subset of the second plurality of micro-objects may include different types of micro-objects.

Assaying cells of a clonal population. In another aspect, a method of assaying cells of a clonal population in a microfluidic device is provided; and includes the steps of: introducing a first fluidic medium including a plurality of cells into an enclosure of the microfluidic device, the enclosure including a substrate, a flow region including a microfluidic channel configured to contain a fluidic medium, a first plurality of sequestration pens disposed adjacent to each other such that each sequestration pen of the first plurality opens off a first side of the microfluidic channel, and a second plurality of sequestration pens disposed adjacent to each other such that each sequestration pen of the second plurality opens off a second opposing side of the microfluidic channel; flowing the first fluidic medium and the plurality of cells into the channel of the microfluidic device; introducing a clonal population of cells in each of the sequestration pens of the first plurality of sequestration pens; for each clonal population of cells in the first plurality of sequestration pens, moving at least one cell to a respective sequestration pen of the second plurality of sequestration pens; introducing a flowable polymer into the channel; activating solidification of the flowable polymer along a length of the microfluidic channel, thereby forming an in situ-generated barrier dividing the microfluidic channel into a first sub-channel configured to provide a first sub-flow of fluidic medium past the first plurality of sequestration pens and a second sub-channel configured to provide a second sub-flow of fluidic medium past the second plurality of sequestration pens, wherein the in situ-generated barrier prevents cells from moving from the first sub-channel to the second sub-channel, and vice versa; flowing a second fluidic medium into the second sub-channel, wherein the second fluidic medium includes reagents for assaying the cells in the second plurality of sequestration pens; and assaying the cell(s) in each sequestration pen of the second plurality. FIGS. 14A-C show one embodiment. In various embodiments, the in situ-generated barrier may have a length from a first end of the channel to a second end of the microfluidic channel. Each sequestration pen of the first plurality of sequestration pens and of the second plurality of sequestration pens may have a proximal opening to its respective side of the microfluidic channel.

In various embodiments, the flowable polymer may be introduced before or after the step of introducing of the plurality of cells to the first plurality of sequestration pens.

In some embodiments, the step of introducing the clonal population may include introducing a single cell to each of the first plurality of sequestration pens, and may further include expanding the single cell to a clonal population of cells.

In various embodiments of the method, the method may further include the step of flowing fluidic medium in the first sub-channel and flowing fluidic medium in the second sub-channel to respective first and second outputs of the microfluidic device. The fluidic medium in the first sub-channel may be different from the fluidic medium in the second sub-channel. In some embodiments, the in situ-generated barrier may prevent the first sub-flow of fluidic medium in the first sub-channel from mixing with the second sub-flow of fluidic medium in the second sub-channel.

In some embodiments, the step of assaying may include preparing the cells in the second plurality of sequestration pens for genotyping. In some other embodiments, the step of assaying may include determining a level of production of a biological product by the cell(s) in each sequestration pen of the second plurality and/or by the clonal population in each sequestration pen of the first plurality.

In some embodiments, the reagents for assaying may include one or more of the group including chemical reagents, biological reagents, feeder cells, stimulatory cells, reporter cells, reporter molecules, and beads. The beads may include chemical reagents, biological reagents, stimulatory reagents, or reporter molecules.

In various embodiments, the assaying step further includes identifying at least one cell of the cells in the second plurality of sequestration pens, the at least one cell including a selected characteristic. The method may further include a step of exporting at least one cell of the cells in the second plurality of sequestration pens, wherein the at least one cell includes a selected characteristic s. In various embodiments, the method may further include the step of exporting the clonal population from the respective pen of the first plurality of sequestration pens. In other embodiments, the method may further include a step of exporting the cells in the second plurality of sequestration pens and/or clonal populations of cells in the first plurality of sequestration pens that do not include a selected characteristic.

In various embodiments of the method, the method may further include the step of removing the in situ-generated barrier before exporting a cell.

In various embodiments, the step of activating solidification of the flowable polymer along a length of the microfluidic channel includes activating solidification of the flowable polymer at gaps of a barrier extending from a first end of the microfluidic channel to a second end of the microfluidic channel, the barrier separating the microfluidic channel into the first sub-channel and the second sub-channel, wherein the gaps are aligned with the proximal opening of each pen of the first plurality of sequestration pens and the proximal opening of the respective pen of the second plurality of sequestration pens, thereby forming an in situ-generated barrier preventing cells from moving from the first sub-channel to the second sub-channel, and vice versa. The barrier may have at least one gap aligned with the proximal opening of one pen of the first plurality of sequestration pens and the proximal opening of the respective pen of the second plurality of sequestration pens. In some embodiments, the barrier has a plurality of gaps. Each gap may be aligned across from the proximal opening (to the microfluidic channel) of each sequestration pen of the first plurality of sequestration pens and, optionally, also aligned with the proximal opening of each respective sequestration pen of the second plurality of sequestration pens to the microfluidic channel. In some embodiments, the step of activating solidification along the length of the barrier may include forming a plurality of in situ-generated barriers closing the plurality of gaps in the barrier.

Cell line evolution. In another aspect, a method of cell line evolution in a microfluidic device is provided, including the steps of: providing the microfluidic device, where the device includes an enclosure comprising a substrate, a flow region including a channel configured to contain a fluidic medium, a first plurality of sequestration pens disposed adjacent to each other such that each sequestration pen of the first plurality opens off a first side of the microfluidic channel, and a second plurality of sequestration pens disposed adjacent to each other such that each sequestration pen of the second plurality opens off a second opposing side of the microfluidic channel; introducing a first fluidic medium into the channel of the microfluidic device; introducing one or more cells of a clonal population into each of the first plurality of sequestration pens; introducing one or more cells of the clonal population into each of the second plurality of sequestration pens; introducing a flowable polymer into the channel; activating solidification of the flowable polymer along a length of the microfluidic channel, thereby forming an in situ-generated barrier dividing the microfluidic channel into a first sub-channel configured to provide a first sub-flow of fluidic medium past the first plurality of sequestration pens and a second sub-channel configured to provide a second sub-flow of fluidic medium past the second plurality of sequestration pens, wherein the in situ-generated barrier prevents cells from moving from the first sub-channel to the second sub-channel, and vice versa; introducing a second fluidic medium into the second side of the channel; and growing each of the one or more cells in each sequestration pen of the second plurality of sequestration pens in the presence of the second fluidic medium. The step of introducing a flowable polymer may be performed before or after the introducing of cells.

In some embodiments, the second fluidic medium may include chemical or biological components differing from those of the first fluidic medium. The chemical or biological components of the second fluidic medium may apply selective pressure upon the growth of the one or more cells of the clonal population in each of the second plurality of sequestration pens.

In various embodiments of the method, the method may further include the step of flowing the first fluidic medium in the first side of the channel and flowing the second fluidic medium in the second side of the channel along the in situ-generated barrier to respective first and second outputs of the device. In some embodiments, the isolating step may further include preventing the first medium from mixing with the second medium on the second side of the channel.

In various embodiments of the method, the method may further include the step of expanding each of the single cells in each of the second plurality of sequestration pens to provide new clonal populations in each sequestration pen of the second plurality of sequestration pens.

In some embodiments, the step of forming an in situ-generated barrier may further include forming an in situ-generated barrier having a plurality of in situ-generated barrier modules, each of the plurality of in situ-generated modules spaced apart from each other at a distance preventing the at least one micro-object from passing through the barrier. In some embodiments, the micro-objects prevented from passing through the in situ-generated barrier may have a diameter from 1-20 microns. In other embodiments, the step of forming an in situ-generated barrier may further include spacing the plurality of in situ-generated barrier modules apart from each other thereby forming an in situ-generated barrier preventing at least one subset of micro-objects of the plurality of micro-objects from passing through the in situ-generated barrier. In some embodiments, the patterning step may further include forming a first module of the plurality of in situ-generated modules having a length of at least 40% of the length of the in situ-generated barrier, where the in situ-generated barrier has a length along the length of the channel. The in situ-generated barrier further has a first end and a second end. The first end of the in situ-generated barrier may be proximal to a first fluidic inlet and/or a second fluidic inlet. In some embodiments, the step of forming an in situ-generated barrier may further include forming each of a remainder of the plurality of in situ-generated barrier modules having a length no greater than 20% of the length of the in situ-generated barrier. In yet other embodiments, the step of forming an in situ-generated barrier may further include forming the in situ-generated barrier, where the in situ-generated barrier is not porous to a flow of the first or second fluidic medium at the first end and is porous to at least a portion of the flow of the first or the second fluidic medium at a point that is at least 40% of the length of the in situ-generated barrier.

In various embodiments of the method, the method may further include the step of reducing at least a portion of the in situ-generated barrier by application of increased fluidic flow in the flow region, hydrolysis, proteolysis, osmotic change, temperature change of the in situ-generated barrier, or optical illumination. The at least a portion of the in situ-generated barrier may be reduced by reducing a size of the barrier. In various embodiments, when the in situ-generated barrier includes the plurality of in situ-generated modules, the in situ-generated barrier may be at least reduced by removing at least a portion of the plurality of in situ-generated barrier modules. Removing at least a portion of the plurality of the in situ-generated barrier modules may include removing one or any number of the plurality of in situ-generated barrier modules.

In various embodiments of the method, the method may further include mixing the first fluidic medium and the second fluidic medium to an extent dependent upon a location along the microfluidic channel, thereby forming a plurality of differing compositions for each of the first fluidic medium and the second fluidic medium. In some embodiments, the method may further include the step of growing each of the one or more cells in each of the first plurality and the second plurality of sequestration pens clonal in the presence of a differing composition of fluidic medium depending on a location of the one or more cells along the microfluidic channel.

In various embodiments of the method, the method may further include the step of assaying the one or more cells in each sequestration pen of the second plurality of sequestration pens. In various embodiments of the method, the method may further include the step of assaying the new clonal populations in each sequestration pen of the second plurality of sequestration pens.

The assaying step may include flowing in a third fluidic medium into the second side of the channel, where the third fluidic medium includes reagents for assaying the one or more cells in each respective pen of the second plurality of sequestration pens. The reagents for assaying may include one or more of chemical reagents, biological reagents, feeder cells, stimulatory cells, reporter cells, reporter molecules, and beads. The beads may include chemical reagents, biological reagents, stimulatory reagents, or reporter molecules.

In various embodiments, the assaying step may further include identifying at least one cell in the second plurality of sequestration pens having a selected characteristic. In other embodiments, the assaying step may further include identifying at least one new clonal population having the selected characteristic and exporting the new clonal population so identified.

In various embodiments of the method, the method may further include the step of exporting the at least one cell having a selected characteristic s from the microfluidic device. The method may further include exporting the clonal population from the pens of the first plurality of sequestration pens from the microfluidic device. The method may further include the step of exporting cells that do not have the selected characteristic in the second plurality of sequestration pens from the microfluidic device. In various embodiments of the method, the method may further include the step of removing thein situ-generated barrier before exporting a cell.

Prototyping. In another aspect, a method of rapid microfluidic device prototyping is provided, including the steps of: providing the microfluidic device, where the device includes an enclosure including a substrate and a flow region; introducing a first fluidic medium into the enclosure of the microfluidic device; introducing a flowable polymer into the enclosure; selecting at least one area of the enclosure; activating solidification of the polymer at each selected area, such that a pattern of activation results in the formation of an in situ-generated test structure; and testing the in situ-generated test structure for use in manipulating microobjects in the microfluidic device. In some embodiments, when the test structure does not pass the testing, then the test structure may be removed. In some embodiments, at least a portion of the test structure may be removable by application of increased fluidic flow in the flow region, hydrolysis, proteolysis, osmotic change, temperature change to the test structure, or optical illumination. In some embodiments, when the at least a portion of the test structure is removable by temperature change, then temperature change may be performed by optically illuminating a thermal pad on the substrate underlying the in situ-generated test structure. In various embodiments of the method, the method may further include the step of patterning a second in situ-generated test structure having adjusted properties based on a result of the testing step.

For all methods: In various embodiments of any of the methods described herein, the flowable polymer may include a synthetic polymer, a modified synthetic polymer, or a biological polymer. The biological polymer may be light or temperature activatable. The synthetic polymer modifications may include size modification motifs, cleavage motifs, reactive terminal moieties, and/or cell recognition motifs, in any combination. In various embodiments, the polymer may include at least one of a polyethylene glycol, modified polyethylene glycol, polylactic acid (PLA), modified polylactic acid, polyglycolic acid (PGA), modified polyglycolic acid, polyacrylamide (PAM), modified polyacrylamide, poly-N-isopropylacrylamide (PNIPAm), modified poly-N-isopropylacrylamide, polyvinyl alcohol (PVA), modified polyvinyl alcohol, polyacrylic acid (PAA), modified polyacrylic acid, polycaprolactone (PCL), modified polycaprolactone, fibronectin, modified fibronectin, collagen, modified collagen, laminin, modified laminin, polysaccharide, modified polysaccharide, or a co-polymer in any combination. In other embodiments, the polymer may include at least one of a polyethylene glycol, modified polyethylene glycol, polylactic acid (PLA), modified polylactic acid, polyglycolic acid (PGA), modified polyglycolic acid, polyvinyl alcohol (PVA), modified polyvinyl alcohol, polyacrylic acid (PAA), modified polyacrylic acid, polycaprolactone (PCL), modified polycaprolactone, fibronectin, modified fibronectin, collagen, modified collagen, laminin, modified laminin, polysaccharide, modified polysaccharide, or a co-polymer in any combination. In some embodiments, the flowable polymer may include at least one of a polyethylene glycol, modified polyethylene glycol, polylactic acid (PLA), modified polylactic acid, polyglycolic acid (PGA), modified polyglycolic acid, polyvinyl alcohol (PVA), modified polyvinyl alcohol, polyacrylic acid (PAA), modified polyacrylic acid, polycaprolactone (PCL), modified polycaprolactone, fibronectin, modified fibronectin, collagen, modified collagen, laminin, modified laminin, polysaccharide, modified polysaccharide, or a co-polymer in any combination.

For all methods: In various embodiments of any of the methods described herein, the flowable polymer may include a modified polyethylene glycol polymer. In other embodiments, the modified polyethylene glycol polymer may include a star polymer. In some embodiments, the modified polyethylene glycol polymer may include diacrylate moieties. In various embodiments, the modified polyethylene glycol polymer may include photocleavable moieties.

For all methods: In various embodiments of any of the methods described herein, the step of activating solidification of the flowable polymer may include optically illuminating a selected area of the substrate, thereby polymerizing the polymer. Polymerizing the flowable polymer may form a solidified polymer network. The step of activating solidification of the flowable polymer may further include introducing a photoactivatable polymerization initiator.

For all methods: In various embodiments of any of the methods described herein, the step of activating solidification of the flowable polymer may include changing a temperature at a selected area of the substrate, and thereby gelling the polymer. Gelling the flowable polymer may form a solidified polymer network. The step of changing temperature at the selected area of substrate may further include optically illuminating a thermal pad on the substrate.

For all methods: In various embodiments of any of the methods described herein, at least a portion of the in situ-generated isolation structure/isolation modules/barrier/barrier modules may be removable by increasing flow of a fluidic medium through the flow region; introducing a hydrolytic agent into the flow region; introducing a proteolytic agent into the flow region; introducing a fluidic medium into the flow region that increases/decreases an osmolality within the flow region; changing a temperature of the in situ-generated isolation structure; or optically illuminating the isolation structure. In some embodiments when the at least a portion of the in situ-generated isolation structure/isolation modules/barrier/barrier modules is removable by temperature change, then the temperature may be changed by optical illumination of a thermal pad on the substrate underlying the barrier.

For all methods: In various embodiments of any of the methods described herein, the substrate may be configured to generate a dielectrophoretic (DEP) force upon a micro-object in a fluidic medium within the enclosure. The substrate configured to generate the DEP force may be optically actuated. In various embodiments of the method, the substrate may be configured to generate an electro-wetting force on a droplet within the enclosure. The electro-wetting forces may be optically actuated.

For all methods: In various embodiments, at least one inner surface of the enclosure of the microfluidic device may include a conditioned surface. The at least one inner surface may include a surface of the substrate. In some embodiments, substantially all the inner surface of the enclosure may include a conditioned surface. The conditioned surface may be a covalently modified surface. In some embodiments, the covalently modified surface may be hydrophilic. In some embodiments of the method, the method may further include a step of providing a conditioned surface to at least one inner surface of the enclosure. The step of providing a conditioned surface may be performed before introducing any micro-objects, biological cells or a flowable polymer.

Kits. In yet another aspect, a kit is provided, for isolating a micro-object within a microfluidic device, comprising a microfluidic device comprising an enclosure comprising a substrate and a flow region located within the enclosure and a flowable polymer solution, wherein the polymer is capable of polymerization and/or thermally induced gelling. The microfluidic device may be any microfluidic device described herein and may have any combination of features, components and dimensions. The kit may further include a photoactivatable polymerization initiator.

In another aspect, a kit for assaying cells of a clonal population is provided, including a microfluidic device having an enclosure having a substrate; a flow region comprising a channel located within the enclosure; a first plurality of sequestration pens disposed adjacent to each other on a first side of the channel; and a second plurality of sequestration pens disposed adjacent to each other on a second opposing side of the channel, and a flowable polymer solution, wherein the polymer is capable of polymerization and/or thermally induced gelling. In various embodiments, the microfluidic device may further include a barrier separating the first side of the channel from the second side of the channel. The barrier may be an in situ-generated barrier. In various embodiments, the barrier may not be an in situ-generated barrier and may be punctuated by at least one gap aligned between a proximal opening to the channel of the first pen of the first plurality of pens and a proximal opening to the channel of a first pen of the second plurality of pens. This kit including a microfluidic device having a substrate; a flow region comprising a channel located within the enclosure; a first plurality of sequestration pens disposed adjacent to each other on a first side of the channel; and a second plurality of sequestration pens disposed adjacent to each other on a second opposing side of the channel may have any combination of features, components or dimensions for the microfluidic device as described herein.

In various embodiments of any of the kits described herein, the polymer may include a synthetic polymer, a modified synthetic polymer, or a biological polymer. The biological polymer may be light or temperature activatable. The synthetic polymer modifications may include size modification motifs, cleavage motifs, reactive terminal moieties, and/or cell recognition motifs, in any combination. In various embodiments, the polymer may include at least one of a polyethylene glycol, modified polyethylene glycol, polylactic acid (PLA), modified polylactic acid, polyglycolic acid (PGA), modified polyglycolic acid, polyacrylamide (PAM), modified polyacrylamide, poly-N-isopropylacrylamide (PNIPAm), modified poly-N-isopropylacrylamide, polyvinyl alcohol (PVA), modified polyvinyl alcohol, polyacrylic acid (PAA), modified polyacrylic acid, polycaprolactone (PCL), modified polycaprolactone, fibronectin, modified fibronectin, collagen, modified collagen, laminin, modified laminin, polysaccharide, modified polysaccharide, or a co-polymer in any combination. In other embodiments, the polymer may include at least one of a polyethylene glycol, modified polyethylene glycol, polylactic acid (PLA), modified polylactic acid, polyglycolic acid (PGA), modified polyglycolic acid, polyvinyl alcohol (PVA), modified polyvinyl alcohol, polyacrylic acid (PAA), modified polyacrylic acid, polycaprolactone (PCL), modified polycaprolactone, fibronectin, modified fibronectin, collagen, modified collagen, laminin, modified laminin, polysaccharide, modified polysaccharide, or a co-polymer in any combination. In some embodiments, the flowable polymer may include at least one of a polyethylene glycol, modified polyethylene glycol, polylactic acid (PLA), modified polylactic acid, polyglycolic acid (PGA), modified polyglycolic acid, polyvinyl alcohol (PVA), modified polyvinyl alcohol, polyacrylic acid (PAA), modified polyacrylic acid, polycaprolactone (PCL), modified polycaprolactone, fibronectin, modified fibronectin, collagen, modified collagen, laminin, modified laminin, polysaccharide, modified polysaccharide, or a co-polymer in any combination.

In various embodiments of any of the kits described herein, the flowable polymer may include a modified polyethylene glycol polymer. In other embodiments, the modified polyethylene glycol polymer may include a star polymer. In some embodiments, the modified polyethylene glycol polymer may include diacrylate moieties. In various embodiments, the modified polyethylene glycol polymer may include photocleavable moieties.

In various embodiments of any of the kits described herein, the kit may further include a reagent configured to covalently modify at least one internal surface of the microfluidic device, which may produce any covalently modified internal surface as described herein. The various components of the kit may be packaged in separate containers.

EXPERIMENTAL

System and Microfluidic device: System and Microfluidic device: Manufactured by Berkeley Lights, Inc. The system included at least a flow controller, temperature controller, fluidic medium conditioning and pump component, light source for light activated DEP configurations, microfluidic device, mounting stage, and a camera. The sequestration pens have a volume of about $2 \times 10^7$ cubic microns.

Priming procedure: 250 microliters of 100% carbon dioxide was flowed in at a rate of 3 microliters/sec. This was followed by 250 microliters of PBS, flowed in at 3 microliters per second. The final step of priming included 250 microliters of culture medium containing 0.1% Pluronic® F27 (Life Technologies® Cat #P6866), flowed in at 3 microliters/sec.

Example 1. Installation of Isolation Structures Across Several Pens

Hydrogel preparation: A prepolymer solution was made combining polyethylene glycol diacrylate (PEGDA), 5 kDa (Laysan Bio, Cat. #ACRL-PEG_ACRL-5000-1g), 10% w/v, and 1.2% w/v IGRACURE® 2959 (Ciba®, Sigma Aldrich Cat. #410896) photoinitiator in Dulbecco's phosphate buffer saline.

Culture medium: Hybridoma-SFM (Life Technologies, Cat. #12045-076); 10% Fetal Bovine Serum; 1% Penicillin-streptomycin (100000 U/mL, Life Technologies Cat #15140-163); 1 mM MEM Non-Essential Amino Acid (Life Technologies Cat #10370-088); 2 mM GlutaMAX (Life Technologies Cat #35050-079); 1 mM Sodium Pyruvate (Life Technologies Cat #11360-070).

The microfluidic device was primed according to the general procedure above. Culture medium was then flowed in for 5 minutes. Cells were loaded into the microfluidic device and then introduced into the sequestration pens using gravity.

Prepolymer solution (60 microliters) was flowed into the microfluidic device at 2 microliter/sec and allowed to exchange with media present within the sequestration pens for 5 minutes. Photoinitiated polymerization of selected regions (25×600 microns) within the channel, just above selected sequestration pens containing cells, was performed using 100 microW at 340 nm +/±20 nm, introducing isolation structures over the openings of several pens, for 7.5 sec. After completion of photopolymerization, culture medium was perfused at 1 microliter/sec for 10 minutes to remove remaining prepolymer from the sequestration pens and flow channel. FIG. 5A shows a brightfield image of the region where an isolation structure 520 was introduced. The solidified polymer network 520 is not visible under this illumination but cells 530 are clearly present in pens isolated by the isolation structure.

The entire microfluidic device was then maintained over 2 days with continued perfusion of media at 0.02 microliters/sec. At the end of the culturing period, the sequestration pens having an isolation structure preventing exit of cells within the pens was visualized again, using a FITC overlay to the brightfield illumination, which is shown in FIG. 5B. Under this illumination condition, the isolation structure 520 was clearly visible. The isolation structure prevented any cells in the pens from exiting. The cells 530 in the sequestration pens were still viable and demonstrated the continued ability to grow and divide.

Example 2. Introduction and Removal of Photocleavable Hydrogel Barriers Within a Microfluidic Device A photocleavable PEG diacrylate having a structure of Formula 1 was synthesized.

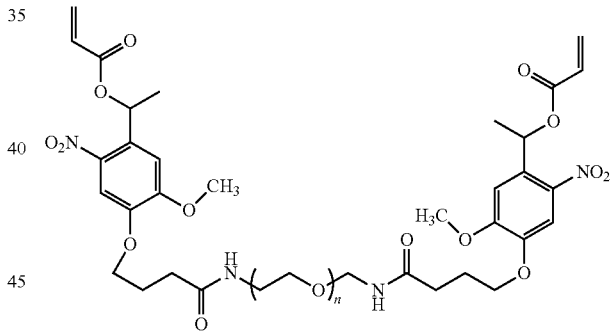

Formula I

The synthesis protocol of Kloxin et al. (Kloxin, A. M.; Tibbitt, M. W.; Anseth, K. S. Synthesis of photodegradable hydrogels as dynamically tunable cell culture platforms. Nat. Protoc. 2010, 5 (12), 1867-1887) was used to synthesize the compound of Formula I, with modifications to more rigorously exclude oxygen. Preparation and handling of solutions of the photocleavable PEG diacrylate was performed under low light conditions for all experiments. The reaction product was used as is for all procedures.

Prepolymer solution: The prepolymer solution was prepared using 7.5% w/v PEG diacrylate $M_n$700 (Sigma Aldrich Cat. #455008), 3.5% w/v photodegradable PEG diacryrlate (Formula I); and 1% v/v H-NU 605 IL photoinitiator (Spectra group Ltd) in phosphate buffered saline/deionized water (1:3 ratio).

Introduction of barriers: A microfluidic device having sequestration pens as above was primed prior to introduction of the prepolymer solution. The prepolymer solution was flowed in and allowed to diffuse into the sequestration pens from the flow channel. Introduction of precisely and selectively placed in situ-generated barriers was performed using exposure to 458 nm illumination (458 filtered visible light), with a power of approximately 4.5 nW/cm$^2$. As shown in FIG. 21A, increasing exposure times produced increasingly dense in situ-generated barriers, blocking portions of the connection region of the selected pens and extending into the flow channel. In situ-generated barriers 2120-2128, from left to right of FIG. 21A, have the following exposure times:

TABLE 1

Exposure times for in situ-generated barriers.

| 2120 | 2121 | 2122 | 2123 | 2124 | 2125 | 2126 | 2127 |
|---|---|---|---|---|---|---|---|
| 10 sec | 15 sec | 30 sec | 45 sec | 60 sec | 90 sec | 120 sec | 180 sec |

Gels sufficiently formed to prevent cells from exiting the pen were observed for all timepoints greater than 10 sec exposure. Gels formed with approximately 60 sec of exposure were very dense.

Removal of barriers: Barriers formed as above with in a microfluidic device, and stored overnight at 4 C, were exposed to illumination from an Omnicure Series 2000 lamp having a 383 short pass filter installed, for two minute exposures. As shown in FIGS. 21B and 21C, a barrier formed using a 30 sec exposure (e.g., barriers 2128 (Control) and 2129), was completely degraded using the 2 minute exposure (2129", no barrier remaining), while control barrier 2128 still remained. Increasingly dense barriers were removable upon longer exposure (data not shown).

Example 3. Introduction of Photocleavable Hydrogel Barriers in Presence of Cells Cells. OKT3 mouse myeloma (ATCC®, CRL-8001™).

Culture medium. IMDM (LifeTech™, 12440-061), 20% FBS (Seradigm), 10000 U/ml penicillin-streptomycin (LifeTech™, 15140-163).

Cell penning. OKT3 cells were introduced into a primed microfluidic device and placed into sequestration pens using optically actuated dielectrophoresis forces (optoelectronic tweezers (OET)), 5 volts applied field, moving at 8 microns/sec. The device was kept at 37° C. until the start of prepolymer introduction. The microfluidic device was flushed ×3 with culture medium (250 microliters at 3 microliters/sec).

Prepolymer solution preparation. All photosensitive compounds prepared in low light conditions. 160 microliters of prepolymer hydrogel solution was prepared to a final concentration of 3.75% w/v Ac star PEG star solid (4 arm PEG acrylate (10 k MW) from Laysan Bio (#4arm-PEG-ACRYL-10 k-1g), 1.25% w/v photodegradable PEG diacrylate (Formula I, synthesized as described above in Example 2); and 1% v/v H-NU 605 IL photoinitiator (Spectra group Ltd) in culture medium containing 0.1% Pluronic® F27 (Life Technologies® Cat #P6866).

A solution of H-NU 605 IL photoinitiator at 1% v/v in culture medium containing 0.1% Pluronic® F27 (Life Technologies® Cat #P6866) was made by vortexing and warming at 35° C. until fully solubilized.

Introducing in situ-generated barriers for isolation of selected cells. In low light conditions a primed microfluidic device was loaded with 140 microliters prepolymer solution at 0.05 microliter/sec. This rate allowed diffusion of prepolymer into pens of the microfluidic device. After loading the prepolymer, a 60 sec or 120 sec exposure to UV light (Omnicure® Series 2000, Lumen Dynamics) was used to initiate polymer solidification at the top of selected pens containing cells.

After solidification was initiated, a set of rinses with culture medium containing 0.1% Pluronic® F27 (Life Technologies® Cat #P6866) were used to remove excess soluble polymers and initiator in the channel of the microfluidic device, including 1×250 microliters at 3 microliters/sec at room temperature; 3×250 microliters at 3 microliters/sec at 37° C. The photograph of FIG. 22 was taken at this timepoint.

As depicted in FIG. 22, in situ-generated isolation structures were installed specifically and selectively at sequestration pen openings, without disrupting cell membranes. Some cells are highlighted in white circles within the isolated sequestration pens.

Recitation of some embodiments of the microfluidic devices, methods and kits.

1. A microfluidic device including: an enclosure including: a substrate; a flow region located within the enclosure; and at least one in situ-generated isolation structure disposed on the substrate, wherein the at least one in situ-generated structure includes a solidified polymer network.

2. The microfluidic device of embodiment 1, wherein the solidified polymer network includes a photoinitiated polymer.

3. The microfluidic device of embodiment 1 or 2, wherein the solidified polymer network does not include a silicone polymer.

4. The microfluidic device any one of embodiments 1 to 3, wherein all or at least part of the at least one in situ-generated isolation structure consists of the solidified polymer network.

5. The microfluidic device of any one of embodiments 1-4, wherein the solidified polymer network includes a thermosensitive polymer.

6. The microfluidic device of embodiment 5, wherein the device further includes a thermal pad disposed on the substrate at a location beneath the at least one in situ-generated isolation structure.

7. The microfluidic device of any one of embodiments 1 to 6, wherein the device further includes at least one sequestration pen.

8. The microfluidic device of embodiment 7, wherein the at least one sequestration pen includes an isolation region and a connection region, the connection region having a proximal opening to the flow region and a distal opening to the isolation region.

9. The microfluidic device of embodiment 8, wherein the proximal opening of the sequestration pen to the flow region is oriented substantially parallel to a flow of fluidic medium in the flow region.

10. The microfluidic device of any one of embodiments 1 to 9, wherein the flow region includes a microfluidic channel.

11. The microfluidic device of any one of embodiments 1 to 10, wherein the device includes a plurality of sequestration pens.

12. The microfluidic device of embodiment 11, wherein the flow region includes a microfluidic channel, and wherein the plurality of sequestration pens is aligned in a row, with each sequestration pen of the plurality opening off a common side of the microfluidic channel.

13. The device of any one of embodiments 1-12, wherein the in situ-generated isolation structure is porous to a flow of fluidic medium.

14. The microfluidic device of any one of embodiments 1-13, wherein the in situ-generated isolation structure is configured to retain one or more of a plurality of micro-objects.

15. The microfluidic device of any one of embodiments 1-14, wherein the at least one in situ-generated isolation structure includes a plurality of in situ-generated isolation modules disposed in the flow region, wherein the in situ-generated isolation modules of the plurality are configured to substantially restrict passage of micro-objects into, out of, and/or through the at least one isolation structure in a size dependent manner.

16. The microfluidic device of embodiment 15, wherein each in situ-generated isolation module of the plurality is spaced apart from the other in situ-generated isolation modules of the plurality such that micro-objects having a diameter of 5 microns or greater are substantially prevented from passing into, out of, and/or through the at least one in situ-generated isolation structure.

17. The microfluidic device of embodiment 16, wherein the in situ-generated isolation modules of the plurality are configured to allow a first type of biological micro-object to pass into, out of, and/or through the at least one isolation structure and substantially prevent a second type of biological micro-object from passing into, out of, and/or through the at least one isolation structure.

18. The microfluidic device of any one of embodiments 1-17, wherein the microfluidic device further includes a plurality of in situ-generated isolation structures.

19. A microfluidic device including: an enclosure including: a flow region including a microfluidic channel; a sequestration pen, wherein the sequestration pen opens off of the microfluidic channel; and an in situ-generated isolation structure comprising an in situ-generated barrier disposed on the substrate, the in situ-generated barrier including a solidified polymer network.

20. The microfluidic device of embodiment 19, wherein the solidified polymer network includes a photoinitiated polymer.

21. The microfluidic device of embodiment 19 or 20, wherein the solidified polymer network does not include a silicone polymer.

22. The microfluidic device of any one of embodiments 19 to 21, wherein the in situ-generated barrier at least partially blocks the microfluidic channel and/or the sequestration pen.

23. The microfluidic device of any one of embodiments 19 to 22, wherein the in situ-generated barrier is disposed within the connection region of the sequestration pen.

24. The microfluidic device of embodiment 23, wherein the in situ-generated barrier has a width that extends across at least part of a width $W_{con}$ of the connection region, and wherein the in situ-generated barrier is configured to substantially block entry and/or exit of at least one micro-object into and/or from the sequestration pen.

25. The microfluidic device of embodiment 24, wherein the width of the in situ-generated barrier is about 5 microns to about 20 microns.

26. The microfluidic device of any one of embodiments 23 to 25, wherein a portion of the in situ-generated barrier extends from the connection region into the microfluidic channel.

27. The microfluidic device of embodiment 26, wherein the portion of the in situ-generated barrier extending into the channel includes less than 50% of a volume of the barrier.

28. The microfluidic device of any one of embodiments 19 to 27, wherein the in situ-generated barrier is disposed in the channel.

29. The microfluidic device of embodiment 28, wherein the in situ-generated barrier is located adjacent to one edge of the proximal opening of the sequestration pen.

30. The microfluidic device of embodiment 28 or 29 further including a plurality of sequestration pens, wherein the plurality of sequestration pens form a row, and wherein the in situ-generated barrier is located adjacent to a distal edge of the proximal opening of a sequestration pen located at the end of the row of sequestration pens.

31. The microfluidic device of any one of embodiments 28 to 30, wherein the barrier prevents at least one subset of a plurality of micro-objects from moving past the in situ-generated barrier in the channel, wherein the plurality of micro-objects have a diameter in a range from 1 micron to 20 microns.

32. The microfluidic device of embodiment 31, wherein the in situ-generated barrier includes a plurality of in situ-generated barrier modules disposed on the substrate in the channel.

33. The microfluidic device of any one of embodiments 19 to 32, wherein the in situ-generated barrier is porous to a flow of fluidic medium.

34. The microfluidic device of embodiment 28 or 29 further including a plurality of sequestration pens, wherein the plurality of sequestration pens form a row, and wherein the in situ-generated barrier is disposed adjacent to an edge of the proximal opening of a selected sequestration pen of row of sequestration pens.

35. The microfluidic device of any one of embodiments 19 to 28 further including a plurality of sequestration pens, wherein the plurality of sequestration pens form a row, and wherein the in situ-generated barrier blocks the proximal openings of at least two contiguous sequestration pens.

36. The microfluidic device of any one of embodiments 19 to 21, further including: a first plurality of sequestration pens disposed in a row, wherein each sequestration pen of the first plurality opens off a first side of the microfluidic channel; and a second plurality of sequestration pens disposed in a row, wherein each sequestration pen of the second plurality opens off a second opposing side of the microfluidic channel, wherein the in situ-generated barrier is disposed along a length of the microfluidic channel, dividing the microfluidic channel into a first sub-channel configured to provide a first sub-flow of fluidic medium past the first plurality of sequestration pens and a second sub-channel configured to provide a second sub-flow of fluidic medium past the second plurality of sequestration pens, wherein the in situ-generated barrier prevents cells from moving from the first sub-channel to the second sub-channel, and vice versa.

37. The microfluidic device of embodiment 36, wherein the in situ-generated barrier includes a plurality of in situ-generated barrier modules.

38. The microfluidic device of embodiment 37, wherein the in situ-generated barrier modules are configured to fill one or more gaps in a barrier that is not in situ-generated.

39. The microfluidic device of any one of embodiments 36 to 38, wherein the in situ-generated barrier is porous to a flow of fluidic medium.

40. The microfluidic device of any one of embodiments 36 to 39, wherein the first side of the microfluidic channel is configured to receive a first fluidic medium, and the second side of the microfluidic channel is configured to receive a second fluidic medium.

41. The microfluidic device of any one of embodiments 36 to 40, wherein the in situ-generated barrier prevents a micro-object having a diameter greater than 1 μm from moving from the first side of the microfluidic channel to the second side of the microfluidic channel, or vice versa.

42. The microfluidic device of any one of embodiments 1-41, wherein the solidified polymer network includes a synthetic polymer, a modified synthetic polymer, or a biological polymer.

43. The microfluidic device of embodiment 42, wherein the synthetic polymer modifications include size modification motifs, cleavage motifs, reactive terminal moieties, or cell recognition motifs.

44. The microfluidic device of any one of embodiments 1 to 43, wherein the solidified polymer network includes at least one of a polyethylene glycol, modified polyethylene glycol, polylactic acid (PLA), modified polylactic acid, polyglycolic acid (PGA), modified polyglycolic acid, polyacrylamide (PAM), modified polyacrylamide, poly-N-isopropylacrylamide (PNIPAm), modified poly-N-isopropylacrylamide, polyvinyl alcohol (PVA), modified polyvinyl alcohol, polyacrylic acid (PAA), modified polyacrylic acid, polycaprolactone (PCL), modified polycaprolactone, fibronectin, modified fibronectin, collagen, modified collagen, laminin, modified laminin, polysaccharide, modified polysaccharide, or a co-polymer in any combination.

46. The microfluidic device of any one of embodiments 1 to 45, wherein the solidified polymer network includes at least one of a polyethylene glycol, modified polyethylene glycol, polylactic acid (PLA), modified polylactic acid, polyglycolic acid (PGA), modified polyglycolic acid, polyvinyl alcohol (PVA), modified polyvinyl alcohol, polyacrylic acid (PAA), modified polyacrylic acid, polycaprolactone (PCL), modified polycaprolactone, fibronectin, modified fibronectin, collagen, modified collagen, laminin, modified laminin, polysaccharide, modified polysaccharide, or a co-polymer in any combination.

47. The microfluidic device of any one of embodiments 1-46, wherein the solidified polymer network includes a modified polyethylene glycol polymer.

48. The microfluidic device of embodiment 47, wherein the modified polyethylene glycol polymer includes a star polymer.

49. The microfluidic device of embodiment 47 or 48, wherein the modified polyethylene glycol polymer includes diacrylate moieties.

50. The microfluidic device of any one of embodiments 47 to 49, wherein the modified polyethylene glycol polymer includes photocleavable moieties.

51. The microfluidic device of any one of embodiments 42 to 50, wherein the solidified polymer network is susceptible to degradation by hydrolysis, proteolysis, osmotic change, temperature change or optical illumination.

52. The microfluidic device of any one of embodiments 42 to 51, wherein the solidified polymer network is susceptible to displacement by increased fluidic flow.

53. The microfluidic device of any one of embodiments 1 to 52, wherein at least one inner surface of the enclosure includes a conditioned surface.

54. The microfluidic device of embodiment 53, wherein the at least one inner surface includes a surface of the substrate.

55. The microfluidic device of embodiment 53 or 54, wherein the conditioned surface is a covalently modified surface.

56. The microfluidic device of embodiment 55, wherein the covalently modified surface is hydrophilic.

57. The microfluidic device of any one of embodiments 1-56, wherein the substrate is configured to generate dielectrophoresis (DEP) forces within the enclosure.

58. The microfluidic device of embodiment 57, wherein the DEP forces are optically actuated.

59. The microfluidic device of any one of embodiments 1 to 59, wherein a cover of the microfluidic device is transparent.

60. A method of isolating a micro-object in a microfluidic device, including the steps of: introducing a first fluidic medium including a plurality of micro-objects into an enclosure of the microfluidic device, the enclosure including a substrate and a flow region; introducing a solution including a flowable polymer into the enclosure; activating solidification of the flowable polymer at at least one selected area of the flow region, thereby forming an in situ-generated isolation structure; and isolating at least one of the plurality of micro-objects with the in situ-generated isolation structure.

61. The method of embodiment 60, wherein the step of introducing a solution including a flowable polymer is performed before the step of introducing the first fluidic medium including the plurality of micro-objects 62. The method of embodiment 61 wherein the step of initiating solidification of the flowable polymer includes optically illuminating the at least one selected area of the flow region, and further wherein the step of solidification of the flowable polymer includes polymerizing polymers of the flowable polymer to form a polymer network.

63. The method of any one of embodiments 60 to 62, wherein the step of introducing a flowable polymer further includes introducing a photoactivatable polymerization initiator.

64. The method of any one of embodiments 60 to 62, wherein the step of initiating solidification of the flowable polymer includes changing a temperature at the at least one selected area of the substrate, and further wherein the step of solidification of the polymer includes gelling the polymer to form a polymer network.

65. The method of any one of embodiments 60 to 64, further including processing a remainder of the plurality of micro-objects.

66. The method of any one of embodiments 60 to 65, further including exporting a remainder of the plurality of micro-objects from the microfluidic device.

67. The method of any one of embodiments 60 to 66, wherein the at least one micro-object isolated by the in situ-generated isolation structure is a selected portion of the plurality of micro-objects.

68. The method of any one of embodiments 60 to 67, further including the step of: reducing or removing the in situ-generated isolation structure by: increasing flow of a fluidic medium through the flow region; introducing a hydrolytic agent into the flow region; introducing a proteolytic agent into the flow region; introducing a fluidic medium into the flow region that increases/decreases an osmolality within the flow region; changing a temperature of the in situ-generated isolation structure; or optically illuminating the isolation structure, and thereby releasing the at least one micro-object from the in situ-generated isolation structure.

69. The method of embodiment 68, wherein the step of changing the temperature further includes optically illuminating a thermal pad on the substrate adjacent to or under the in situ-generated isolation structure.

70. The method of embodiment 68 or 69, further including the step of exporting the at least one released micro-object from the microfluidic device.

71. The method of any one of embodiments 60 to 70, wherein the in situ-generated isolation structure is at least partially porous to a flow of a fluidic medium.

72. The method of any one of embodiments 60 to 71, wherein the step of activating solidification of the flowable polymer includes forming an in situ-generated isolation structure comprising an in situ-generated barrier configured to prevent passage of the at least one micro-object into, out of, or through the in situ-generated isolation structure.

73. The method of any one of embodiments 60 to 72, wherein the step of activating solidification of the flowable polymer includes forming a plurality of in situ-generated barriers configured to prevent passage of sub-sets of the plurality of micro-objects into, out of, or through the in situ-generated isolation structure.

74. The method of embodiment 73, further including the step of reducing or removing one or more of the plurality of in situ-generated barriers by: increasing flow of a fluidic medium through the flow region; introducing a hydrolytic agent into the flow region; introducing a proteolytic agent into the flow region; introducing a fluidic medium into the flow region that increases/decreases an osmolality within the flow region; changing a temperature of the in situ-generated barriers; or optically illuminating the in situ-generated barriers, and thereby releasing one or more sub-sets of the at least one micro-object from the in situ-generated isolation structure.

75. The method of embodiment 74, wherein the step of reducing or removing one or more of the in situ-generated barriers includes optically illuminating the in situ-generated barrier.

76. The method of embodiment 74, wherein the step of changing the temperature of the one or more in situ-generated barriers further includes optically illuminating a thermal pad on the substrate adjacent or under the one or more in situ-generated barriers.

77. The method of any one of embodiment 74 to 76, further including the step of exporting the one or more sub-sets of the at least one released micro-object from the microfluidic device.

78. The method of any one of embodiments 72 to 77, wherein the step of activating solidification further includes forming an in situ-generated isolation structure comprising an in situ-generated barrier including a plurality of in situ-generated barrier modules, each of the plurality of in situ-generated barrier modules spaced apart from each other at a distance preventing the at least one micro-object from passing through the in situ-generated isolation structure.

79. The method of embodiment 78, further including the step of spacing the plurality of in situ-generated barrier modules apart from each other thereby preventing at least one subset of micro-objects of the plurality of micro-objects from passing through the in situ-generated isolation structure.

80. The method of embodiment 79, wherein the at least one subset of micro-objects includes at least one type of biological cell.

81. The method of any one of embodiments 60-80, wherein the enclosure of the microfluidic device further includes at least one sequestration pen including an isolation region and a connection region, the connection region having a proximal opening to the flow region and a distal opening to the isolation region.

82. The method of embodiment 81, wherein the enclosure includes a plurality of sequestration pens.

83. The method of embodiment 82, wherein the plurality of sequestration pens is disposed in a row, and the proximal opening of each of the plurality of sequestration pens are disposed contiguously to each other.

84. The method of embodiment 82 or 83, wherein the flow region includes a microfluidic channel and the proximal opening of each of the plurality of sequestration pens opens off of one side of the microfluidic channel.

85. The method of any one of embodiments 81 to 84, wherein the step of activating solidification is performed inside a sequestration pen.

86. The method of embodiment 85, wherein the step of activation of solidification is performed within the isolation region or the connection region.

87. The method of embodiment 85 or 86, wherein the step of activating solidification of the flowable polymer generates an in situ-generated isolation structure including an in situ-generated barrier in the connection region.

88. The method of any one of embodiments 81 to 87, further including the step of processing a remainder of the plurality of micro-objects not isolated by the in situ-generated barrier.

89. The method of any one of embodiments 81 to 87, further including the step of exporting a remainder of the plurality of micro-objects not isolated by the in situ-generated barrier from the microfluidic device.

90. The method of embodiment 89, further including the step of reducing or removing the in situ-generated barrier by increasing flow of a fluidic medium through the flow region, introducing a hydrolytic agent into the flow region, introducing a proteolytic agent into the flow region, introducing a fluidic medium into the flow region that increases or decreases an osmolality of the fluidic medium, changing a temperature of the in situ-generated barrier, or optically illuminating the barrier, thereby releasing the at least one micro-object from isolation.

91. The method of embodiment 90, wherein the step of reducing or removing the in situ-generated barrier includes optically illuminating the in situ-generated barrier.

92. The method of embodiment 90, wherein changing temperature further includes optically illuminating a thermal pad on the substrate adjacent or under the in situ-generated barrier.

93. The method of any one of embodiments 90 to 92, further including a step of exporting the at least one micro-object from the microfluidic device.

94. The method of embodiment 84, wherein the step of activating solidification of the flowable polymer forms an in situ-generated isolation structure including an in situ-generated barrier in the channel.

95. The method of embodiment 94, wherein the step of activating solidification of the flowable polymer disposes the in situ-generated barrier at a proximal opening of at least one sequestration pen of the plurality of sequestration pens.

96. The method of embodiment 94 or 95, wherein the step of activating solidification of the flowable polymer forms an in situ-generated barrier sized to block the proximal openings of at least two contiguous sequestration pens.

97. The method of embodiment 96, further including a step of exporting a remainder of the plurality of micro-objects not isolated by the in situ-generated barrier from the microfluidic device.

98. The method of embodiment 94, wherein the microfluidic device further includes a second plurality of sequestration pens disposed adjacent to each other such that each sequestration pen opens off a second side of the microfluidic channel; and the step of activating solidification of the flowable polymer further includes activating solidification of the flowable polymer along a length of the microfluidic channel, thereby forming an in situ-generated isolation structure comprising an in situ-generated barrier dividing the microfluidic channel into a first sub-channel configured to provide a first sub-flow of a fluidic medium past the first plurality of sequestration pens and a second sub-channel configured to provide a second sub-flow of fluidic medium past the second plurality of pens, wherein the in situ-generated barrier prevents micro-objects from moving from the first sub-channel to the second sub-channel, and vice versa.

99. The method of embodiment 98, wherein the microfluidic device further includes a barrier dividing the microfluidic channel into a first sub-channel configured to provide a first sub-flow of a fluidic medium past the first plurality of sequestration pens and a second sub-channel configured to provide a second sub-flow of fluidic medium past the second plurality of pens, the barrier punctuated by at least one gap aligned with a proximal opening to the first sub-channel of a first sequestration pen of the first plurality of sequestration pens and aligned with a proximal opening to a proximal opening to the second sub-channel of a first pen of the second plurality of sequestration pens; and further wherein the step of activating polymerization includes activating polymerization at the at least one gap to form at least one in situ-generated barrier in the at least one gap, thereby preventing micro-objects from moving from the first sub-channel to the second sub-channel, and vice versa.

100. The method of embodiment 98 or 99, wherein the step of introducing the plurality of micro-objects further includes introducing a clonal population of cells in each of the sequestration pens of the first plurality of sequestration pens; and, for each clonal population of cells in the first plurality of sequestration pens, moving at least one cell to a respective sequestration pen of the second plurality of pens.

101. The method of embodiment 100, wherein when the microfluidic device includes the barrier punctuated by at least one gap, the step of moving the at least one cell of each clonal population in the first plurality of sequestration pens includes moving the at least one cell to the respective sequestration pen of the second plurality of pens through the at least one gap.

102. The method of embodiment 100 or 101, wherein the method further includes a step of processing the cell(s) in the second plurality of sequestration pens.

103. The method of any one of embodiments 60 to 102, wherein the flowable polymer includes a synthetic polymer, a modified synthetic polymer, or a biological polymer.

104. The method of embodiment 103, wherein the synthetic polymer modifications include size modification motifs, cleavage motifs, reactive terminal moieties, or cell recognition motifs.

105. The method of any one of embodiments 60 to 104, wherein the flowable polymer includes at least one of a polyethylene glycol, modified polyethylene glycol, polylactic acid (PLA), modified polylactic acid, polyglycolic acid (PGA), modified polyglycolic acid, polyacrylamide (PAM), modified polyacrylamide, poly-N-isopropylacrylamide (PNIPAm), modified poly-N-isopropylacrylamide, polyvinyl alcohol (PVA), modified polyvinyl alcohol, polyacrylic acid (PAA), modified polyacrylic acid, polycaprolactone (PCL), modified polycaprolactone, fibronectin, modified fibronectin, collagen, modified collagen, laminin, modified laminin, polysaccharide, modified polysaccharide, or a co-polymer in any combination.

106. The method of any one of embodiments 60 to 105, wherein the flowable polymer includes at least one of a polyethylene glycol, modified polyethylene glycol, polylactic acid (PLA), modified polylactic acid, polyglycolic acid (PGA), modified polyglycolic acid, polyvinyl alcohol (PVA), modified polyvinyl alcohol, polyacrylic acid (PAA), modified polyacrylic acid, polycaprolactone (PCL), modified polycaprolactone, fibronectin, modified fibronectin, collagen, modified collagen, laminin, modified laminin, polysaccharide, modified polysaccharide, or a co-polymer in any combination.

107. The method of any one of embodiments 60 to 106, wherein the solidified polymer network includes a modified polyethylene glycol polymer.

108. The method of embodiment 107, wherein the modified polyethylene glycol polymer includes a star polymer.

109. The method of embodiment 107 or 108, wherein the modified polyethylene glycol polymer includes diacrylate moieties.

110. The method of any one of embodiments 107 to 109, wherein the modified polyethylene glycol polymer includes photocleavable moieties.

111. The method of any one of embodiments 60 to 110, wherein at least one inner surface of the enclosure includes a conditioned surface.

112. The method of embodiment 111, wherein the at least one inner surface includes a surface of the substrate.

113. The method of any one of embodiments 110 to 112, wherein the conditioned surface is a covalently modified surface.

114. The method of embodiment 113, wherein the covalently modified surface is hydrophilic.

115. The method of any one of embodiments 60 to 114, wherein the step of introducing the plurality of micro-objects further includes using dielectrophoresis (DEP) forces.

116. The method of any one of embodiments 66 to 115, wherein the step of exporting one or more micro-objects of the plurality of micro-objects further includes using dielectrophoresis (DEP) forces.

117. The method of embodiment 115 or 116, further including optically actuating the DEP forces.

118. A method of assaying a cell of a clonal population in a microfluidic device, the method including the steps of: introducing a first fluidic medium including a plurality of cells into an enclosure of the microfluidic device, the enclosure including: a substrate; a flow region including a microfluidic channel configured to contain a fluidic medium; a first plurality of sequestration pens disposed adjacent to each other such that each sequestration pen of the first plurality opens off a first side of the microfluidic channel; and a second plurality of sequestration pens disposed adjacent to each other such that each sequestration pen of the second plurality opens off a second opposing side of the microfluidic channel; flowing the first fluidic medium and the plurality of cells into the channel of the microfluidic device; introducing a clonal population of cells in each of the sequestration pens of the first plurality of sequestration pens; for each clonal population of cells in the first plurality of sequestration pens, moving at least one cell to a respective sequestration pen of the second plurality of sequestration pens; introducing a flowable polymer into the channel; activating solidification of the flowable polymer along a length of the microfluidic channel, thereby forming an in situ-generated barrier dividing the microfluidic channel into a first sub-channel configured to provide a first sub-flow of fluidic medium past the first plurality of sequestration pens and a second sub-channel configured to provide a second sub-flow of fluidic medium past the second plurality of sequestration pens, wherein the in situ-generated barrier prevents cells from moving from the first sub-channel to the second sub-channel, and vice versa; flowing a second fluidic medium into the second sub-channel, wherein the second fluidic medium includes reagents for assaying the cells in the second plurality of sequestration pens; and, assaying the cell(s) in each sequestration pen of the second plurality.

119. The method of embodiment 118, wherein the in situ-generated barrier has a length from a first end of the channel to a second end of the microfluidic channel.

120. The method of embodiment 118 or 119, wherein each sequestration pen of the first plurality of sequestration pens and of the second plurality of sequestration pens has a proximal opening to its respective side of the microfluidic channel.

121. The method of any one of embodiments 118 to 120, wherein the step of introducing the clonal population includes introducing a single cell to each of the first plurality of sequestration pens, and further includes expanding the single cell to a clonal population of cells.

122. The method of embodiment 121 further including flowing fluidic medium in the first sub-channel and flowing fluidic medium in the second sub-channel to respective first and second outputs of the microfluidic device.

123. The method of any one of embodiments 118 to 122, wherein the step of assaying includes preparing the cells in the second plurality of sequestration pens for genotyping.

124. The method of any one of embodiments 118 to 123, wherein the step of assaying includes determining a level of production of a biological product by the cell(s) in each sequestration pen of the second plurality and/or by the clonal population in each sequestration pen of the first plurality.

125. The method of any one of embodiments 118 to 124, wherein the in situ-generated barrier prevents the first sub-flow of fluidic medium in the first sub-channel from mixing with the second sub-flow of fluidic medium in the second sub-channel.

126. The method of any one of embodiments 118 to 125, wherein the reagents for assaying include one or more of the group including chemical reagents, biological reagents, feeder cells, stimulatory cells, reporter cells, reporter molecules, and beads.

127. The method of embodiment 126 wherein the beads include chemical reagents, biological reagents, stimulatory reagents, or reporter molecules.

128. The method of any one of embodiments 118 to 127, wherein the assaying step further includes identifying at least one cell of the cells in the second plurality of sequestration pens, the at least one cell including a selected characteristic.

129. The method of any one of embodiments 118 to 128, further including a step of exporting at least one cell of the cells in the second plurality of sequestration pens, wherein the at least one cell includes a selected characteristic.

130. The method of embodiment 128 or 129, further including a step of exporting the respective clonal population from the respective pen of the first plurality of sequestration pens.

131. The method of any one of embodiments 118 to 130, further including a step of exporting the cells in the second plurality of sequestration pens and/or clonal populations of cells in the first plurality of sequestration pens that do not include a selected characteristic.

132. The method of any one of claims 129 to 131, further including the step of removing the in situ-generated barrier before exporting a cell.

133. The method of any one of embodiments 118 to 132, wherein the step of activating solidification the polymer includes optically illuminating a selected area of the substrate, thereby polymerizing the polymer.

134. The method of embodiment 133, wherein the step of activating solidification of the flowable polymer further includes introducing a photoactivatable polymerization initiator.

135. The method of any one of embodiments 118 to 134, wherein the step of activating solidification of the flowable polymer along a length of the microfluidic channel includes activating solidification of the flowable polymer at gaps of a barrier extending from a first end of the microfluidic channel to a second end of the microfluidic channel, the barrier separating the microfluidic channel into the first sub-channel and the second sub-channel, wherein the gaps are aligned with the proximal opening of each pen of the first plurality of sequestration pens and the proximal opening of the respective pen of the second plurality of sequestration pens, thereby forming an in situ-generated barrier preventing cells from moving from the first sub-channel to the second sub-channel, and vice versa.

136. The method of any one of embodiments 118 to 130, wherein the step of activating solidification of the polymer includes changing a temperature at a selected area of the substrate, and thereby gelling the polymer.

137. The method of any one of embodiments 118 to 136, wherein the flowable polymer includes a synthetic polymer, a modified synthetic polymer, or a biological polymer.

138. The method of embodiment 137, wherein the synthetic polymer modifications include size modification motifs, cleavage motifs, reactive terminal moieties, and/or cell recognition motifs.

139. The method of any one of embodiments 118 to 138, wherein the flowable polymer includes at least one of a polyethylene glycol, modified polyethylene glycol, polylactic acid (PLA), modified polylactic acid, polyglycolic acid (PGA), modified polyglycolic acid, polyacrylamide (PAM), modified polyacrylamide, poly-N-isopropylacrylamide (PNIPAm), modified poly-N-isopropylacrylamide, polyvinyl alcohol (PVA), modified polyvinyl alcohol, polyacrylic acid (PAA), modified polyacrylic acid, polycaprolactone (PCL), modified polycaprolactone, fibronectin, modified fibronectin, collagen, modified collagen, laminin, modified laminin, polysaccharide, modified polysaccharide, or a co-polymer in any combination.

140. The method of any one of embodiments 118 to 139, wherein the flowable polymer includes at least one of a polyethylene glycol, modified polyethylene glycol, polylactic acid (PLA), modified polylactic acid, polyglycolic acid (PGA), modified polyglycolic acid, polyvinyl alcohol (PVA), modified polyvinyl alcohol, polyacrylic acid (PAA), modified polyacrylic acid, polycaprolactone (PCL), modified polycaprolactone, fibronectin, modified fibronectin, collagen, modified collagen, laminin, modified laminin, polysaccharide, modified polysaccharide, or a co-polymer in any combination.

141. The method of any one of embodiments 118 to 140, wherein the solidified polymer network includes a modified polyethylene glycol polymer.

142. The method of embodiment 141, wherein the modified polyethylene glycol polymer includes a star polymer.

143. The method of embodiment 141 or 142, wherein the modified polyethylene glycol polymer includes diacrylate moieties.

144. The method of any one of embodiments 141 to 143, wherein the modified polyethylene glycol polymer includes photocleavable moieties.

145. The method of any one of embodiments 116 to 144, wherein the step of introducing the clonal population of micro-objects or moving the single cell is performed using dielectrophoretic (DEP) forces.

146. The method of embodiment 145, further including optically actuating the DEP forces.

147. The method of any one of embodiments 118-146, wherein at least one inner surface of the enclosure includes a conditioned surface.

148. The method of embodiment 147, wherein the at least one inner surface includes a surface of the substrate.

149. The method of embodiment 147 or 148, wherein the conditioned surface is a covalently modified surface.

150. The method of embodiment 149, wherein the covalently modified surface is hydrophilic.

151. A kit including a microfluidic device of any one of embodiments 1 to 59, and a flowable polymer solution, wherein the polymer is capable of polymerization and/or thermally induced gelling.

152. The kit of embodiment 151, further including a photoactivatable polymerization initiator.

153. The kit of embodiment 151 or 152, wherein the flowable polymer includes a synthetic polymer, a modified synthetic polymer, or a biological polymer.

154. The kit of embodiment 153, wherein the modified synthetic polymer includes size modification motifs, cleavage motifs, reactive terminal moieties, or cell recognition motifs.

155. The kit of any one of embodiments 151 to 154, wherein the flowable polymer includes at least one of a polyethylene glycol, modified polyethylene glycol, polylactic acid (PLA), modified polylactic acid, polyglycolic acid (PGA), modified polyglycolic acid, polyacrylamide (PAM), modified polyacrylamide, poly-N-isopropylacrylamide (PNIPAm), modified poly-N-isopropylacrylamide, polyvinyl alcohol (PVA), modified polyvinyl alcohol, polyacrylic acid (PAA), modified polyacrylic acid, polycaprolactone (PCL), modified polycaprolactone, fibronectin, modified fibronectin, collagen, modified collagen, laminin, modified laminin, polysaccharide, modified polysaccharide, or a co-polymer in any combination.

156. The kit of any one of embodiments 151 to 155, wherein the flowable polymer includes at least one of a polyethylene glycol, modified polyethylene glycol, polylactic acid (PLA), modified polylactic acid, polyglycolic acid (PGA), modified polyglycolic acid, polyvinyl alcohol (PVA), modified polyvinyl alcohol, polyacrylic acid (PAA), modified polyacrylic acid, polycaprolactone (PCL), modified polycaprolactone, fibronectin, modified fibronectin, collagen, modified collagen, laminin, modified laminin, polysaccharide, modified polysaccharide, or a co-polymer in any combination.

157. The kit of any one of embodiments 151 to 156, wherein the flowable polymer includes a modified polyethylene glycol polymer.

158. The kit of embodiment 157, wherein the modified polyethylene glycol polymer includes a star polymer.

159. The kit of embodiment 157 or 158, wherein the modified polyethylene glycol polymer includes diacrylate moieties.

160. The kit of any one of embodiments 153 to 154, wherein the modified polyethylene glycol polymer includes photocleavable moieties.

161. The kit of any one of embodiments 151 to 161, further including a reagent configured to covalently modify at least one internal surface of the microfluidic device.

162. A microfluidic device including: an enclosure including: a substrate; a flow region including a microfluidic channel configured to contain a fluidic medium; a first plurality of sequestration pens disposed adjacent to each other such that each sequestration pen of the first plurality opens off a first side of the microfluidic channel; and a second plurality of sequestration pens disposed adjacent to each other such that each sequestration pen of the second plurality opens off a second opposing side of the microfluidic channel.

163. The microfluidic device of embodiment 162, wherein the first side of the microfluidic channel is configured to receive a first fluidic medium, and the second side of the microfluidic channel is configured to receive a second fluidic medium.

164. The microfluidic device of embodiment 163, wherein the first fluidic medium is introduced into the first side of microfluidic the channel via a first fluidic inlet and the second fluidic medium is introduced into the second side of the microfluidic channel via a second fluidic inlet.

165. The microfluidic device of embodiment 163 or 164, wherein the first fluidic medium flows out of the first side of the microfluidic channel via a first outlet and the second fluidic medium flows out of the second side of the microfluidic channel via a second outlet.

166. The microfluidic device of any one of embodiments 162-165, wherein each sequestration pen of the first plurality and the second plurality of sequestration pens includes an isolation region and a connection region, the connection region having a proximal opening to the channel and a distal opening to the isolation region.

167. The microfluidic device of embodiment 166, wherein the proximal opening of the sequestration pen to the channel is oriented substantially parallel to a flow of fluidic medium in the channel.

168. The microfluidic device of any one of embodiments 162-167, wherein at least one inner surface of the enclosure includes a conditioned surface.

169. The microfluidic device of embodiment 168, wherein the at least one inner surface includes a surface of the substrate.

170. The microfluidic device of embodiment 168 or 169, wherein the conditioned surface is a covalently modified surface.

171. The microfluidic device of any one of embodiments 168-169, wherein the covalently modified surface is hydrophilic.

172. The microfluidic device of any one of embodiments 162-171, wherein the substrate is configured to generate dielectrophoresis (DEP) forces within the enclosure.

173. The microfluidic device of embodiment 172, wherein the DEP forces are optically actuated.

174. The microfluidic device of any one of embodiments 162-173, wherein a cover of the microfluidic device is substantially transparent.

175. The microfluidic device of any one of embodiments 162-174, further including a barrier dividing the microfluidic channel into a first sub-channel configured to provide a first sub-flow of fluidic medium past the first plurality of sequestration pens and a second sub-channel configured to provide a second sub-flow of fluidic medium past the second plurality of sequestration pens, wherein the barrier is punctuated by at least one gap aligned between a proximal opening to the first sub-channel of the first pen of the first plurality of pens and a proximal opening to the second sub-channel of a first pen of the second plurality of pens.

176. The microfluidic device of embodiment 175, wherein the barrier has a length that extends from a first end of the channel to a second end of the channel.

177. The microfluidic device of embodiment 175 or 176, wherein the barrier of the microfluidic device further includes a gap aligned between a proximal opening to the first sub-channel of each pen of the first plurality of pens and a proximal opening to the second sub-channel of each respective pen of the second plurality of pens, wherein the barrier thereby includes a plurality of gaps along a length of the barrier in the microfluidic channel.

178. The microfluidic device of embodiment 175 or 176, further including an in situ-generated barrier closing the gap in the barrier separating the first sub-channel from the second sub-channel.

179. The microfluidic device of embodiment 178, further including an in situ-generated barrier closing each of the plurality of gaps of the barrier separating the first sub-channel from the second sub-channel, wherein the barrier thereby includes a plurality of in situ-generated barriers.

180. The microfluidic device of any one of embodiments 162-174, further including an in situ-generated barrier, wherein the in situ-generated barrier is disposed along a length of the microfluidic channel, dividing the microfluidic channel into a first sub-channel configured to provide a first sub-flow of fluidic medium past the first plurality of sequestration pens and a second sub-channel configured to provide a second sub-flow of fluidic medium past the second plurality of sequestration pens, wherein the in situ-generated barrier prevents cells from moving from the first sub-channel to the second sub-channel, and vice versa.

181. The microfluidic device of any one of embodiments 178-180, wherein the in situ-generated barrier includes a solidified polymer network.

182. The microfluidic device of embodiments 181, wherein the solidified polymer network includes a synthetic polymer, a modified synthetic polymer, or a biological polymer.

183. The microfluidic device of embodiment 182, wherein the synthetic polymer modifications include size modification motifs, cleavage motifs, reactive terminal moieties, or cell recognition motifs.

184. The microfluidic device of any one of embodiments 181-183, wherein the solidified polymer network includes at least one of a polyethylene glycol, modified polyethylene glycol, polylactic acid (PLA), modified polylactic acid, polyglycolic acid (PGA), modified polyglycolic acid, polyacrylamide (PAM), modified polyacrylamide, poly-N-isopropylacrylamide (PNIPAm), modified poly-N-isopropylacrylamide, polyvinyl alcohol (PVA), modified polyvinyl alcohol, polyacrylic acid (PAA), modified polyacrylic acid, polycaprolactone (PCL), modified polycaprolactone, fibronectin, modified fibronectin, collagen, modified collagen, laminin, modified laminin, polysaccharide, modified polysaccharide, or a co-polymer in any combination.

185. The microfluidic device of any one of embodiments 181-184, wherein the solidified polymer network includes at least one of a polyethylene glycol, modified polyethylene glycol, polylactic acid (PLA), modified polylactic acid, polyglycolic acid (PGA), modified polyglycolic acid, polyvinyl alcohol (PVA), modified polyvinyl alcohol, polyacrylic acid (PAA), modified polyacrylic acid, polycaprolactone (PCL), modified polycaprolactone, fibronectin, modified fibronectin, collagen, modified collagen, laminin, modified laminin, polysaccharide, modified polysaccharide, or a co-polymer in any combination.

186. The microfluidic device of any one of embodiments 176-180, wherein the solidified polymer network includes a modified polyethylene glycol polymer.

187. The microfluidic device of embodiment 186, wherein the modified polyethylene glycol polymer includes a star polymer.

188. The microfluidic device of embodiment 186 or 187, wherein the modified polyethylene glycol polymer includes diacrylate moieties.

189. The microfluidic device of any one of embodiments 186 to 188 wherein the modified polyethylene glycol polymer includes photocleavable moieties.

190. A kit for assaying cells of a clonal population, including a microfluidic device of any one of embodiments 162-177, and a flowable polymer solution, wherein the polymer is capable of polymerization and/or thermally induced gelling.

191. The kit of embodiment 190, further including a photoactivatable polymerization initiator.

192. The kit of embodiment 190 or 191, wherein the flowable polymer includes a synthetic polymer, a modified synthetic polymer, or a biological polymer.

193. The kit of embodiment 192, wherein the modified synthetic polymer includes size modification motifs, cleavage motifs, reactive terminal moieties, or cell recognition motifs.

194. The kit of any one of embodiments 190-193, wherein the flowable polymer includes at least one of a polyethylene glycol, modified polyethylene glycol, polylactic acid (PLA), modified polylactic acid, polyglycolic acid (PGA), modified polyglycolic acid, polyacrylamide (PAM), modified polyacrylamide, poly-N-isopropylacrylamide (PNIPAm), modified poly-N-isopropylacrylamide, polyvinyl alcohol (PVA), modified polyvinyl alcohol, polyacrylic acid (PAA), modified polyacrylic acid, polycaprolactone (PCL), modified polycaprolactone, fibronectin, modified fibronectin, collagen, modified collagen, laminin, modified laminin, polysaccharide, modified polysaccharide, or a co-polymer in any combination.

195. The kit of any one of embodiments 190-194, wherein the flowable polymer includes at least one of a polyethylene glycol, modified polyethylene glycol, polylactic acid (PLA), modified polylactic acid, polyglycolic acid (PGA), modified polyglycolic acid, polyvinyl alcohol (PVA), modified polyvinyl alcohol, polyacrylic acid (PAA), modified polyacrylic acid, polycaprolactone (PCL), modified polycaprolactone, fibronectin, modified fibronectin, collagen, modified collagen, laminin, modified laminin, polysaccharide, modified polysaccharide, or a co-polymer in any combination.

196. The kit of any one of embodiments 190-195, wherein the flowable polymer includes a modified polyethylene glycol polymer.

197. The kit of embodiment 196, wherein the modified polyethylene glycol polymer includes a star polymer.

193. The kit of embodiment 191 or 192, wherein the modified polyethylene glycol polymer includes diacrylate moieties.

194. The kit of any one of embodiments 191 to 193, wherein the modified polyethylene glycol polymer includes photocleavable moieties.

195. The kit of any one of embodiments 185 to 194, further including a reagent configured to covalently modify at least one internal surface of the microfluidic device.

What is claimed:

1. A method of isolating a micro-object in a microfluidic device, comprising:

introducing the micro-object into an enclosure of the microfluidic device, the enclosure comprising a flow region and a sequestration pen comprising an isolation region and a connection region, the connection region having a proximal opening to the flow region and a distal opening to the isolation region;

disposing the micro-object into the sequestration pen;

introducing a solution comprising a flowable polymer into the enclosure;

solidifying the flowable polymer thereby forming an in situ-generated isolation structure, in-situ at least in part in the sequestration pen, wherein the in situ-generated isolation structure is disposed within the connection region and configured to block passage of the micro-object between the sequestration pen and the flow region; and isolating the micro-object using the in situ-generated isolation structure.

2. The method of claim 1, wherein the enclosure is configured to receive a fluidic medium, and the in situ-generated isolation structure is porous to the fluidic medium.

3. The method of claim 1, wherein the in situ-generated isolation structure substantially restricts passage of the micro-object into or out of the sequestration pen in a size dependent manner.

4. The method of claim 1, wherein the in situ-generated isolation structure partially blocks the proximal opening of the connection region.

5. The method of claim 1, wherein the in situ-generated isolation structure is formed within the sequestration pen.

6. The method of claim 1, wherein the in situ-generated isolation structure is formed within the isolation region or the connection region.

7. The method of claim 1, wherein the in situ-generated isolation structure is formed at the proximal opening of the connection region.

8. The method of claim 7, wherein the connection region comprises a width of about 50 microns to about 100 microns at the proximal opening, and the in situ-generated isolation structure has a dimension of at least 50 microns.

9. The method of claim 8, wherein the width of the connection region is about 50 microns to about 60 microns.

10. The method of claim 1, wherein solidifying the flowable polymer comprises optically illuminating a selected area, and further wherein solidifying the flowable polymer comprises polymerizing polymers of the flowable polymer to form a polymer network.

11. The method of claim 1, further comprising:

reducing or removing the in situ-generated isolation structure by: increasing flow of fluidic medium through the flow region;

introducing a hydrolytic agent into the flow region; introducing a proteolytic agent into the flow region;

increasing/decreasing osmolality of fluidic medium within the enclosure; changing a temperature of the in situ-generated isolation structure; or optically illuminating the isolation structure, and releasing the micro-object from the in situ-generated isolation structure.

12. The method of claim 11, further comprising: exporting the micro-object from the microfluidic device.

13. The method of claim 1, further comprising: introducing a plurality of micro-objects into the enclosure of the microfluidic device.

14. The method of claim 13, further comprising: exporting from the microfluidic device a remainder of the plurality of micro-objects not isolated by the in situ-generated isolation structure.

15. The method of claim 1, wherein the enclosure comprises a plurality of sequestration pens.

16. The method of claim 15, wherein the flow region comprises a microfluidic channel and a proximal opening of each of the plurality of sequestration pens opens off of one side of the microfluidic channel.

17. The method of claim 1, wherein the flowable polymer comprises a synthetic polymer, a modified synthetic polymer, or a biological polymer.

18. The method of claim 17, wherein the modified synthetic polymer comprises size modification motifs, cleavage motifs, reactive terminal moieties, and/or cell recognition motifs.

19. The method of claim 1, wherein the solidified polymer network comprises at least one of a polyethylene glycol, modified polyethylene glycol, polylactic acid (PLA), modified polylactic acid, polyglycolic acid (PGA), modified polyglycolic acid, polyacrylamide (PAM), modified polyacrylamide, poly-N-isopropylacrylamide (PNIPAm), modified poly-N-isopropylacrylamide, polyvinyl alcohol (PVA), modified polyvinyl alcohol, polyacrylic acid (PAA), modified polyacrylic acid, polycaprolactone (PCL), modified polycaprolactone, fibronectin, modified fibronectin, collagen, modified collagen, laminin, modified laminin, polysaccharide, modified polysaccharide, or a co-polymer in any combination.

20. The method of claim 1, wherein disposing the micro-object into the sequestration pen comprises using dielectrophoresis (DEP) forces.

* * * * *